(12) United States Patent
Kim et al.

(10) Patent No.: US 11,983,364 B2
(45) Date of Patent: May 14, 2024

(54) STYLUS PEN, ANTENNA MODULE, TOUCH SENSOR, AND ELECTRONIC DEVICE

(71) Applicant: HiDeep Inc., Seongnam-si (KR)

(72) Inventors: Seyeob Kim, Seongnam-si (KR);
Bonkee Kim, Seongnam-si (KR);
Youngho Cho, Seongnam-si (KR);
Hyoungwook Woo, Seongnam-si (KR);
Kiryoung Jung, Seongnam-si (KR);
Hwanhee Lee, Seongnam-si (KR);
Wonwoo Lee, Seongnam-si (KR);
Kyeonghan Park, Seongnam-si (KR);
Sein Lee, Seongnam-si (KR);
Jeongwon Seo, Seongnam-si (KR);
Jongsik Kim, Seongnam-si (KR); Inuk Jeong, Seongnam-si (KR); Hojun Moon, Seongnam-si (KR); Beomkyu Ko, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 4 days.

(21) Appl. No.: 17/763,385

(22) PCT Filed: Jan. 21, 2021

(86) PCT No.: PCT/KR2021/000837
§ 371 (c)(1),
(2) Date: Jan. 3, 2023

(87) PCT Pub. No.: WO2021/150036
PCT Pub. Date: Jul. 29, 2021

(65) Prior Publication Data
US 2023/0125764 A1    Apr. 27, 2023

(30) Foreign Application Priority Data

Jan. 22, 2020 (KR) .................. 10-2020-0008825
Jan. 22, 2020 (KR) .................. 10-2020-0008826
(Continued)

(51) Int. Cl.
*G06F 3/041* (2006.01)
*G06F 3/0354* (2013.01)
(Continued)

(52) U.S. Cl.
CPC ...... *G06F 3/04184* (2019.05); *G06F 3/03545* (2013.01); *G06F 3/0383* (2013.01);
(Continued)

(58) Field of Classification Search
CPC .................................................. G06F 3/0488
See application file for complete search history.

(56) References Cited

U.S. PATENT DOCUMENTS 8,847,901 B2   9/2014   Oh
8,878,802 B2   11/2014  Azumi et al.
(Continued)

FOREIGN PATENT DOCUMENTS

EP    2772838      9/2014
JP    2013-076795  4/2013
(Continued)

OTHER PUBLICATIONS

KIPO, PCT Search Report & Written Opinion of PCT/KR2021/000837 dated Apr. 19, 2021.
EPO, Search Report of EP 21743904.1 dated Jan. 19, 2024.

*Primary Examiner* — Nan-Ying Yang
(74) *Attorney, Agent, or Firm* — LEX IP MEISTER, PLLC

(57) ABSTRACT

An embodiment of the present invention provides a display device including: a loop coil; a display unit configured to
(Continued)

include a plurality of pixels; a display driver configured to apply a data signal and a scan signal to the pixels depending on a vertical synchronization signal and a horizontal synchronization signal; a plurality of touch electrodes positioned on the display unit; a driving receiver configured to apply a driving signal to the loop coil during a first period and to receive a sensing signal from at least one of the touch electrodes during a second period after the first period; and a controller configured to generate touch information by using the sensing signal, wherein the driving signal is synchronized to at least one pulse of the vertical synchronization signal and the horizontal synchronization signal.

16 Claims, 175 Drawing Sheets

(30) Foreign Application Priority Data

| Jan. 22, 2020 | (KR) | 10-2020-0008827 |
| Jan. 22, 2020 | (KR) | 10-2020-0008829 |
| Jan. 22, 2020 | (KR) | 10-2020-0008830 |
| Feb. 24, 2020 | (KR) | 10-2020-0022527 |
| Mar. 31, 2020 | (KR) | 10-2020-0039246 |
| Apr. 1, 2020 | (KR) | 10-2020-0039831 |
| Apr. 3, 2020 | (KR) | 10-2020-0040911 |
| Apr. 20, 2020 | (KR) | 10-2020-0047507 |
| May 12, 2020 | (KR) | 10-2020-0056598 |
| May 18, 2020 | (KR) | 10-2020-0058885 |
| May 20, 2020 | (KR) | 10-2020-0060499 |

(51) Int. Cl.
*G06F 3/038* (2013.01)
*G06F 3/044* (2006.01)

(52) U.S. Cl.
CPC ...... *G06F 3/04162* (2019.05); *G06F 3/04164* (2019.05); *G06F 3/041662* (2019.05); *G06F 3/0441* (2019.05); *G06F 3/0442* (2019.05)

(56) References Cited

U.S. PATENT DOCUMENTS

| 9,182,848 | B2 | 11/2015 | Oh | |
| 10,545,589 | B2 | 1/2020 | Gotoh et al. | |
| 2008/0150918 | A1 | 6/2008 | Hagen et al. | |
| 2013/0082954 | A1 | 4/2013 | Azumi et al. | |
| 2013/0141344 | A1 | 6/2013 | Oh | |
| 2014/0362012 | A1* | 12/2014 | Lee | G06F 3/046 345/173 |
| 2014/0362021 | A1 | 12/2014 | Oh | |
| 2015/0145819 | A1 | 5/2015 | Bae | |
| 2016/0231859 | A1 | 8/2016 | Chen | |
| 2018/0032173 | A1 | 2/2018 | Kim et al. | |
| 2018/0032202 | A1* | 2/2018 | Kim | G06F 3/04166 |
| 2018/0173367 | A1 | 6/2018 | Mayumi | |
| 2018/0307340 | A1 | 10/2018 | Gotoh et al. | |
| 2019/0102034 | A1 | 4/2019 | Nam et al. | |

FOREIGN PATENT DOCUMENTS

| JP | 2013-097469 | 5/2013 |
| JP | 2013-120598 | 6/2013 |
| JP | 2014-081944 | 5/2014 |
| JP | 2018-509697 | 4/2018 |
| JP | 2018-185559 | 11/2018 |
| KR | 10-2016-0032768 | 3/2016 |
| KR | 10-2016-0053302 | 5/2016 |
| KR | 10-2018-0012482 | 2/2018 |
| KR | 10-2018-0014446 | 2/2018 |
| KR | 10-2057050 | 12/2019 |
| WO | 2016-190282 | 12/2016 |

* cited by examiner (a)  (b)  (c)

FIG. 60
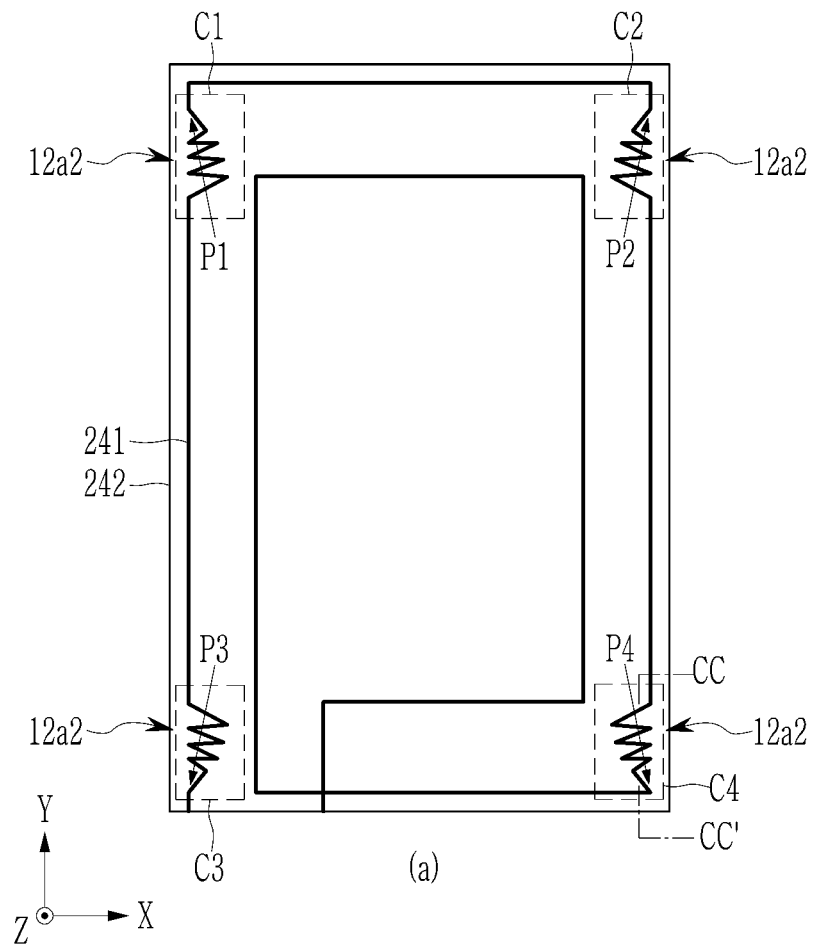
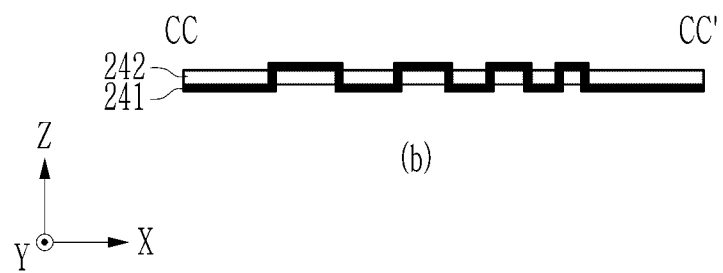

FIG. 82
(A)
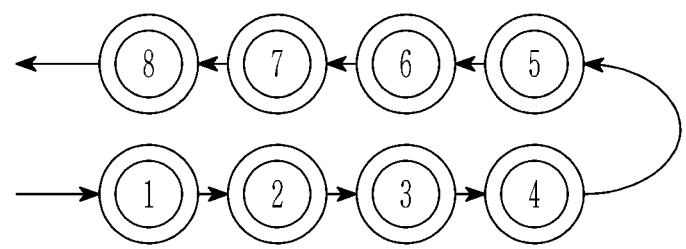
(B)
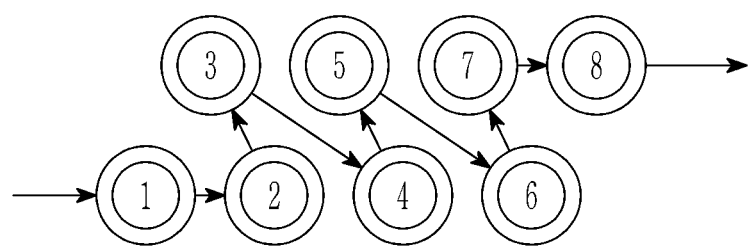

FIG. 92
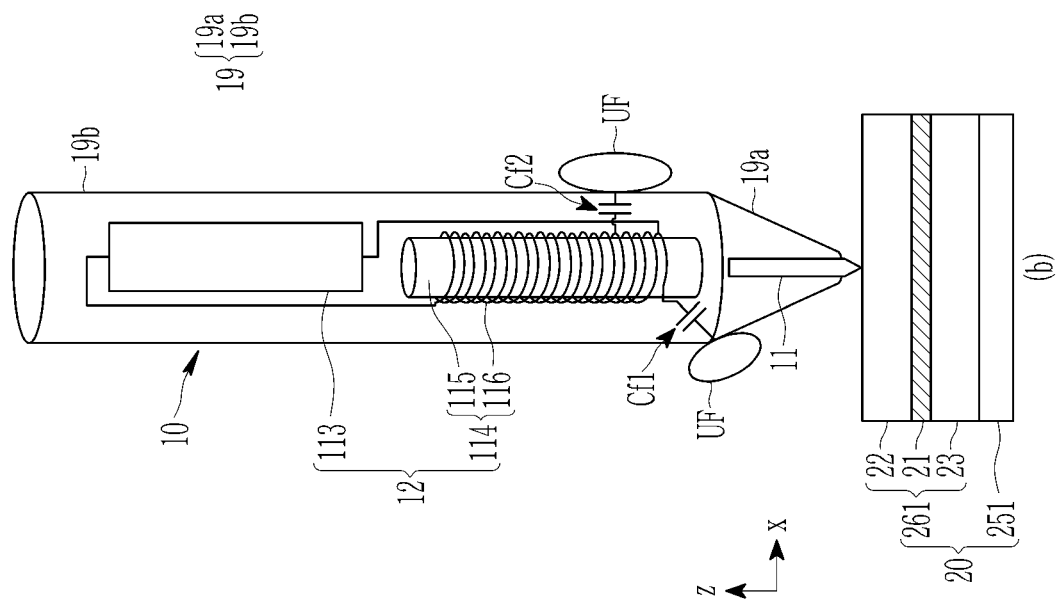
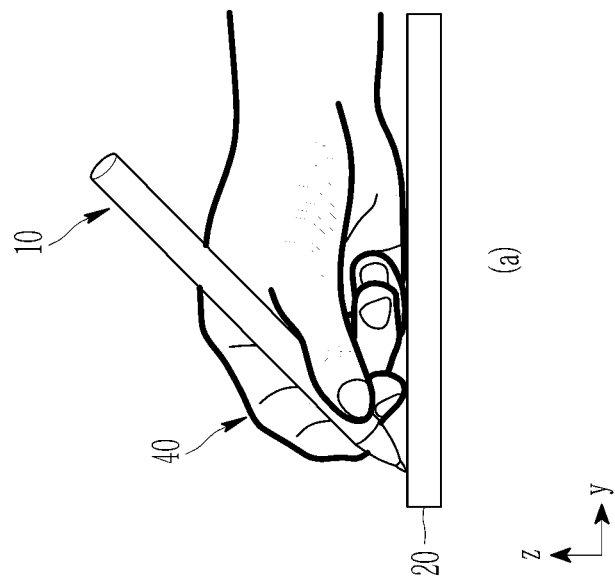

FIG. 146
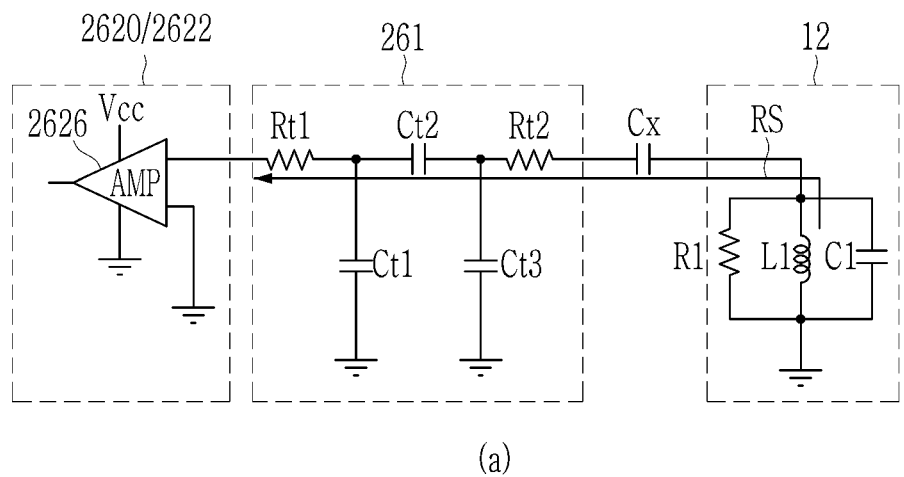
(a)
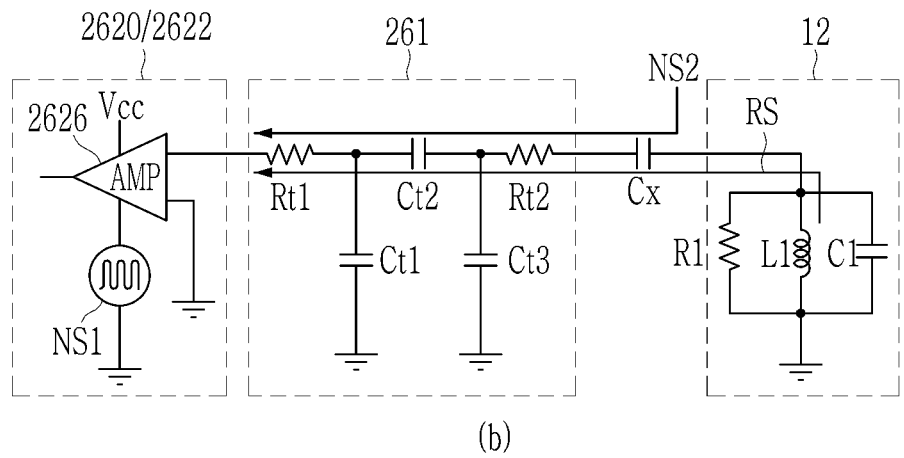
(b)

STYLUS PEN, ANTENNA MODULE, TOUCH SENSOR, AND ELECTRONIC DEVICE

TECHNICAL FIELD

The present disclosure relates to a stylus pen, an antenna module, a touch sensor, and an electronic device.

BACKGROUND ART

A touch sensor is provided in various electronic devices such as mobile phones, smart phones, laptop computers, digital broadcasting terminals, personal digital assistants, portable multimedia players, navigations, slate PCs, tablet PCs, ultrabooks, wear devices, head mounted displays, and the like).

In such an electronic device, a touch sensor may be disposed on a display panel displaying an image, or may be disposed in a portion of the electronic device. As a user interacts with the electronic device by touching the touch sensor, the electronic device may provide the user with an intuitive user interface.

The user may use a stylus pen for sophisticated touch input. The stylus pen may be classified into an active stylus pen and a passive stylus pen depending on whether a battery and an electronic component are provided therein.

The active stylus pen has superior basic performance compared to the passive stylus pen and has an advantage of providing additional functions (pen pressure, hovering, and button), but has a disadvantage in that it is difficult to use while charging the battery.

The passive stylus pen is inexpensive and requires no battery compared to the active stylus pen, but has difficult touch recognition as compared to the active stylus pen.

Particularly, in the case of an electro-magnetic resonance (EMR) type of pen among passive stylus pens, a digitizer transfers an electromagnetic signal to the pen, and then the digitizer receives a resonance signal from the pen. That is, since a signal is transmitted and received only by the digitizer, signal transmission and signal reception may not be performed simultaneously, and there is a problem in that they need to be performed in a time division manner. Similarly, in the case of an electrically coupled resonance (ECR) type of pen among passive stylus pens, a touch electrode transmits an electromagnetic signal to the pen, and then the touch electrode receives a resonance signal from the pen. That is, since a signal is transmitted and received only by the touch electrode, signal transmission and signal reception may not be performed simultaneously, and there is a problem in that they need to be performed in a time division manner.

In addition, noise exists in the electronic device due to various reasons, and such noise may act as a factor to degrade sensing performance of the electronic device. In particular, in the case of a stylus pen, when noise in a frequency band that is similar to a resonance frequency of the stylus pen exists, precision of touch sensing may be greatly reduced.

In addition, the touch sensor is vulnerable to noise having a frequency similar to a resonant frequency according to a design of a resonance circuit embedded in the stylus pen.

The above information disclosed in this Background section is only for enhancement of understanding of the background of the invention, and therefore, it may contain information that does not form the prior art that is already known in this country to a person of ordinary skill in the art.

DISCLOSURE

Technical Problem

Embodiments have been made in an effort to provide an antenna module for reducing noise of a touch signal and an electronic device including the same.

Embodiments have been made in an effort to provide an antenna module that can be implemented on one layer and an electronic device including the same.

Embodiments have been made in an effort to provide an antenna module capable of improving touch sensing performance by a stylus pen and an electronic device including the same.

Embodiments have been made in an effort to provide a foldable electronic device that is easy to use with a stylus pen and a driving method thereof.

Embodiments have been made in an effort to provide a foldable electronic device capable of improving touch sensing performance by a stylus pen and a driving method thereof.

Embodiments have been made in an effort to provide an antenna module driven with a smaller current and an electronic device including the same.

Embodiments have been made in an effort to provide an antenna module capable of reducing power consumption and an electronic device including the same.

Embodiments have been made in an effort to provide an antenna module capable of wireless charging without a separate wireless charging module and an electronic device including the same.

Embodiments have been made in an effort to provide an electronic device that amplifies a magnetic field generated in a coil with a same voltage and a control method thereof.

Embodiments have been made in an effort to provide an electronic device for preventing noise caused by a display panel and a control method thereof.

Embodiments have been made in an effort to provide an electronic device capable of improving touch sensing performance by a stylus pen in an environment in which noise of a frequency band that is similar to a resonance signal of the stylus pen exists, and a touch detection method thereof.

Embodiments have been made in an effort to provide a stylus pen capable of generating a sufficient resonance signal.

Embodiments have been made in an effort to provide a stylus pen that transfers a signal having an appropriate magnitude to a touch sensor.

Embodiments have been made in an effort to provide a stylus pen in which a resonance frequency can be maintained.

Embodiments have been made in an effort to provide a stylus pen having a plurality of resonant frequencies, and a touch sensor and an electronic device for receiving a signal with reduced noise by using the same.

Embodiments have been made in an effort to provide a stylus pen, an electronic device, and an input system, capable of wireless charging during use of the stylus pen.

Embodiments have been made in an effort to provide a stylus pen, an electronic device, and an input system, capable of wireless charging without a separate wireless charging module.

Embodiments have been made in an effort to provide a stylus pen, an electronic device, and an input system, capable of a touch input and a sensor input.

Embodiments have been made in an effort to provide a stylus pen, an electronic device, and an input system, capable of changing a resonant frequency.

Embodiments have been made in an effort to provide a stylus pen, an electronic device, and an input system, capable of communicating with a commercialized communication protocol.

Embodiments have been made in an effort to provide a stylus pen capable of wireless charging with maximum efficiency.

Technical Solution

An embodiment of the present invention provides a display device including: a plurality of antenna loops formed spaced apart from each other on a substrate, wherein each of the antenna loops include a first antenna loop connecting a first pad and a second pad on the substrate and a second antenna loop connecting a third pad and a fourth pad; and a flexible circuit board electrically connected to the first to fourth pads, wherein the flexible circuit board includes a connection wire connecting the second pad and the third pad to each other, and a coil driver applying a driving signal to the first pad and the second pad.

An embodiment of the present invention provides a foldable electronic device including: a touch sensor; and a loop coil positioned below the touch sensor, wherein the loop coil includes a ferrite sheet positioned in a region excluding a folding region forming a curved surface in a folded state and an antenna loop positioned on the ferrite sheet.

An embodiment of the present invention provides an electronic device including: a resonance circuit configured to include a loop coil and a capacitor connected in parallel with the loop coil; a blocking capacitor connected in series to the resonance circuit; and a power supply configured to transfer a driving signal of a predetermined frequency to the blocking capacitor.

An embodiment of the present invention provides an electronic device including: a loop coil; and a coil driver configured to apply a driving signal of a predetermined frequency to opposite ends of the loop coil, and the coil driver applies driving signals of opposite phases to the opposite ends of the loop coil.

An embodiment of the present invention provides an electronic device including: a touch sensor configured to include a touch electrode, and a loop coil configured to have a different distance between windings corresponding to a disposal of the touch electrode.

An embodiment of the present invention provides an electronic device including: a loop coil; a touch panel configured to include a plurality of first touch electrodes arranged in a first direction and a plurality of second touch electrodes arranged in a second direction crossing the first direction; a coil driver configured to apply a coil driving signal to the loop coil; a driver/receiver configured to apply a driving signal to a plurality of first touch electrodes and a plurality of second touch electrodes and to receive sensing signals from the first touch electrodes and the second touch electrodes; and a controller configured to control the coil driver to change a length of a period in which the coil driver operates based on the sensing signals outputted from the receiver.

An embodiment of the present invention provides a display device including: a loop coil; a display unit configured to include a plurality of pixels; a display driver configured to apply a data signal and a scan signal to the pixels depending on a vertical synchronization signal and a horizontal synchronization signal; a plurality of touch electrodes positioned on the display unit; a driving receiver configured to apply a driving signal to the loop coil during a first period and to receive a sensing signal from at least one of the touch electrodes during a second period after the first period; and a controller configured to generate touch information by using the sensing signal, wherein the driving signal is synchronized to at least one pulse of the vertical synchronization signal and the horizontal synchronization signal.

The driver/receiver may receive the sensing signal in synchronization with a pulse of the horizontal synchronization signal.

The controller may generate the touch information by using some sensing signals received during a sensing period determined in response to horizontal synchronization signal among sensing signals.

The controller determines a period excluding a period from a time when the pulse of the horizontal synchronization signal is generated to a predetermined second time from a time when the pulse of the horizontal synchronization signal is generated to a predetermined first time as the sensing period, and the predetermined second time may exceed the predetermined first time.

The controller may determine a period excluding a period during which a scan signal applied to one pixel among the pixels is at an enable level as a sensing period.

The controller may determine a period excluding a period during which a data signal is applied to one pixel among the pixels as the sensing period.

The driving receiver may receive the sensing signal at two times having opposite phases within one cycle of a frequency of the driving signal.

The controller may generate touch information by using a difference value between sensing signals received at two times.

The display driver may further apply an emission control signal for controlling the pixels to emit light, and the two times may be within a period excluding a time at which an emission control signal applied to one of the pixels is transitioned to an enable level.

A frequency of the driving signal may be an integer multiple of 2 or more of a frequency of the horizontal synchronization signal.

A touch device on a display that displays an image of one frame by applying a scan signal and a data signal to a plurality of pixels depending on a vertical synchronization signal and a horizontal synchronization signal, the touch device including: a touch sensor unit configured to include a plurality of electrodes; a driver/receiver configured to applying a driving signal to at least one of the electrodes during a first period and to receive a sensing signal having a predetermined phase difference from the driving signal from at least one of the electrodes during a second period after the first period; and a controller configured to generate touch information by using the sensing signal, wherein the driving signal is synchronized to at least one pulse of the vertical synchronization signal and the horizontal synchronization signal.

The driver/receiver may receive the sensing signal in synchronization with a pulse of the horizontal synchronization signal.

The controller may generate the touch information by using some sensing signals received during a sensing period determined in response to horizontal synchronization signal among sensing signals.

The controller determines a period excluding a period from a time when the pulse of the horizontal synchronization signal is generated to a predetermined second time from a time when the pulse of the horizontal synchronization signal is generated to a predetermined first time as the sensing period, and the predetermined second time may exceed the predetermined first time.

The controller may determine a period excluding a period during which a scan signal applied to one pixel among the pixels is at an enable level as a sensing period.

The controller may determine a period excluding a period during which a data signal is applied to one pixel among the pixels as the sensing period.

The driving receiver may receive the sensing signal at two times having opposite phases within one cycle of a frequency of the driving signal.

The controller may generate touch information by using a difference value between sensing signals received at two times.

A frequency of the driving signal may be an integer multiple of 2 or more of a frequency of the horizontal synchronization signal.

An embodiment of the present invention provides a touch system including: a stylus configured to include a resonance circuit; a display configured to include a display unit configured to include a plurality of pixels, and a display driver configured to apply a data signal and a scan signal to the pixels depending on a vertical synchronization signal and a horizontal synchronization signal; a plurality of touch electrodes positioned on the display unit; a driving receiver configured to apply a driving signal to the loop coil during a first period and to receive a sensing signal from at least one of the touch electrodes during a second period after the first period; and a controller configured to generate touch information by using the sensing signal, wherein the driving signal is synchronized to at least one pulse of the vertical synchronization signal and the horizontal synchronization signal.

An embodiment of the present invention provides a display device including: a loop coil; a coil driver configured to apply a driving signal of a predetermined frequency to the loop coil; a touch electrode; and a touch driver configured to receive a sensing signal from the touch electrode, wherein the touch driver receives a sensing signal during a period to which a driving signal is not applied.

An embodiment of the present invention provides a display device including: a loop coil; a touch panel configured to include a plurality of touch electrodes; and a driver/receiver configured to apply a driving signal having a frequency corresponding to a resonance frequency of a stylus pen to the loop coil, and to receive sensing signals from the touch electrodes, and the driving signal may include a first driving signal and a second driving signal having a phase different from that of the first driving signal.

An embodiment of the present invention provides a stylus pen including: a body portion; a conductive tip configured to be exposed from an inside of the body portion to an outside thereof; a ferrite core positioned in the body portion; an inductor portion configured to include a coil connected to the conductive tip and wound in multiple layers over at least a portion of the ferrite core; and a capacitor portion positioned in the body portion to be electrically connected to the inductor portion to form a resonance circuit.

An embodiment of the present invention provides a stylus pen including: a housing; a conductive tip configured to have at least a portion that is exposed to an exterior of the housing; a resonance circuit positioned in a housing to resonate a magnetic signal; and a conductive blocking member positioned to correspond to a portion of the housing in which the conductive tip is exposed to the exterior.

An embodiment of the present invention provides a stylus pen including: a body portion; a conductive tip configured to be exposed from an inside of the body portion to an outside thereof; a ground portion configured to be electrically connected to a user; and a resonant circuit portion positioned in the body portion, electrically connected between the conductive tip and the ground portion, and including one or more resonance circuits that resonate with electromagnetic signals of different frequencies transferred from the body portion to output resonance signals of different frequencies.

An embodiment of the present invention provides a stylus pen including: a sensor configured to sense an external input; a resonance circuit; and a controller configured to receive power from the resonance circuit and to control the resonance signal generated in the resonance circuit depending on a sensing value of the sensor.

An embodiment of the present invention provides a stylus pen including: a resonance circuit; an inductor coupled to the resonant circuit by mutual inductance; and an active module coupled to the inductor.

Advantageous Effects

According to embodiments, there is an advantage in that it is possible to reduce a manufacturing cost of an antenna module and an electronic device including the same.

According to the embodiments, there is an advantage of being able to provide a thinner and smaller form factor.

There is an advantage of improving a signal-noise-ratio (SNR) of a signal output from a stylus pen.

According to the embodiments, it is possible to improve reception sensitivity of the touch input.

According to the embodiments, it is possible to accurately calculate touch positions.

According to embodiments, there is an advantage that palm rejection may be performed.

According to the embodiments, there is an advantage in that it is possible to reduce power consumption of an antenna module and an electronic device including the same.

According to the embodiments, there is advantage of increasing energy transferred to the stylus pen.

According to the embodiments, there is an advantage in that power required for use of the stylus pen may be transferred at the same time as the use of the stylus pen without separate wireless charging.

According to embodiments, there is an advantage in that it is possible to reduce a manufacturing cost of an antenna module and an electronic device including the same.

According to the embodiments, there is an advantage in that energy consumption of the touch sensor can be reduced by reducing energy consumption during a section during which a driving signal is outputted to the touch sensor for resonance of the stylus pen.

According to the embodiments, there is an advantage in that touch sensing performance by the stylus pen may be improved in an environment in which noise in a frequency band that is similar to a resonance signal of the stylus pen exists.

According to the embodiments, there is an advantage that a sufficient output signal may be generated even with a thin diameter by suggesting a structure of the resonance circuit of the optimal stylus pen.

According to at least one of the embodiments of the present disclosure, it is possible to provide a stylus pen that prevents unintentional touch input.

According to the embodiments, there is an advantage in that it is possible to provide a stylus pen that is robust against external factors.

According to the embodiments, there is an advantage of detecting an additional input of a user using the stylus pen.

According to the embodiments, there is an advantage of wirelessly charging the stylus pen in use.

According to the embodiments, there is an advantage of being able to charge the stylus pen more quickly.

According to the embodiments, there is an advantage of reducing power consumption for charging the stylus pen.

DESCRIPTION OF THE DRAWINGS

FIG. 57 to FIG. 60 illustrate views showing a disposal form of a touch panel and a loop coil according to various aspects of another embodiment.

FIG. 82 illustrates a multi-layer winding scheme.

FIG. 92 illustrates a schematic view showing a stylus pen and an electronic device when the stylus pen is held.

FIG. 146 illustrates an equivalent circuit diagram showing a stylus pen and a touch sensor that receives a sensing signal.

MODE FOR INVENTION

Figure 1:
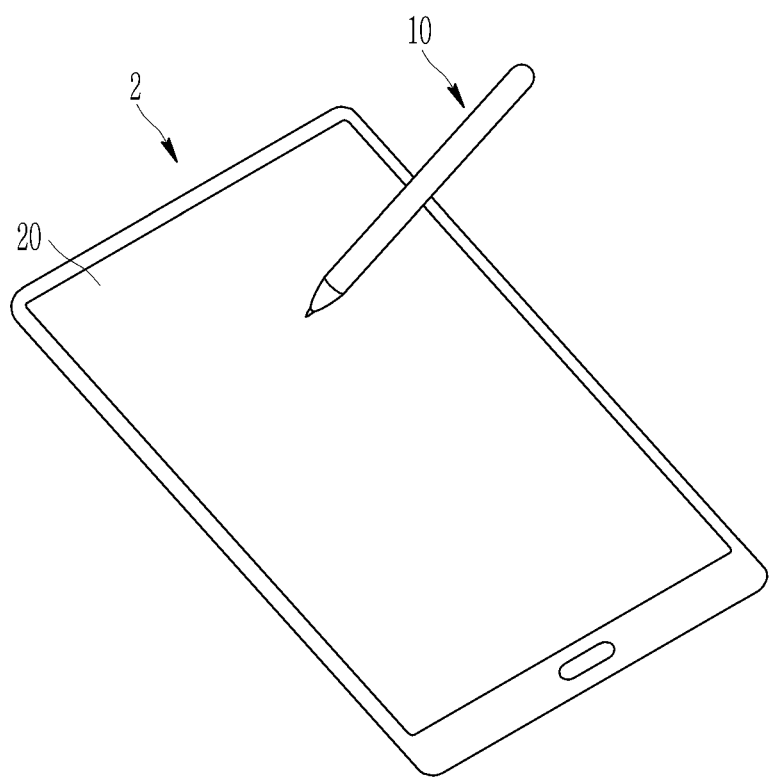
FIG. 1 illustrates a schematic view showing a stylus pen and an electronic device.

Hereinafter, various embodiments of the present document will be described with reference to the accompanying drawings. However, it is not intended to limit the techniques described herein to particular embodiments, and it should be understood as including various modifications, equivalents, and/or alternatives of the embodiments of this document. In connection with the description of the drawings, like reference numerals may be used for like components.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In this document, expressions such as "have", "may have", "includes", or "may include" refer to the presence of a corresponding characteristic (e.g., a numerical value, function, operation, or component such as a part), and does not exclude the presence of additional features.

In this document, expressions such as "A or B", "at least one of A or/and B", or "one or more of A or/and B" may include all possible combinations of the items listed together. For example, "A or B", "at least one of A and B", or "at least one of A or B" indicates (1) including at least A, (2) including at least B; or (3) may refer to all cases including both at least A and at least B.

Expressions such as "first" or "second" used in this document may modify various elements, regardless of order and/or importance, and may modify one element to another, it is used only to distinguish it from the components, and does not limit the components. For example, first user equipment and second user equipment may represent different user equipment regardless of order or importance. For example, without departing from the scope of the rights described in this document, a first component may be referred to as a second component, and similarly, the second component may also be renamed as the first component.

When a component (e.g., a first component) is (operatively or communicatively) "coupled or connected with/to" another component (e.g., a second component), it should be understood that one component may be connected to another component in a direct way or through another component (e.g., a third component). When a component (e.g., a first component) is directly "coupled or connected with/to" another component (e.g., a second component), it may be understood that no other component (e.g., a third component) exists between one component and another component.

As used in this document, the expression "configured to (or configured to)" depends on a situation, e.g., "suitable for", "having the capacity to", "designed to", "adapted to", "made to", or "capable of" may be used interchangeably. The term "configured (or configured to)" may not necessarily indicates only "specifically designed to" in hardware. Instead, in some circumstances, the expression "a device configured to-" may indicate that the device is "capable of-" with other devices or components. For example, the phrase "a processor configured (or configured to perform) A, B, and C" may indicate a generic-purpose processor (e.g., a CPU or an application processor) capable of performing corresponding operations by executing one or more software programs stored in a dedicated processor (e.g., an embedded processor) or memory device for performing the corresponding operation.

Terms used in this document are only used to describe specific embodiments, and may not be intended to limit the scope of other embodiments. Singular forms are to include plural forms unless the context clearly indicates otherwise. Terms used herein, including technical or scientific terms, may have the same meanings as commonly understood by one of ordinary skill in the art described in this document. Among the terms used in this document, terms defined in a general dictionary may be interpreted as having the same or similar meaning as the meaning in the context of the related art, and unless explicitly defined in this document, it should not be construed in an ideal or overly formal sense. In some cases, even terms defined in this document may not be construed to exclude embodiments of this document.

An electronic device according to various embodiments of the present document may include, e.g., at least one of a smart phone, a tablet personal computer, a mobile phone, a video phone, and an e-book reader, a laptop personal computer (PC), a netbook computer, a mobile medical device, a camera, or a wearable device. According to various embodiments, the wearable device may include at least one of an accessory type (e.g. a watch, a ring, a bracelet, an anklet, a necklace, eyeglasses, a contact lens, or a head-mounted-device (HMD)); (e.g. a skin pad or tattoo), or a bioimplantable (e.g. an implantable circuit).

Hereinafter, an electronic device and a driving method thereof according to embodiments will be described with reference to necessary drawings.

Figure 2:
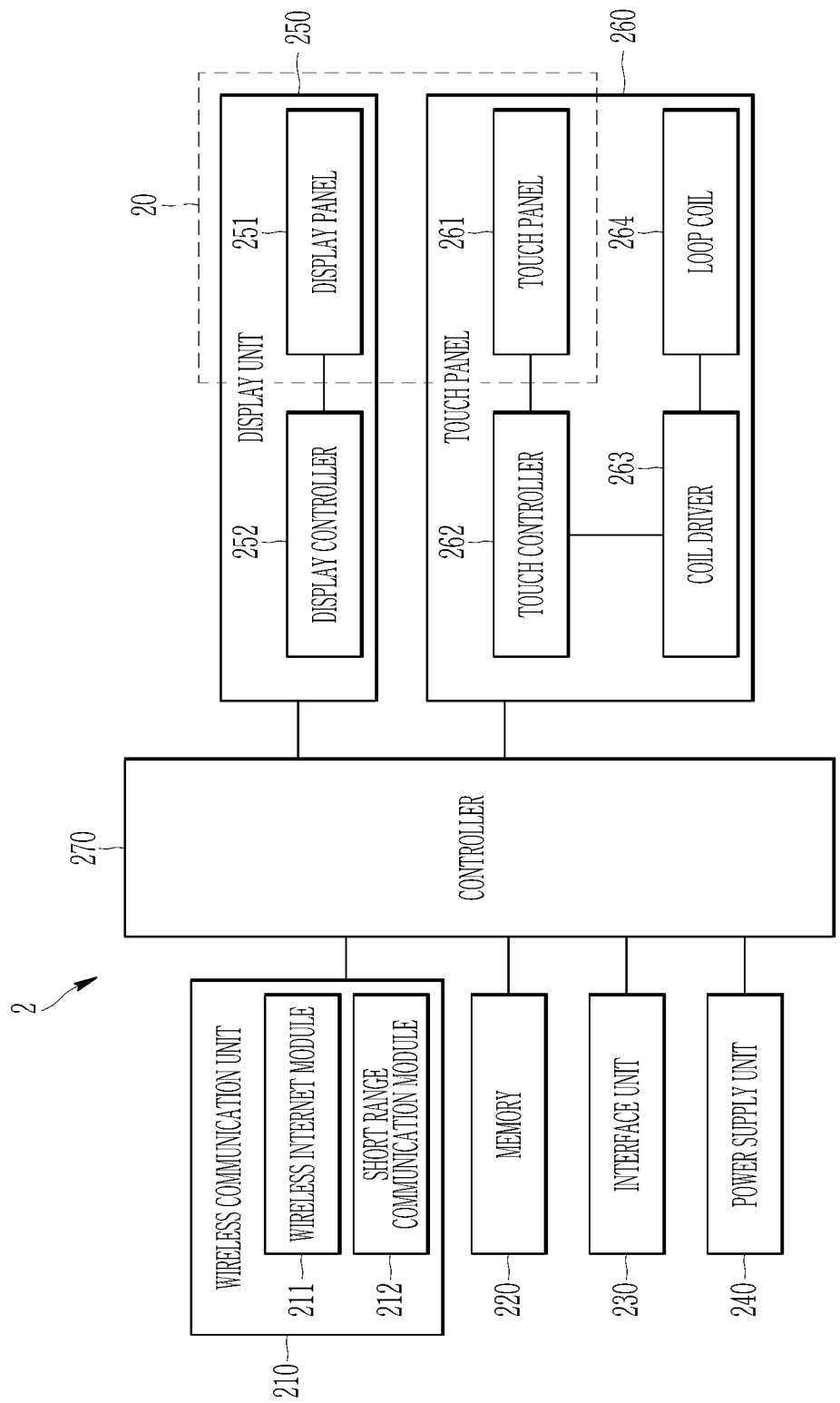
FIG. 2 illustrates a block diagram schematically showing an electronic device.
Figure 3:
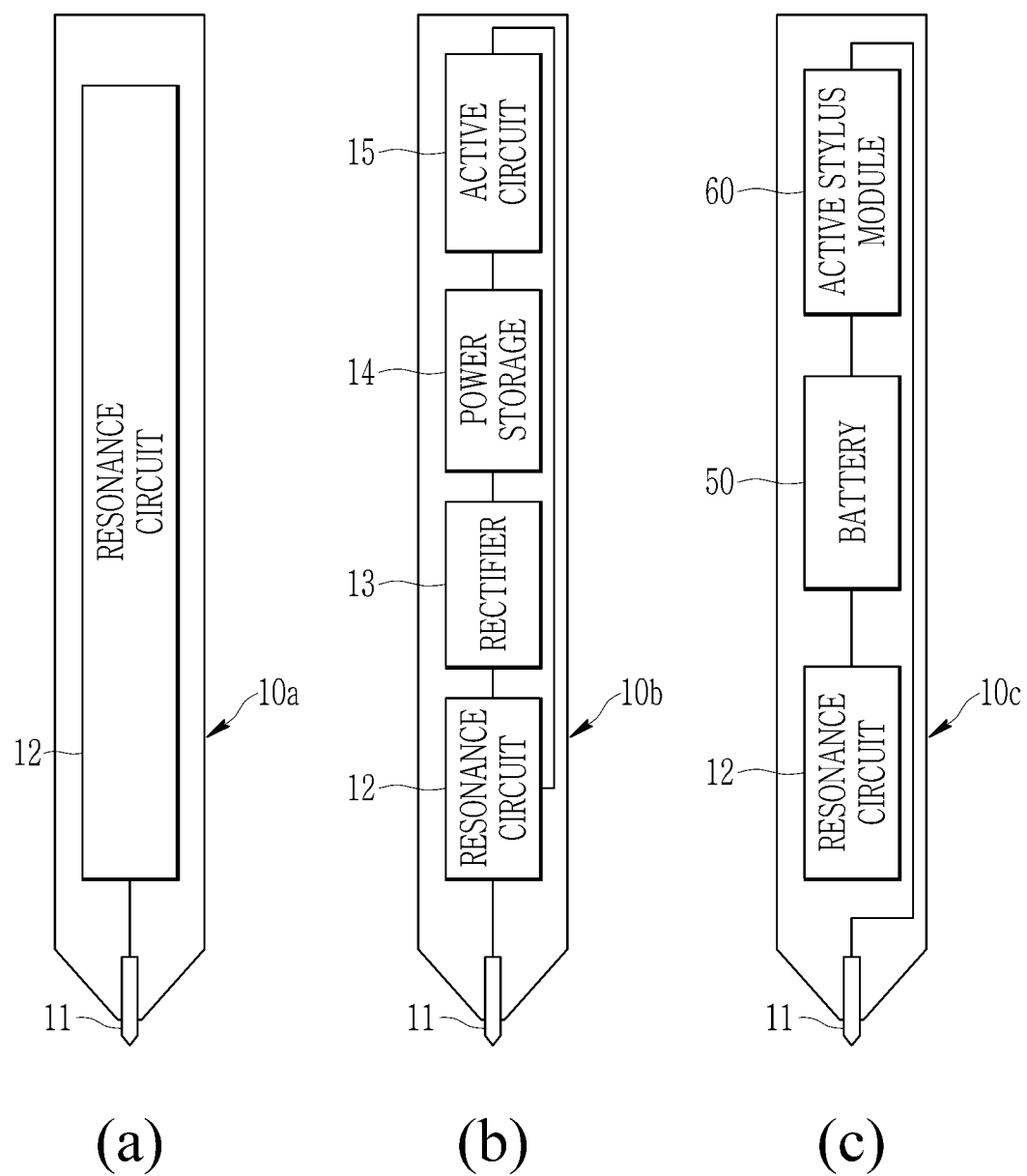
FIG. 3 illustrates a stylus pen according to an embodiment.

FIG. 1 illustrates a schematic view showing a stylus pen and an electronic device, FIG. 2 illustrates a block diagram schematically showing an electronic device, and FIG. 3 illustrates a stylus pen according to an embodiment.

As illustrated in FIG. 1, a stylus pen 10 may receive a signal outputted from an electronic device 2 near a touch screen 20 of the electronic device 2, or the touch screen 20, and may transmit the signal to the touch screen 20.

The electronic device 2 may include a wireless communication unit 210, a memory 220, an interface unit 230, a power supply unit 240, a display unit 250, a touch module 260, a controller 270, and the like. The constituent elements illustrated in FIG. 2 are not essential for implementing an electronic device, so the electronic device described in the present disclosure may include more or less constituent elements than the foregoing listed constituent elements.

Specifically, among the constituent elements, the wireless communication unit 210 may include at least one module that enables wireless communication between the electronic device 2 and a wireless communication system, between the terminal 2 and another electronic device 2, or between the electronic device 2 and an external server. In addition, the wireless communication unit 210 may include at least one module for connecting the electronic device 2 to at least one network.

The wireless communication unit 210 may include a wireless Internet module 211 and a short range communication module 212.

The wireless Internet module 211 refers to a module for wireless Internet connection, and may be embedded in the electronic device 2. The wireless Internet module 211 is configured to transmit and receive wireless signals in a communication network according to wireless Internet technologies. The wireless Internet module 211 transceivers a wireless signal in a communication network according to the wireless Internet technologies. Examples of the wireless Internet technology include a Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), New Radio (NR), Long Term Evolution (LTE), and Long Term Evolution-Advanced (LTE-A), and the wireless Internet module 171 transceives data according to at least one wireless Internet technology in a range including Internet technology which is not listed above.

The short range communication module 212 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short range communication module 212 may support wireless communication between the electronic device 2 and the wireless communication system, the electronic device 2 and a device capable of wireless communication, or the electronic device 2 and a network, in which an external server is located, through a wireless area network. The wireless area network may be a wireless personal area network.

Herein, the device capable of wireless communication may be a mobile terminal capable of exchanging (or interworking) data with the electronic device 2 according to the present invention, e.g., a smart phone, a tablet PC, a notebook computer, etc. The short range communication module 212 may detect (or recognize) a device capable of wireless communication which is capable of communicating with the electronic device 2, around the electronic device 2. Further, when the detected device capable of wireless communication is a device authenticated to communicate with the electronic device 2 according to the embodiment, the controller 270 may transmit at least some of data processed by the electronic device 2 to the device capable of wireless communication through the short-range communication module 212. Accordingly, a user of the device capable of wireless communication may use data processed in the electronic device 2 through the device capable of wireless communication.

In addition, the memory 220 stores data supporting various functions of the electronic device 2. The memory 220 may store a plurality of application programs (or applications), data for operating the electronic device 2, and commands which are driven in the electronic device 2.

The interface unit 230 serves as a passage of various kinds of external devices connected to the electronic device 2. The interface unit 230 may include at least one of a wired/wireless headset port, an external charger port, a wired/wireless data port, a memory card port, a port for connection with a device equipped with an identification module, an audio input/output (I/O) port, a video I/O port, and an earphone port.

The power supply unit 240 receives power from an external power source and an internal power source, and supplies the power from the power source to each constituent element included in the electronic device 2 under the control of the control unit 270. The power supply unit 240 includes a battery, and the battery may be an embedded battery or a replaceable battery.

The display unit 250 displays (outputs) information processed by the electronic device 2. For example, the display unit 250 may display execution image information of an application program driven in the electronic device 2, or user interface (UI) and graphical user interface (GUI) information according to the execution image information.

The display unit 250 may include a liquid crystal display (LCD), an organic light-emitting diode (OLED) display, an e-ink display, a quantum-dot light emitting display, a micro light emitting diode (LED) display, etc.

The display unit 250 includes a display panel 251 for displaying an image, and a display controller 252 connected to the display panel 251 to supply signals for displaying an image to the display panel 251. For example, the display panel 251 may include a plurality of pixels connected to signal lines such as a plurality of scan lines and a plurality of data lines, and a scan driver/receiver for supplying a scan signal to the scan lines, and the display controller 252 may include a data driver IC for generating a data signal applied to a data line, a timing controller for controlling an overall operation of the display unit 250 by processing an image signal, and a power management IC.

The touch module 260 senses a touch (or touch input) applied to a touch area by using a capacitive method. As an example, the touch module 260 may be configured to convert a change in capacitance, voltage, current, or the like, which are generated in a specific portion, into an electrical input signal. The touch module 260 may be configured to detect a position, an area, a capacitance at the touch, and the like, when a touch object that applies a touch onto a touch area is touched on the touch module 260. Herein, the touch object indicates an object applying a touch to the touch sensor, and may be, e.g., a body part of a user (finger, palm, etc.), a passive or active stylus pen 10, or the like.

The touch module 260 includes a touch sensor 261 in which a touch electrode is positioned, and a touch controller 262 configured to transfer touch data to the controller 270 and/or the display controller 252 by applying a driving signal to the touch sensor 261 and receiving a sensing signal from the touch sensor 261.

The touch controller 262 may be connected to at least one of a plurality of first touch electrodes to apply a driving signal, and may include a first driver/receiver configured to receive a sensing signal, a second driver/receiver connected to at least one of a plurality of second touch electrodes to apply a driving signal and receive a sensing signal, and a micro control unit (MCU) configured to control operations of the first driver/receiver and the second driver/receiver and to acquire a touch position by using a sensing signal outputted from the first and second driver/receiver.

The display panel 251 and the touch sensor 261 may be referred to as a touch screen 20 by forming a mutual layer structure or being integrally formed.

The touch module 260 further includes a loop coil 264 and a coil driver 263 for applying a driving signal to the loop coil 264. The loop coil 264 may be positioned around the touch screen 20, or may be positioned at any position in the electronic device 2. The loop coil 264 may also be configured as an antenna of the short-distance communication module 212 such as RFID or NFC. The driving signal includes an alternating current or alternating voltage having a predetermined frequency.

The controller 270 may control driving of the electronic device 2, and may output touch coordinate information in response to a touch detection result of the electronic device 2. In addition, the controller 270 may change a frequency of the driving signal in response to a touch detection result thereof.

The controller 270 typically controls a general operation of the electronic device 2 in addition to the operation related to the application program. The controller 270 processes the input or output signal, data, information, and the like, or drives the application program stored in the memory 220 through the foregoing constituent elements, thereby providing the user with or processing the appropriate information or function.

In addition, the controller 270 may control at least a part of the constituent elements described with reference to FIG. 2 in order to drive the application program stored in the memory 220. Further, the controller 270 may combine two or more of the constituent elements included in the distance measuring apparatus 2 and operate the combined constituent elements for driving the application program.

FIG. 3 illustrates a stylus pen according to an embodiment. Stylus pens 10a, 10b, and 10c each include a conductive tip 11 and a resonance circuit 12.

At least a portion of the conductive tip 11 may be formed of a conductive material (e.g., a metal, a conductive rubber, a conductive fabric, a conductive silicone, etc.), but the present invention is not limited thereto.

The resonance circuit 12, which is an LC resonance circuit, may resonate with a driving signal outputted from the loop coil 264. The driving signal may include a signal (e.g., a sine wave, a square wave, etc.) having a frequency corresponding to a resonance frequency of the resonance circuit 12. For resonance, a resonance frequency of the resonance circuit portion 12 and a frequency of the driving signal must be the same or very similar. Resonance frequencies of the stylus pens 10a and 10c depend on design values of the resonance circuit 12 of the stylus pens 10a and 10c. When the touch electrode 264 generates an electric field by the driving signal, the resonance circuit 12 of the stylus pen 10 resonates using a signal received through a change of the electric field.

Elements of each of the stylus pens 10a, 10b, and 10c may be accommodated in a housing. The housing may have a cylindrical shape, a polygonal shape, a column shape having at least part of a shape of a curved surface, an entasis shape, a frustum of a pyramid shape, a circular truncated cone shape, or the like, but it is not limited thereto. Since an inside of the housing is empty, the elements of each of the stylus pens 10a and 10c such as the conductive tip 11 and the resonance circuit 12 may be accommodated therein. The housing may be made of a non-conductive material.

The stylus pen 10a illustrated in FIG. 3A may include a conductive tip 11 and a resonance circuit 12 directly connected to the conductive tip 11. The resonance circuit 12 resonates using energy transferred from the loop coil 264, and the resonated energy is directly outputted through the conductive tip 11.

The resonance signal caused by the resonance may be outputted to the touch screen 20 through the conductive tip 11 during the period in which the driving signal is inputted into the loop coil 264 and a period thereafter. The resonance circuit 12 is positioned in the housing, and is electrically connected to a ground.

The stylus pen 10b illustrated in FIG. 3B includes a conductive tip 11, a resonance circuit 12, a rectifier 13, a power storage 14, and an active circuit 15. In addition, the stylus pen 10 may further include a sensor (not illustrated) and/or a communication module (not illustrated).

The resonance circuit 12 may resonate using energy transferred from the loop coil 264, and the resonated energy may be rectified in the rectifier 13 to be used to charge the power storage 14. The power storage 14 includes a rechargeable battery or a capacitor such as an electric double layered capacitor (EDLC).

The active circuit 15 may receive power from the power storage 14 to change a magnitude, frequency, phase, etc. of a resonance signal transferred to the touch screen 20. In addition, the active circuit 15 may transmit an additional signal other than a touch input to the short-range communication module 212 of the electronic device 2.

The stylus pen 10c illustrated in FIG. 3B includes the conductive tip 11, the resonance circuit 12, a battery 50 connected to the resonance circuit 12 to store power, and an active stylus module 60 connected to the conductive tip 11.

The resonance circuit 12 resonates using energy transferred from the loop coil 264, and the resonated energy is directly outputted through the conductive tip 11. The active stylus module 60 may receive power from the battery 50 to transmit a signal to the touch screen 20.

Figure 4:
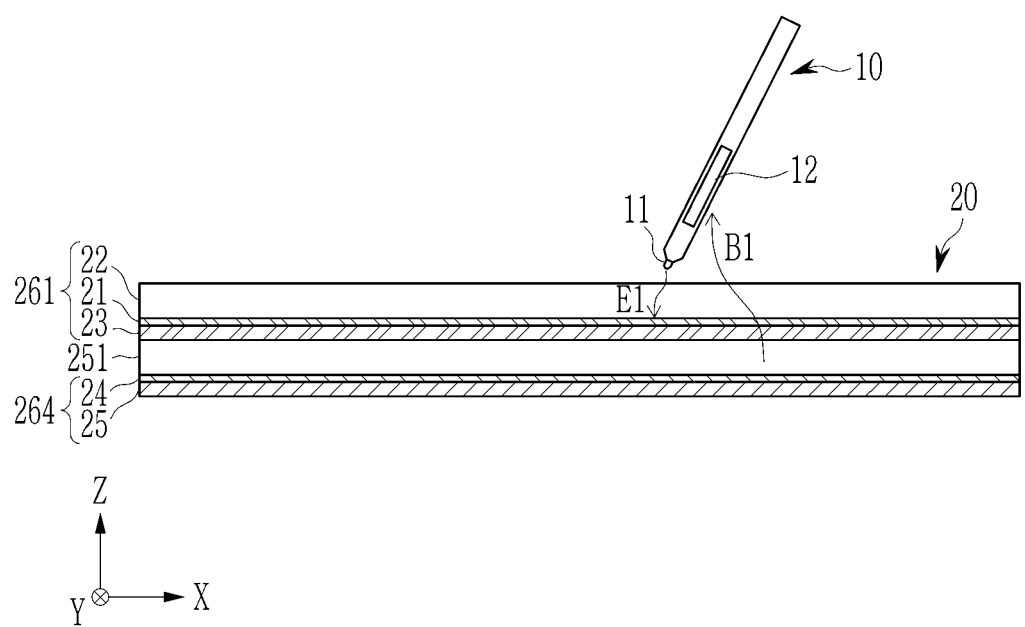
FIG. 4 illustrates a case in which a stylus pen is used in an electronic device according to an embodiment.

FIG. 4 illustrates a case in which a stylus pen is used in an electronic device according to an embodiment.

As illustrated in FIG. 4, the touch screen 20 of the electronic device includes a display panel 251, a touch sensor 261 on the display panel 251, and a loop coil 264 below the display panel 251.

The touch sensor 261 may include a substrate 23, a touch electrode layer 21 on the substrate 23, and a window 22 on the touch electrode layer 21.

The substrate 23 may be an encapsulation substrate of the display panel 251 or a color filter substrate of the display panel 251, which is preferably implemented with a transparent material.

The touch electrode layer 21 may include a plurality of first touch electrodes for detecting touch coordinates in a first direction and a plurality of second touch electrodes for detecting touch coordinates in a second direction crossing the first direction. Although the touch electrode layer 21 is illustrated as a single layer in FIG. 4, the first touch electrodes and the second touch electrodes may be respectively positioned on different layers, may be positioned to overlap each other, may positioned to not overlap each other, or may be positioned with separate layers therebetween.

The window 22 may be positioned on the touch electrodes layer 21. The touch electrode layer 21, the conductive tip 11, and the window 22 may generate capacitance. Accordingly, a signal (a resonance signal or an active touch signal) generated by the stylus pen 10 may be transferred to the touch electrode layer 21 through the capacitance.

The loop coil 264 may include a substrate 24 on which an antenna loop is positioned and a ferrite sheet 25. The antenna loop may be formed of a conductor material such as copper, silver, or the like. As will be described later with reference to FIG. 14 to FIG. 19, the antenna loop may be positioned on a same layer as that of the touch electrode layer 21 in addition to the substrate 24, and in this case, the antenna loop may be formed of a conductive material exhibiting high transmittance and low impedance, such as ITO, graphene, silver nanowire, and the like. In addition, the antenna loop may be positioned under the window 22, and in this case, the substrate 24 may not be included in the loop coil 264.

The substrate 24 may be attached to a rear surface of the display panel 251. The substrate 24 may be positioned on the rear surface of the display panel 251. The substrate 24 may be a single-layer FPCB, e.g., a single-side FPCB, a double-side FPCB, or a multilayer FPCB, but preferably the touch screen 20 may be the single-side FPCB or the double-side FPCB, which is the single-layer FPCB to realize thinning and miniaturization of the FPCB. Since such a single-side FPCB can be made thin, it can be used in bendable, foldable, and stretchable electronic devices. The substrates 23 and 24 of FIG. 4 may be FPCBs or rigid PCBs.

When the substrate 24 is formed of the double-side FPCB, a conductive layer may be positioned on a second surface with respect to a first surface on which the antenna loop is positioned. The conductive layer is made of a conductive material, and may be, e.g., a copper clad layer.

The substrate 24 may include a base film. The base film may be made of a polyimide resin, an epoxy-based resin, or another known material having flexibility. The base film may be flexible. At least one antenna loop formed to include at least one wire may be formed on the base film.

The antenna loop 241 formed on the substrate 24 will be described with reference to FIG. 5.

Figure 5:
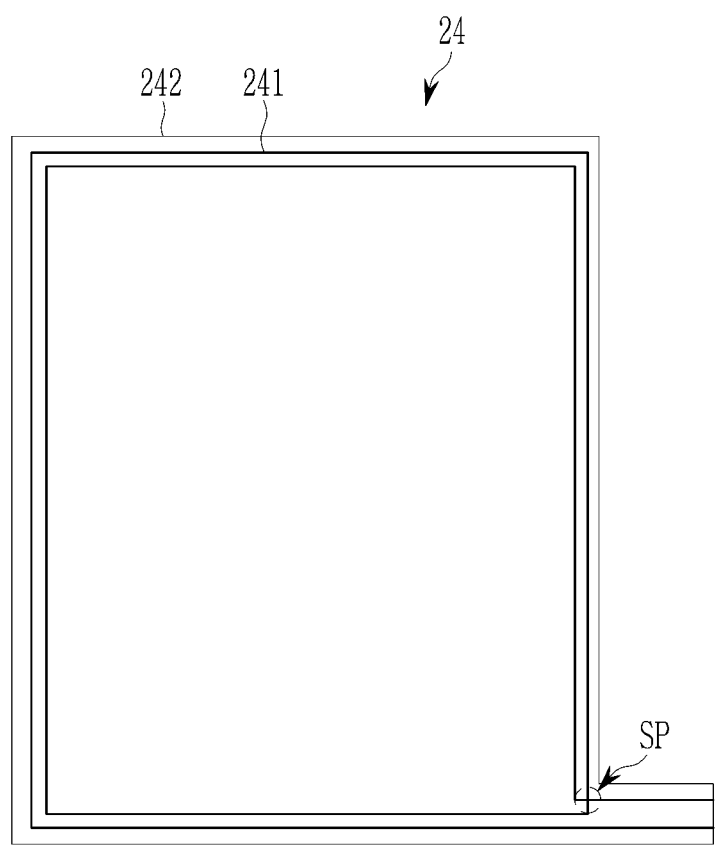
FIG. 5 illustrates an example in which an antenna pattern is implemented on one surface of a substrate.

FIG. 5 illustrates an example in which an antenna pattern is implemented on one surface of a substrate.

Referring to FIG. 5, the antenna loop 241 is formed as a conductive wire on the base film 242. For example, the antenna loop may be printed on the base film 242 by photolithography, thin film sputtering, or the like. A method for positioning the antenna loop on the base film 242 is not limited to the above description.

The antenna loop 241 has a spiral pattern depending on an inductance design value of the antenna loop 241 and radiation performance of the antenna loop 241. However, when the spiral pattern is implemented only on one surface of the base film 242, wires of the antenna loop 241 have a problem that they may be short-circuited to each other at a point SP on one surface of the base film 242. Implementing such a spiral pattern by using a double-side FPCB may be considered. For example, an opening or a hole may be formed in the base film 242, and a wire positioned on a first surface may be connected to a wire positioned on a second surface through the opening or hole. However, when a copper clad layer is attached to the second surface of the double-side FPCB, a problem in which a wire and the copper clad layer positioned on the second surface are in contact with each other or are electrically connected may occur.

Next, examples in which a stylus pen and an electronic device transmit and receive signals will be described with reference to FIG. 6 to FIG. 13.

FIG. 6 to FIG. 11 each illustrate a schematic circuit diagram showing a stylus pen and an electronic device.

The resonance circuit 12 of FIG. 3 may be expressed as an equivalent circuit including a resistor Rp, an inductor Lp, and a capacitor Cp, or an equivalent circuit including a resistor Rs, an inductor Ls, and a capacitor Cs.

Figure 6:
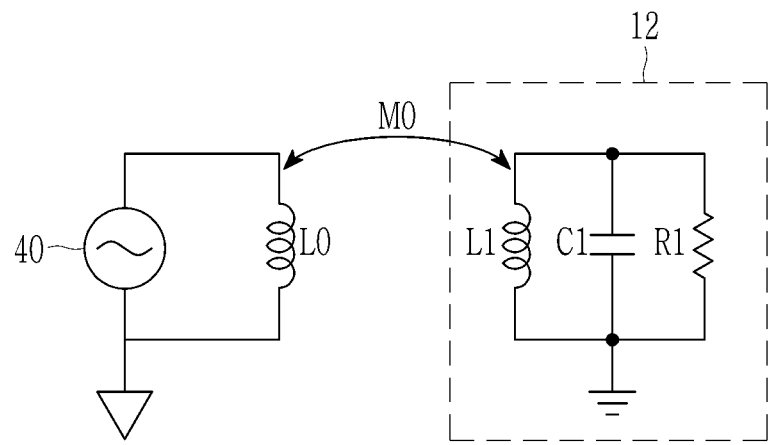
FIG. 6 to FIG. 11 each illustrate a schematic circuit diagram showing a stylus pen and an electronic device.
Figure 7:
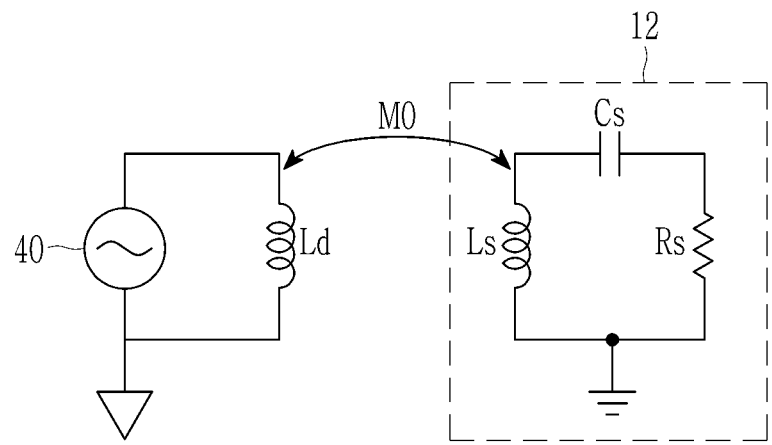

As illustrated in FIG. 6 and FIG. 7, when a loop coil L0 forms a magnetic field by a power source 40 that transfers a driving signal, a current may be induced in the inductor LP of the stylus pen 10 to resonate the resonance circuit 12.

As illustrated in FIG. 8 to FIG. 11, when the loop coil and the internal capacitor resonate by the power source 40 that transfers the driving signal, the resonance circuit 12 of the stylus pen 10 may also mutually resonate with the loop coil and the internal capacitor.

Figure 8:
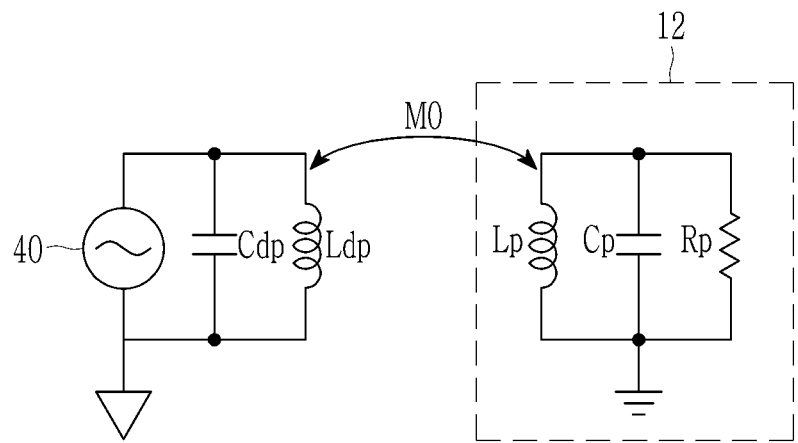

FIG. 8 illustrates a case in which a loop coil Ldp and an internal capacitor Cdp are connected in parallel, and the resistor Rp, the inductor Lp, and the capacitor Cp of the resonance circuit 12 are connected in parallel.

Figure 9:
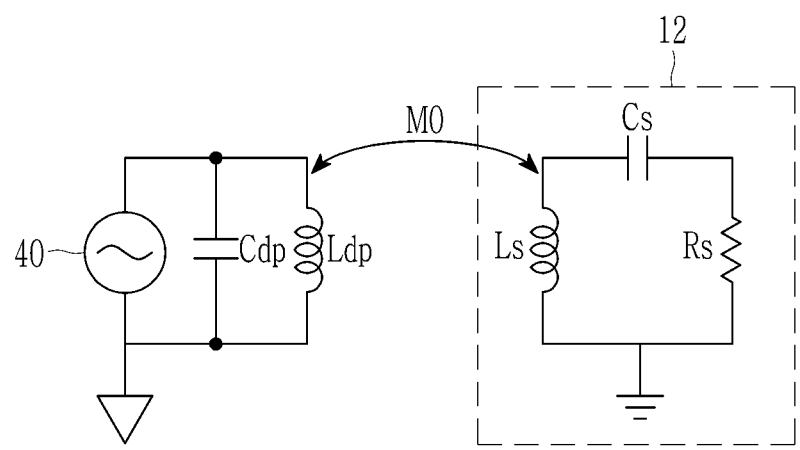

FIG. 9 illustrates a case in which the loop coil Ldp and the internal capacitor Cdp are connected in parallel, and the resistor Rs, the inductor Ls, and the capacitor Cs of the resonance circuit 12 are connected in series.

Figure 10:
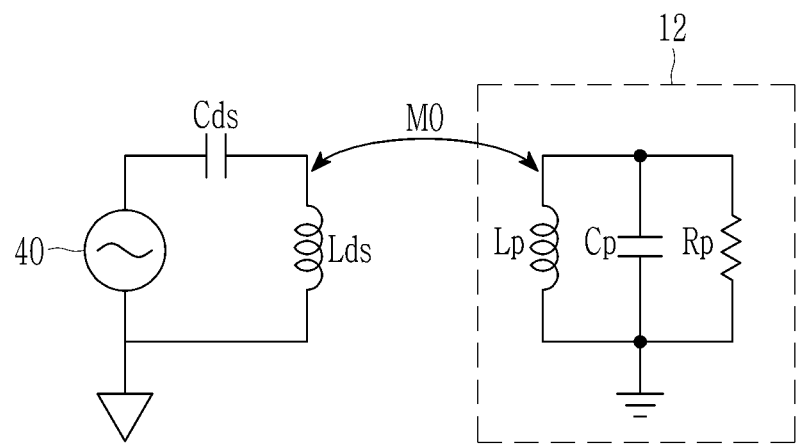

FIG. 10 illustrates a case in which a loop coil Lds and an internal capacitor Cds are connected in series, and the resistor Rp, the inductor Lp, and the capacitor Cp of the resonance circuit 12 are connected in parallel.

Figure 11:
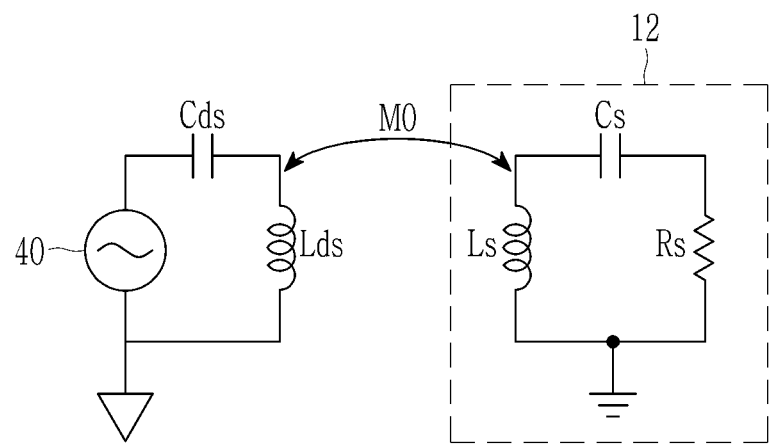

FIG. 11 illustrates a case in which the loop coil Lds and the internal capacitor Cds are connected in series, and the resistor Rs, the inductor Ls, and the capacitor Cs of the resonance circuit 12 are connected in series.

Next, an antenna loop of a spiral pattern implemented on one plane according to the present disclosure will be described with reference to FIG. 12 to FIG. 22. Hereinafter, descriptions of the same components as those described with reference to FIG. 4 will be omitted.

Figure 12:
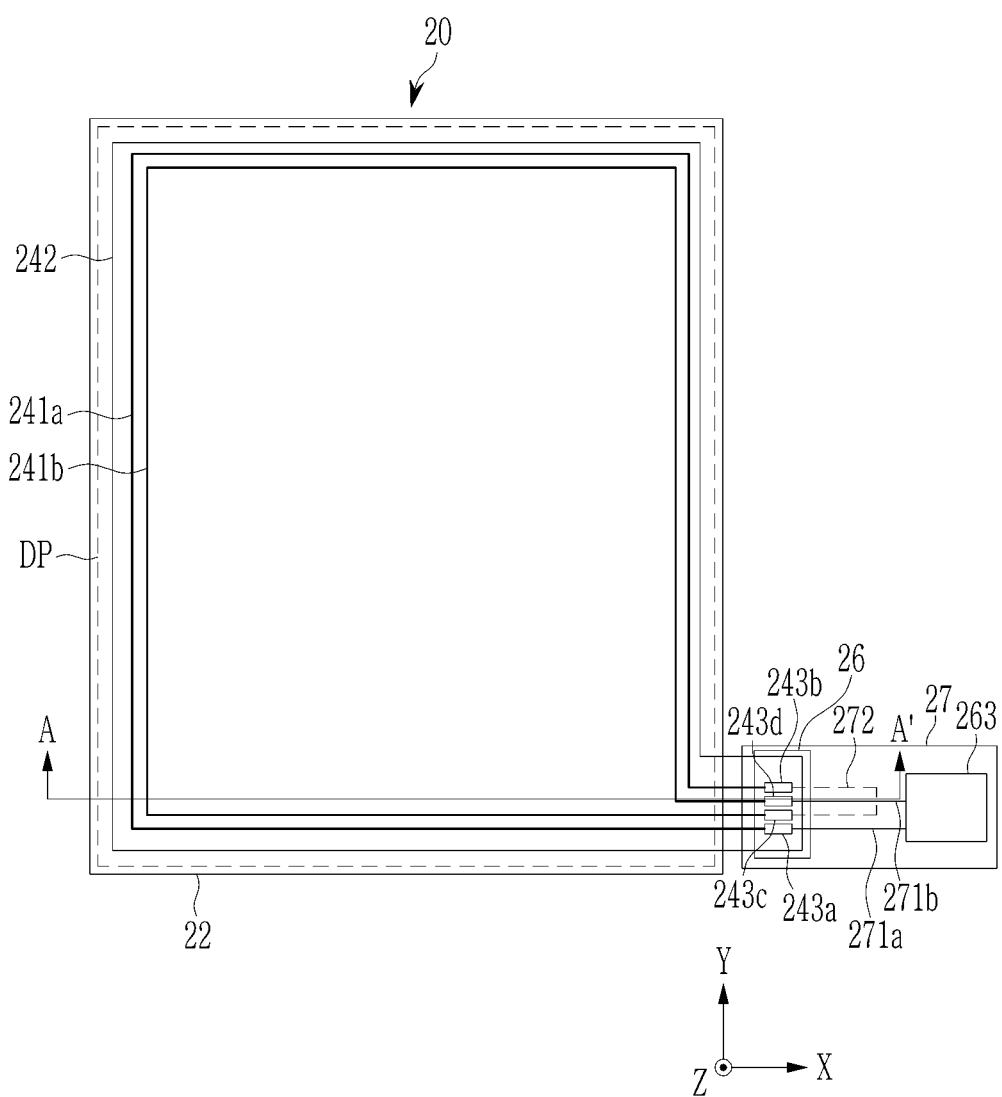
FIG. 12 to FIG. 14 illustrate partial views showing an antenna module and an electronic device including the antenna module according to a first embodiment.
Figure 13:
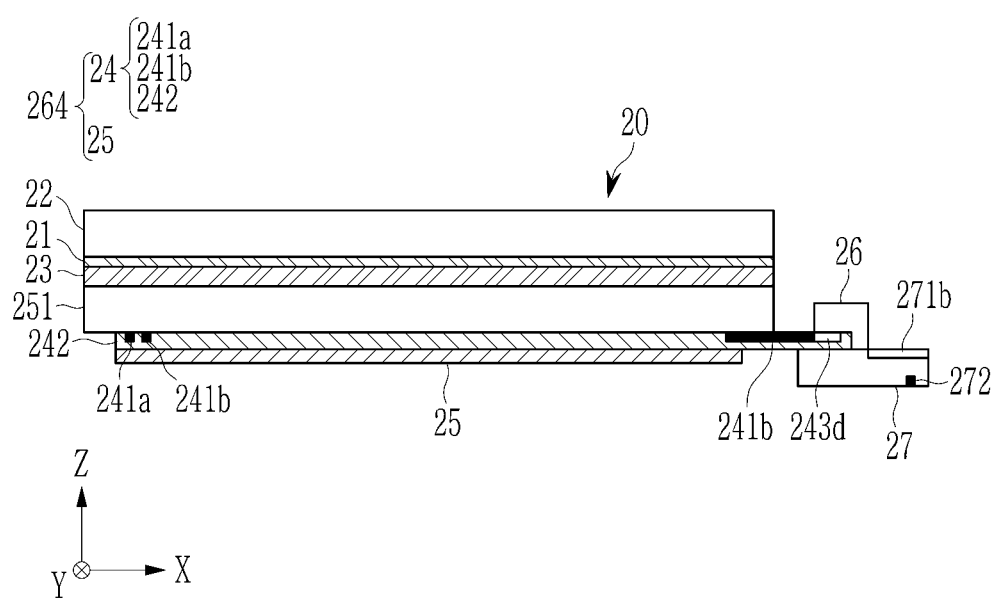
Figure 14:
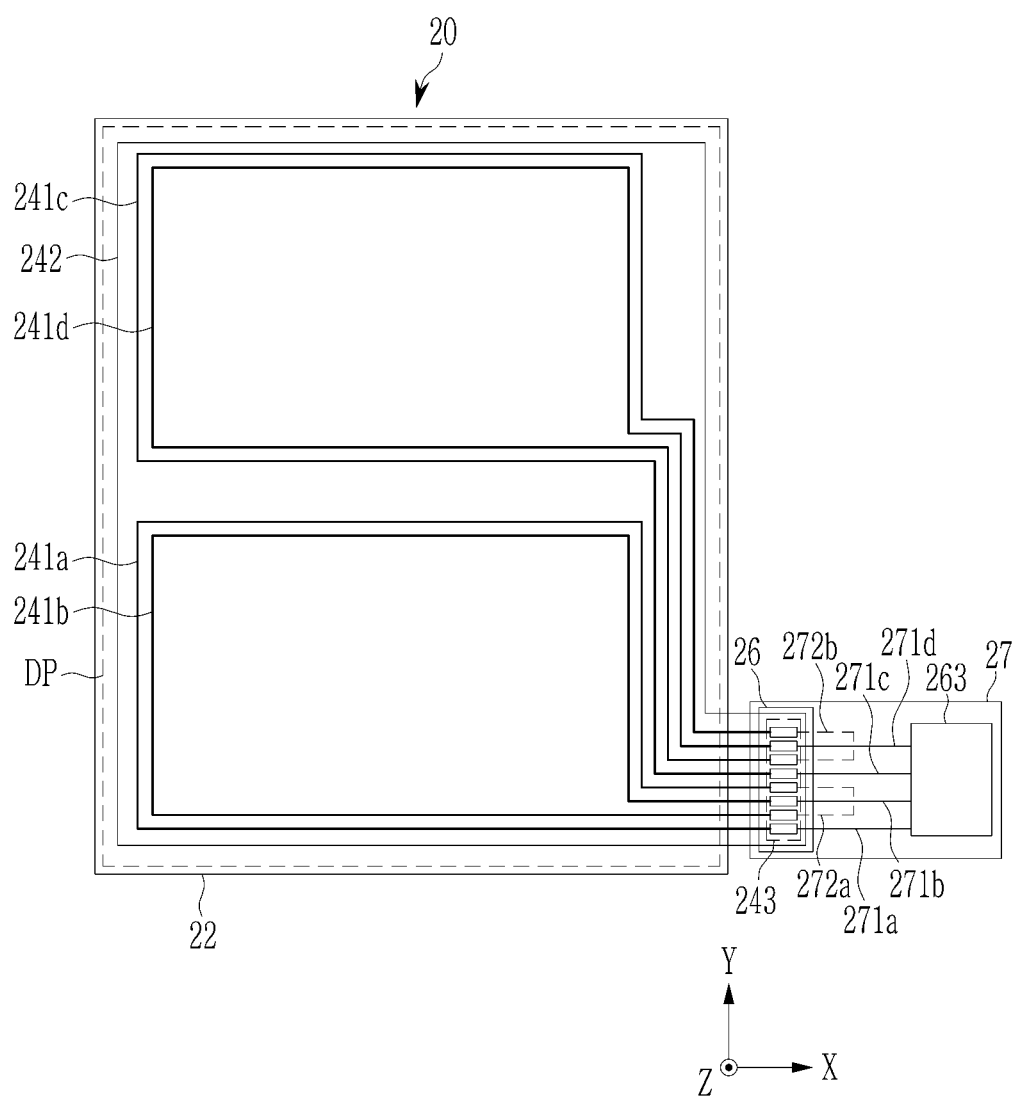

FIG. 12 to FIG. 14 illustrate partial views showing an antenna module and an electronic device including the antenna module according to a first embodiment.

As illustrated in FIG. 12, a plurality of sub-antenna loops 241a and 241b are positioned on the base film 242. The antenna loop 241 may be formed of a conductive material exhibiting high transmittance and low impedance, such as ITO, graphene, silver nanowire, or the like.

FIG. 13 illustrates a cross-sectional view taken along a line A-A' of FIG. 12. As illustrated in FIG. 13, the sub-antenna loops 241a and 241b are illustrated as being positioned on one surface of the base film 242 spaced apart from the ferrite sheet 25, but the present invention is not limited thereto.

The sub-antenna loops 241a and 241b are spaced apart from each other on one surface of the base film 242, and do not directly contact each other. The first sub-antenna loop 241a has a first end connected to a corresponding first pad 243a among a plurality of pads, and a second end connected to a corresponding second pad 243b. The second sub-antenna loop 241b has a first end connected to a corresponding first pad 243c among a plurality of pads, and a second end connected to a corresponding second pad 243d.

Each of the sub-antenna loops 241a and 241b may be a conductive wire extending along a boundary of the display area DP. Although each of the sub-antenna loops 241a and 241b is illustrated as having an overall rectangular shape, they may have a shape such as a circle, an ellipse, a polygon, or a polygon with rounded corners, but the present invention is not limited thereto.

In addition, the first sub-antenna loop 241a is positioned outside the second sub-antenna loop 241b. The first sub-antenna loop 241a may extend along a circumference of the second sub-antenna loop 241b. A shortest distance at which the adjacent first sub-antenna loop 241a and the second sub-antenna loop 241b are spaced apart from each other may be the same on one surface of the base film 242, but the present invention is not limited thereto. The first sub-antenna loop 241a and the second sub-antenna loop 241b may be wires having a same width, but the present invention is not limited thereto. The first sub-antenna loop 241a and the second sub-antenna loop 241b may be made of a same material, but the present invention not limited thereto.

A flexible circuit board 27 may be connected to a plurality of pads 243a, 243b, 243c, and 243d of the base film 242. The flexible circuit board 27 may be a flexible printed circuit board (FPCB). A coil driver 263 is mounted on the flexible circuit board 27.

The flexible circuit substrate 27 may be electrically connected to the pads 243a, 243b, 243c, and 243d. For example, a plurality of pads (not illustrated) on the flexible circuit board 27 connected to a plurality of signal transfer wires 271a and 271b and a connection wire 272 may be coupled to the pads 243a, 243b, 243c, and 243d through a connector 26. The connector 26 may be a ZIF connector (zero insertion force connector), a BTB connector (board-to-board connector), or the like, but the present invention is not limited thereto. A socket for the connector 26 is formed on the board 24, and the pads (not illustrated) and the pads 243a, 243b, 243c, and 243d) may be electrically connected to each other by inserting the flexible circuit board 27 into the socket of the connector 26.

As another example, the pads (not illustrated) of the flexible circuit board 27 may be bonded to the pads 243a, 243b, 243c, and 243d. For example, the pads (not illustrated) on the flexible circuit board 27 connected to the signal transfer wires 271a and 271b and the connection wire 272 may be connected to the pads 243a, 243b, 243c, and 243d by an anisotropic conductive film (ACF) by an outer lead bonding (OLB) method.

In addition, various connection methods for electrically and physically connecting the pads (not illustrated) of the flexible circuit board 27 and the pads 243a, 243b, 243c, and 243d may be used.

The flexible circuit board 27 includes a plurality of signal transmission wires 271a and 271b positioned on a first surface of the board and a connection wire 272 positioned on a second surface. The wires 271a, 271b, and 272 may be printed by photolithography, thin film sputtering, or the like. A method for positioning the wires 271a, 271b, and 272 on the flexible circuit board 27 is not limited to the above description. In addition, although it has been described above that the signal transmission wires 271a and 271b and the connection wire 272 are respectively positioned on opposite surfaces of one substrate, they may be respectively positioned on different substrates, and the present invention is not limited thereto.

The signal transmission wire 271a connects the pad 243a connected to the first sub-antenna loop 241a and the coil driver 263, and the signal transmission wire 271b connects the pad 243d connected to the second sub-antenna loop 241b and the coil driver 263.

The connection wire 272 connects the pad 243b connected to the first sub-antenna loop 241a and the pad 243c connected to the second sub-antenna loop 241b to each other. That is, the first sub-antenna loop 241a and the second sub-antenna loop 241b are electrically connected to each other through the connection wire 272 positioned on the flexible circuit board 27. Accordingly, a current introduced from the coil driver 263 to the pad 243a through the signal transmission wire 271a flows in an order of the first sub-antenna loop 241a, the pad 243b, the connection wire 272, the pad 243c, the second sub-antenna loop 241b, the pad 243d, and the signal transmission wire 271b.

That is, depending on the antenna module according to an embodiment, it has substantially a same effect as the antenna loop formed in the spiral pattern without forming a wire in the spiral pattern on the base film 242. Since all wires are formed on a first surface of the base film 242 in this antenna module, a copper clad layer may be formed on a second surface, thereby reducing a manufacturing cost and reducing a thickness and a size of the touch screen 20.

In the above description, an example of implementing a spiral pattern by using two sub-antenna loops has been described, but depending on a design, a spiral pattern may be implemented by using three or more sub-antenna loops by connecting each of the sub-antenna loops with the connection wire 272 formed on a multi-layered board of the flexible circuit board 27.

As illustrated in FIG. 14, a plurality of antenna loops may be positioned on the touch screen 20. The first sub-antenna loop 241a, the connection wire 272a, and the second sub-antenna loop 241b constitute a first antenna loop of a spiral pattern. The third sub-antenna loop 241c, the connection wire 272b, and the fourth sub-antenna loop 241d constitute a second antenna loop of a spiral pattern. The first antenna loop and the second antenna loop are spaced apart from each other in a y-axis direction. Herein, the ferrite sheet 25 may be separately positioned in each of an area where the first antenna loop is positioned and an area where the second antenna loop is positioned.

The coil driver 263 may apply a driving signal having a same or similar phase to the first antenna loop and the second antenna loop, may apply a driving signal having an opposite phase, or may selectively drive them.

Figure 15:
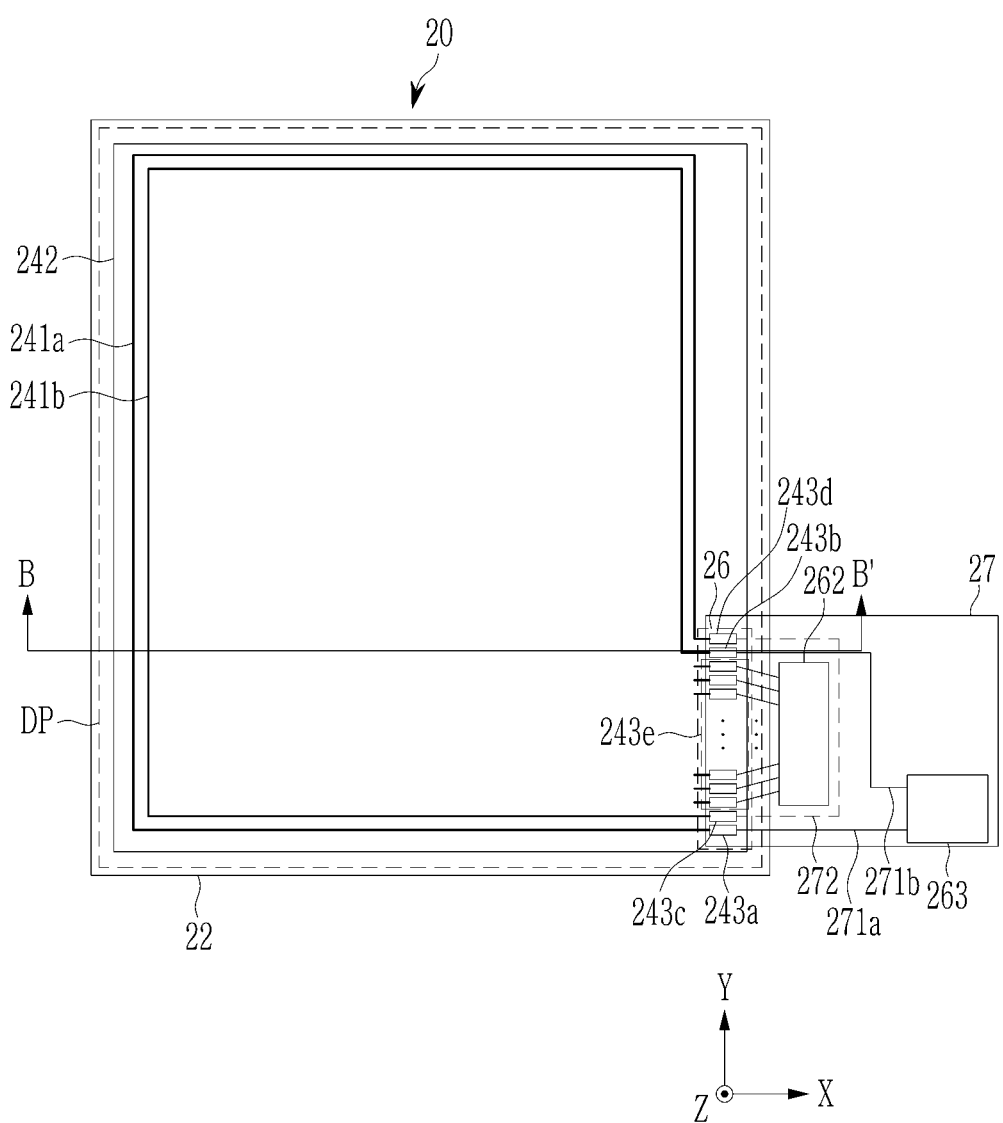
FIG. 15 and FIG. 16 illustrate partial views showing an antenna module and an electronic device including the antenna module according to a second embodiment.
Figure 16:
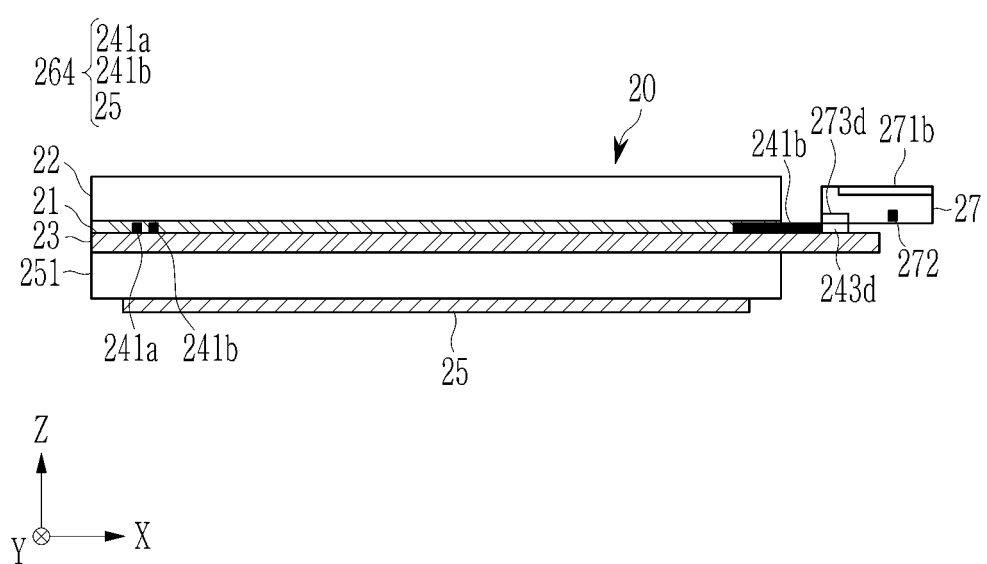

FIG. 15 and FIG. 16 illustrate partial views showing an antenna module and an electronic device including the antenna module according to a second embodiment.

FIG. 15 and FIG. 16 illustrate the loop coil 264 including the antenna loop 241 positioned on a same layer as that of the touch electrode layer 21 when the touch sensor 261 is implemented as an on-cell type of touch sensor.

As illustrated in FIG. 15 and FIG. 16, the loop coil 264 includes the antenna loop 241 positioned on the touch electrode layer 21 and the ferrite sheet 25 positioned under the display panel 251.

FIG. 16 illustrates a cross-sectional view taken along a line B-B' of FIG. 15. As illustrated in FIG. 16, the antenna loops 241a and 241b and the touch electrode layer 21 are positioned in a same layer on the encapsulation substrate 23 of the display panel 251. The antenna loops 241a and 241b may be made of a same material as that of the first and second touch electrodes of the touch electrode layer 21. For example, the antenna loops 241a and 241b may be formed of a conductive material exhibiting high transmittance and low impedance, such as ITO, graphene, silver nanowire, or the like. However, the antenna loops 241a and 241b may be positioned as a different layer from the touch electrode layer 21, and may be made of a different material from that of the first and second touch electrodes.

The sub-antenna loops 241a and 241b are spaced apart from each other on one surface of the encapsulation substrate 23, and do not directly contact each other. The first sub-antenna loop 241a has a first end connected to a corresponding first pad 243a among a plurality of pads, and a second end connected to a corresponding second pad 243b. The second sub-antenna loop 241b has a first end connected to a corresponding first pad 243c among a plurality of pads, and a second end connected to a corresponding second pad 243d. Meanwhile, the first touch electrode and the second touch electrode are connected to pads 243e.

Each of the sub-antenna loops 241a and 241b may be a conductive wire extending along a boundary of the display area DP. Although each of the sub-antenna loops 241a and 241b is illustrated as having an overall rectangular shape, they may have a shape such as a circle, an ellipse, a polygon, or a polygon with rounded corners, but the present invention is not limited thereto.

In addition, the first sub-antenna loop 241a is positioned outside the second sub-antenna loop 241b. The first sub-antenna loop 241a may extend along a circumference of the second sub-antenna loop 241b. A shortest distance at which the adjacent first sub-antenna loop 241a and the second sub-antenna loop 241b are spaced apart from each other may be the same on one surface of the encapsulation substrate 23, but the present invention is not limited thereto. The first sub-antenna loop 241a and the second sub-antenna loop 241b may be wires having a same width, but the present invention is not limited thereto. The first sub-antenna loop 241a and the second sub-antenna loop 241b may be made of a same material, but the present invention not limited thereto.

A flexible circuit board 27 may be connected to a plurality of pads 243a, 243b, 243c, and 243d of the encapsulation substrate 23.

A plurality of pads (not illustrated) of the flexible circuit board 27 connected to the signal transmission wires 271a and 271b and the connection wire 272 may be electrically connected to the pads 243a, 243b, 243c, and 243d. The pads (not illustrated) may be bonded to the pads 243a, 243b, 243c, and 243d. For example, the pads (not illustrated) and the pads 243a, 243b, 243c, and 243d may be connected by an anisotropic conductive film (ACF) or the like by an outer lead bonding (OLB) method.

In addition, various connection methods for electrically and physically connecting the pads (not illustrated) and the pads 243a, 243b, 243c, and 243d may be used.

The flexible circuit board 27 includes a plurality of signal transmission wires 271a and 271b positioned on a first surface of the board and a connection wire 272 positioned on a second surface. The wires 271a, 271b, and 272 may be printed by photolithography, thin film sputtering, or the like. A method for positioning the wires 271a, 271b, and 272 on the flexible circuit board 27 is not limited to the above description. In addition, although it has been described above that the signal transmission wires 271a and 271b and the connection wire 272 are respectively positioned on opposite surfaces of one substrate, they may be respectively positioned on different substrates, and the present invention is not limited thereto.

The signal transmission wire 271a connects the pad 243a connected to the first sub-antenna loop 241a and the coil driver 263, and the signal transmission wire 271b connects the pad 243d connected to the second sub-antenna loop 241b and the coil driver 263.

The connection wire 272 connects the pad 243b connected to the first sub-antenna loop 241a and the pad 243c connected to the second sub-antenna loop 241b to each other. That is, the first sub-antenna loop 241a and the second sub-antenna loop 241b are electrically connected to each other through the connection wire 272 positioned on the flexible circuit board 27. Accordingly, a current introduced from the coil driver 263 to the pad 243a through the signal transmission wire 271a flows in an order of the first sub-antenna loop 241a, the pad 243b, the connection wire 272, the pad 243c, the second sub-antenna loop 241b, the pad 243d, and the signal transmission wire 271b.

That is, depending on the antenna module according to an embodiment, it has substantially a same effect as the antenna loop formed in the spiral pattern without forming a wire in the spiral pattern on the encapsulation substrate 23. All wires are formed on a first surface of the encapsulation substrate 23 in this antenna module, thereby reducing a manufacturing cost and reducing a thickness and a size of the touch screen 20.

Figure 17:
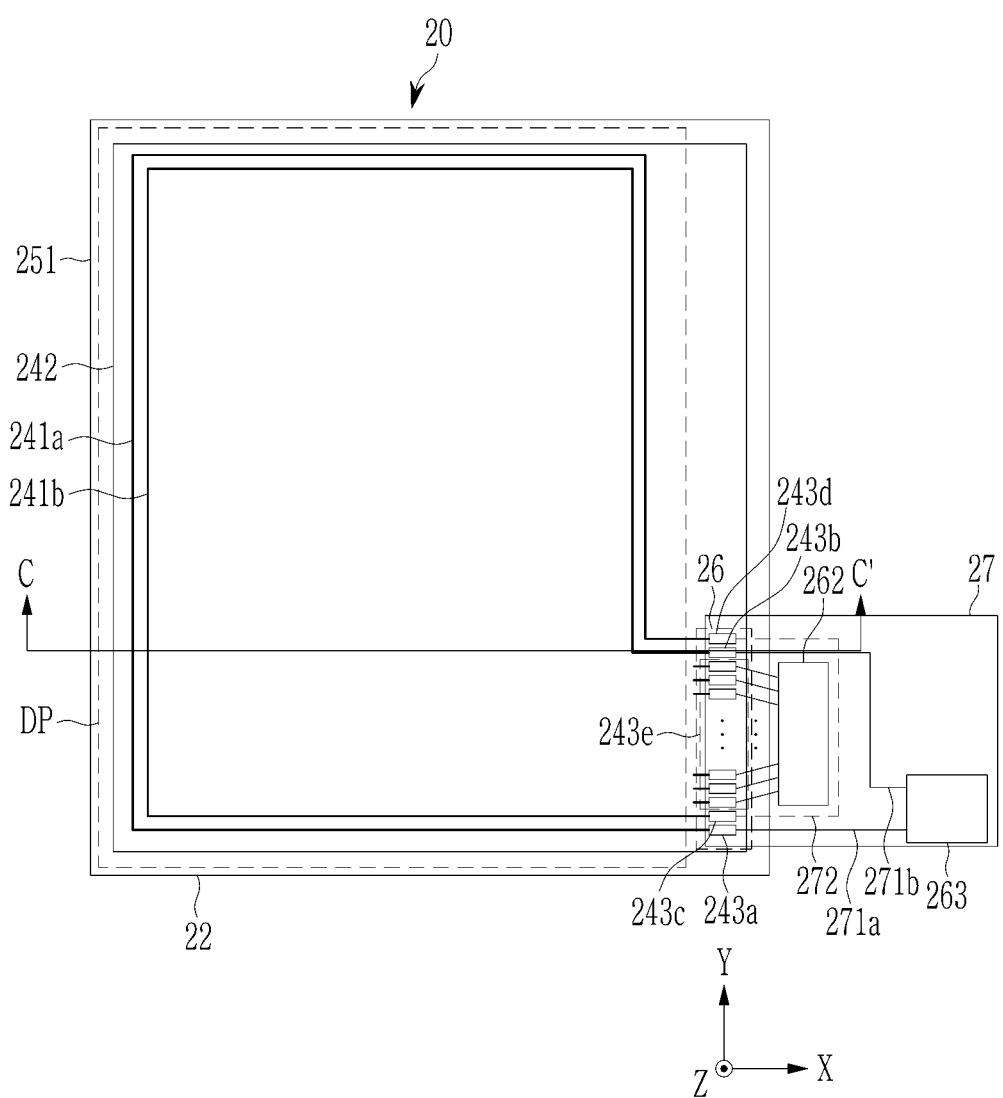
FIG. 17 and FIG. 18 illustrate partial views showing an antenna module and an electronic device including the antenna module according to a third embodiment.
Figure 18:
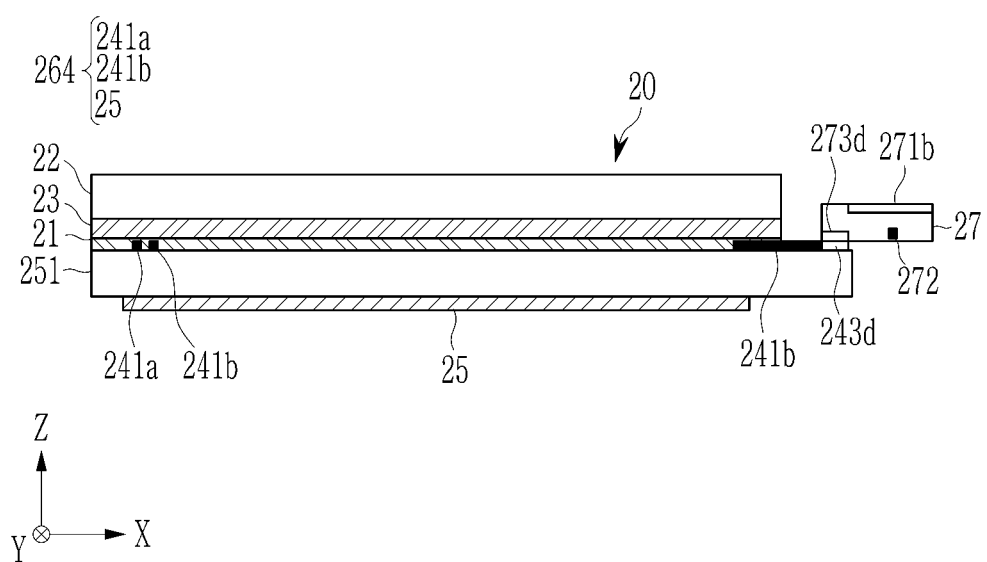

FIG. 17 and FIG. 18 illustrate partial views showing an antenna module and an electronic device including the antenna module according to a third embodiment.

FIG. 17 and FIG. 18 illustrate the loop coil 264 including the antenna loop 241 positioned on a same layer as that of the touch electrode layer 21 when the touch sensor 261 is implemented as an in-cell type of touch sensor.

As illustrated in FIG. 17 and FIG. 18, the loop coil 264 includes the antenna loop 241 positioned on the touch electrode layer 21 and the ferrite sheet 25 positioned under the display panel 251.

FIG. 18 illustrates a cross-sectional view taken along a line C-C' of FIG. 17. As illustrated in FIG. 18, the antenna loops 241a and 241b and the touch electrode layer 21 may be positioned on a same layer between the color filter substrate 23 of the display panel 251 and a TFT substrate of the display panel 251. All of the touch electrode layer 21 and the antenna loops 241a and 241b may be positioned on upper and lower portions of the color filter substrate 23.

The antenna loops 241a and 241b may be made of a same material as that of the first and second touch electrodes of the touch electrode layer 21. For example, the antenna loops 241a and 241b may be formed of a conductive material exhibiting high transmittance and low impedance, such as ITO, graphene, silver nanowire, or the like. However, the antenna loops 241a and 241b may be positioned as a different layer from the touch electrode layer 21, and may be made of a different material from that of the first and second touch electrodes.

The sub-antenna loops 241a and 241b are spaced apart from each other on one surface of the color filter substrate 23, and do not directly contact each other. The first sub-antenna loop 241a has a first end connected to a corresponding first pad 243a among a plurality of pads, and a second end connected to a corresponding second pad 243b. The second sub-antenna loop 241b has a first end connected to a corresponding first pad 243c among a plurality of pads, and a second end connected to a corresponding second pad 243d. Meanwhile, the first touch electrode and the second touch electrode are connected to pads 243e.

Each of the sub-antenna loops 241a and 241b may be a conductive wire extending along a boundary of the display area DP. Although each of the sub-antenna loops 241a and 241b is illustrated as having an overall rectangular shape, it may have a shape such as a circle, an ellipse, a polygon, or a polygon with rounded corners, but the present invention is not limited thereto.

In addition, the first sub-antenna loop 241a is positioned outside the second sub-antenna loop 241b. The first sub-antenna loop 241a may extend along a circumference of the second sub-antenna loop 241b. A shortest distance at which the adjacent first sub-antenna loop 241a and the second sub-antenna loop 241b are spaced apart from each other may be the same on one surface of the color filter substrate 23, but the present invention is not limited thereto. The first sub-antenna loop 241a and the second sub-antenna loop 241b may be wires having a same width, but the present invention is not limited thereto. The first sub-antenna loop 241a and the second sub-antenna loop 241b may be made of a same material, but the present invention not limited thereto.

The flexible circuit board 27 may be connected to a plurality of pads 243a, 243b, 243c, and 243d of the color filter substrate 23.

A plurality of pads (not illustrated) of the flexible circuit board 27 connected to the signal transmission wires 271a and 271b and the connection wire 272 may be electrically connected to the pads 243a, 243b, 243c, and 243d. The pads (not illustrated) may be bonded to the pads 243a, 243b, 243c, and 243d. For example, the pads (not illustrated) and the pads 243a, 243b, 243c, and 243d may be connected by an anisotropic conductive film (ACF) or the like by an outer lead bonding (OLB) method.

In addition, various connection methods for electrically and physically connecting the pads (not illustrated) and the pads 243a, 243b, 243c, and 243d may be used.

The flexible circuit board 27 includes a plurality of signal transmission wires 271a and 271b positioned on a first surface of the board and a connection wire 272 positioned on a second surface. The wires 271a, 271b, and 272 may be printed by photolithography, thin film sputtering, or the like. A method for positioning the wires 271a, 271b, and 272 on the flexible circuit board 27 is not limited to the above description. In addition, although it has been described above that the signal transmission wires 271a and 271b and the connection wire 272 are respectively positioned on opposite surfaces of one substrate, they may be respectively positioned on different substrates, and the present invention is not limited thereto.

The signal transmission wire 271a connects the pad 243a connected to the first sub-antenna loop 241a and the coil driver 263, and the signal transmission wire 271b connects the pad 243d connected to the second sub-antenna loop 241b and the coil driver 263.

The connection wire 272 connects the pad 243b connected to the first sub-antenna loop 241a and the pad 243c connected to the second sub-antenna loop 241b to each other. That is, the first sub-antenna loop 241a and the second sub-antenna loop 241b are electrically connected to each other through the connection wire 272 positioned on the flexible circuit board 27. Accordingly, a current introduced from the coil driver 263 to the pad 243a through the signal transmission wire 271a flows in an order of the first sub-antenna loop 241a, the pad 243b, the connection wire 272, the pad 243c, the second sub-antenna loop 241b, the pad 243d, and the signal transmission wire 271b.

That is, depending on the antenna module according to an embodiment, it has substantially a same effect as the antenna loop formed in the spiral pattern without forming a wire in the spiral pattern on the color filter substrate 23. All wires are formed on a first surface of the color filter substrate 23 in this antenna module, thereby reducing a manufacturing cost and reducing a thickness and a size of the touch screen 20.

Figure 19:
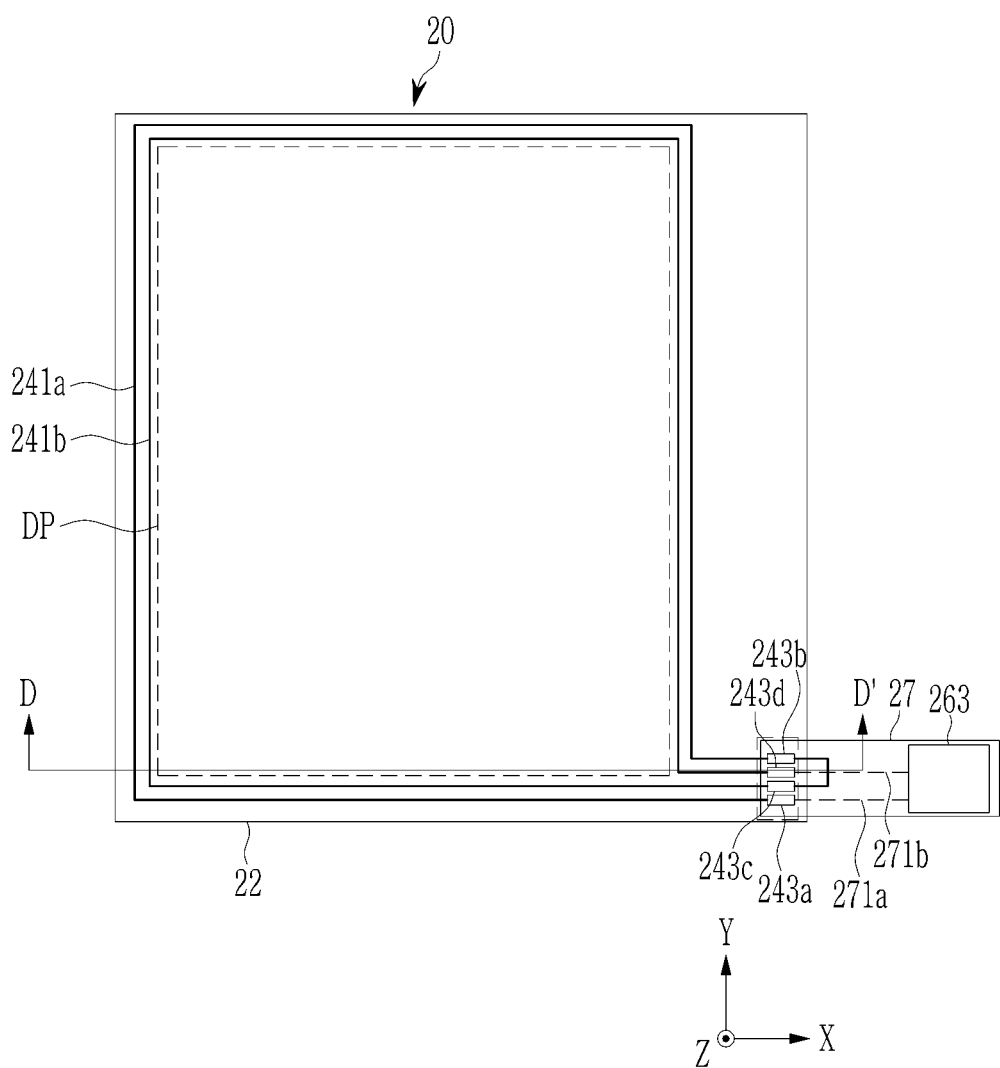
FIG. 19 and FIG. 20 illustrate partial views showing an antenna module and an electronic device including the antenna module according to a fourth embodiment.
Figure 20:
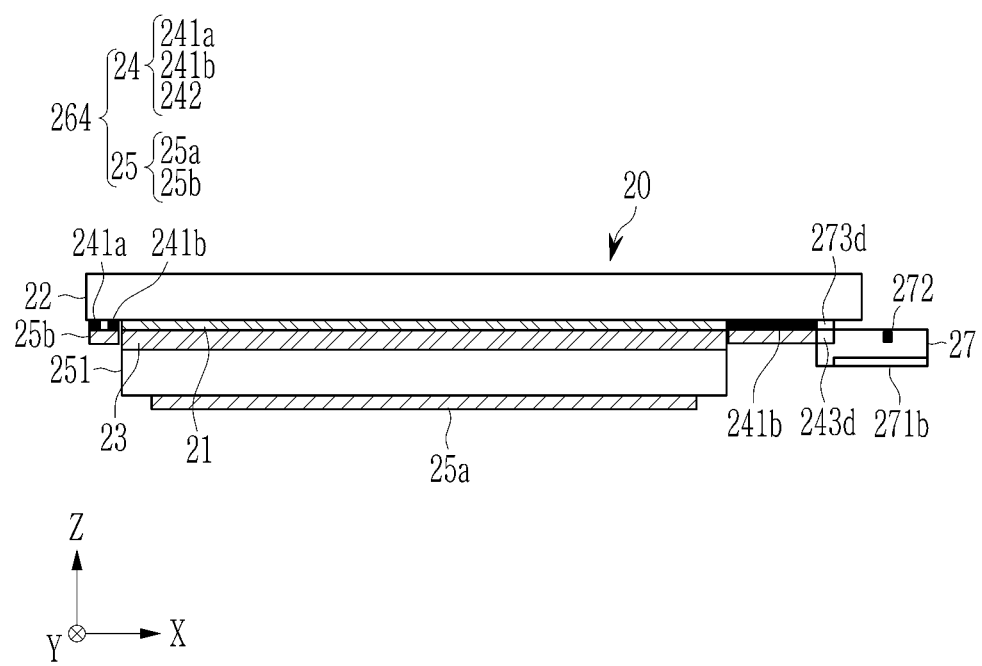

FIG. 19 and FIG. 20 illustrate partial views showing an antenna module and an electronic device including the antenna module according to a fourth embodiment.

As illustrated in FIG. 19 and FIG. 20, the loop coil 264 includes antenna loops 241a and 241b positioned under the window 22, a ferrite sheet 25a positioned under the display panel 251, and a ferrite sheet 25b positioned under the antenna loops 241a and 241b.

FIG. 20 illustrates a cross-sectional view taken along a line D-D' of FIG. 19. As illustrated in FIG. 20, the antenna loops 241a and 241b may be printed on the window 22 by a method such as photolithography, thin film sputtering, or the like, or may be printed on a sheet by a method such as photolithography, thin film sputtering, or the like to be attached to the window 22, and a method for positioning the antenna loops 241a and 241b on the window 22 is not limited to the above description.

The sub-antenna loops 241a and 241b are spaced apart from each other on one surface of the window 22, and do not directly contact each other. The first sub-antenna loop 241a has a first end connected to a corresponding first pad 243a among a plurality of pads, and a second end connected to a corresponding second pad 243b. The second sub-antenna loop 241b has a first end connected to a corresponding first pad 243c among a plurality of pads, and a second end connected to a corresponding second pad 243d.

Each of the sub-antenna loops 241a and 241b may be a conductive wire extending along a boundary of the display area DP. Although each of the sub-antenna loops 241a and 241b is illustrated as having an overall rectangular shape, it may have a shape such as a circle, an ellipse, a polygon, or a polygon with rounded corners, but the present invention is not limited thereto.

In addition, the first sub-antenna loop 241a is positioned outside the second sub-antenna loop 241b. The first sub-antenna loop 241a may extend along a circumference of the second sub-antenna loop 241b. A shortest distance at which the adjacent first sub-antenna loop 241a and the second sub-antenna loop 241b are spaced apart from each other may be the same on one surface of the window 22, but the present invention is not limited thereto. The first sub-antenna loop 241a and the second sub-antenna loop 241b may be wires having a same width, but the present invention is not limited thereto. The first sub-antenna loop 241a and the second sub-antenna loop 241b may be made of a same material, but the present invention not limited thereto.

The flexible circuit substrate 27 may be connected to the pads 243a, 243b, 243c, and 243d. The flexible circuit board 27 may be a flexible printed circuit board (FPCB) or a chip-on-film (COF). Since the coil driver 263 is mounted on the flexible circuit board 27, the flexible circuit board 27 will be described below as the chip-on-film (COF).

The flexible circuit substrate 27 may be electrically connected to the pads 243a, 243b, 243c, and 243d. For example, a plurality of pads (not illustrated) on the flexible circuit board 27 connected to a plurality of signal transfer wires 271a and 271b and a connection wire 272 may be coupled to the pads 243a, 243b, 243c, and 243d through a connector 26. The connector 26 may be a ZIF connector (zero insertion force connector), a BTB connector (board-to-board connector), or the like, but the present invention is not limited thereto. A socket for the connector 26 is formed on the window 22, and the pads (not illustrated) and the pads 243a, 243b, 243c, 243d) may be electrically connected to each other by inserting the flexible circuit board 27 into the socket of the connector 26.

As another example, the pads (not illustrated) of the flexible circuit board 27 may be bonded to the pads 243a, 243b, 243c, and 243d. For example, the pads (not illustrated) on the flexible circuit board 27 connected to the signal transfer wires 271a and 271b and the connection wire 272 may be connected to the pads 243a, 243b, 243c, and 243d by an anisotropic conductive film (ACF) by an outer lead bonding (OLB) method.

In addition, various connection methods for electrically and physically connecting the pads (not illustrated) and the pads 243a, 243b, 243c, and 243d may be used.

The flexible circuit board 27 includes a plurality of signal transmission wires 271a and 271b positioned on a first surface of the board and a connection wire 272 positioned on a second surface. The wires 271a, 271b, and 272 may be printed by photolithography, thin film sputtering, or the like. A method for positioning the wires 271a, 271b, and 272 on the flexible circuit board 27 is not limited to the above description. In addition, although it has been described above that the signal transmission wires 271a and 271b and the connection wire 272 are respectively positioned on opposite surfaces of one substrate, they may be respectively positioned on different substrates, and the present invention is not limited thereto.

The signal transmission wire 271a connects the pad 243a connected to the first sub-antenna loop 241a and the coil driver 263, and the signal transmission wire 271b connects the pad 243d connected to the second sub-antenna loop 241b and the coil driver 263.

The connection wire 272 connects the pad 243b connected to the first sub-antenna loop 241a and the pad 243c connected to the second sub-antenna loop 241b to each other. That is, the first sub-antenna loop 241a and the second sub-antenna loop 241b are electrically connected to each other through the connection wire 272 positioned on the flexible circuit board 27. Accordingly, a current introduced from the coil driver 263 to the pad 243a through the signal transmission wire 271a flows in an order of the first sub-antenna loop 241a, the pad 243b, the connection wire 272, the pad 243c, the second sub-antenna loop 241b, the pad 243d, and the signal transmission wire 271b.

That is, depending on the antenna module according to an embodiment, it has substantially a same effect as the antenna loop formed in the spiral pattern without forming a wire in the spiral pattern on the base film 242. All wires are formed on a first surface of the window 22 in this antenna module, thereby reducing a manufacturing cost and reducing a thickness and a size of the touch screen 20.

Figure 21:
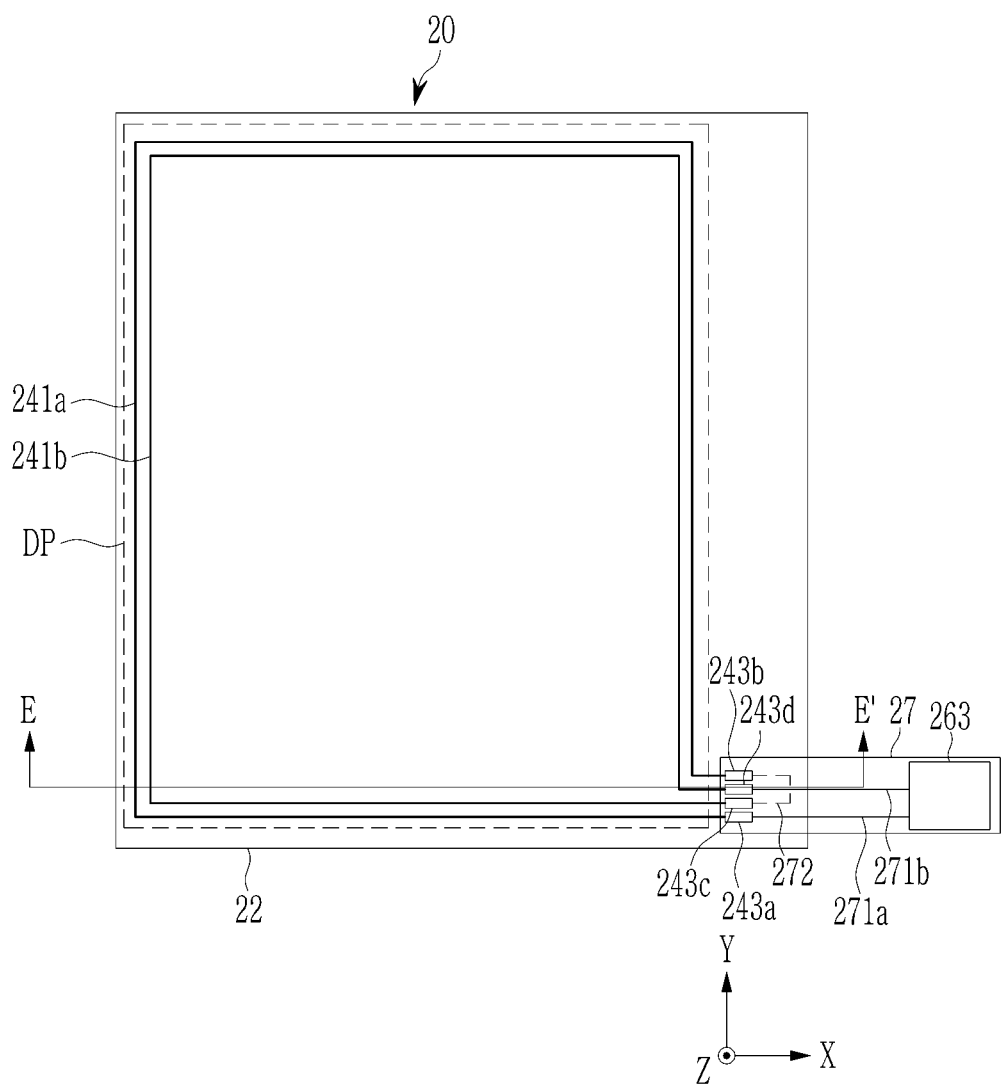
FIG. 21 and FIG. 22 illustrate partial views showing an antenna module and an electronic device including the antenna module according to a fifth embodiment.
Figure 22:
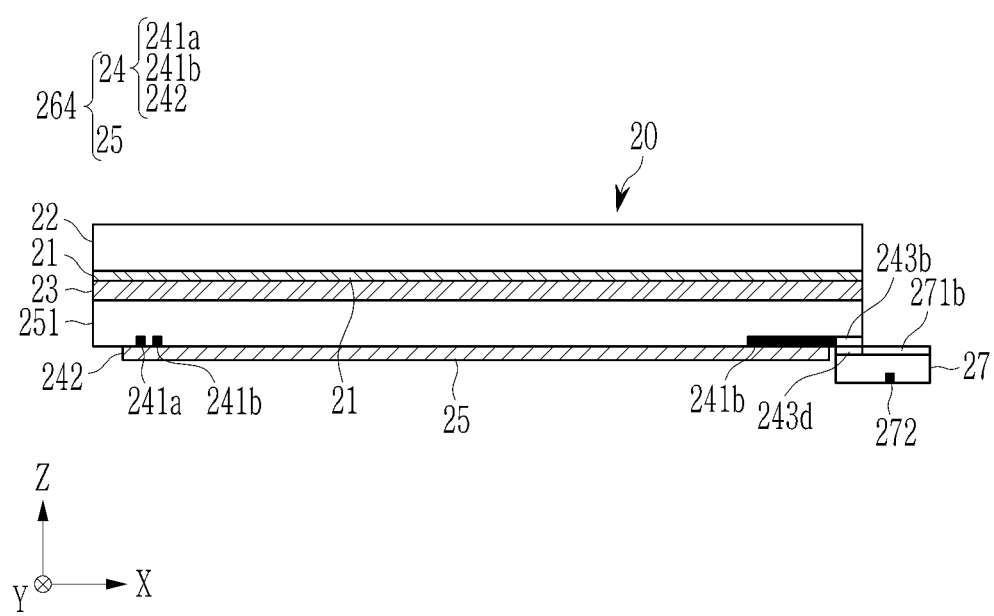

FIG. 21 and FIG. 22 illustrate partial views showing an antenna module and an electronic device including the antenna module according to a fifth embodiment.

As illustrated in FIG. 21 and FIG. 22, the loop coil 264 includes antenna loops 241a and 241b and antenna loops 241a and 241b positioned under the display panel 251, and a ferrite sheet 25 positioned under the display panel 251.

FIG. 22 illustrates a cross-sectional view taken along a line D-D' of FIG. 21. As illustrated in FIG. 22, the antenna loops 241a and 241b may be printed on the display panel 251 by a method such as photolithography or thin film sputtering, and a method for positioning the antenna loops 241a and 241b on the display panel 251 is not limited to the above description.

The sub-antenna loops 241a and 241b are spaced apart from each other on one surface of the display panel 251, and do not directly contact each other. The first sub-antenna loop 241a has a first end connected to a corresponding first pad 243a among a plurality of pads, and a second end connected to a corresponding second pad 243b. The second sub-antenna loop 241b has a first end connected to a corresponding first pad 243c among a plurality of pads, and a second end connected to a corresponding second pad 243d. The pads 243a, 243b, 243c, and 243d may be formed on one surface of the display panel 251.

Each of the sub-antenna loops 241a and 241b may be a conductive wire extending along a boundary of the display area DR Although each of the sub-antenna loops 241a and 241b is illustrated as having an overall rectangular shape, it may have a shape such as a circle, an ellipse, a polygon, or a polygon with rounded corners, but the present invention is not limited thereto.

In addition, the first sub-antenna loop 241a is positioned outside the second sub-antenna loop 241b. The first sub-antenna loop 241a may extend along a circumference of the second sub-antenna loop 241b. A shortest distance at which the adjacent first sub-antenna loop 241a and the second sub-antenna loop 241b are spaced apart from each other may be the same on one surface of the display panel 251, but the present invention is not limited thereto. The first sub-antenna loop 241a and the second sub-antenna loop 241b may be wires having a same width, but the present invention is not limited thereto. The first sub-antenna loop 241a and the second sub-antenna loop 241b may be made of a same material, but the present invention not limited thereto.

The flexible circuit substrate 27 may be connected to the pads 243a, 243b, 243c, and 243d. The flexible circuit board 27 may be a flexible printed circuit board (FPCB) or a chip-on-film (COF). Since the coil driver 263 is mounted on the flexible circuit board 27, the flexible circuit board 27 will be described below as the chip-on-film (COF).

The flexible circuit substrate 27 may be electrically connected to the pads 243a, 243b, 243c, and 243d. For example, a plurality of pads (not illustrated) on the flexible circuit board 27 connected to a plurality of signal transfer wires 271a and 271b and a connection wire 272 may be coupled to the pads 243a, 243b, 243c, and 243d through a connector 26. The connector 26 may be a ZIF connector (zero insertion force connector), a BTB connector (board-to-board connector), or the like, but the present invention is not limited thereto. A socket for the connector 26 is formed on the display panel 251, and the pads (not illustrated) and the pads 243a, 243b, 243c, 243d) may be electrically connected to each other by inserting the flexible circuit board 27 into the socket of the connector 26.

As another example, the pads (not illustrated) of the flexible circuit board 27 may be bonded to the pads 243a, 243b, 243c, and 243d. For example, the pads (not illustrated) on the flexible circuit board 27 connected to the signal transfer wires 271a and 271b and the connection wire 272 may be connected to the pads 243a, 243b, 243c, and 243d by an anisotropic conductive film (ACF) by an outer lead bonding (OLB) method.

In addition, various connection methods for electrically and physically connecting the pads (not illustrated) and the pads 243a, 243b, 243c, and 243d may be used.

The flexible circuit board 27 includes a plurality of signal transmission wires 271a and 271b positioned on a first surface of the board and a connection wire 272 positioned on a second surface. The wires 271a, 271b, and 272 may be printed by photolithography, thin film sputtering, or the like. A method for positioning the wires 271a, 271b, and 272 on the flexible circuit board 27 is not limited to the above description. In addition, although it has been described above that the signal transmission wires 271a and 271b and the connection wire 272 are respectively positioned on opposite surfaces of one substrate, they may be respectively positioned on different substrates, and the present invention is not limited thereto.

The signal transmission wire 271a connects the pad 243a connected to the first sub-antenna loop 241a and the coil driver 263, and the signal transmission wire 271b connects the pad 243d connected to the second sub-antenna loop 241b and the coil driver 263.

The connection wire 272 connects the pad 243b connected to the first sub-antenna loop 241a and the pad 243c connected to the second sub-antenna loop 241b to each other. That is, the first sub-antenna loop 241a and the second sub-antenna loop 241b are electrically connected to each other through the connection wire 272 positioned on the flexible circuit board 27. Accordingly, a current introduced from the coil driver 263 to the pad 243a through the signal transmission wire 271a flows in an order of the first sub-antenna loop 241a, the pad 243b, the connection wire 272, the pad 243c, the second sub-antenna loop 241b, the pad 243d, and the signal transmission wire 271b.

That is, depending on the antenna module according to an embodiment, it has substantially a same effect as the antenna loop formed in the spiral pattern without forming a wire in the spiral pattern on the base film 242. All antenna loops wires are formed on a lower surface of the display panel 251 in this antenna module, thereby reducing a manufacturing cost and reducing a thickness and a size of the touch screen 20.

Hereinafter, when an electronic device according to the embodiments is implemented as a foldable device, the electronic device and a driving method thereof will be described.

Figure 23:
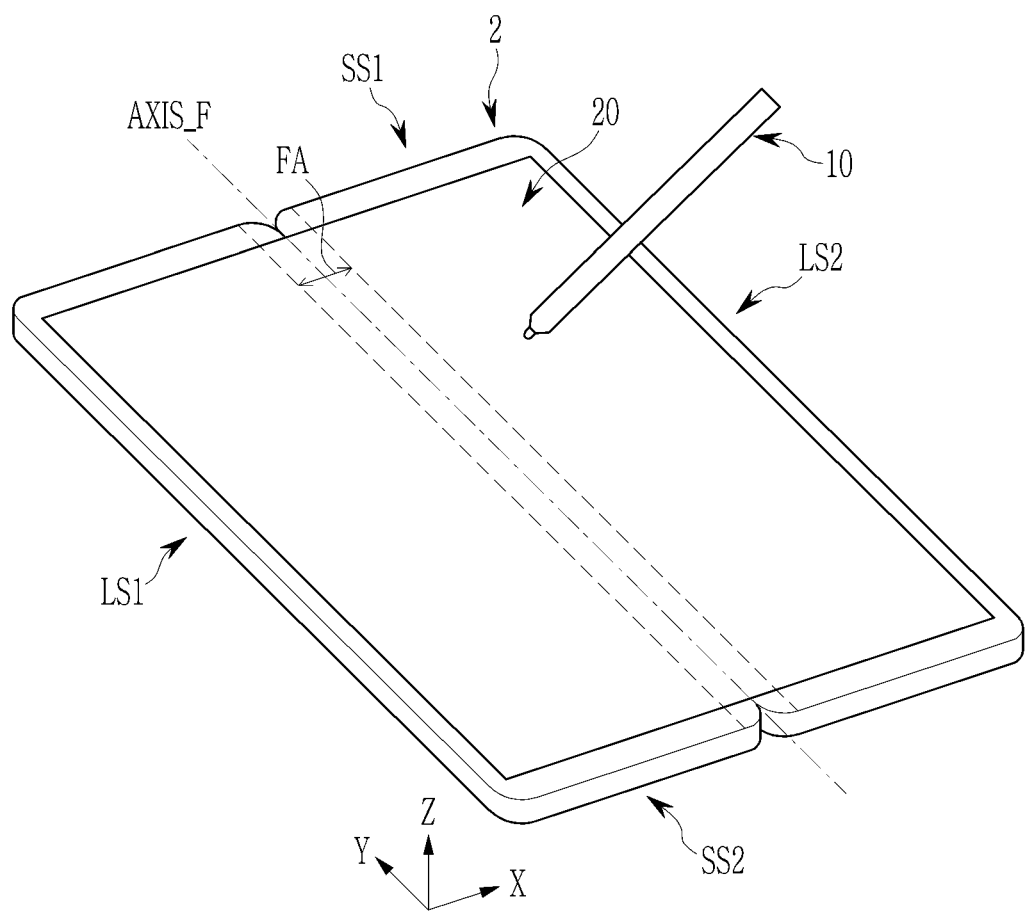
FIG. 23 illustrates a schematic view showing a stylus pen and a portable electronic device.

FIG. 23 illustrates a schematic view showing a stylus pen and a portable electronic device.

The foldable electronic device 2 may include the constituent elements of the electronic device described in FIG. 2.

As illustrated in FIG. 23, in a member such as a rectangular foldable electronic device 2 or a touch screen 20 included therein, in a plan view, a long side positioned at a left side is referred to as a first long side LS1, a long side positioned at a right side is referred to as a second long side LS2, a short side positioned at an upper side is referred to as a first short side SS1, and a short side positioned at a lower side is referred to as a second short side SS2.

The foldable electronic device 2 may be bent along a predetermined folding direction based on a folding axis AXIS_F crossing the first short side SS1 and the second short side SS2. That is, the foldable electronic device 2 may be able to switch between a folded state and an unfolded state along a folding direction based on the folding axis AXIS_F.

Next, a case in which a conventional stylus pen, e.g., an EMR type of pen, is used for the foldable electronic device will be described with reference to FIG. 24 and FIG. 25.

Figure 24:
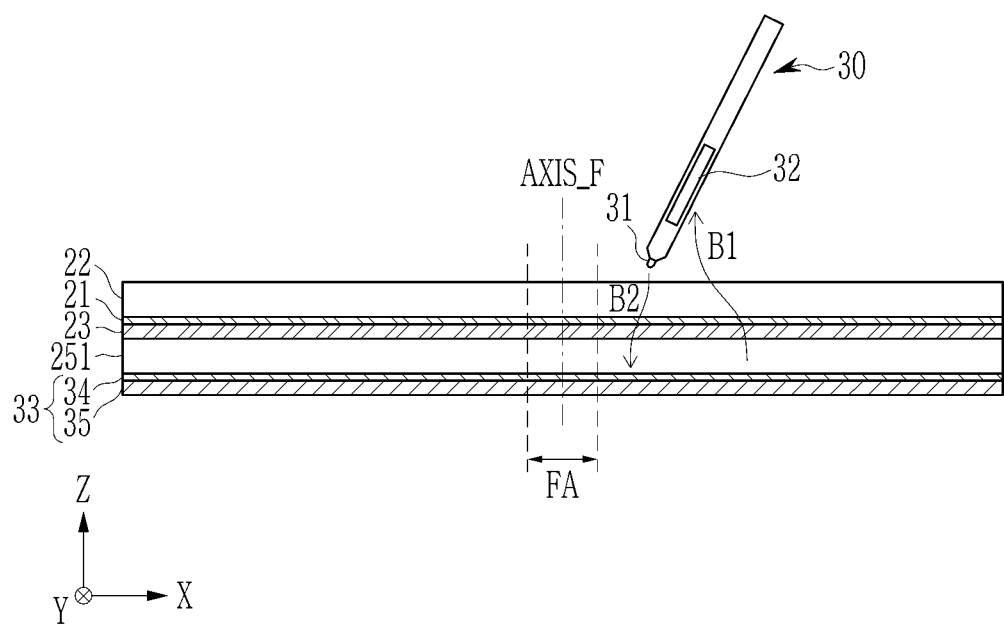
FIG. 24 and FIG. 25 illustrate a case in which a stylus pen according to a conventional method is used in a foldable electronic device.
Figure 25:
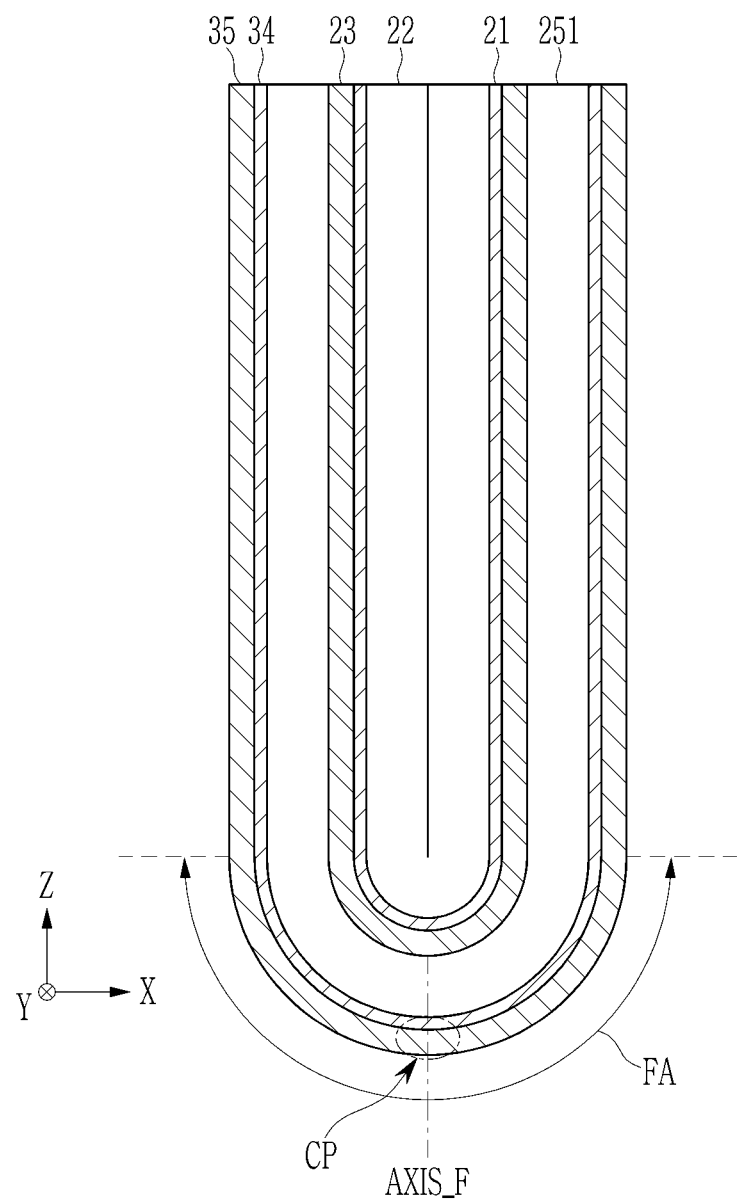

FIG. 24 and FIG. 25 illustrate a case in which a stylus pen according to a conventional method is used in a foldable electronic device.

The foldable electronic device described herein may have a flat or unfolded state illustrated in FIG. 24, a folded state illustrated in FIG. 25, and an intermediate state between the unfolded and folded states. Herein, the term "folded state" indicates "fully folded state" unless otherwise specifically described.

As illustrated in FIG. 24, among passive stylus pens, in the case of electro-magnetic resonance type of pens, the digitizer 33 transmits an electromagnetic signal B1 to a stylus pen 30 of an EMR type, and then receives the resonance signal B2 from the stylus pen 30 of the EMR type.

The digitizer 33 may be attached under the display panel 251, and may include a flexible printed circuit board (FPCB) 34 having a plurality of conductive antenna loops formed thereon and a ferrite sheet 35 blocking a magnetic field generated by the antenna loops.

In the FPCB 34, a plurality of antenna loops for detecting a position to which a resonance signal is inputted are configured to include a plurality of layers. One antenna loop has a shape overlapping at least another antenna loop in a Z-axis direction. Accordingly, a thickness of the FPCB 34 is thick.

As illustrated in FIG. 25, when folding of the foldable electronic device 2 occurs based on the folding axis AXIS_F, deformation of the FPCB 34 attached to a folded area (hereinafter referred to as a folding area) FA may occur. Stress is applied to a wiring member forming the antenna loop by repeated folding, which may result in damage to the wiring member. In the folded state, at least a portion of the folding area FA may be formed of a curved surface having a predetermined curvature.

The ferrite sheet 35 blocks an influence of the magnetic field generated by the antenna loop on inside of the foldable electronic device 2. The ferrite sheet 35 is also thick, is prone to deformation when folding of the foldable electronic device 2 occurs, and may be damaged by repeated folding.

Accordingly, it is difficult to apply the stylus pen 30 of the EMR type to the foldable electronic device 2. In addition, in the case of the EMR type, since a signal is transmitted and received only by the digitizer 33, signal transmission B1 and signal reception B2 may not be simultaneously performed, and there is a problem that signal transmission and signal reception must be performed separately by time.

Figure 26:
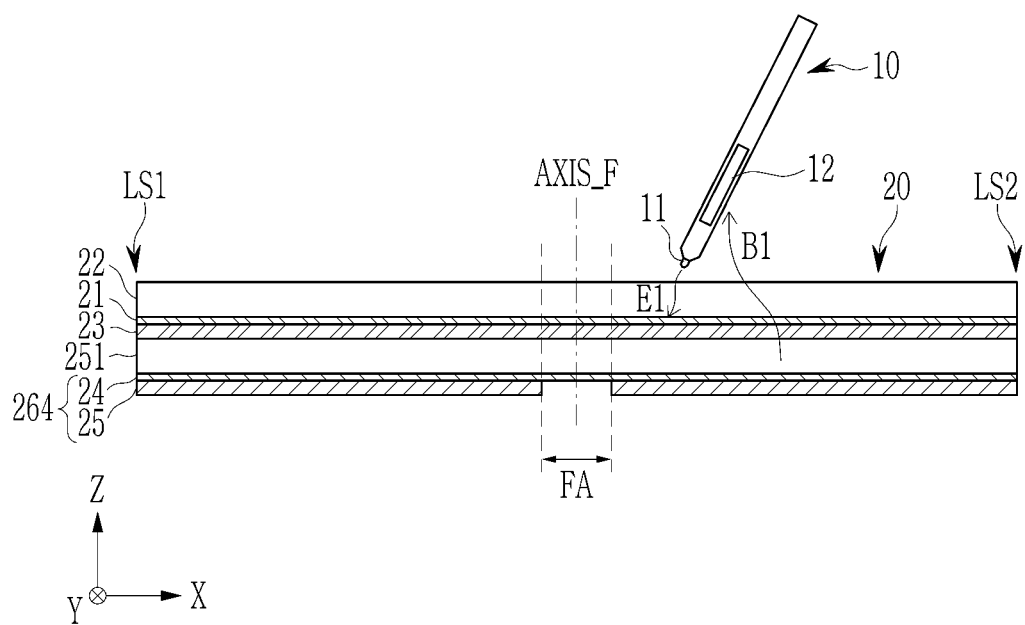
FIG. 26 and FIG. 27 illustrate a foldable electronic device according to an embodiment.
Figure 27:
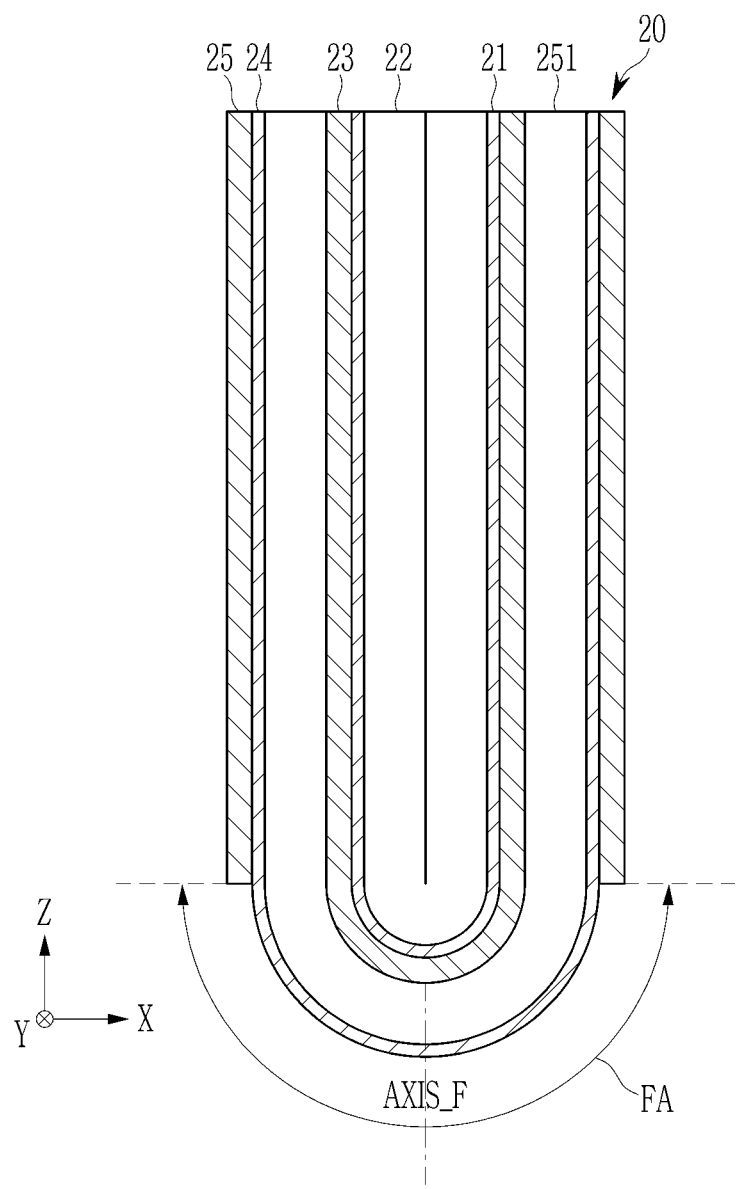

FIG. 26 and FIG. 27 illustrate a foldable electronic device according to an embodiment.

The touch screen 20 of the foldable electronic device includes a display panel 251, a touch sensor 261 on the display panel 251, and a loop coil 264 below the display panel 251.

The touch sensor 261 may include a substrate 23, a touch electrode layer 21 on the substrate 23, and a window 22 on the touch electrode layer 21.

The substrate 23 may be an encapsulation substrate of the display panel 251 or a color filter substrate of the display panel 251, which is preferably implemented with a transparent material.

The touch electrode layer 21 may include a plurality of first touch electrodes for detecting touch coordinates in a first direction and a plurality of second touch electrodes for detecting touch coordinates in a second direction crossing the first direction. Although the touch electrode layer 21 is illustrated as a single layer in FIG. 26, the first touch electrodes and the second touch electrodes may be respectively positioned on different layers, may be positioned to overlap each other, may positioned to not overlap each other, or may be positioned with separate layers therebetween.

The window 22 may be positioned on the touch electrodes layer 21. The touch electrode layer 21, the conductive tip 11, and the window 22 may generate capacitance. Accordingly, a signal (a resonance signal or an active touch signal) generated by the stylus pen 10 may be transferred to the touch electrode layer 21 through the capacitance.

The loop coil 264 may include a substrate 24 on which an antenna loop is positioned and a ferrite sheet 25. As will be described with reference to FIG. 28 to FIG. 33, the antenna loop may be positioned on a same layer as the touch electrode layer 21 in addition to the substrate 24 or positioned under the window 22, and in this case, the substrate 24 may not be included in the loop coil 264.

The substrate 24 may be attached to a rear surface of the display panel 251. The substrate 24 may be positioned in an area including the folding area FA on a rear surface of the display panel 251. The substrate 24 may be a single-side FPCB, a double-side FPCB, or a multilayer FPCB, but is preferably the single-side FPCB or the double-side FPCB. Accordingly, even when the folding area FA is bent with respect to the folding axis AXIS_F, a risk of damage to the substrate 24 due to a force applied to the substrate 24 is reduced.

The substrate 24 may include a flexible base film. The base film may be made of a polyimide resin, an epoxy-based resin, or another known material having flexibility. At least one antenna loop formed to include at least one wire may be formed on the base film.

The antenna loop is formed as a conductive wire on the substrate 24. For example, the antenna loop may be printed on the substrate 24 by photolithography, thin film sputtering, or the like. A method for positioning the antenna loop on the substrate 24 is not limited to the above description.

The ferrite sheet 25 may be positioned in an area that is other than the folding area FA on an XY plane. Herein, the area excluding the folding area FA indicates an area in which a force acting on the ferrite sheet 25 does not damage the ferrite sheet 25 when the foldable electronic device 2 is in the folded state, and does not indicate that the ferrite sheet 25 is not completely positioned in the folding area FA. For example, although the ferrite sheet 25 is positioned in a portion of the folding area FA, if the ferrite sheet 25 is not damaged when the foldable electronic device 2 is repeatedly deformed between the folded state and the unfolded state, it also corresponds to an area excluding the folding area FA. Accordingly, even when the folding area FA is bent with respect to the folding axis AXIS_F, a risk of damage to the ferrite sheet 25 is reduced.

After the loop coil 264 transfers an electromagnetic signal B1 to the stylus pen 10, the touch sensor 261 receives a resonance signal E1 from the stylus pen 10.

The resonance circuit 12 of the stylus pen 10 may mutually resonate with the loop coil 264, and a degree of mutual resonance occurring between an inductor of the resonance circuit 12 and the loop coil 264 is affected by mutual inductance. Alternatively, the resonance circuit 12 may resonate with a magnetic field generated by the loop coil 264. This refers to the descriptions of FIG. 6 to FIG. 11.

FIG. 28 to FIG. 33 illustrate views showing an arrangement of a touch panel and a loop coil according to various aspects of an embodiment.

As illustrated in FIG. 28A, the loop coil 264 is positioned under the display panel 251. The loop coil 264 may include a substrate 24 and a ferrite sheet 25. The substrate 24 includes a base film 242 and an antenna loop 241.

As illustrated in FIG. 28B, the antenna loop 241 may be a conductive wire extending along a boundary of the display area DP. Although the antenna loop 241 is illustrated as having an overall rectangular shape, it may have a shape such as a circle, an ellipse, a polygon, or a polygon with rounded corners, but the present invention is not limited thereto. In addition, the antenna loop 241 may be formed of a conductive material exhibiting high transmittance and low impedance, such as ITO, graphene, silver nanowire, or the like. The antenna loop 241 may overlap an area in which the ferrite sheet 25 is positioned on the XY plane.

The ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

As illustrated in FIG. 29A, the antenna loop 241 may be directly printed on a substrate of the display panel 251 by a method such as photolithography or thin film sputtering. A method for directly forming the antenna loop 241 on the substrate of the display panel 251 is not limited to the above description.

As illustrated in FIG. 29A, the ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

The antenna loop 241 may be a conductive wire extending along a boundary of the display area DP. Although the antenna loop 241 is illustrated as having an overall rectangular shape, it may have a shape such as a circle, an ellipse, a polygon, or a polygon with rounded corners, but the present invention is not limited thereto. In addition, the antenna loop 241 may be formed of a conductive material exhibiting high transmittance and low impedance, such as ITO, graphene, silver nanowire, or the like. The antenna loop 241 may overlap an area in which the ferrite sheet 25 is positioned on the XY plane.

Figure 30:
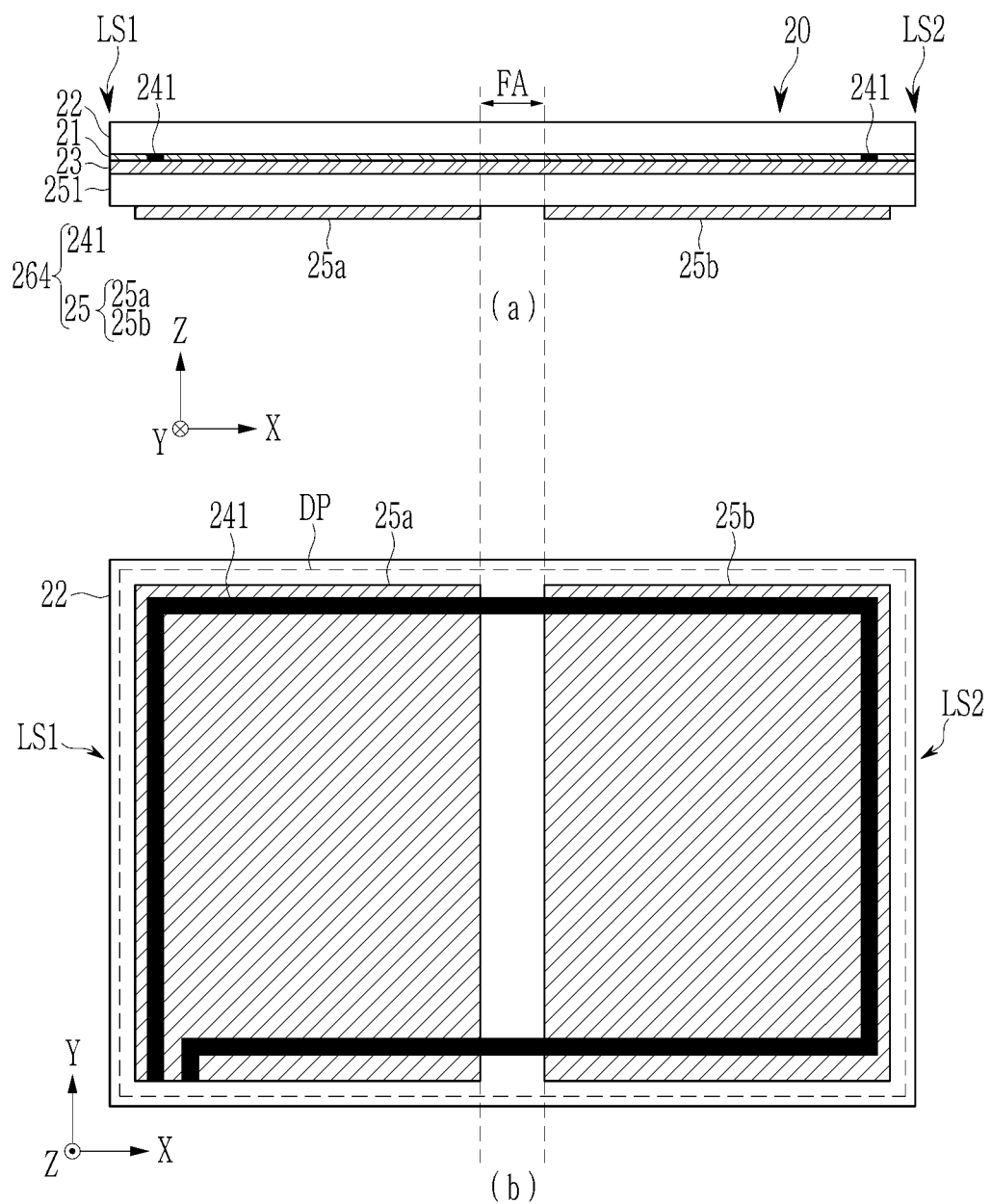
Figure 31:
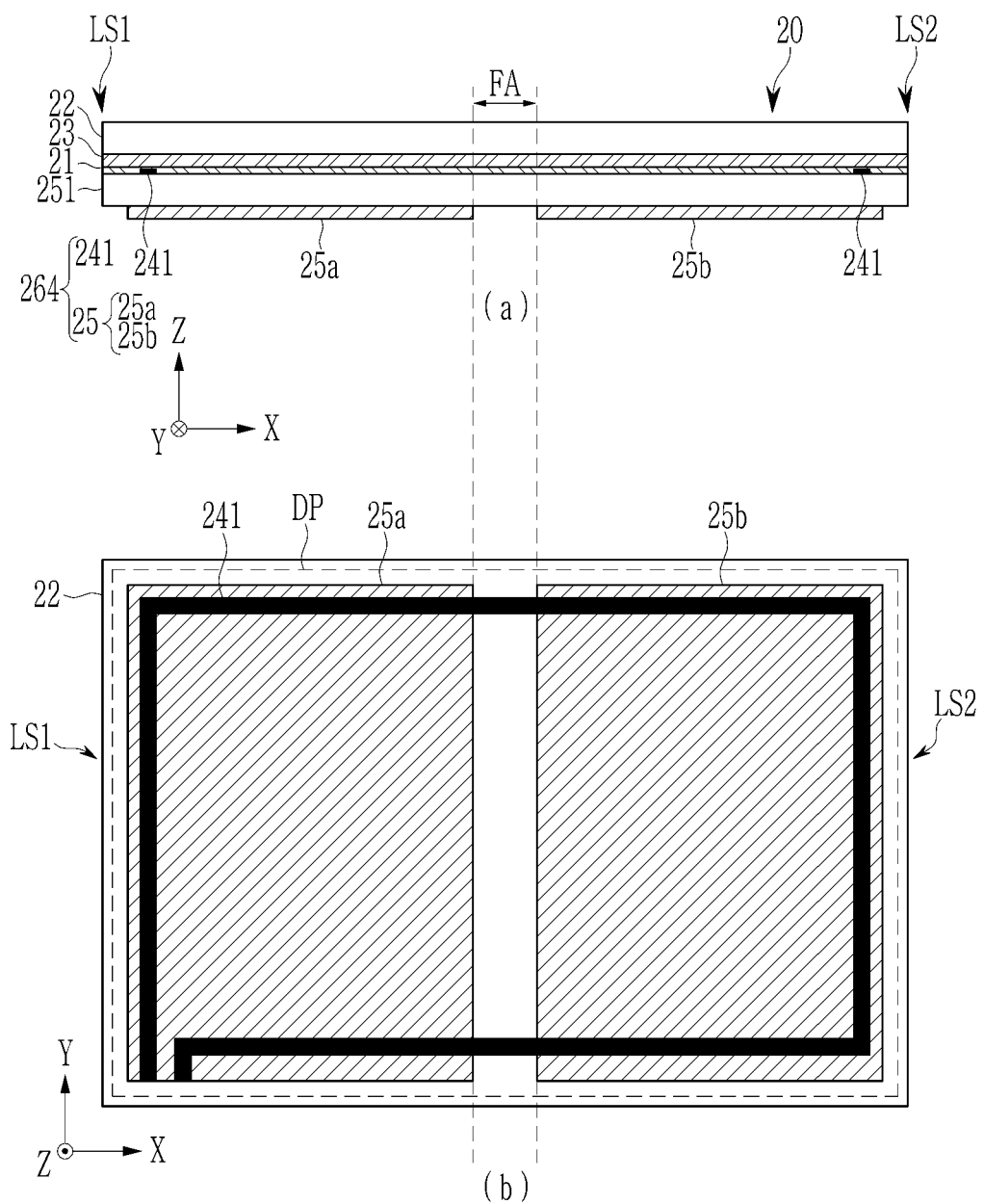
Figure 32:
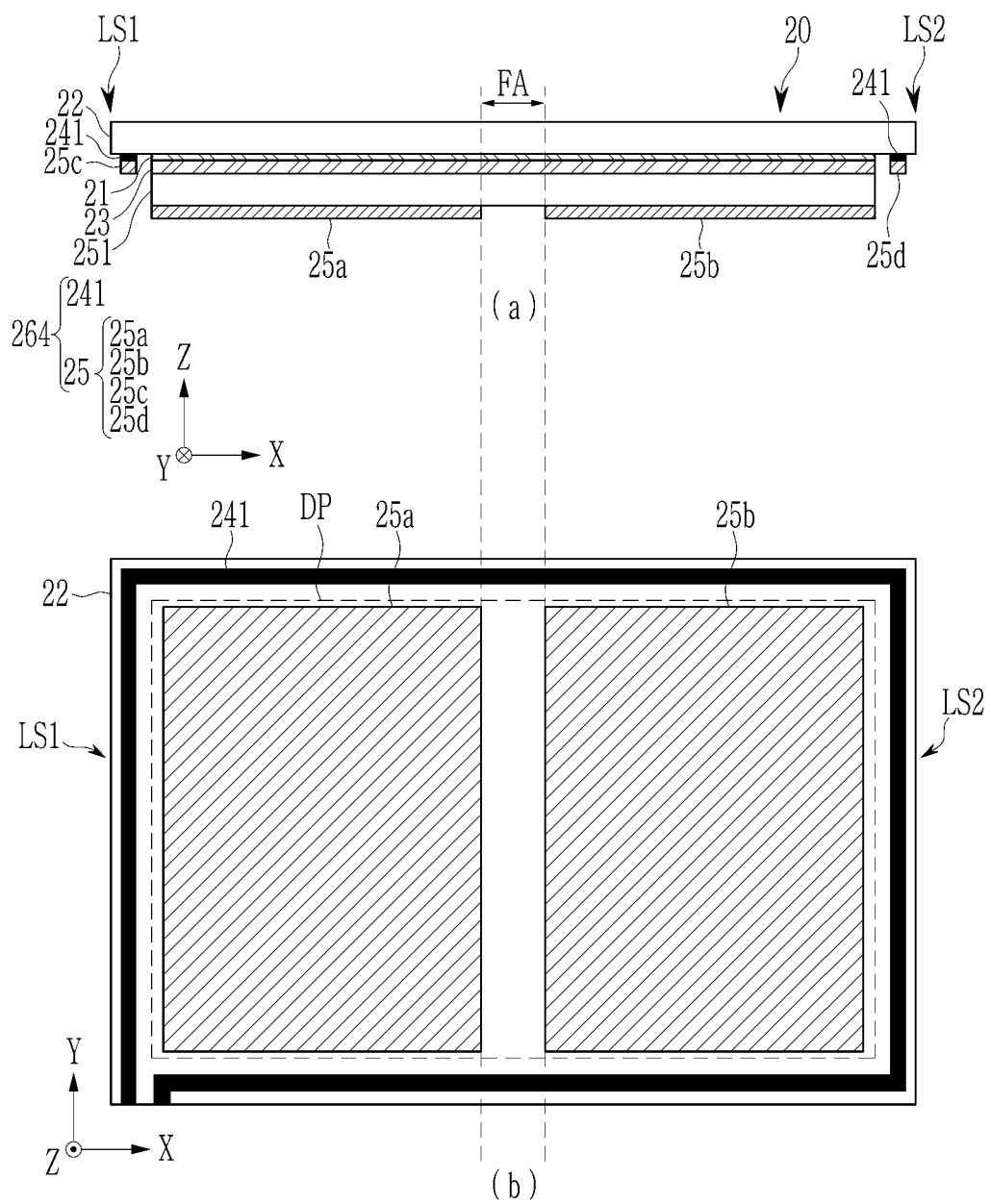
Figure 33:
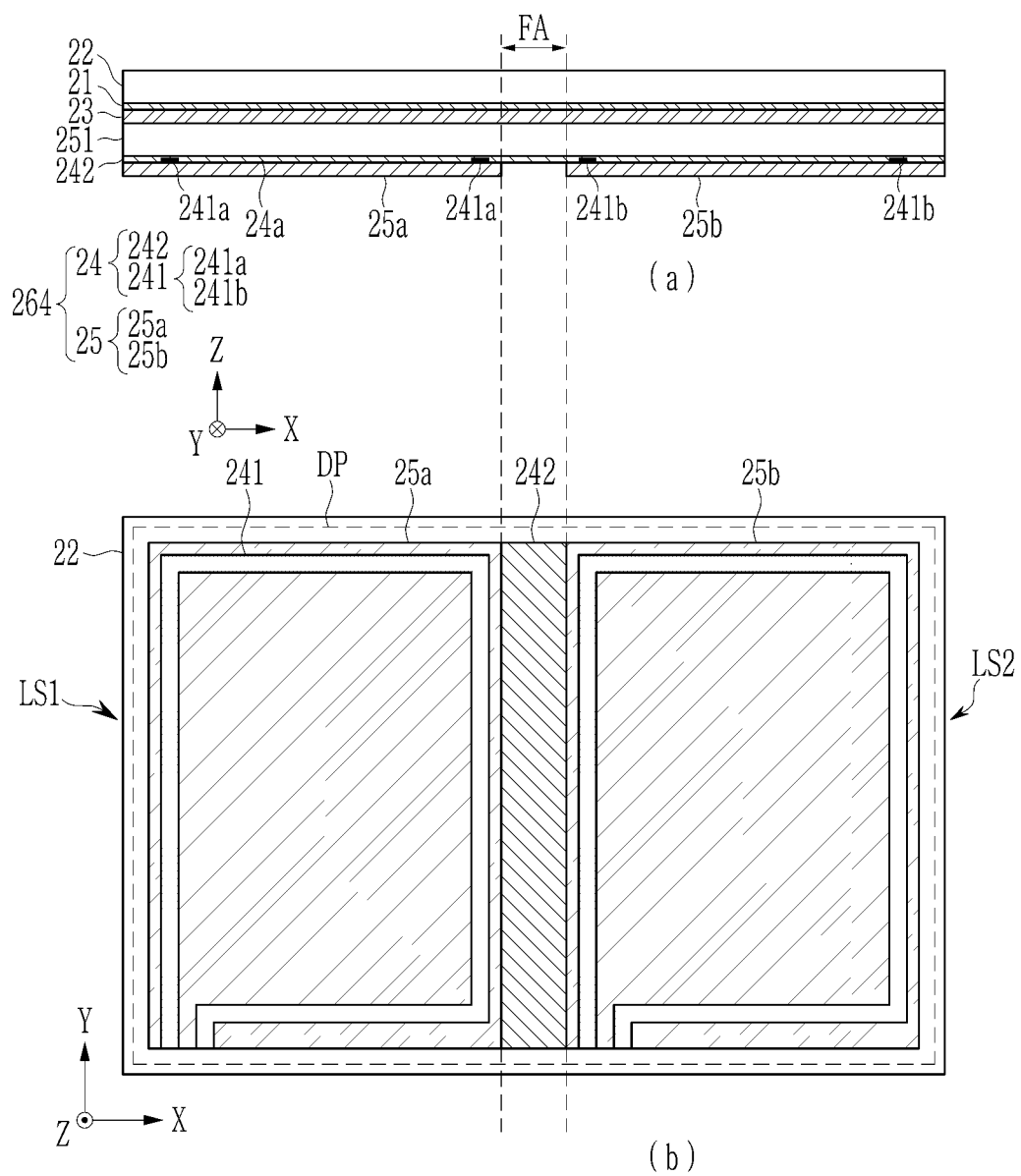

Next, FIG. 30 illustrates the loop coil 264 including the antenna loop 241 positioned in a same layer as the touch electrode layer 21 in the case of an on-cell type of touch sensor, and FIG. 31 illustrates the loop coil 264 including the antenna loop 241 positioned on a same layer as the touch electrode layer 21 in the case of an in-cell type of touch sensor.

The antenna loop 241 may be made of a same material as that of the first and second touch electrodes of the touch electrode layer 21. However, the antenna loop 241 may be positioned as a different layer from the touch electrode layer 21, and may be made of a different material from that of the first and second touch electrodes.

As illustrated in FIG. 30A and FIG. 31A, the loop coil 264 includes the antenna loop 241 positioned on the touch electrode layer 21 and the ferrite sheet 25 positioned under the display panel 251.

As illustrated in FIG. 30B, the antenna loop 241 and the touch electrode layer 21 are positioned in a same layer on the encapsulation substrate 23 of the display panel 251.

The antenna loop 241 may be a conductive wire extending along a boundary of the display area DP. The antenna loop 241 may overlap an area in which the ferrite sheet 25 is positioned on the XY plane.

The ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

As illustrated in FIG. 31B, the display panel 251 includes a touch electrode layer 21 and a loop coil 264. That is, the substrate 23 may be a color filter substrate of the display panel 251, and the touch electrode layer 21 and the antenna loop 241 may be positioned between the color filter substrate 23 and a TFT substrate of the display panel 251. Alternatively, both the touch electrode layer 21 and the antenna loop 241 may be positioned on upper and lower portions of the color filter substrate 23.

The antenna loop 241 may be a conductive wire extending along a boundary of the display area DP. The antenna loop 241 may overlap an area in which the ferrite sheet 25 is positioned on the XY plane.

The ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

In FIG. 28 to FIG. 31, although the antenna loop 241 is illustrated to have a shape extending along a boundary of the display area DP inside the display area DP, the antenna loop 241 may be positioned outside the display area DR In addition, the antenna loop 241 may be positioned so as to not overlap the touch electrodes positioned on the touch electrode layer 21 on the XY plane, and to surround a circumference of an area in which the touch electrodes are positioned.

As illustrated in FIG. 32A, the antenna loop 241 may be printed on the window 22 by a method such as photolithography, thin film sputtering, or the like, or may be printed on a sheet by a method such as photolithography, thin film sputtering, or the like to be attached to the window 22, and a method for positioning the antenna loop 241 on the window 22 is not limited to the above description.

The ferrite sheet 25 includes a first sheet 25a attached to a rear surface of the display panel 251 and positioned in an area between the folding area FA and the long side LS1, a second sheet 25b attached to the rear surface of the display panel 251 and positioned in an area between the folding area FA and the long side LS, a third sheet 25c positioned below the antenna loop 241 attached to the window 22 while being positioned at the long side LS1, and a third sheet 25d positioned under the antenna loop 241 attached to the window 22 while being positioned at the long side LS2.

As illustrated in FIG. 33A, the loop coil 264 is positioned under the display panel 251. The loop coil 264 may include a substrate 24 and a ferrite sheet 25. The substrate 24 includes a base film 242 and antenna loops 241a and 241b.

As illustrated in FIG. 33B, the ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

The antenna loop 241a may be a conductive wire extending along a boundary between the display area DP at the long side LS1 and the folding area FA, and the antenna loop 241b may be a conductive wire extending along a boundary between the display area DP at the long side LS2 and the folding area FA. The antenna loop 241a may overlap an area where the first sheet 25a is positioned on the XY plane, and the antenna loop 241b may overlap an area where the second sheet 25b is positioned on the XY plane.

Next, a method of driving the touch module 260 including the antenna module according to the present disclosure will be described with reference to FIG. 34 and FIG. 35.

Figure 34:
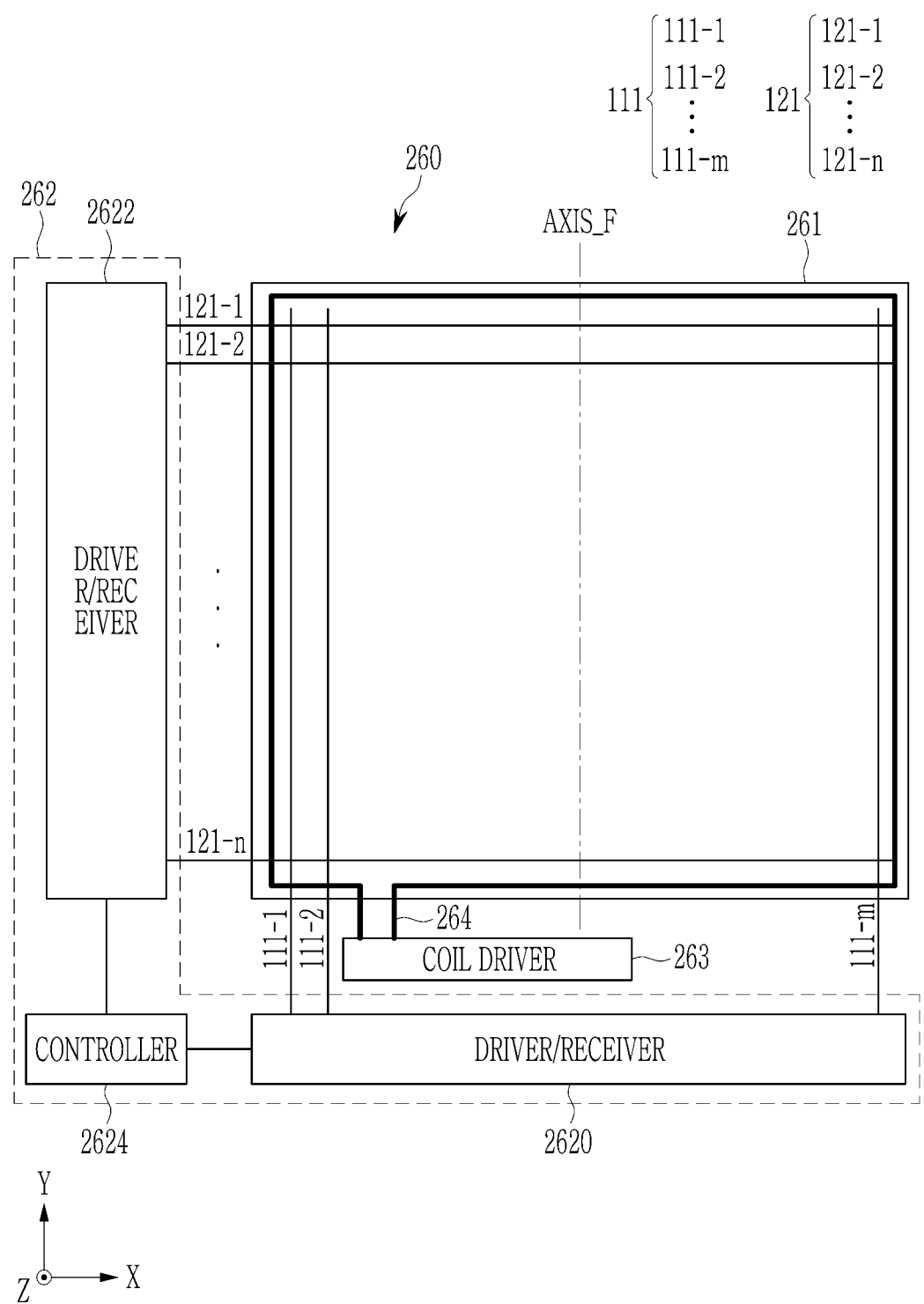
FIG. 34 schematically illustrates a portion of a touch module according to an embodiment.

FIG. 34 schematically illustrates a portion of a touch module according to an embodiment.

The touch module 260 according to an embodiment includes a touch sensor 261, a loop coil 264, a coil driver 263 for driving the loop coil 264, and a touch controller 262 for controlling the touch sensor 261. The touch controller 262 may include a first driver/receiver 2620 and a second driver/receiver 2622 for transmitting and receiving signals to and from the touch sensor 261, and a controller 2624.

The touch sensor 261 may include a plurality of first touch electrodes 111-1 to 111-m for detecting touch coordinates in a first direction; and a plurality of second touch electrodes 121-1 to 121-n for detecting touch coordinates in a second direction intersecting the first direction. For example, the first touch electrodes 111-1 to 111-m may have a shape extending in the second direction, and the second touch electrodes 121-1 to 121-n may have a shape extending in the first direction. In the touch sensor 261, the first touch electrodes 111-1 to 111-m may be arranged along the first direction, and the second touch electrodes 121-1 to 121-n may be arranged along the second direction.

The first driver/receiver 2620 may apply a driving signal to the first touch electrodes 111-1 to 111-m. The second driver/receiver 2622 may apply a driving signal to the second touch electrodes 121-1 to 121-n.

The first driver/receiver 2620 may receive a sensing signal from the first touch electrodes 111-1 to 111-m. The second driver/receiver 2622 may receive a sensing signal from the second touch electrodes 121-1 to 121-n.

Although it has been described above that the touch sensor 261 is implemented in a mutual capacitance method, the touch sensor 261 may be implemented in a self-capacitance method, and it will be easy for a person skilled in the art to appropriately modify the touch electrodes 111-1 to 111-m and 121-1 to 121-n, the first driver/receiver 2620 and the second driver/receiver 2622 in the mutual capacitance method, to add a new component, or to omit some components and to modify them to fit the self-capacitance method.

That is, the touch sensor 261 may include a plurality of self-capacitance touch electrodes, and in this case, the touch electrodes may be arranged in a dot shape, or may be arranged to have a shape extending in one direction as described above.

The coil driver 263 applies a driving signal to the loop coil 264. The driving signal may include a signal (e.g., a sine wave, a square wave, etc.) having a frequency corresponding to a resonance frequency of the resonance circuit 12, and may be an AC voltage or an AC current having a predetermined frequency. A frequency and magnitude of the driving signal may be changed under control of the controller 2624.

The controller 2624 may receive a sensor input from the stylus pen 10 by demodulating a touch signal received from at least one of the first driver/receiver 2620 or the second driver/receiver 2622. In addition, the controller 2624 may modulate a driving signal applied to the loop coil 264 such that a frequency of the resonance signal of the stylus pen 10 may be changed. In this case, the modulating method of the driving signal and the modulating method of a frequency change request driving signal in the controller 2624 may be performed in a manner such as on/off keying (OOK), amplitude shift keying (ASK), and frequency shift keying (FSK). Similarly, the modulating method of the touch signal and the demodulating method of the frequency change request driving signal in the stylus pen 10 may be performed in a same way as the OOK and the ASK.

The driving signal will be described with reference to FIG. 35.

Figure 35:
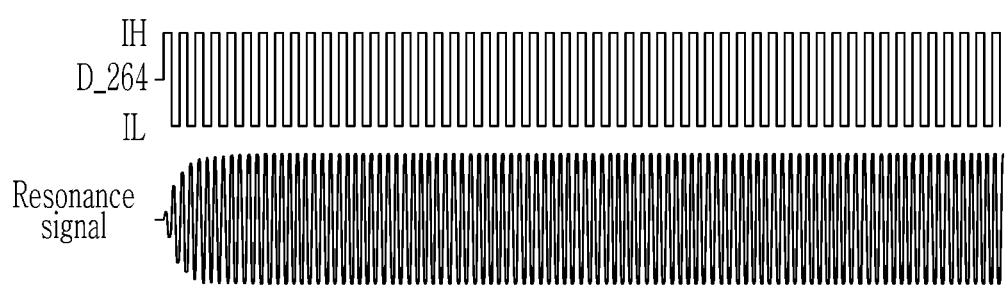
FIG. 35 illustrates a driving signal of a loop coil and a resonance signal of a stylus pen according to an embodiment.

FIG. 35 illustrates a driving signal of a loop coil and a resonance signal of a stylus pen according to an embodiment.

As illustrated in FIG. 35, the coil driver 263 may apply a driving signal D_264 to the loop coil 264. The driving signal D_264 may be an AC current having a predetermined frequency, that is, a frequency corresponding to a resonance frequency of the resonance circuit 12 of the stylus pen 10, and oscillating between a first level IH and a second level IL, but the present invention is not limited thereto. Then, the resonance circuit 12 resonates by the magnetic field generated in the loop coil 264 by the driving signal D_264. A signal resonated by the resonance circuit 12 may be transferred to the touch sensor 261 through capacitance generated with the touch sensor 261, and thus a sensing signal by the stylus pen 10 may be received by the touch electrodes 111 and the touch electrodes 121.

Next, a foldable electronic device and a driving method according to embodiments of the present disclosure will be described with reference to FIG. 36 to FIG. 47.

Figure 36:
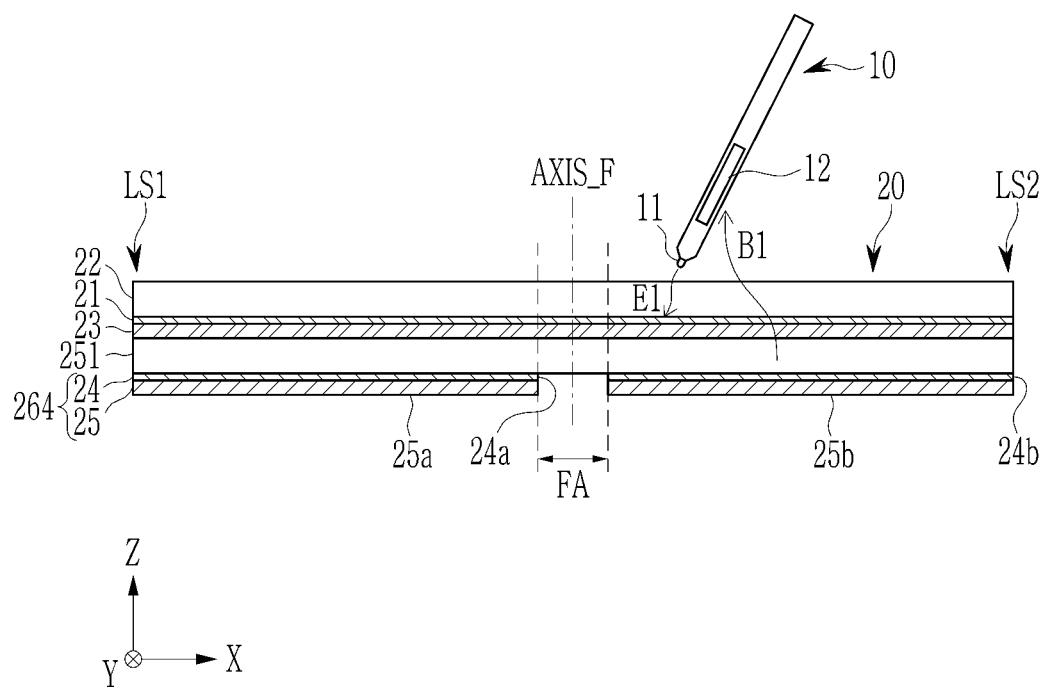
FIG. 36 and FIG. 37 illustrate a foldable electronic device according to another embodiment.
Figure 37:
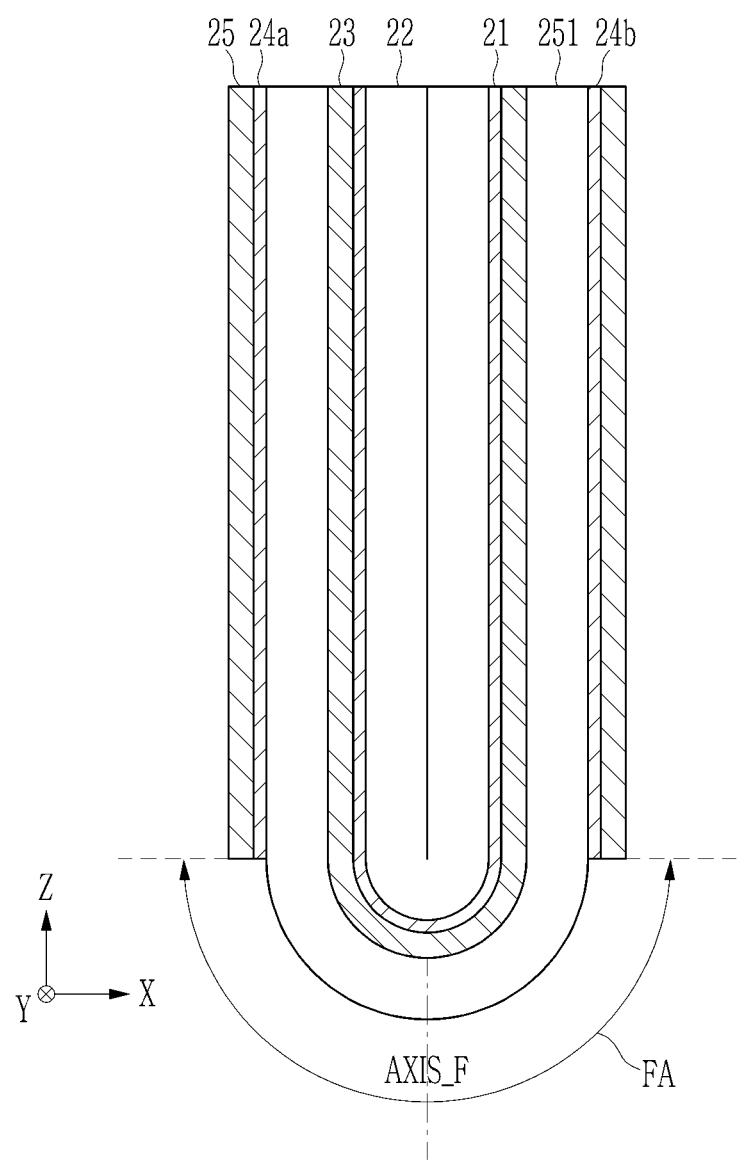

FIG. 36 and FIG. 37 illustrate a foldable electronic device according to another embodiment.

Compared with the foldable electronic device described with reference to FIG. 24 and FIG. 25, it is the same except for a point that the substrate 24 is positioned in an area excluding the folding area FA on the XY plane, and thus a description thereof will be omitted.

Referring to FIG. 36, the loop coil 264 may include a substrate 24 on which an antenna loop is positioned and a ferrite sheet 25. As will be described with reference to FIG. 38 to FIG. 41, the antenna loop may be positioned on a same layer as the touch electrode layer 21 in addition to the substrate 24, and in this case, the substrate 24 may not be included in the loop coil 264.

The loop coil 264 may be positioned in an area other than the folding area FA on the XY plane. The loop coil 264 may include at least two sub-loop coils 24a and 24b. The sub-loop coil 24a may be positioned in an area between the folding area FA and the long side LS1, and the sub-loop coil 24b may be positioned in an area between the folding area FA and the long side LS2. A driving signal having a same or similar phase may be applied to the two sub-loop coils 24a and 24b, a driving signal having an opposite phase may be applied thereto, or they may be selectively driven.

Accordingly, even when the folding area FA is bent with respect to the folding axis AXIS_F, a risk of damage to the loop coil 264 is further reduced.

FIG. 38 to FIG. 41 illustrate views showing a disposal form of a touch panel and a loop coil according to various aspects of another embodiment.

As illustrated in FIG. 38A, the loop coil 264 is positioned under the display panel 251. The loop coil 264 includes a plurality of sub-loop coils 24a and 24b and a ferrite sheet 25.

The sub-loop coil 24a includes a base film 242a and an antenna loop 241a, and the sub-loop coil 24b includes a base film 242b and an antenna loop 241b. The sub-loop coil 24a may be positioned in an area between the folding area FA and the long side LS1, and the sub-loop coil 24b may be positioned in an area between the folding area FA and the long side LS2. The base films 242a and 242b of FIG. 38 may be FPCBs or rigid PCBs.

As illustrated in FIG. 38B, the ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

The antenna loop 241a of the sub-loop coil 24a may be a conductive wire extending along a boundary between the display area DP at the long side LS1 and the folding area FA, and the antenna loop 241b of the sub-loop coil 24b may be a conductive wire extending along a boundary between the display area DP at the long side LS2 and the folding area FA. The antenna loop 241a may overlap an area where the first sheet 25a is positioned on the XY plane, and the antenna loop 241b may overlap an area where the second sheet 25b is positioned on the XY plane.

As illustrated in FIG. 39A, the antenna loops 241a and 241b are may be directly printed on a substrate of the display panel 251 by a method such as photolithography or thin film sputtering. A method for directly forming the antenna loops 241a and 241b on the substrate of the display panel 251 is not limited to the above description.

As illustrated in FIG. 39B, the ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

The antenna loop 241a may be a conductive wire extending along a boundary between the display area DP at the long side LS1 and the folding area FA, and the antenna loop 241b may be a conductive wire extending along a boundary between the display area DP at the long side LS2 and the folding area FA. The antenna loop 241a may overlap an area where the first sheet 25a is positioned on the XY plane, and the antenna loop 241b may overlap an area where the second sheet 25b is positioned on the XY plane.

Figure 40:
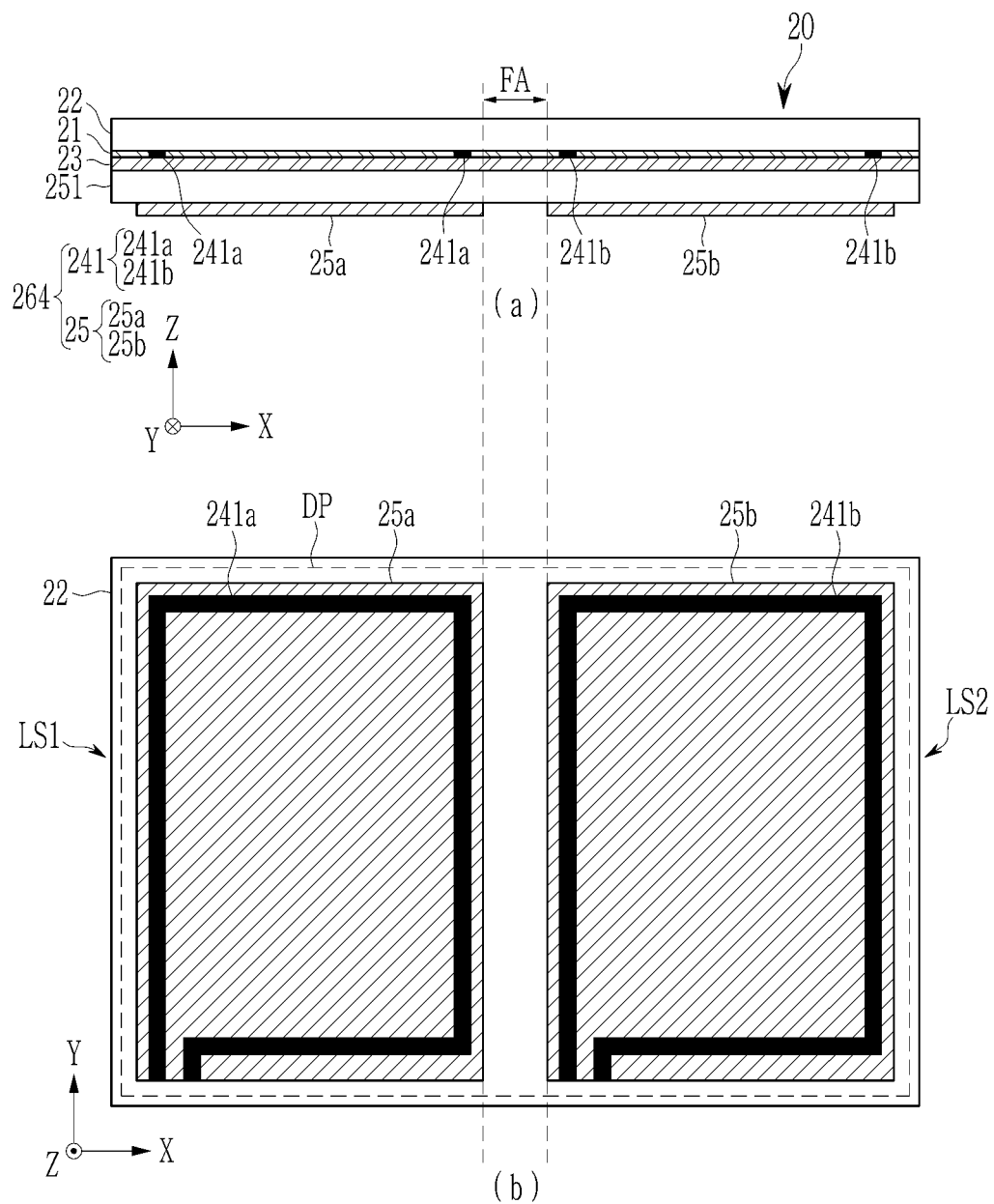
Figure 41:
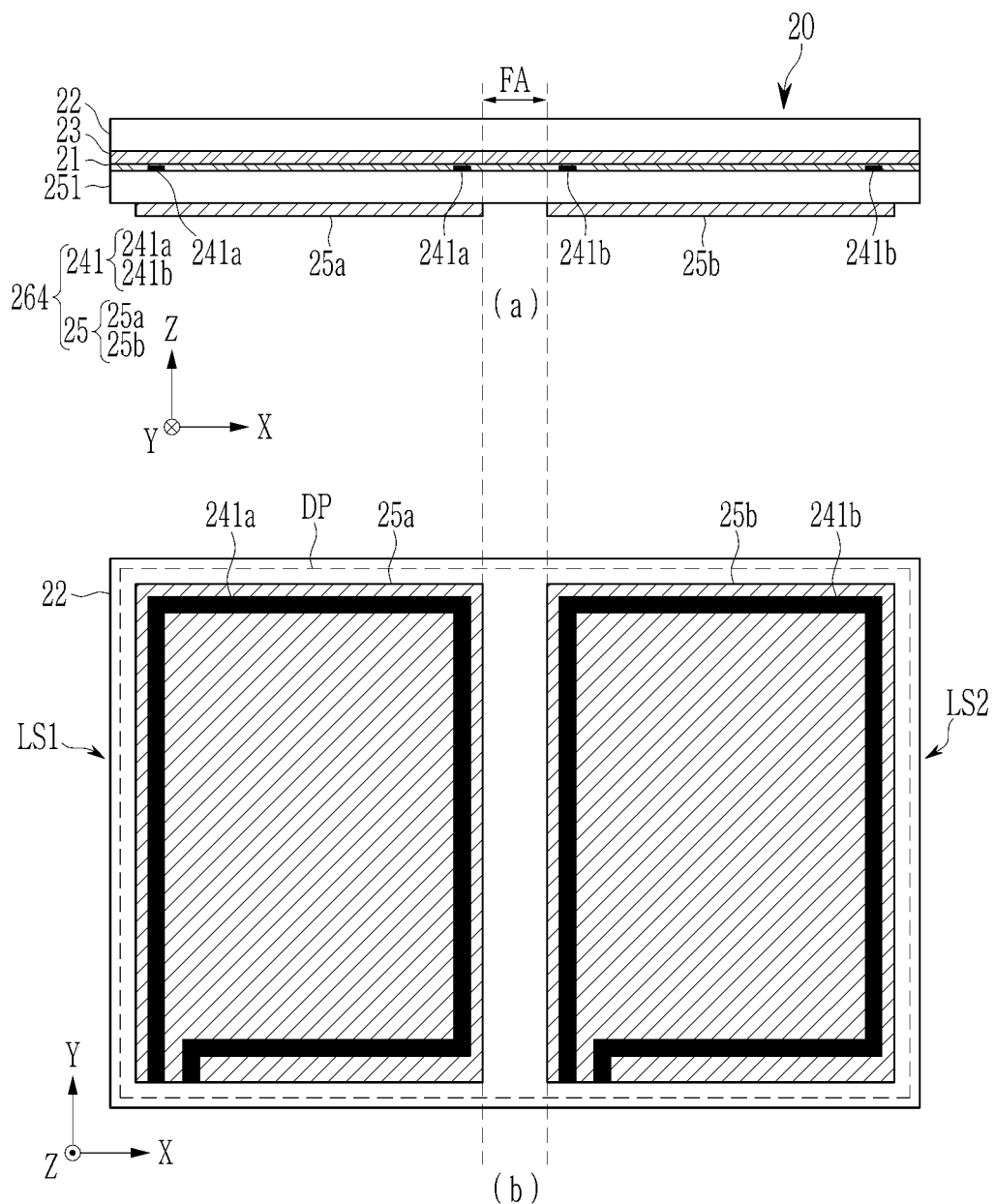

Next, FIG. 40 illustrates the loop coil 264 including the antenna loop 241 positioned in a same layer as the touch electrode layer 21 in the case of an on-cell type of touch sensor, and FIG. 41 illustrates the loop coil 264 including the antenna loop 241 positioned on a same layer as the touch electrode layer 21 in the case of an in-cell type of touch sensor.

The antenna loop 241 may be made of a same material as that of the first and second touch electrodes of the touch electrode layer 21. However, the antenna loop 241 may be positioned as a different layer from the touch electrode layer 21, and may be made of a different material from that of the first and second touch electrodes.

As illustrated in FIG. 40A and FIG. 41A, the loop coil 264 includes the antenna loop 241 positioned on the touch electrode layer 21 and the ferrite sheet 25 positioned under the display panel 251.

As illustrated in FIG. 40B, the antenna loop 241 and the touch electrode layer 21 are positioned in a same layer on the encapsulation substrate 23 of the display panel 251.

The antenna loop 241a may be a conductive wire extending along a boundary between the display area DP at the long side LS1 and the folding area FA, and the antenna loop 241b may be a conductive wire extending along a boundary between the display area DP at the long side LS2 and the folding area FA. The antenna loop 241a may overlap an area where the first sheet 25a is positioned on the XY plane, and the antenna loop 241b may overlap an area where the second sheet 25b is positioned on the XY plane.

The ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

As illustrated in FIG. 41B, the display panel 251 includes a touch electrode layer 21 and a loop coil 264. That is, the substrate 23 may be a color filter substrate of the display panel 251, and the touch electrode layer 21 and the antenna loop 241 may be positioned between the color filter substrate 23 and a TFT substrate of the display panel 251. Alternatively, both the touch electrode layer 21 and the antenna loop 241 may be positioned on upper and lower portions of the color filter substrate 23.

The antenna loop 241a may be a conductive wire extending along a boundary between the display area DP at the long side LS1 and the folding area FA, and the antenna loop 241b may be a conductive wire extending along a boundary between the display area DP at the long side LS2 and the folding area FA. The antenna loop 241a may overlap an area where the first sheet 25a is positioned on the XY plane, and the antenna loop 241b may overlap an area where the second sheet 25b is positioned on the XY plane.

The ferrite sheet 25 may include a first sheet 25a positioned between the folding area FA and the long side LS1 and a second sheet 25b positioned between the folding area FA and the long side LS2. The ferrite sheet 25 may include a plurality of sheets in addition to two sheets, and even in this case, the ferrite sheet 25 is positioned in an area other than the folding area FA on the rear surface of the display panel 251.

Figure 38:
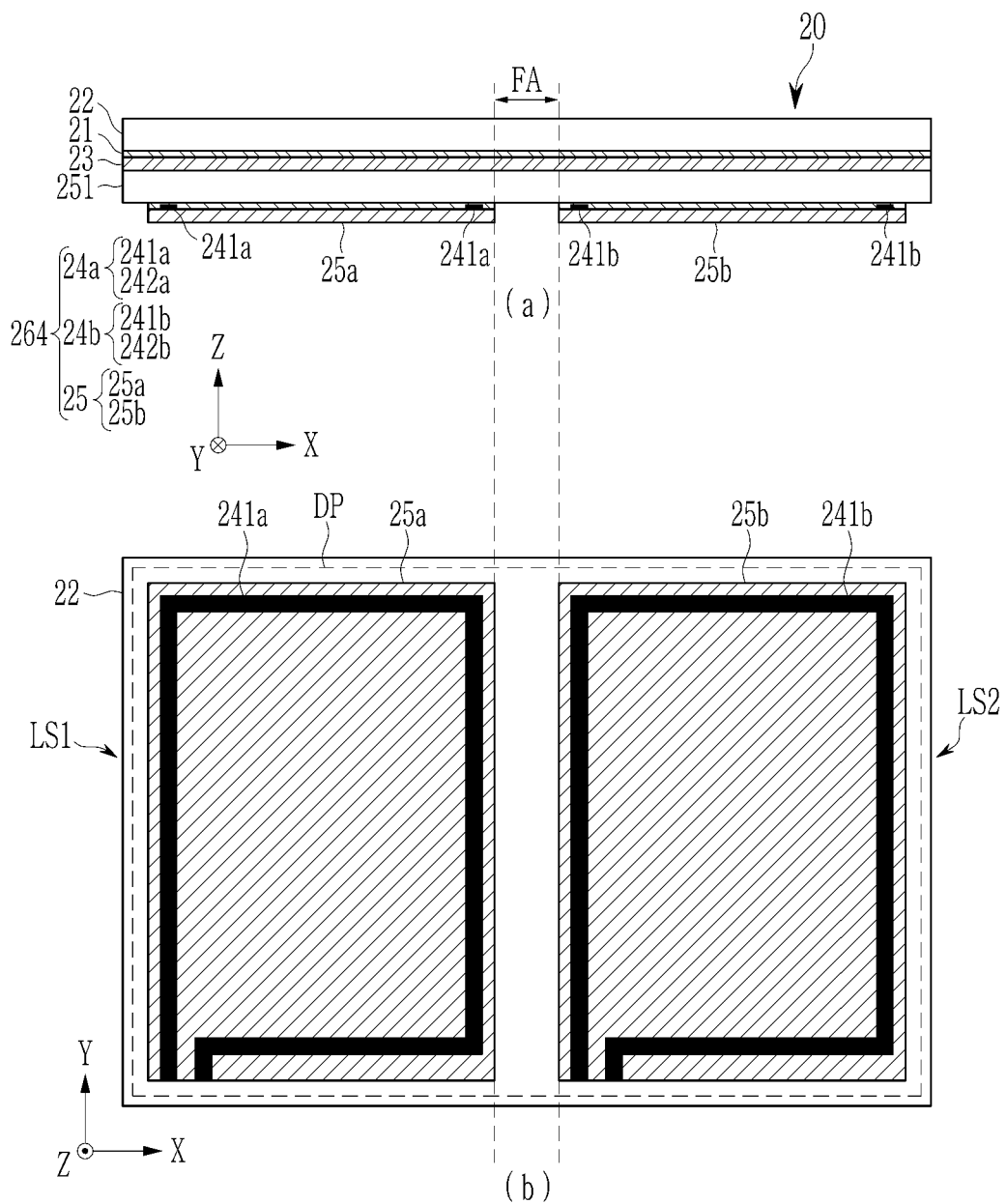
FIG. 38 to FIG. 41 illustrate views showing a disposal form of a touch panel and a loop coil according to various aspects of another embodiment.
Figure 39:
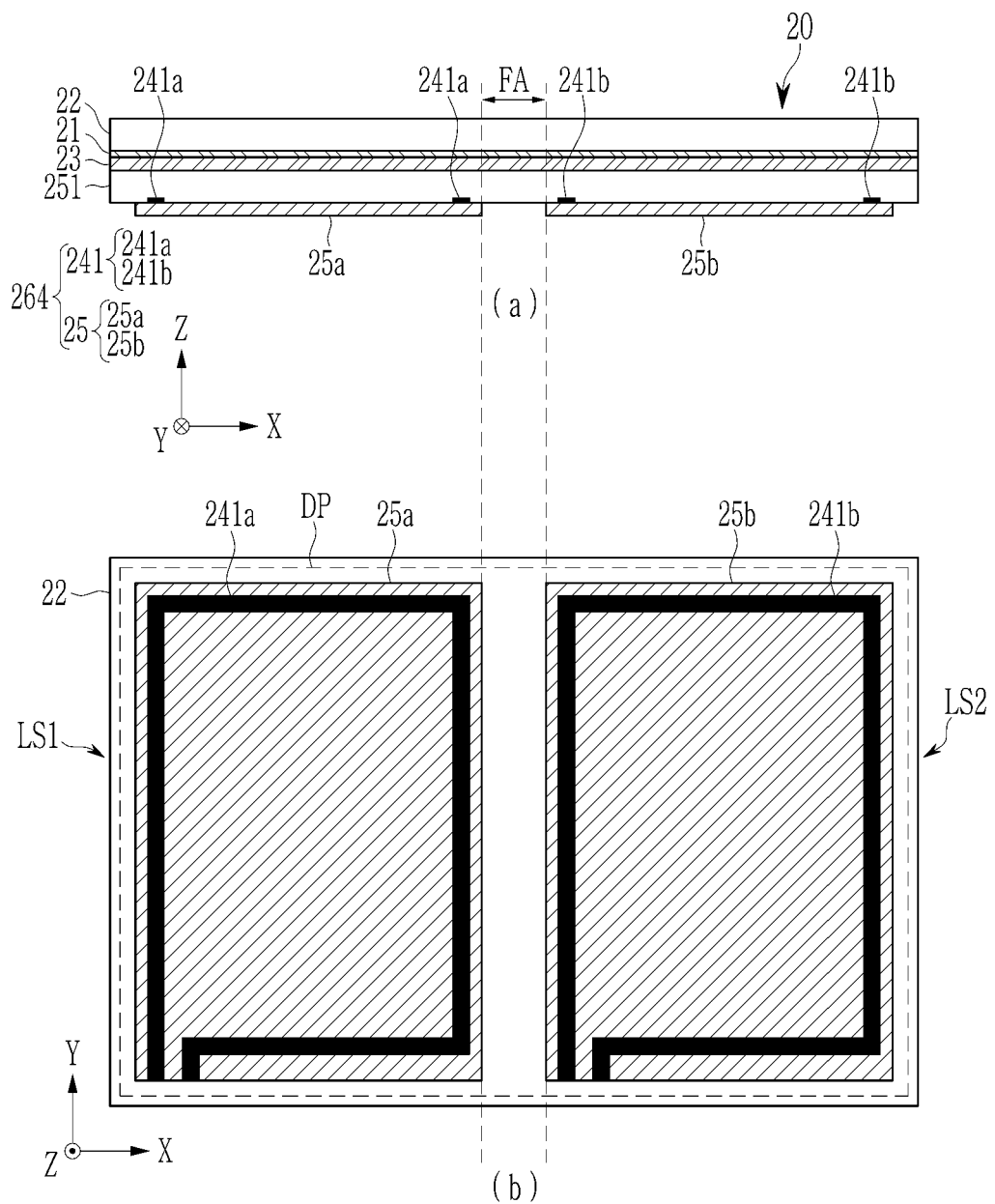

In FIG. 38 to FIG. 40, although the antenna loops 241a and 241b are illustrated to extend along a boundary between the display area DP and the folding area FA, the antenna loops 241a and 241b may also be positioned outside the display area DR In addition, the antenna loop 241 may also be positioned so as to not overlap the touch electrodes positioned on the touch electrode layer 21 on the XY plane, and to surround a circumference of an area in which the touch electrodes are positioned.

Hereinafter, operations of the touch panel and the loop coil of FIG. 33 and FIG. 38 to FIG. 41 will be described with reference to FIG. 42 to FIG. 47.

Figure 42:
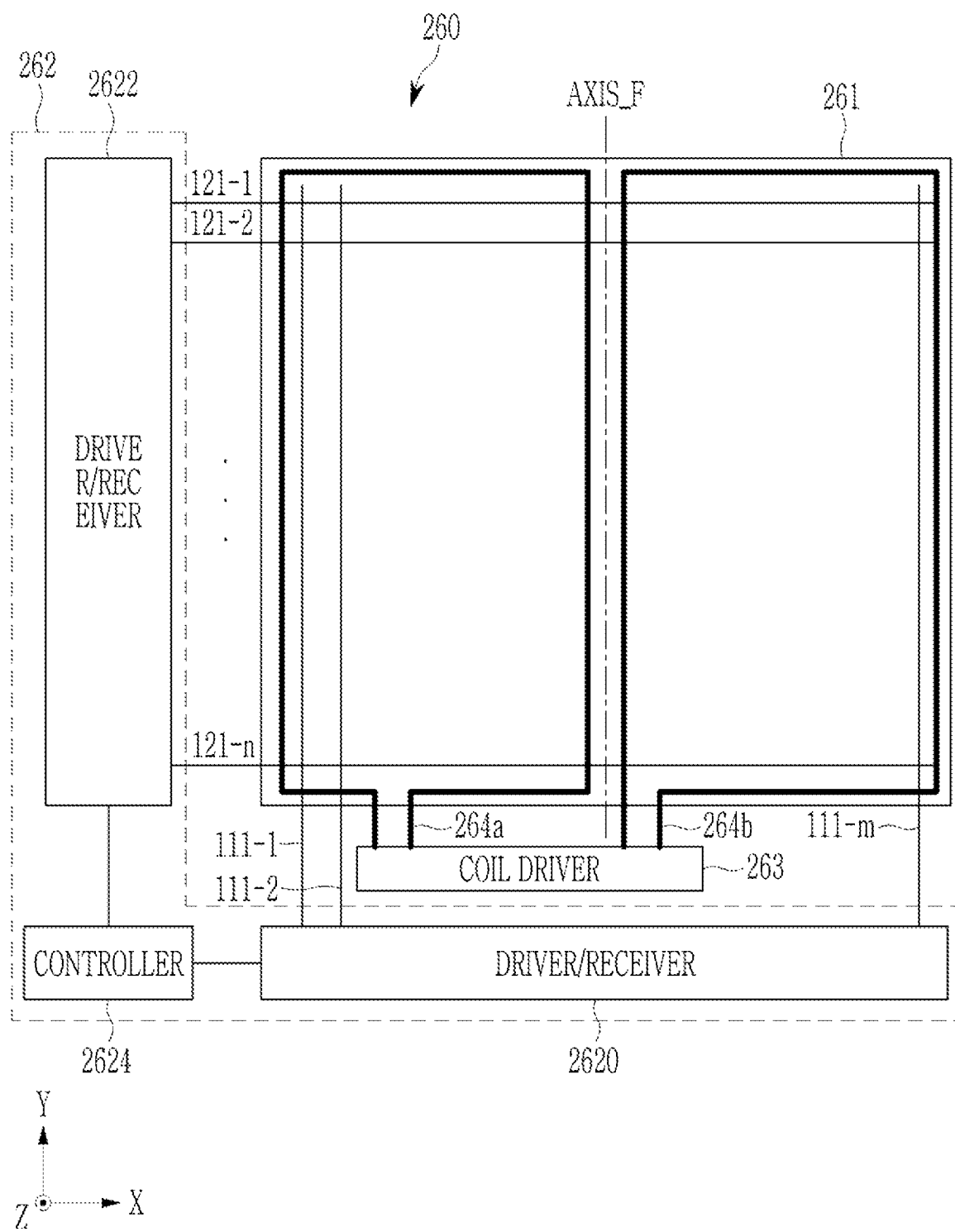
FIG. 42 schematically illustrates a portion of a touch module according to an embodiment.

FIG. 42 schematically illustrates a portion of a touch module according to an embodiment.

Compared with the foldable electronic device described with reference to FIG. 34, it is the same except for a point that the loop coils 264a and 264b are respectively positioned in areas other than the folding area FA, and thus a description thereof will be omitted.

The loop coil 264a is positioned at a left side of the folding axis AXIS_F, and the loop coil 264b is positioned at a right side of the folding axis AXIS_F. The loop coils 264a and 264b are connected to the coil driver 263.

The coil driver 263 applies a driving signal to each of the loop coils 264a and 264b. The coil driver 263 may differently apply a driving signal by using a position of the stylus pen 10 on the touch screen 20. Next, this will be described with reference to FIG. 43 to FIG. 47.

Figure 43:
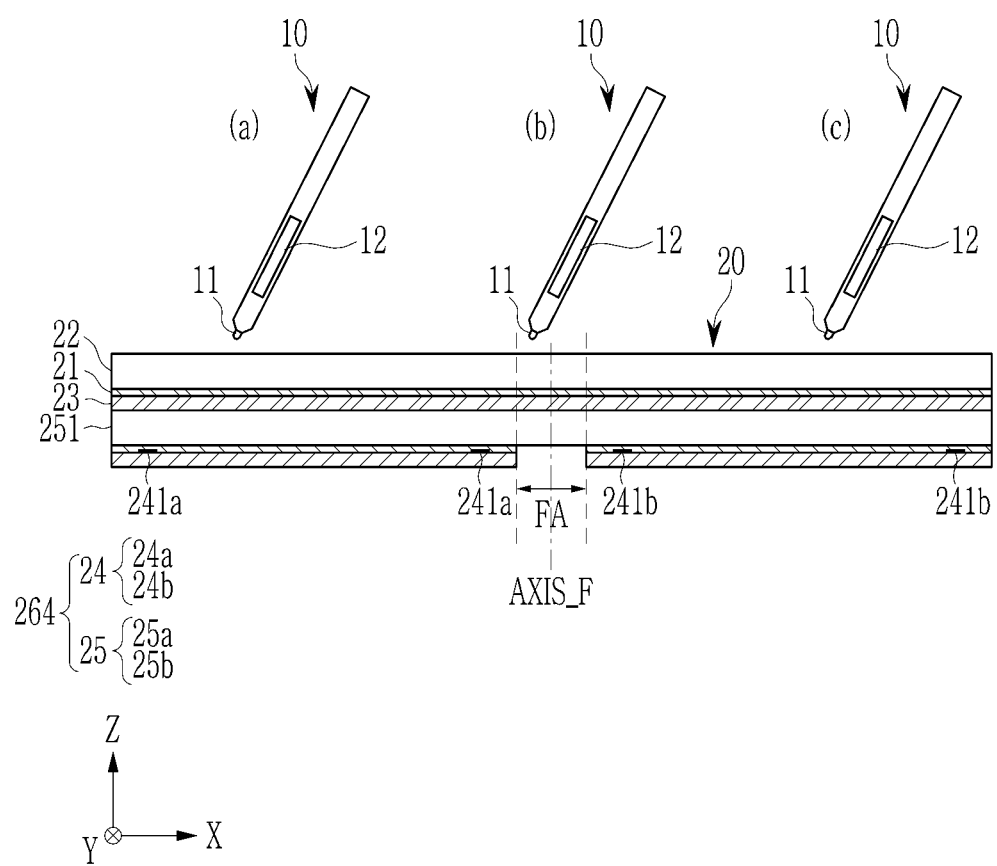
FIG. 43 illustrates a case in which a stylus pen approaches various positions of a foldable electronic device according to another embodiment.
Figure 44:
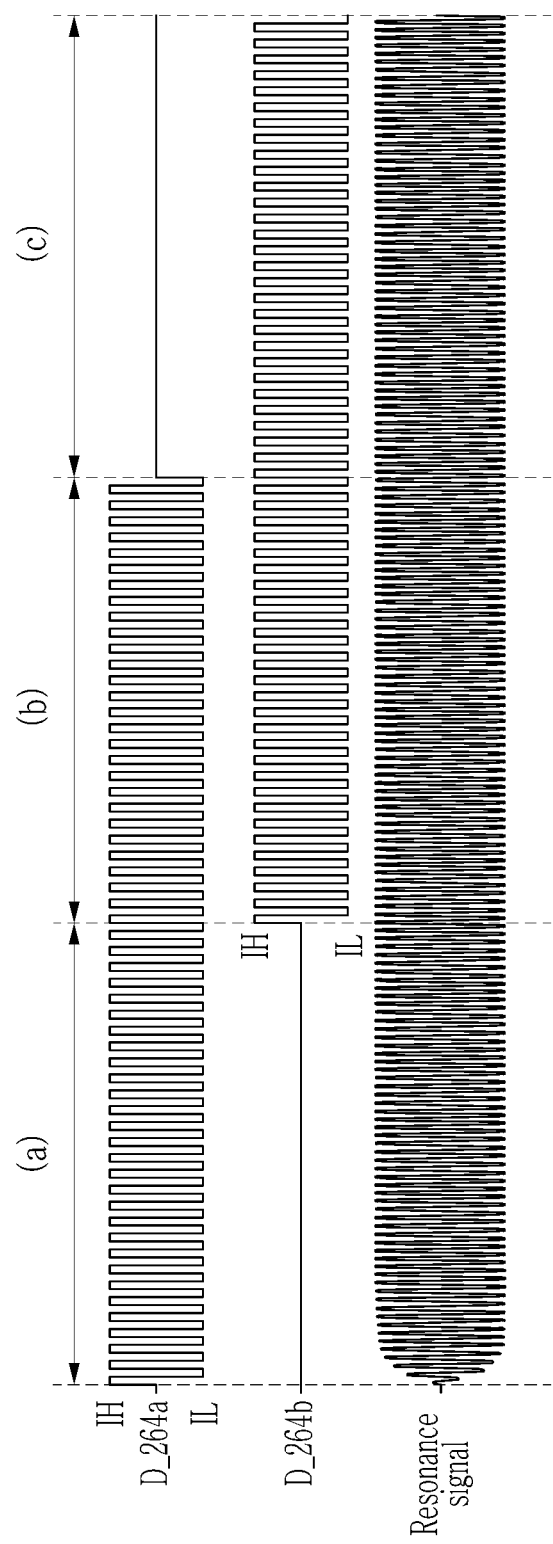
FIG. 44 illustrates a driving signal of a loop coil and a resonance signal of a stylus pen depending on a position of the stylus pen.

FIG. 43 illustrates a case in which a stylus pen approaches various positions of a foldable electronic device according to another embodiment, and FIG. 44 illustrates a driving signal of a loop coil and a resonance signal of the stylus pen depending on a position of the stylus pen.

As illustrated in FIG. 43A and FIG. 43C, the coil driver 263 may resonate the resonance circuit 12 by applying a driving signal to each of the antenna loops 241a and 241b when the stylus pen 10 is positioned in an area covered by the loop coil on the XY plane, that is, an area between the folding area FA and the long side LS1, or an area between the folding area FA and the long side LS2. However, as illustrated in FIG. 43B, in the case where the stylus pen 10 is positioned in an area that is not covered by the loop coil on the XY plane, that is, the folding area FA, when driving signals are individually applied to the antenna loops 241a and 241b, a signal resonated by the resonance circuit 12 may be attenuated, so that reception sensitivity of a touch input detected by the touch sensor 261 may be reduced.

Accordingly, as illustrated in FIG. 44, the coil driver 263 applies a driving signal of a same or similar phase to both of the antenna loops 241a and 241b when the stylus pen 10 is positioned in an area that is not covered by the loop coil on the XY plane, that is, during a section (b). Herein, a position of the stylus pen 10 may be determined by the touch controller 262, and when the touch controller 262 enters the area where the stylus pen 10 is not covered by the loop coil on the XY plane, the coil driver 263 may be controlled such that a driving signal such as a signal of a section (b) may be applied to each of the antenna loops 241a and 241b.

Figure 45:
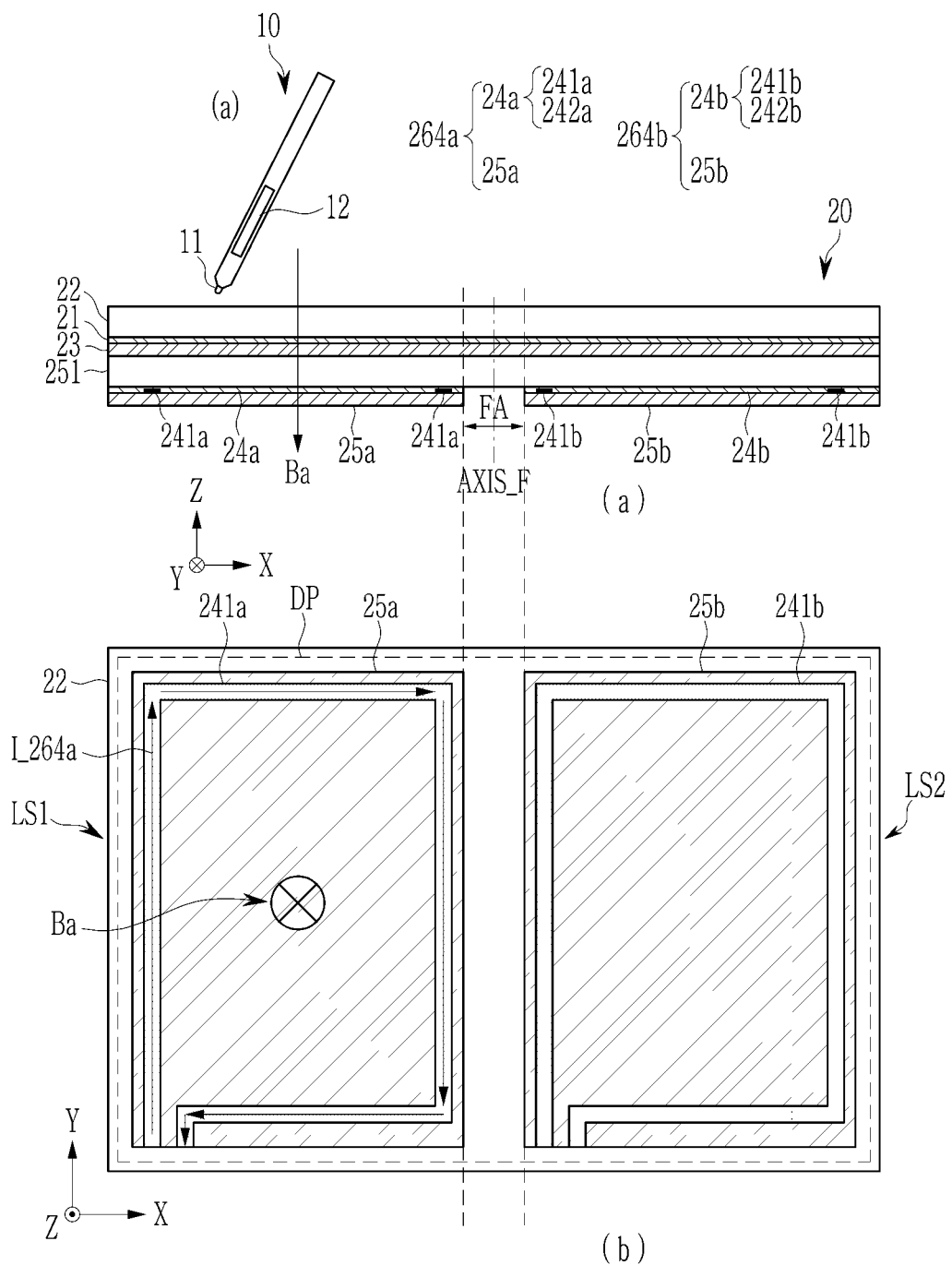
FIG. 45 to FIG. 47 schematically illustrate a magnetic field generated when the driving signal of FIG. 44 is applied.
Figure 46:
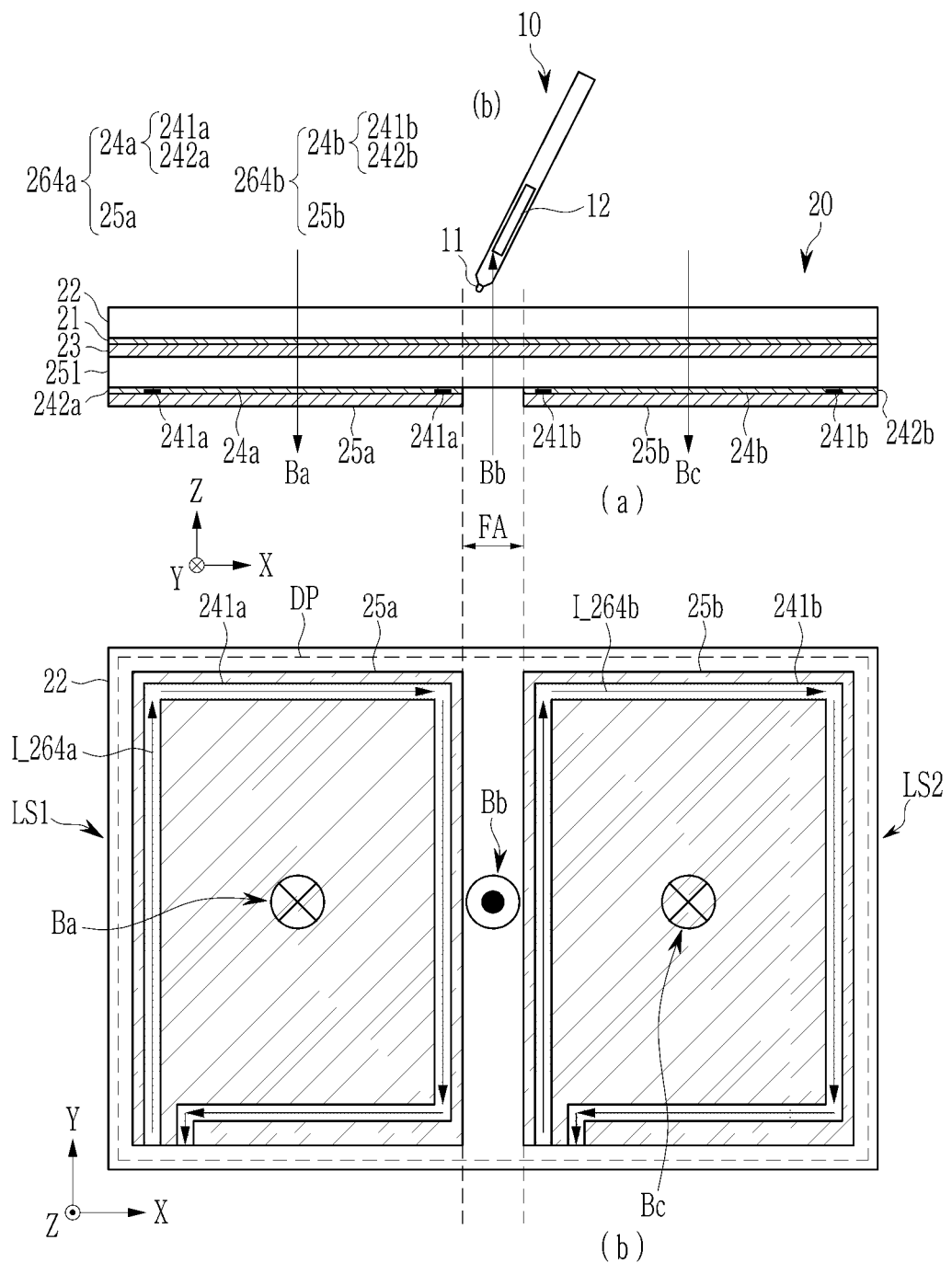
Figure 47:
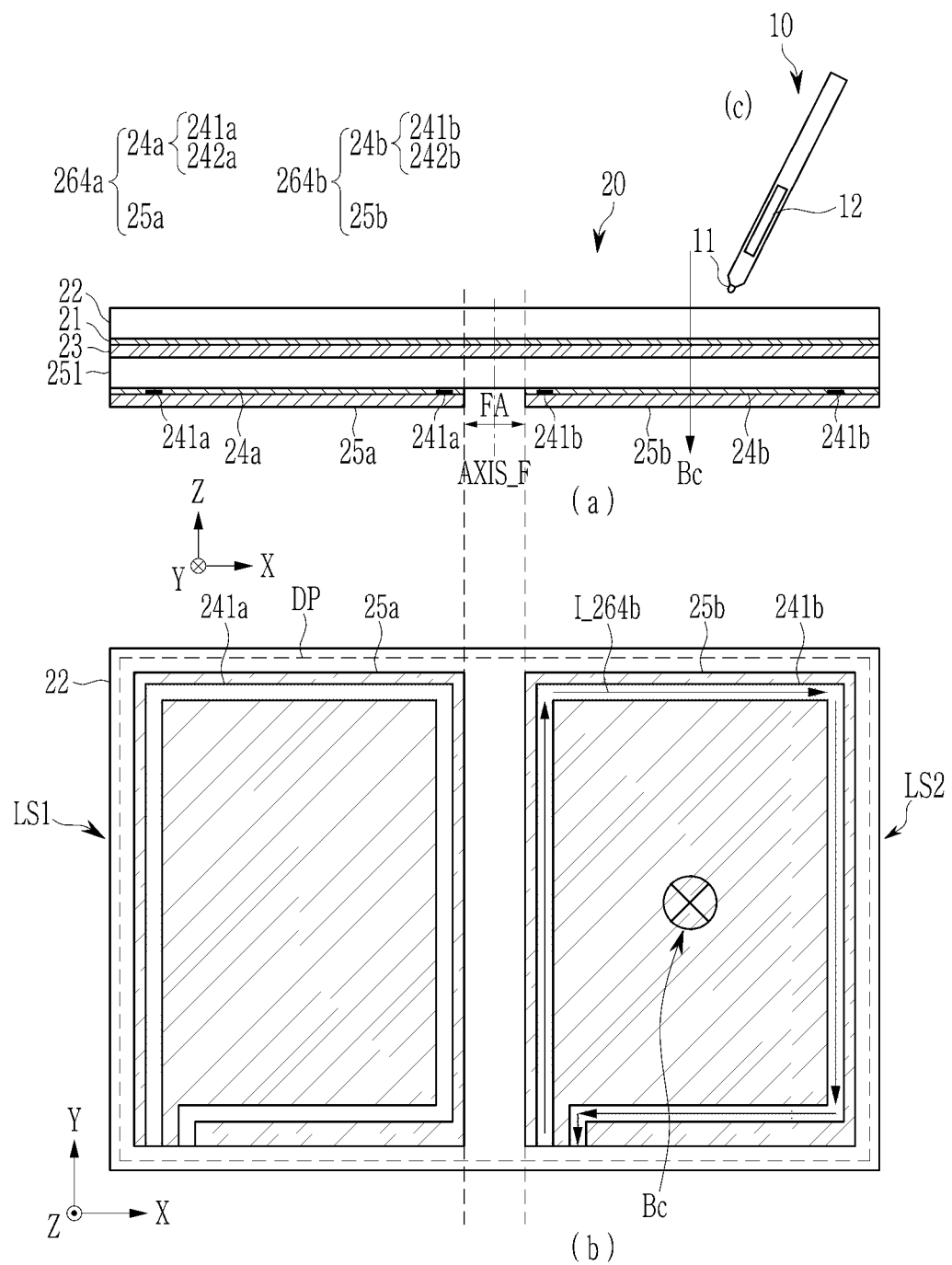

FIG. 45 to FIG. 47 schematically illustrate a magnetic field generated when the driving signal of FIG. 44 is applied.

FIG. 45 illustrates a magnetic field Ba when a driving signal such as a signal of section (a) of FIG. 44 is applied. Since the magnetic field Ba is mainly generated in an area that is covered by the loop coil 264a on the XY plane by a current I_264a flowing through the loop coil 264a, the resonance circuit 12 of the stylus pen 10 may be resonated.

FIG. 46 illustrates magnetic fields Ba, Bb, and Bc when the driving signal such as the signal of the section (b) of FIG. 44 is applied. Not only the magnetic field Ba and the magnetic field Bc are generated in an area that is covered by the loop coils 264a and 264b on the XY plane by the current I_264a flowing through the loop coil 264a and the current I_264b flowing through the loop coil 264b but also the magnetic field Bb is formed in an area that is not covered by the loop coils 264a and 264b on the XY plane, so the resonance circuit 12 of the stylus pen 10 may resonate.

FIG. 47 illustrates the magnetic field Bc when the driving signal such as a signal of the section (c) of FIG. 44 is applied. Since the magnetic field Bc is mainly generated in an area that is covered by the loop coil 264b on the XY plane by a current I_264b flowing through the loop coil 264b, the resonance circuit 12 of the stylus pen 10 may be resonated.

Next, a region having low reception sensitivity within the touch sensor will be described with reference to FIG. 48 and FIG. 49.

Figure 48:
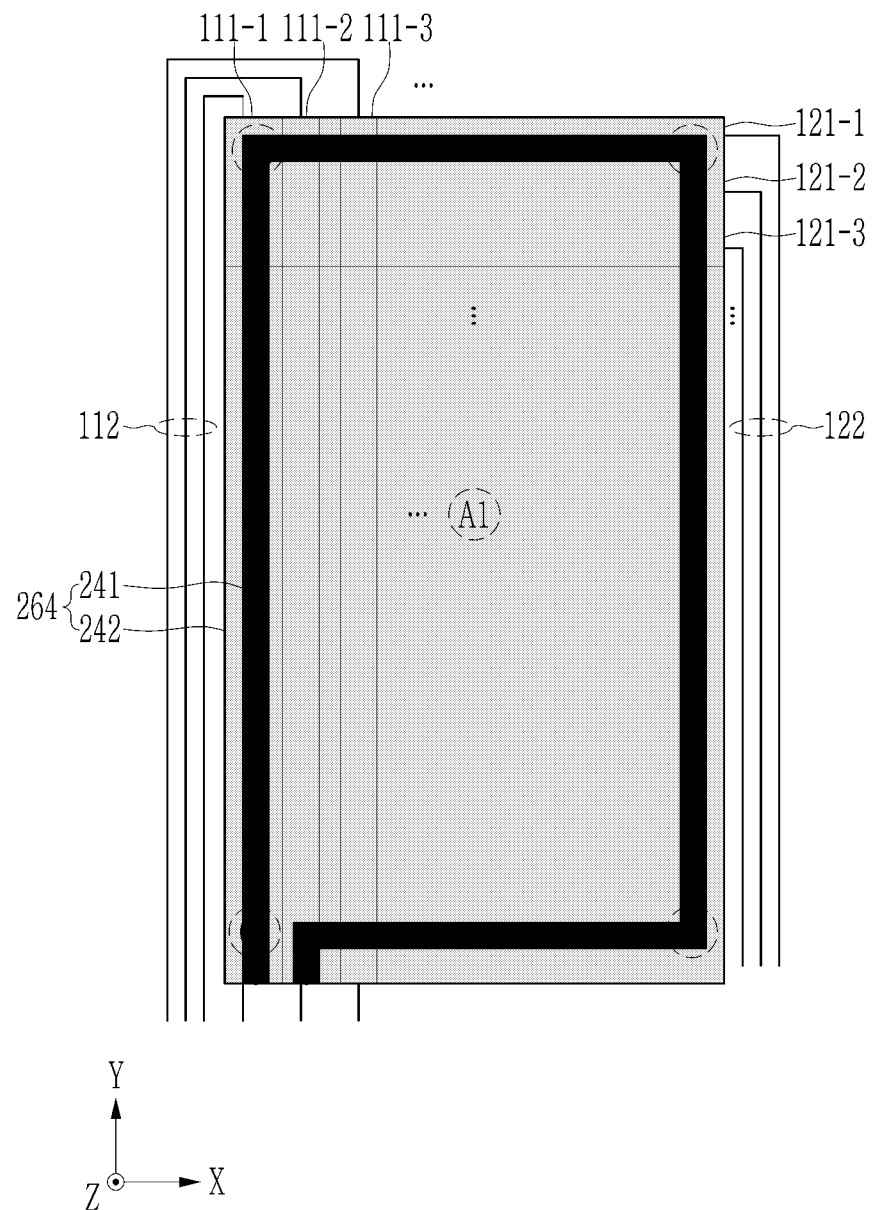
FIG. 48 and FIG. 49 each illustrate a disposal form of a touch panel and a loop coil.
Figure 49:
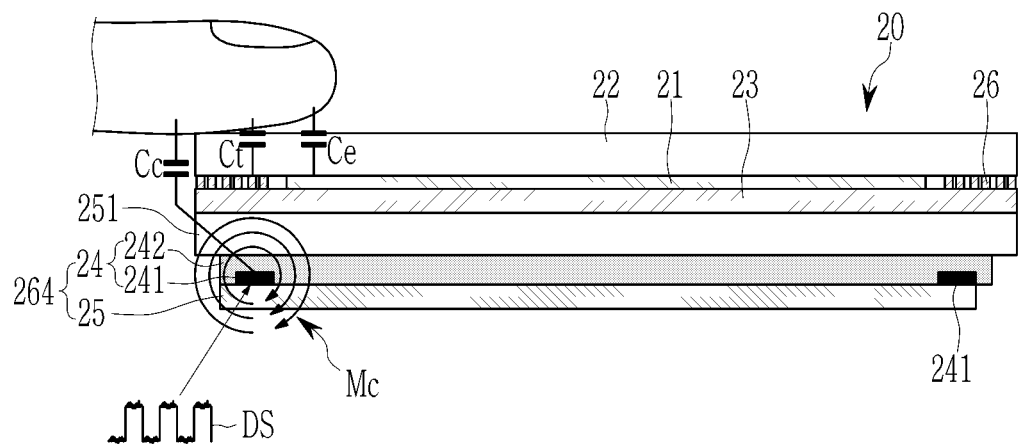

FIG. 48 and FIG. 49 each illustrate a disposal form of a touch panel and a loop coil.

As illustrated in FIG. 48, the touch electrodes 111 and 121 in a touch sensor are connected to traces 112 and 122 in a peripheral area positioned at an edge of a touch area. The first touch electrodes 111-1, 111-2, 111-3, . . . are connected to the respective traces 112, and the second touch electrodes 121-1, 121-2, 121-3, . . . are connected corresponding to the respective traces 122.

The first touch electrodes 111-1, 111-2, 111-3, . . . are longer than the second touch electrodes 121-1, 121-2, 121-3, . . . , RC delay may occur, so that the traces 112 may be connected to both a first end and a second end of the first touch electrodes 111-1, 111-2, 111-3, . . . .

As illustrated in FIG. 49, when a current by a driving signal DS flows through the antenna loop 241, a magnitude of a magnetic field generated in a central area A1 of the touch sensor and the magnetic field generated in corner areas C1, C2, C3, and C4 of the touch sensor are different from each other.

In the central area A1 of the touch sensor, magnetic fields are generated in the same direction (−Z-axis direction in FIG. 12) by a current flowing through the antenna loop 241. The stylus pen 10 may be used with an angle within at least 60 degrees from a Z-axis direction. When the stylus pen 10 is positioned along the Z-axis direction, a coil of an inductor of the resonance circuit 12 of the stylus pen 10 is wound in a direction perpendicular to the Z-axis. That is, in the area A1, the direction (−Z axis) of the magnetic field and the winding direction of the coil are perpendicular to each other, so that energy transferred to the resonance circuit 12 is large. In contrast, in the corner areas C1, C2, C3, and C4 of the touch sensor, the direction of the magnetic field generated by the antenna loop 241 is perpendicular to the Z axis. The direction of the coil wound around the inductor of the resonance circuit 12 is substantially parallel to the direction of the magnetic field. That is, in the corner areas C1, C2, C3, and C4, energy transferred to the resonance circuit 12 is smaller than that of the area A1.

Accordingly, a magnitude of a signal outputted from the stylus pen 10 positioned in the corner regions C1, C2, C3, and C4 of the touch sensor may be reduced, or the output of the signal may be stopped.

Accordingly, it is required to design an antenna module capable of increasing magnetic energy transferred to the stylus pen 10 positioned in the corner areas C1, C2, C3, and C4 of the touch sensor.

A trace layer 26 may be formed as a same layer as the touch electrode layer 21. In addition, the trace layer 26 may be formed of a conductor material exhibiting high transmittance and low impedance, such as silver nanowire. However, the trace layer 26 may be positioned at a different layer from the touch electrode layer 21, and may be made of ITO or graphene, but the present invention is not limited thereto.

In addition, the antenna loop 241 is positioned on the base film 242. The antenna loop 241 may be printed on the base film 242 by photolithography, thin film sputtering, or the like. Alternatively, the antenna loop 241 may be printed on the window 22 by photolithography, thin film deposition, or the like. In addition, a sheet on which the antenna loop 241 is formed may be attached to the window 22. In addition, the antenna loop 241 may be positioned on a same layer as the touch electrode layer 21. In this case, the antenna loop 241 may be made of a same material as that of the touch electrodes of the touch electrode layer 21. However, the antenna loop 241 may be positioned at a layer that is different from that of the touch electrode layer 21, and may be made of a different material from that of the touch electrodes. In addition, although it is illustrated that there is one antenna loop 241 in FIG. 13, there may be two or more antenna loops 241, and a method for positioning the antenna loop 241 on the touch screen 20 is not limited to the above description.

When a touch object, such as a human body, is being touched in the peripheral area of the touch sensor, capacitance Cc is generated between the conductive antenna loop 241 and the touch object. In addition, capacitance Ct is generated between the touch object and the traces 112 and 122, and capacitance Ce is also generated between the touch object and the touch electrodes 111 and 121 positioned in the touch electrode layer 21.

When the driving signal DS is applied to the antenna loop 241, the driving signal DS affects the traces 112 and 122 and the touch electrodes 111 and 121 by the electrical coupling Cc, Ct, and Ce.

For example, while the driving signal DS is applied to the antenna loop 241, when a sensing signal from the stylus pen 10 is received by the touch electrodes 111 and 121, noise may be generated by the driving signal DS transferred to the touch electrodes 111 and 121 through the touch object. In addition, while the driving signal DS is applied to the antenna loop 241, when the sensing signal received by the touch electrodes 111 and 121 is transferred to the touch controller 262 through the traces 112 and 122, noise may be generated by the driving signal DS transferred to the traces 112 and 122 through the touch object.

In addition, even when the touch object is not being touched, the antenna loop 241, the touch electrodes 111 and 121, and the traces 112 and 122 are electrically influenced by each other. For example, the touch electrodes 111 and 121 and the traces 112 and 122 may generate direct capacitive coupling with the antenna loop 241. Accordingly, when a voltage of a predetermined frequency is applied to the loop coil 264, noise may be generated by the sensing signal sensed by the touch electrodes 111 and 121 or the sensing signal transferred to the touch controller 262 by the traces 112 and 122.

In addition, when a current flows in the antenna loop 241, a magnetic field (Mc) is generated, and this magnetic field may eventually generate a current (e.g., eddy current) in the touch electrodes 111, and 121 and the traces 112 and 122. Accordingly, by electromagnetic induction, noise may be generated by the sensing signal sensed by the touch electrodes 111 and 121 or the sensing signal transferred to the touch controller 262 by the traces 112 and 122.

In particular, in the case of touch electrodes in which the trace 112 and the touch electrode 111 extend in a same direction, noise due to the electromagnetic coupling may be greater. This will be described with reference to FIG. 50.

Figure 50:
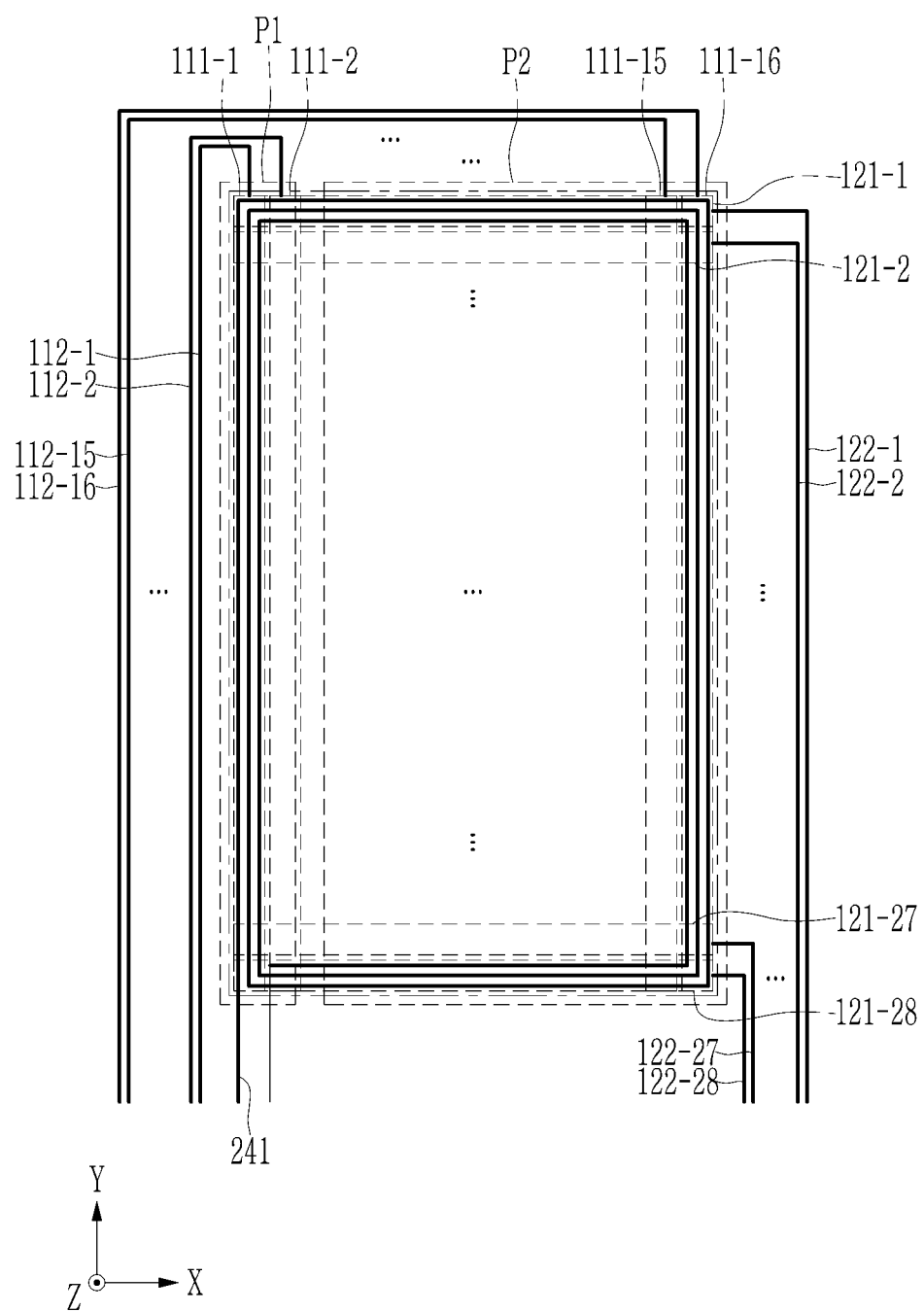
FIG. 50 illustrates a disposal form of the touch panel and the loop coil of 48 in more detail.

FIG. 50 illustrates a disposal form of the touch panel and the loop coil of 48 in more detail.

Referring to FIG. 50, touch electrodes 111-1, . . . , and 111-16 are connected to traces 112-1, . . . , and 112-16, respectively, and touch electrodes 121-1, . . . , and 121-28 are connected to traces 122-1, . . . , and 122-28, respectively.

In this case, greater noise may be generated between the trace and the touch electrode which are adjacent to each other while being connected to each other.

As illustrated in FIG. 50, the touch electrode 111-1 extending in the Y-axis direction and the trace 112-1 extending in the Y-axis direction are connected to each other. The touch electrode 111-1 and the trace 112-1 are positioned adjacent to each other. That is, no other trace or touch electrode is positioned between the touch electrode 111-1 and the trace 112-1. In this case, when a length of the antenna loop 241 extending in the Y-axis direction, which is positioned within a maximum width in the X-axis direction of the touch electrode 111-1, is more than twice the length of the touch electrode 111-1 in the Y-axis direction, both the touch electrode 111-1 and the trace 112-1 are affected by the driving signal DS applied to the antenna loop 241.

That is, when a touch object is touched in an area P1 where the touch electrode 111-1 and the trace 112-1 are positioned, both of the touch electrode 111-1 for receiving the sensing signal and the trace 112-1 for transferring the received sensing signal to the touch controller 262 are affected by the driving signal DS applied to the antenna loop 241 positioned in an area corresponding to a maximum width in the X-axis direction of the touch electrode 111-1.

However, even when the touch object is being touched in an area P2, the touch electrodes 111-2, . . . , 111-15, and 111-16 may be affected by the driving signal DS applied to the antenna loop 241, but in the case of the traces 112-2, . . . , 112-15, and 112-16 that are connected to each other and are not adjacent to each other, an influence of the driving signal DS applied to the antenna loop 241 is small.

In addition, when a touch object is being touched adjacent to the traces 112-1, . . . , 112-15, and 112-28, the touch electrodes 121-1, . . . , and 121-28 may be affected by the driving signal DS applied to the antenna loop 241, but an affected area is smaller than that of the touch electrodes 111-1, . . . , and 111-16. When a touch object is being touched adjacent to the touch electrodes 121-1, . . . , and 121-28, the touch electrodes 121-1, . . . , and 121-28 may be affected by the driving signal DS applied to the antenna loop 241, but the traces 112-1, . . . , 112-15, and 112-28 are less affected by the driving signal DS.

That is, more noise may be generated between a trace and a touch electrode that are connected and adjacent to each other and arranged in a same or similar direction, than between a trace and a touch electrode connected to each other and arranged in a same or similar direction, but not adjacent, and between a trace and a touch electrode that are connected to each other and are adjacent but not arranged in a same or similar direction.

The inventors confirmed that noise caused by the antenna loop driving was larger than a normal touch signal for the touch electrode when a length of the antenna loop extending in the Y-axis direction overlapping the touch electrode within the maximum width of the touch electrode in the X-axis direction is more than twice a length of the touch electrode in the Y-axis direction in a case where a trace and a touch electrode extending in the Y-axis direction are connected to each other and positioned adjacent to each other.

Accordingly, it is required to design an antenna module capable of reducing such noise.

FIG. 51 to FIG. 55 illustrate views showing an arrangement of a touch panel and a loop coil according to various aspects of an embodiment.

It is assumed that the arrangement of the touch electrodes 111 and 121 and the traces 112 and 122 in FIG. 51 to FIG. 55 is the same as the touch sensor illustrated in FIG. 48 and FIG. 50. The antenna loop 241 is illustrated with a solid line or a dotted line to indicate that the antenna loop 241 may be positioned on different layers.

In FIG. 51 to FIG. 55, a length of a portion of the antenna loop 241 extending in the Y-axis direction while overlapping the touch electrode within the maximum width in the X-axis direction of the touch electrode 111-1 as a portion of the antenna loop 241 in the area P1 in which the trace 112-1 and the touch electrode 111-1 extending in the Y-axis direction are connected to each other and positioned adjacent to each other is less than twice the length of the touch electrode 111-1 in the Y-axis direction. That is, density of the antenna loop 241 positioned in the area P1 is less than that of the antenna loop 241 positioned in the area P2. Herein, it is assumed that the density is an overlapping length of the touch electrode and the antenna loop 241 extending in a same direction on the XY plane.

Figure 51:
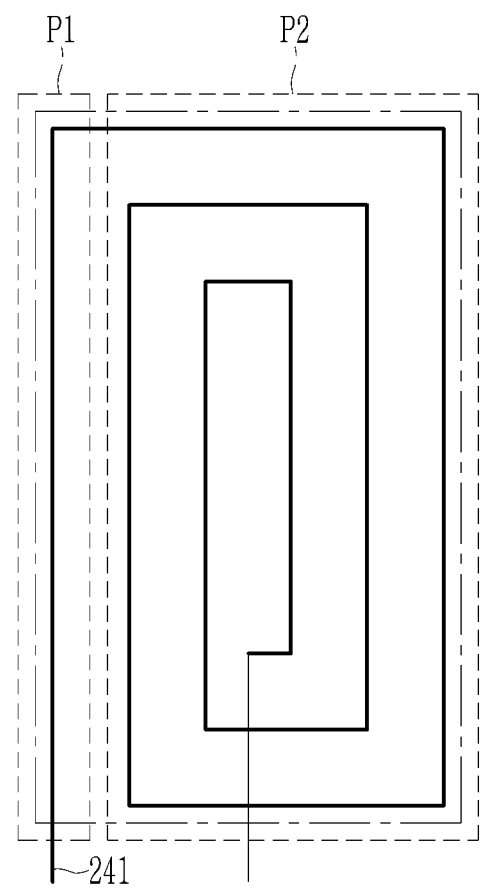
FIG. 51 to FIG. 55 illustrate views showing an arrangement of a touch panel and a loop coil according to various aspects of an embodiment.
Figure 52:
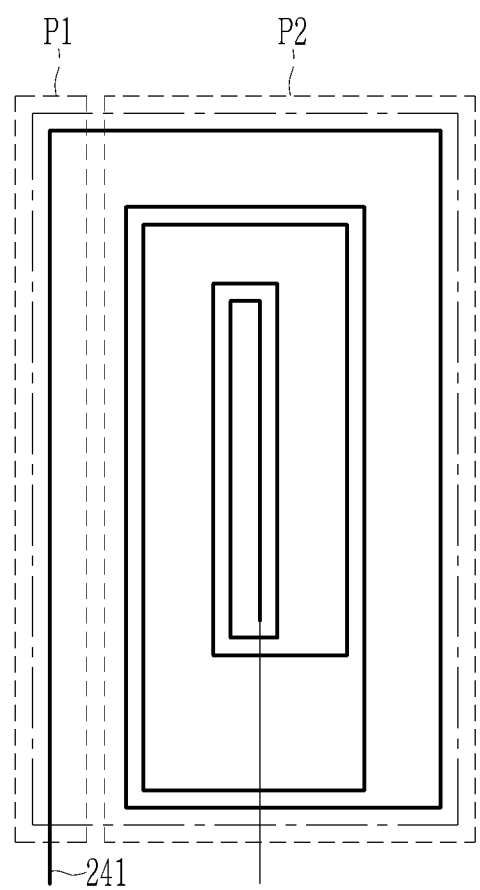

Referring to FIG. 51 and FIG. 52, a Y-axis direction length of the antenna loop 241 extending in the Y-axis direction, overlapping the touch electrode 111-1 extending in the Y-axis direction along the Y-axis direction, is equal to or less than 1 time a Y-axis direction length of the touch electrode 111-1. Since the antenna loop 241 is wound, first winding of the antenna loop 241 positioned in the area P1 and second winding of the antenna loop 241 adjacent to the area P1 may be positioned on different Y-axis direction touch electrodes.

As illustrated in FIG. 51, a separation distance (separation distance in the X-axis direction) between the first and second winding of the antenna loop 241 may be substantially equal to a minimum separation distance between the second and third windings of the antenna loop 241.

As illustrated in FIG. 52, the separation distance between the first and second windings of the antenna loop 241 may be greater than the minimum separation distance between the second and third windings of the antenna loop 241. The separation distance between the first winding of the antenna loop 241 and the second winding of the antenna loop 241 may be substantially equal to a minimum separation distance between the third winding and fourth winding of the antenna loop 241.

Figure 53:
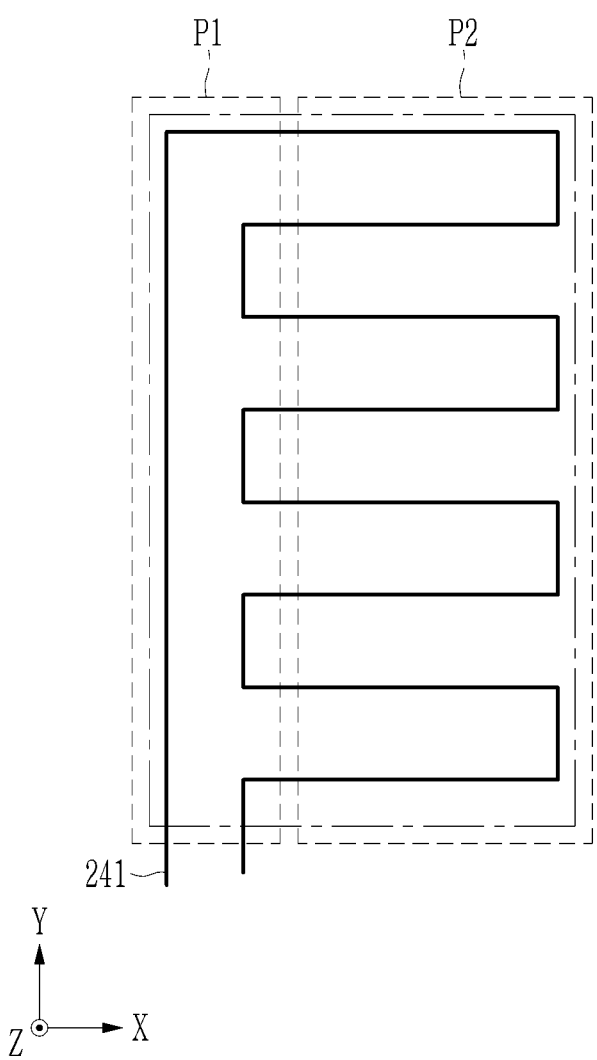
Figure 54:
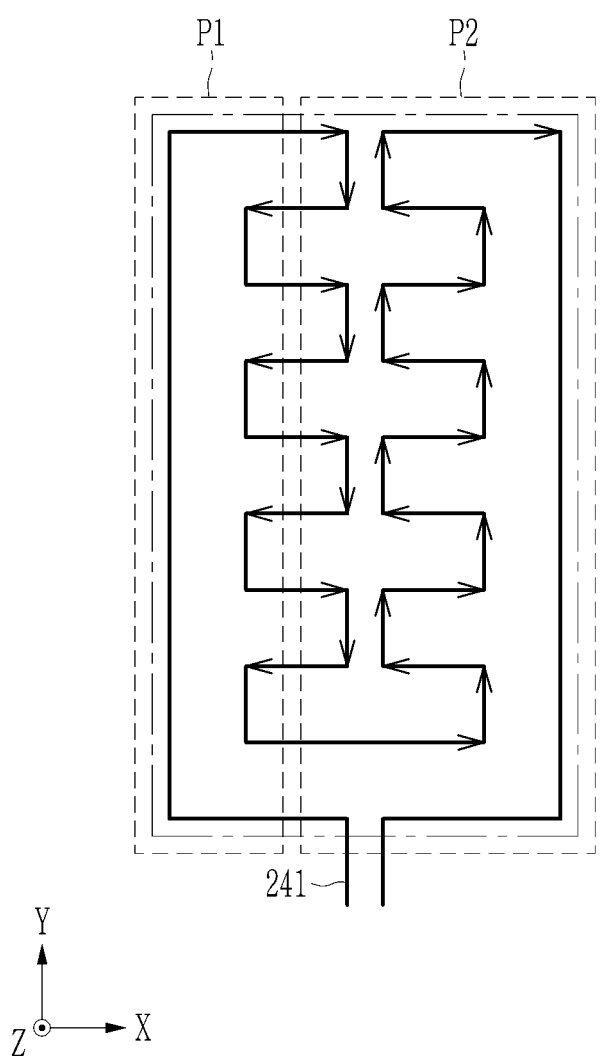

Referring to FIG. 53 and FIG. 54, the Y-axis direction length of the antenna loop 241 extending in the Y-axis direction, overlapping the touch electrode 111-1 extending in the Y-axis direction along the Y-axis direction, is less than two times the Y-axis direction length of the touch electrode 111-1.

As illustrated in FIG. 53, the antenna loop 241 may include a first portion extending in the Y-axis direction and a second portion in which a 'ㄹ'-shaped pattern is repeated along the Y-axis direction. In this case, a part of the second portion may be positioned in the area P1. That is, a part of the second portion may overlap the touch electrode 111-1 extending in the Y-axis direction.

As illustrated in FIG. 54, the antenna loop 241 may have a form in which a structure including a first portion extending in the Y-axis direction and a second portion in which a 'ㄹ'-shaped pattern is repeated along the Y-axis direction is symmetrically positioned. In this case, a part of the second portion may be positioned in the area P1. That is, a part of the second portion may overlap the touch electrode 111-1 extending in the Y-axis direction.

Figure 55:
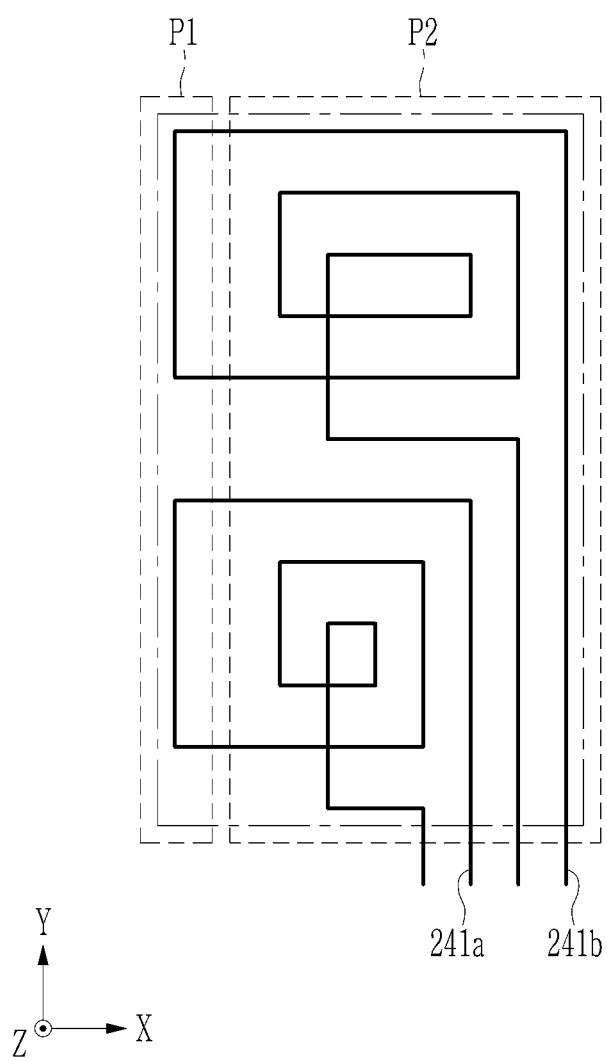

Referring to FIG. 55, a plurality of antenna loops 241a and 241b may be positioned. A sum of the Y-axis direction length of the antenna loop 241a extending in the Y-axis direction overlapping the touch electrode 111-1 extending in the Y-axis direction and the Y-axis direction length of the antenna loop 241b extending in the Y-axis direction overlapping the touch electrode 111-1 extending in the Y-axis direction is equal to or less than 1 time the length of the touch electrode 111-1 in the Y-axis direction.

A driving signal may be applied to each of the antenna loops 241a and 241b independently of each other. Accordingly, when the driving signal is applied only to the antenna loop 241a or only to the antenna loop 241b, an influence on the touch electrode 111-1 and the trace 112-1 may be further reduced.

A noise reduction effect in the case of using the antenna loop 241 according to an embodiment of the present disclosure will be described with reference to FIG. 56.

Figure 56:
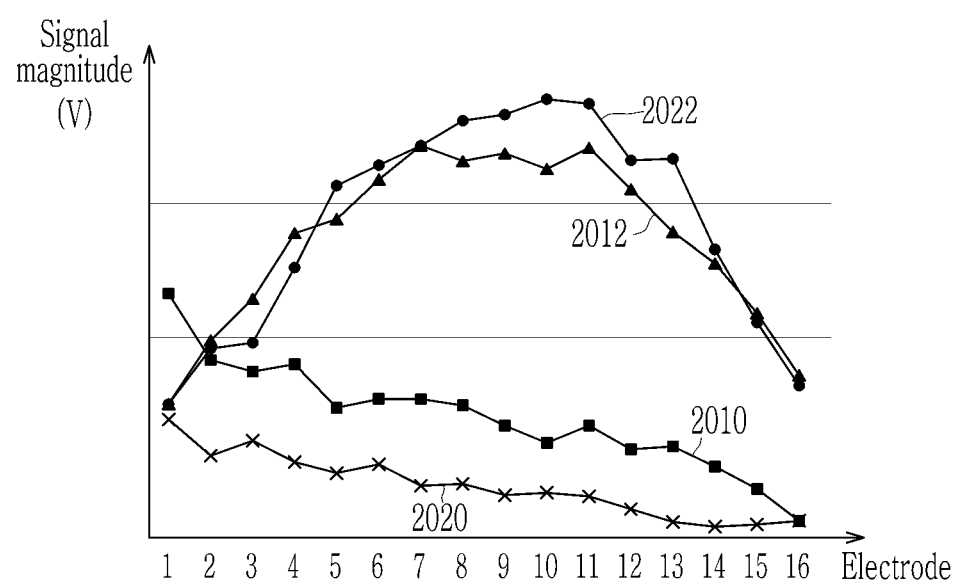
FIG. 56 illustrates a graph comparing a touch signal and a noise signal according to an example and a comparative example.

FIG. 56 illustrates a graph comparing a touch signal and a noise signal according to an example and a comparative example.

The Y-axis represents a magnitude of a signal sensed by each touch electrode, and the X-axis represents numbers of the touch electrodes. It will be described that a first electrode is the touch electrode 111-1 and that a 16th electrode is the touch electrode 111-16.

Signals 2010 and 2012 detected in a structure of the antenna loop 241 as illustrated in FIG. 50 will be described. Since a difference between the noise signal 2010 and the touch signal 2012 detected by the touch electrodes 111-2, . . . , and 111-16 is greater than or equal to a threshold, the touch controller 262 may detect the touch signal 2012 as a touch input. However, in the case of the first electrode 111-1, since a magnitude of the touch signal 2012 is smaller than that of the noise signal 2020, the touch controller 262 may not detect the touch signal 2012 as a touch input.

Signals 2020 and 2022 detected in a structure of the antenna loop 241 illustrated in FIG. 51 to FIG. 55 will be described. Since a magnitude of the touch signal 2022 detected by the touch electrodes 111-1, . . . , and 111-16 is larger than that of the noise signal 2020, the touch controller 262 may detect the touch signal 2022 as a touch input.

Next, an antenna module capable of increasing magnetic energy transferred to the stylus pen 10 positioned in corner areas C1, C2, C3, and C4 of the touch sensor will be described with reference to FIG. 57 to FIG. 59.

FIG. 57 to FIG. 60 illustrate views showing a disposal form of a touch panel and a loop coil according to various aspects of another embodiment.

Figure 57:
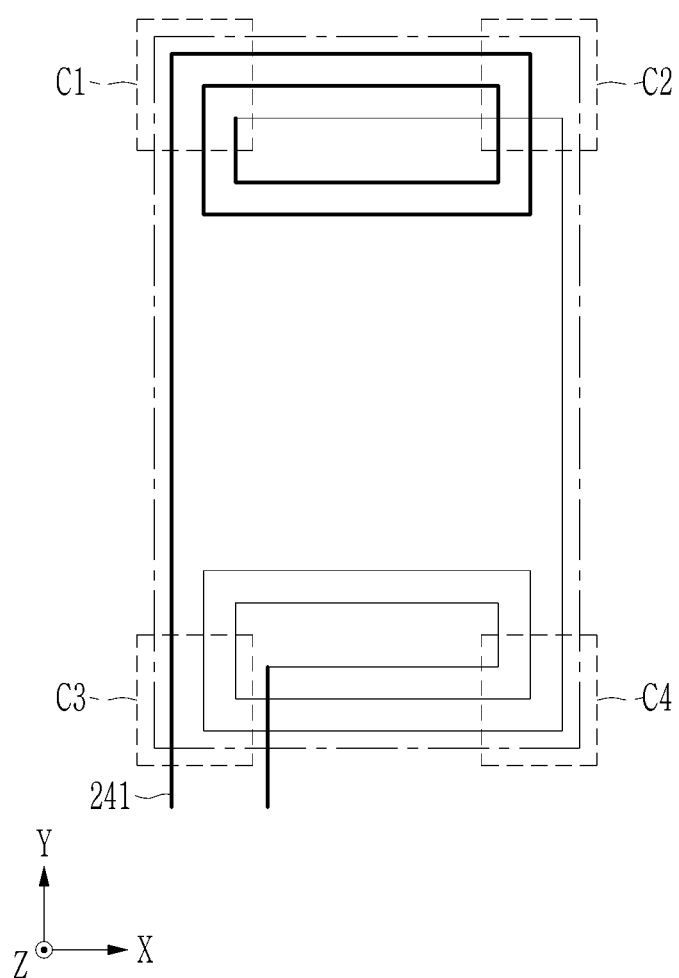
Figure 58:
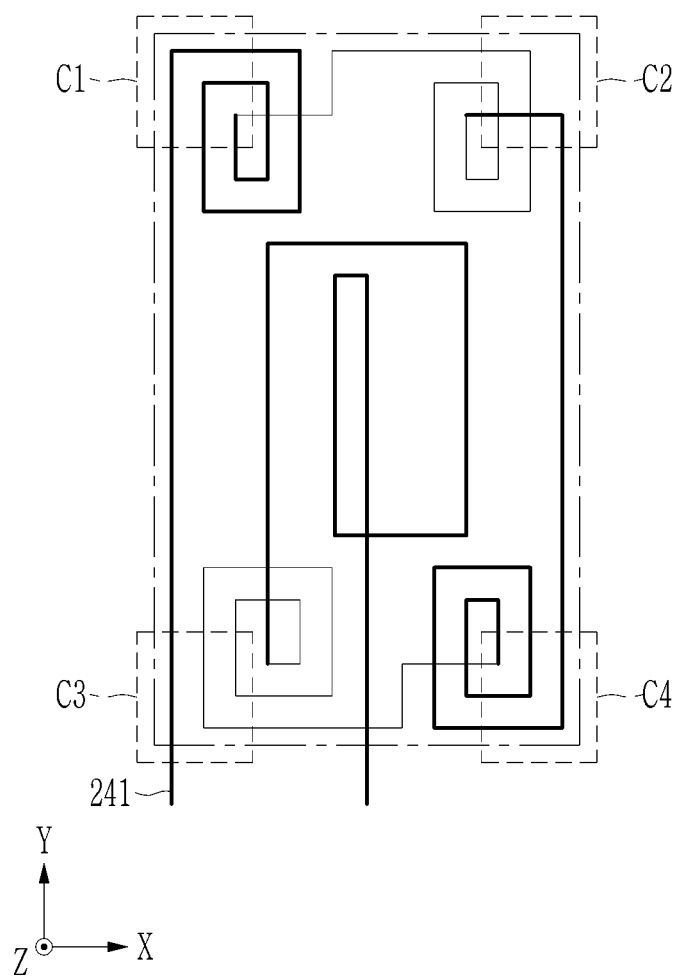

In FIG. 57 and FIG. 58, a number of windings in the corner areas C1, C2, C3, and C4 of the antenna loop 241 is greater than that of windings in other areas.

As illustrated in FIG. 57, the antenna loop 241 may be wound twice across the corner areas C1 and C2, C3 and C4 adjacent to each other, and as illustrated in FIG. 58, the antenna loop 241 may be wound twice in each of the corner areas C1, C2, C3, and C4.

In addition, as illustrated in FIG. 58, after winding in each of the corner areas C1, C2, C3, and C4, one winding may be performed in a central area as well.

Magnetic energy transferred to the stylus pen 10 positioned in the corner regions C1, C2, C3, and C4 may be increased through a structure that increases the number of windings in the corner regions C1, C2, C3, and C4 as described above.

Figure 59:
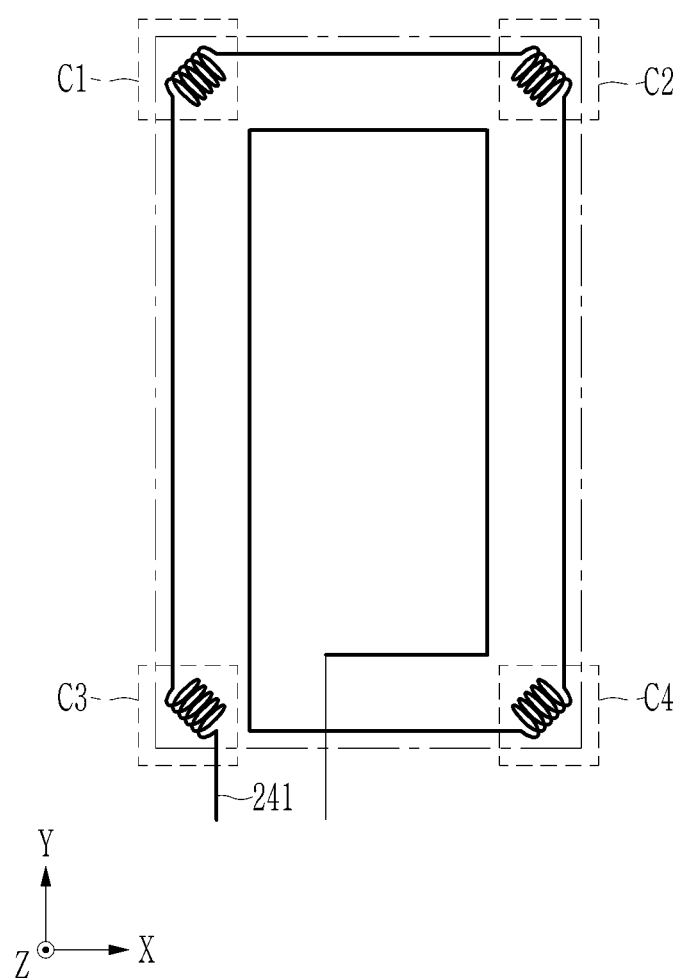

Referring to FIG. 59, corner patterns 241x may be positioned in the corner areas C1, C2, C3, and C4 in order to generate a magnetic field in the vertex directions P1, P2, P3, and P4 in the corner areas C1, C2, C3, and C4. The corner pattern 241x has a pattern that is repeated in a zigzag manner in each of the corner areas C1, C2, C3, and C4.

Referring to FIG. 60, when the base film 242 is a double-side PCB, the corner patterns 241x may be alternately positioned on opposite surfaces of the base film 242. When the base film 242 is a multilayer PCB, the corner patterns 241x may be positioned on several layers of the base film 242. This is to implement a solenoid as the corner pattern 241x.

The solenoid implemented as the corner pattern 241x may generate a magnetic field in a vertex direction or a direction in which the vertex direction and the Z-axis direction are combined. Accordingly, the antenna loop 241 may increase magnetic energy transferred even to the stylus pen 10 inclined in the vertex direction in the corner areas C1, C2, C3, and C4.

According to the embodiments, there is an advantage in that reception sensitivity of a touch input may be improved and a more accurate touch position may be calculated.

According to the embodiments, there is an advantage in that energy transferred to the stylus pen in the corner area of the antenna loop may be increased.

Next, examples in which a stylus pen and an electronic device according to an embodiment transmit and receive signals will be described with reference to FIG. 61 and FIG. 62.

Figure 61:
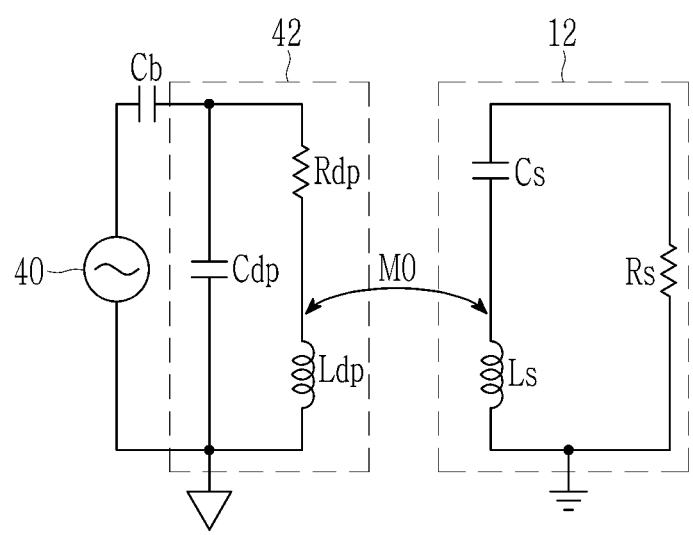
FIG. 61 and FIG. 62 each illustrate a schematic circuit diagram showing a stylus pen and an electronic device.
Figure 62:
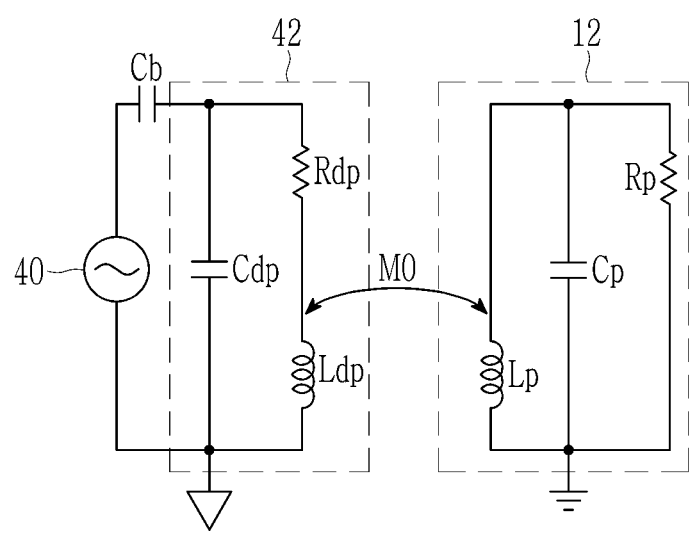

FIG. 61 and FIG. 62 each illustrate a schematic circuit diagram showing a stylus pen and an electronic device.

The resonance circuit 12 of FIG. 61 may be expressed as an equivalent circuit including a resistor Rp, an inductor Lp, and a capacitor Cp or an equivalent circuit including a resistor Rs, an inductor Ls, and a capacitor Cs.

As illustrated in FIG. 61 and FIG. 62, when the loop coil and the internal capacitor resonate by the power source 40 that transfers the driving signal, the resonance circuit 12 of the stylus pen 10 may also mutually resonate with the loop coil and the internal capacitor.

FIG. 61 illustrates a case in which a loop coil Ldp and an internal capacitor Cdp are connected in parallel, and the resistor Rp, the inductor Lp, and the capacitor Cp of the resonance circuit 12 are connected in parallel.

FIG. 62 illustrates a case in which the loop coil Ldp and the internal capacitor Cdp are connected in parallel, and the resistor Rs, the inductor Ls, and the capacitor Cs of the resonance circuit 12 are connected in series.

In FIG. 61 and FIG. 62, when a blocking capacitor Cb is not connected in series with the resonance circuit 42, a magnetic field generated by a driving signal is as follows.

$$\nabla \times H = \frac{\partial D}{\partial t} + J \qquad \text{[Equation 1]}$$

A change in a magnetic field generated by the resonance circuit 42 generates an induced electromotive force as shown in Equation 2 below.

$$\nabla \times E = -\frac{\partial B}{\partial t} \qquad \text{[Equation 2]}$$

For Equation 1, when inducing a magnetic field by an electric field, both an alternating current and a direct current contribute to inducing the magnetic field, but as in Equation 2, when the electric field is induced by the magnetic field, the electric field is induced only by the magnetic field that changes with time. Accordingly, a current J of a DC component of Equation 1 consumes power even though it does not contribute to the induced electromotive force of the resonance circuit 12.

Thus, it is possible to prevent a DC component current from flowing through the resonance circuit 42 as shown in Equation 3 below by connecting the blocking capacitor Cb in series with the resonance circuit 42.

$$\nabla \times H = \frac{\partial D}{\partial t} \qquad \text{[Equation 3]}$$

Accordingly, power consumption by the resonance circuit 42 may be reduced.

Next, an example of the loop coil 264 and the coil driver 263 of the electronic device 2 according to an embodiment will be described with reference to FIG. 63.

Figure 63:
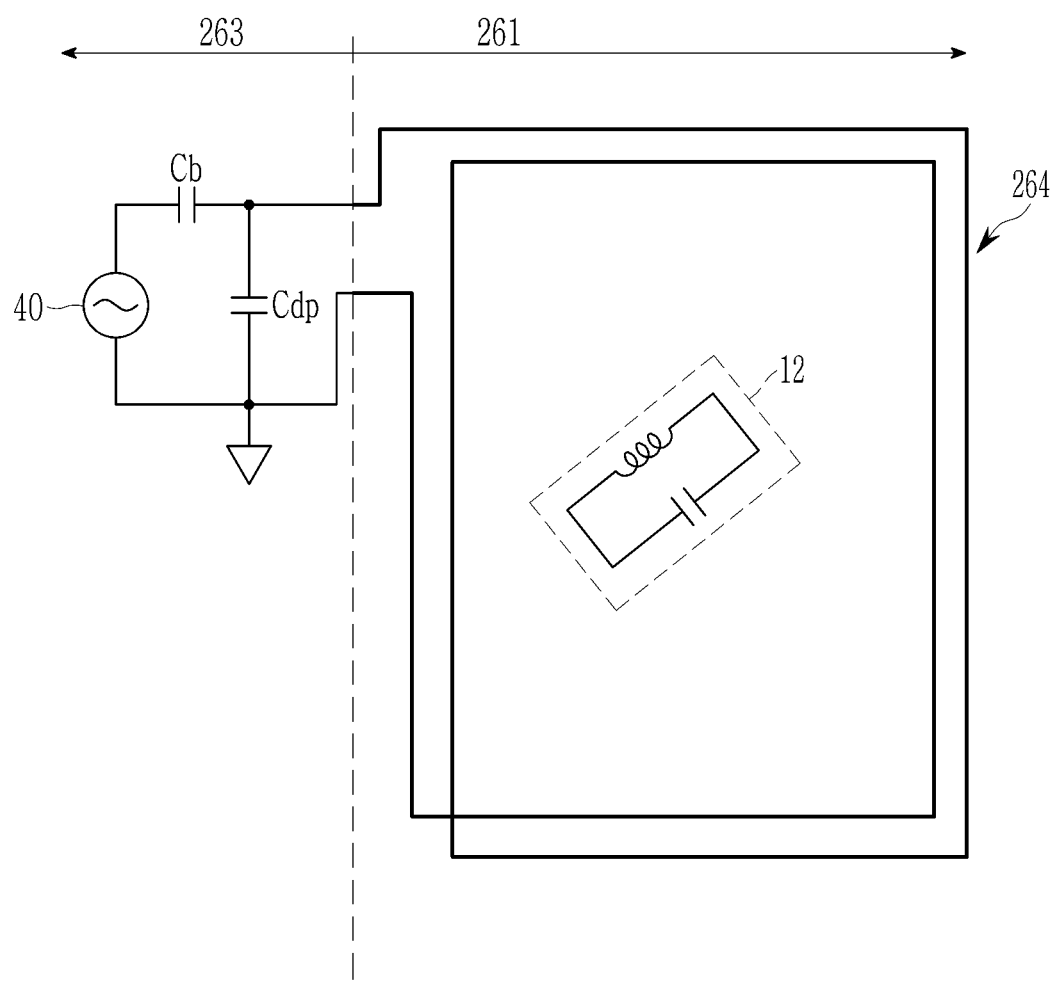
FIG. 63 illustrates an antenna module and a stylus pen according to an embodiment.

FIG. 63 illustrates an antenna module and a stylus pen according to an embodiment.

Referring to FIG. 63, the loop coil 264 positioned at a side of the touch sensor 261 constitutes a resonance circuit with the capacitor Cdp. The resonance circuit and the blocking capacitor Cb are connected in series.

The resonance circuit 12 of the stylus pen may resonate by receiving energy from the loop coil 264 as a magnetic field generated by a driving signal of a predetermined frequency applied by the power source 40. Then, the stylus pen may transfer a touch input signal to the touch sensor 261 by using resonant energy. For example, the stylus pens 10a and 10b of FIG. 3A and FIG. 3B may transfer a signal that is resonant from the resonance circuit 12 to the touch sensor 261 as a touch input. In the stylus pen 10c of FIG. 3C, the active stylus module 60 may generate a signal by using power generated from the resonance signal in the resonance circuit unit 12, and may transmit it to the touch sensor 261.

Next, amplitude change of a resonance signal based on a magnetic field increased by a method of applying the driving signal will be described with reference to FIG. 64 and FIG. 65.

Figure 64:
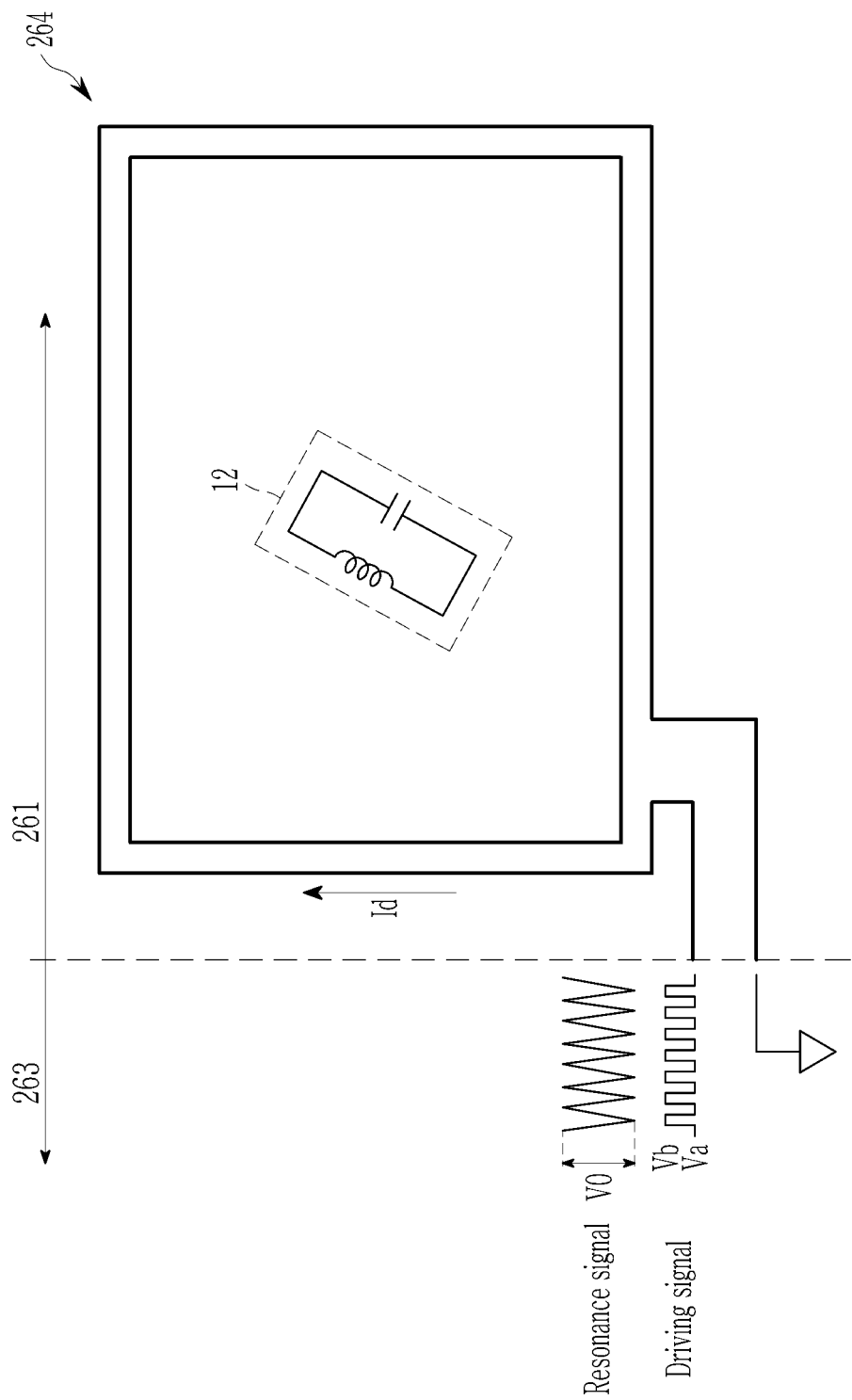
FIG. 64 illustrates a driving signal applied by a coil driver to a loop coil and a resonance signal of a stylus pen.
Figure 65:
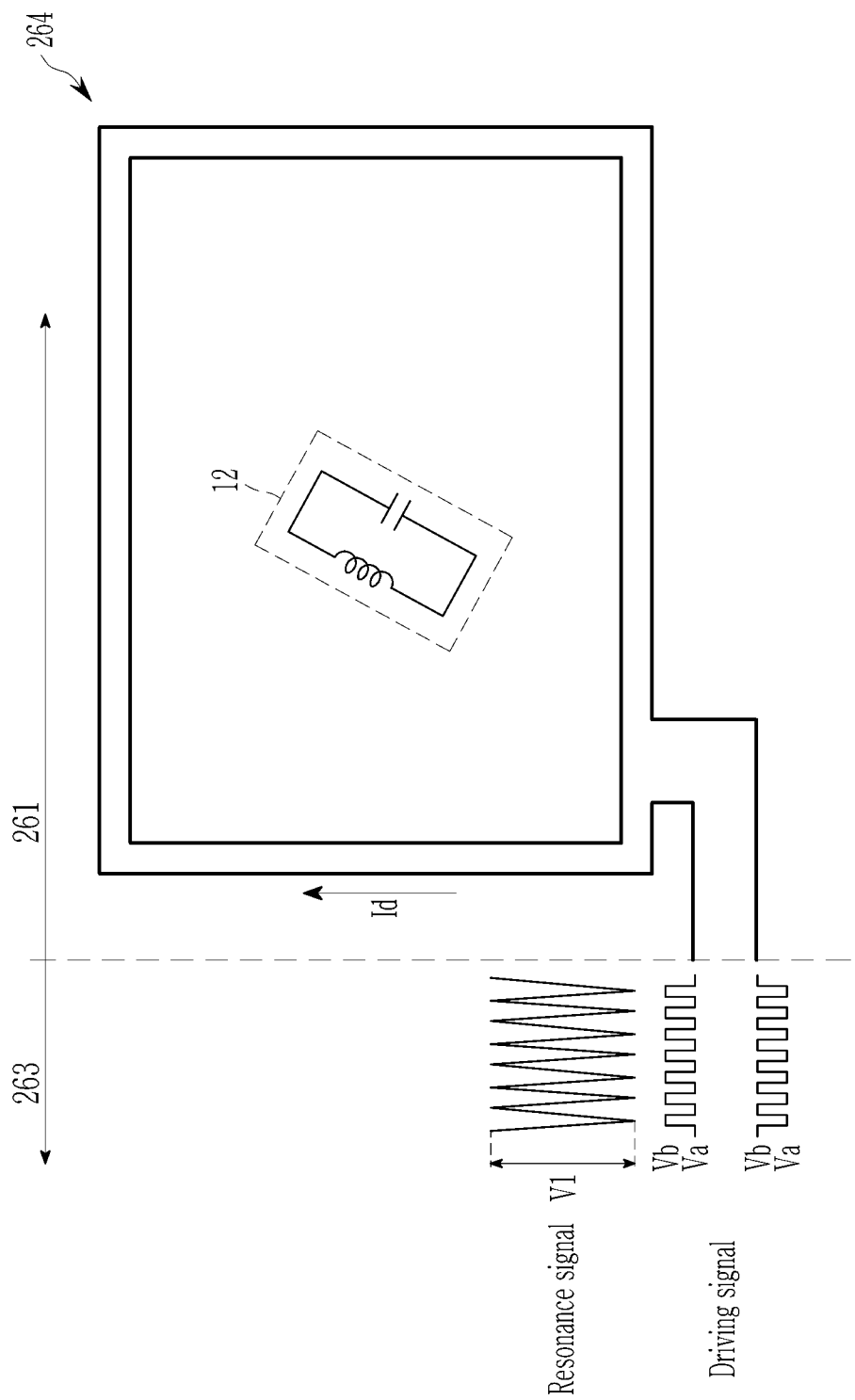
FIG. 65 illustrates a driving signal applied by a coil driver to a loop coil and a resonance signal of a stylus pen according to an embodiment.

FIG. 64 illustrates a driving signal applied by a coil driver to a loop coil and a resonance signal of a stylus pen, and FIG. 65 illustrates a driving signal applied by a coil driver to a loop coil and a resonance signal of a stylus pen according to an embodiment.

As illustrated in FIG. 64, the coil driver 263 may apply a driving signal to each of opposite ends of the loop coil 264. A ground is connected to a second end of the loop coil 264, and a driving signal, i.e., a voltage having a predetermined frequency, is applied to a first end of the loop coil 264. Since voltages having different magnitudes (voltage difference between opposite ends=(Vb−Va)) are applied to the opposite ends of the loop coil 264, a current Id flows in the loop coil 264. A strength of a current changes depending on a change of a voltage, but a direction thereof is constant. As in Equation 1 above, a change in the current (current strength) generates a magnetic field around the loop coil 264.

A change in the magnetic field induces an induced electromotive force in the resonance circuit 12 as in Equation 2. A PP (peak to peak) voltage of the resonance signal generated by the induced electromotive force in the resonance circuit 12 is V0.

Referring to FIG. 65, driving signals of opposite phases to each other are applied to the opposite ends of the loop coil 264. In this case, the PP voltage of the driving signal is Vb−Va, which is the same as the driving signal applied to the loop coil 264 in FIG. 64. Since voltages having different magnitudes (voltage difference between opposite ends=2*(Vb−Va)) are applied to the opposite ends of the loop coil 264, the current Id flows in the loop coil 264. As the voltage changes, the strength and direction of the current change.

As in Equation 1 above, a change in the current (current strength) generates a magnetic field around the loop coil 264. A change in the magnetic field induces an electromotive force in the resonance circuit 12 as in Equation 2. The PP voltage of the resonance signal generated by the induced electromotive force in the resonance circuit 12 is V1 (V1>V0).

An alternating current of greater strength generates a larger magnetic field change, and a larger magnetic field change induces a larger induced electromotive force. According to an electronic device control method of the present disclosure, there is an effect of amplifying the magnetic field generated in the coil even with a same voltage by simultaneously applying the reverse-phase driving signal to the opposite ends of the loop coil 264.

That is, according to the electronic device control method of the present disclosure, the energy transferred to the resonance circuit 12 of the stylus pen 10 may be increased by the coil driver 263 without increasing the PP voltage.

Next, a case in which the coil driver 263 in which the method of applying the driving signal of FIG. 65 is used includes the blocking capacitor Cb will be described.

Figure 66:
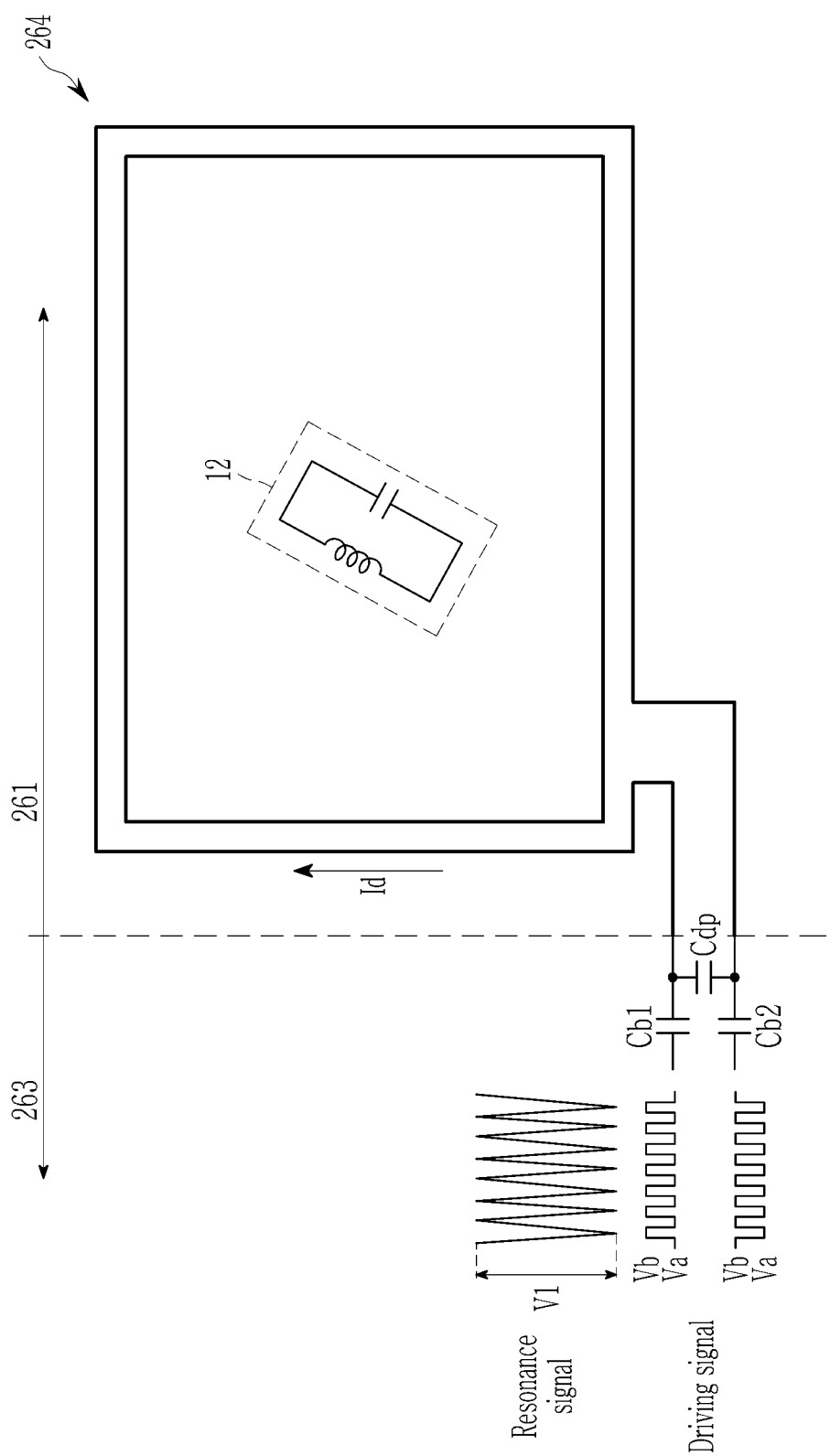
FIG. 66 specifically illustrates the coil driver of FIG. 65.

FIG. 66 specifically illustrates the coil driver of FIG. 65

Referring to FIG. 66, the loop coil Ldp and the internal capacitor Cdp are connected in parallel, a first electrode of the blocking capacitor Cb1 is connected to a first electrode of the internal capacitor Cdp, and a first electrode of the blocking capacitor Cb2 is connected to a second electrode of the internal capacitor Cdp.

Driving signals having phases that are different from each other (e.g., opposite phases) are applied to a second electrode of the blocking capacitor Cb1 and a second electrode of the blocking capacitor Cb2, respectively. For example, a phase of the driving signal applied to the second electrode of the blocking capacitor Cb1 and the driving signal applied to the second electrode of the blocking capacitor Cb2 are opposite to each other.

As described with reference to FIG. 65, there is an effect of amplifying the magnetic field generated in the coil even with a same voltage by simultaneously applying the reverse-phase driving signal to the opposite ends of the loop coil 264.

In addition, it is possible to prevent a DC component current from flowing through the resonance circuit 42 as in Equation 3 above by connecting the blocking capacitors Cb1 and Cb2 to the resonance circuit 42.

According to the above, it is possible to reduce power consumption of the antenna module and the electronic device including the same, and to increase energy transferred to the stylus pen, and there is an effect that the power required for the use of the stylus pen may be transferred simultaneously with the use of the stylus pen without separate wireless charging.

Figure 67:
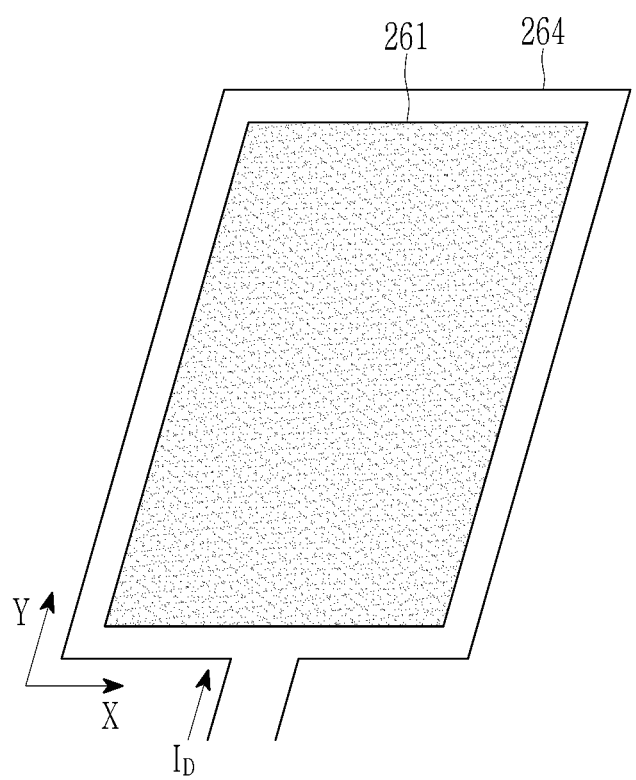
FIG. 67 to FIG. 69 each illustrate a disposal form of a touch sensor and a loop coil.
Figure 68:
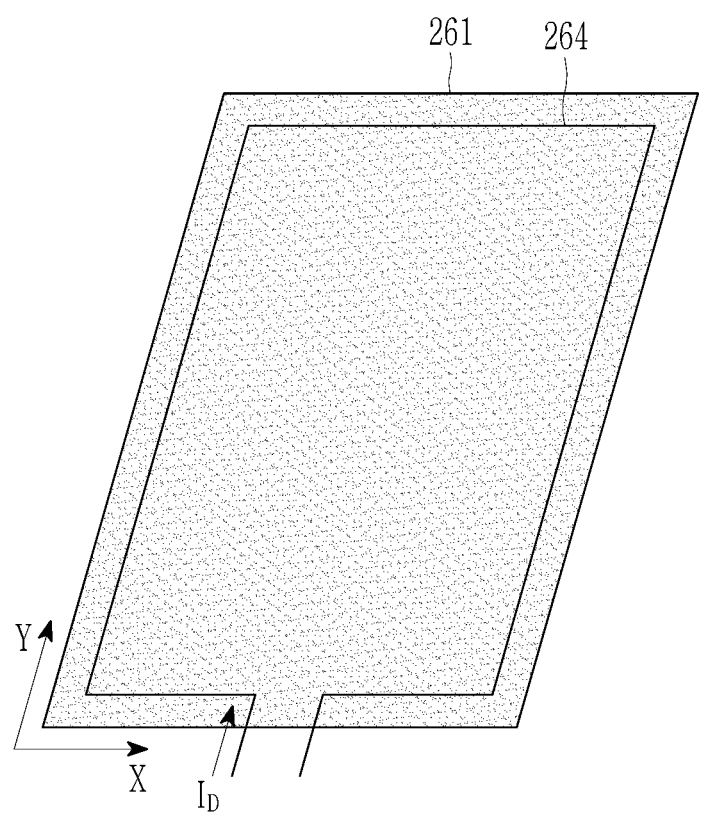
Figure 69:
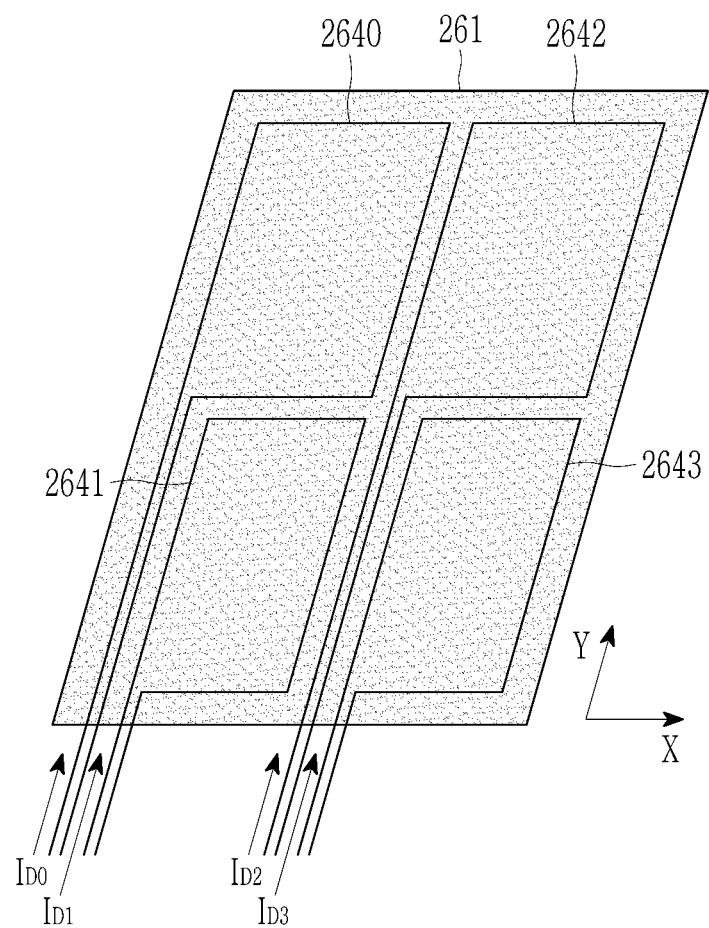
Figure 70:
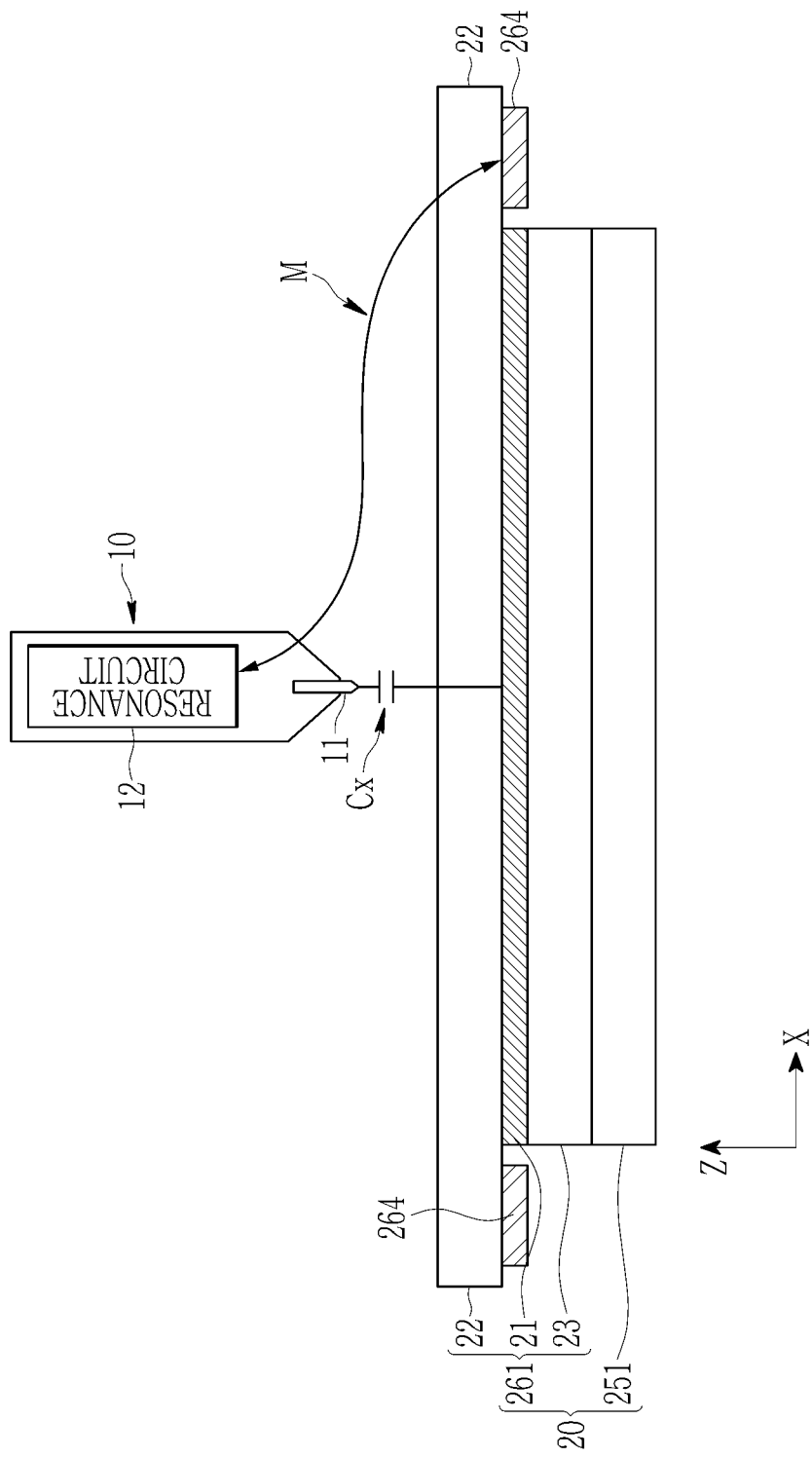
FIG. 70 to FIG. 74 each illustrate a state where a stylus pen is close to an electronic device.

FIG. 67 to FIG. 69 each illustrate a disposal form of a touch sensor and a loop coil.

As illustrated in FIG. 67, the loop coil 264 may be positioned to surround a periphery of the touch sensor 261 without overlapping with the touch sensor 261. The current ID having an AC waveform as the driving signal is applied to the loop coil 264.

As illustrated in FIG. 68, the loop coil 264 may be positioned in an area overlapping the touch sensor 261. The current ID having an AC waveform by the driving signal is applied to the loop coil 264.

As illustrated in FIG. 69, the loop coil 264 may include a plurality of sub-loop coils 2640, 2641, 2642, and 2643. The sub-loop coils 2640, 2641, 2642, and 2643 may be positioned in an area overlapping the touch sensor 261, but the present disclosure is not limited thereto. Currents $I_{D0}$, $I_{D1}$, $I_{D2}$, and $I_{D3}$ each having an AC waveform by the driving signal are respectively applied to the sub-loop coils 2640, 2641, 2642, and 2643.

FIG. 70 to FIG. 74 each illustrate a state where a stylus pen is close to an electronic device.

As illustrated in FIG. 70 to FIG. 74, a stylus pen 10 and a touch screen 20 may be close to each other.

The stylus pen 10 of FIG. 70 to FIG. 74 may generate a touch input (a resonance signal or an active touch signal) by resonating with a driving signal applied to a touch electrode of the touch electrode layer 21.

The touch screen 20 of FIG. 70 to FIG. 74 includes a display panel 251 and a touch sensor 261 on the display panel 251. The touch sensor 261 may include a substrate 23, the touch electrode of the touch electrode layer 21 on the substrate, and a window 22 on the touch electrode of the touch electrode layer 21.

The substrate 23 may be an encapsulation substrate of the display panel 251, which may be implemented by a transparent material.

The touch electrode of the touch electrode layer 21 may include a plurality of first touch electrodes each having a shape extending in a first direction and arranged in a second direction crossing the first direction, and a plurality of second touch electrodes each having a shape extending in the second direction and arranged in the second direction. Although the touch electrode of the touch electrode layer 21 is illustrated as a single layer in the drawings, a first touch electrode and a second touch electrode may be respectively positioned on different layers, but the present invention is not limited thereto.

The window 22 may be positioned on the touch electrode of the touch electrode layer 21. The touch electrode of the touch electrode layer 21, the conductive tip 11, and the window 22 may form a capacitance Cx. Accordingly, a signal (a resonance signal or an active touch signal) generated by the stylus pen 10 may be transferred to the touch electrode of the touch electrode layer 21.

As illustrated in FIG. 70 to FIG. 74, the resonance circuit 12 may mutually resonate with the loop coil 264, and a degree of mutual resonance occurring between an inductor and the loop coil 264 of the resonance circuit 12 is affected by a mutual inductance M. Alternatively, the resonance circuit 12 may resonate with a magnetic field generated by the loop coil 264.

Figure 71:
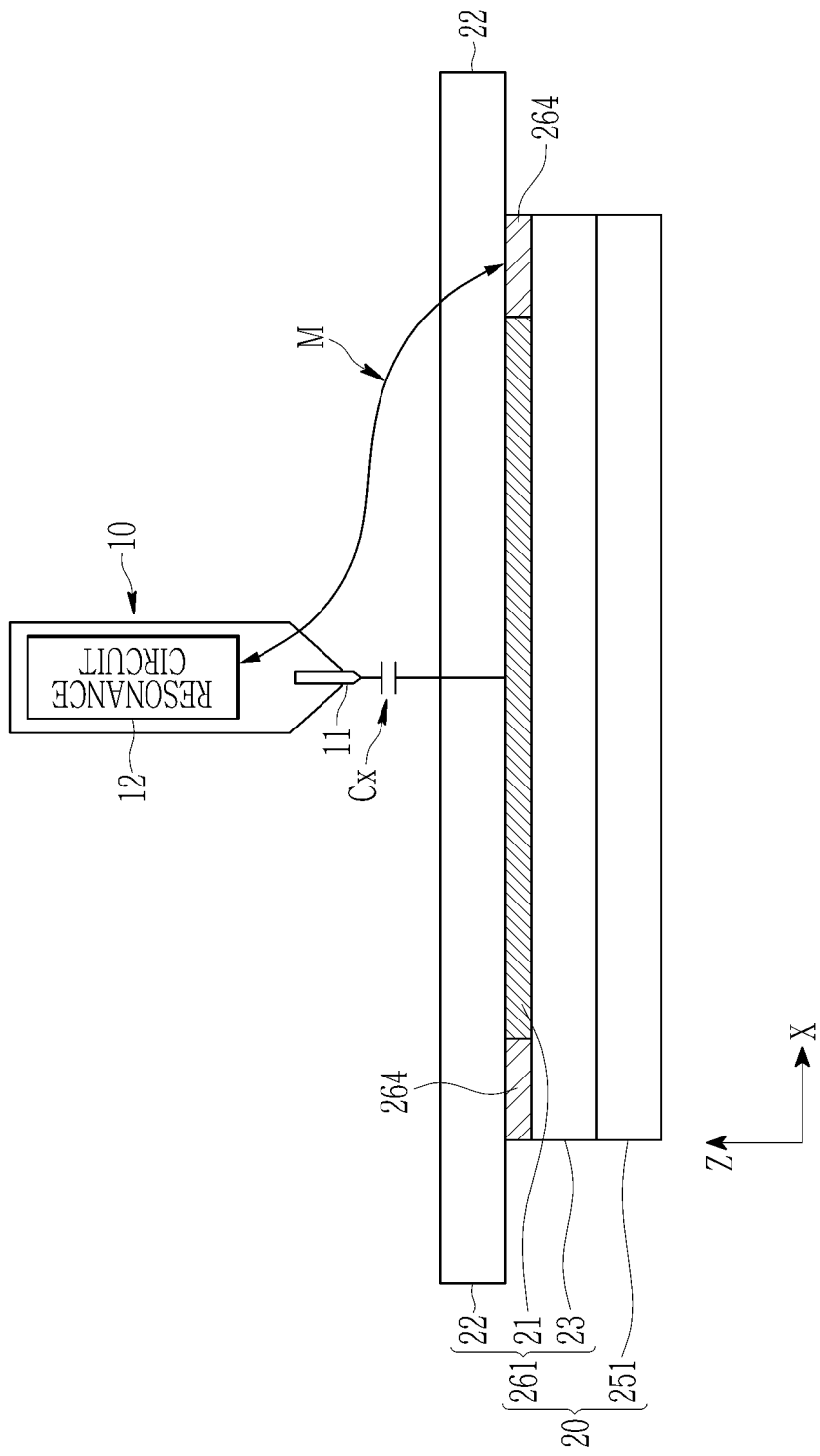
Figure 72:
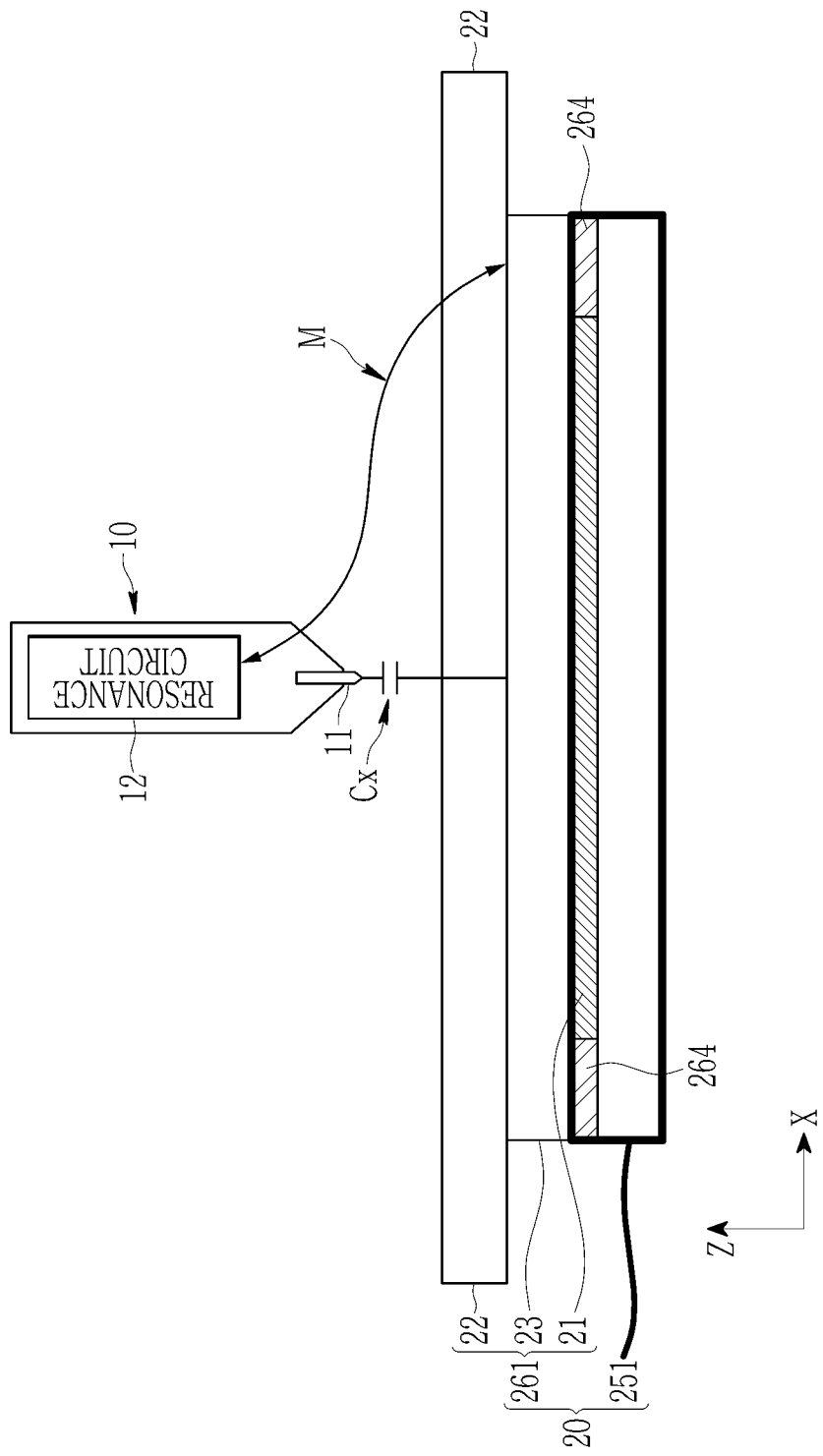
Figure 73:
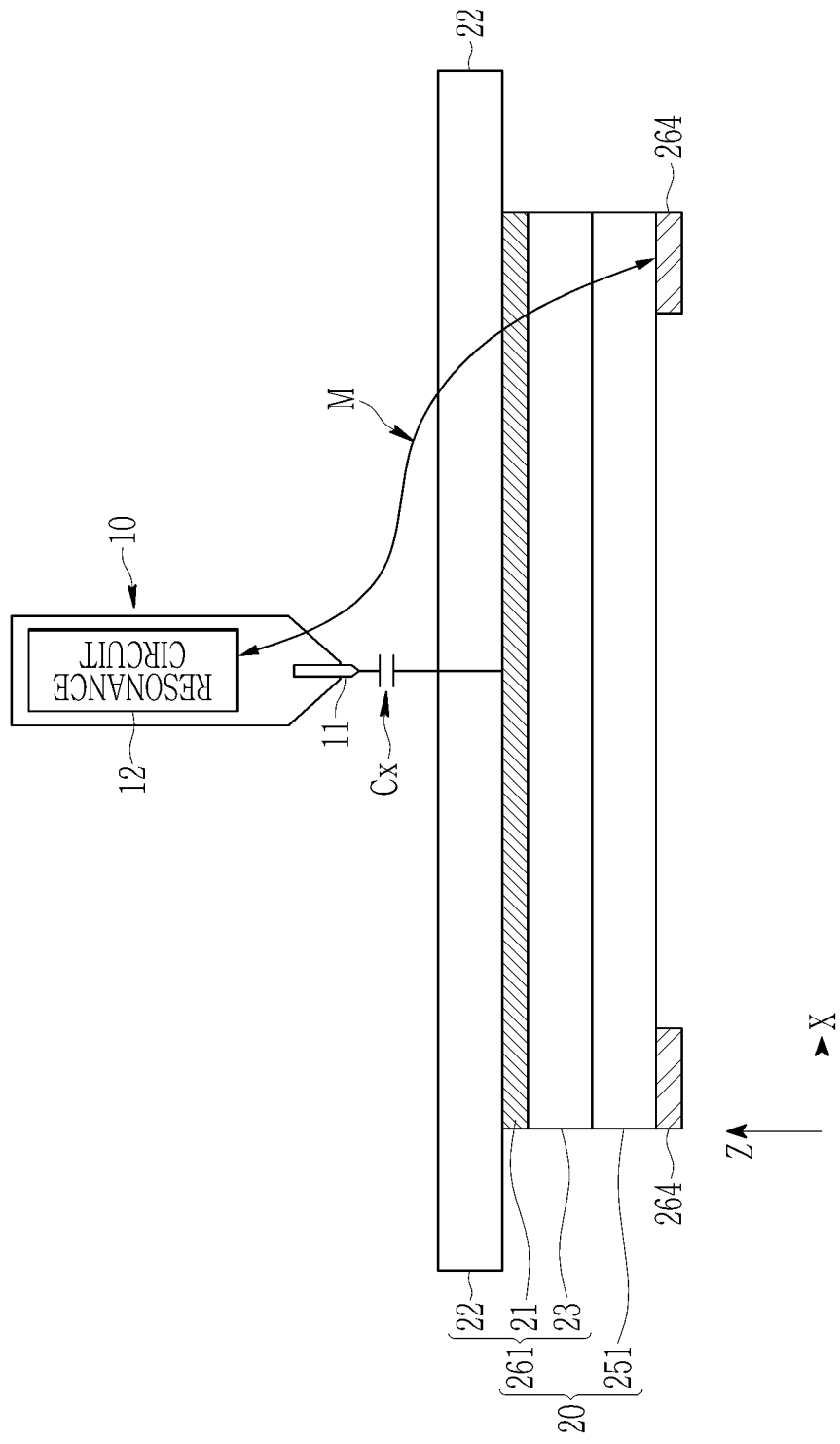

As illustrated FIG. 71, FIG. 72, and FIG. 73, the loop coil 264 may be positioned in an area that does not overlap the touch sensor 261.

Referring to FIG. 71, the loop coil 264 may be printed on the window 22 by a method such as photolithography, thin film sputtering, or the like, or may be printed on a sheet by a method such as photolithography, thin film sputtering or the like and attached to the window 22, and a manner for positioning the loop coil 264 on the window 22 is not limited to the above description.

FIG. 72 illustrates a disposal of the loop coil 264 positioned in a same layer as that of the touch electrode of the touch electrode layer 21 in the case of an on-cell type of touch sensor, and FIG. 73 illustrates a disposal of the loop coil 264 positioned on a same layer as that of the touch electrode of the touch electrode layer 21 in the case of an in-cell type of touch sensor.

Referring to FIG. 72 and FIG. 73, the loop coil 264 may be positioned on the same layer as that of the touch electrode of the touch electrode layer 21. The loop coil 264 may be made of a same material as that of the touch electrode of the touch electrode layer 21. However, the loop coil 264 may be positioned in a different layer than that of the touch electrode of the touch electrode layer 21, and may be made of a different material.

In FIG. 72, the loop coil 264 and the touch electrode of the touch electrode layer 21 are positioned in a touch electrode on an encapsulation substrate 23 of the display panel 251.

In FIG. 73, the display panel 251 includes the touch electrode and the loop coil 264 of the touch electrode layer 21. That is, the substrate 23 may be a color filter substrate of the display panel 251, and the touch electrode of the electrode layer 21 and the loop coil 264 may be positioned between the color filter substrate 23 and a TFT substrate of the display panel 251. Alternatively, both the touch electrode of the touch electrode layer 21 and the loop coil 264 may be positioned on upper and lower portions of the color filter substrate 23.

Figure 74:
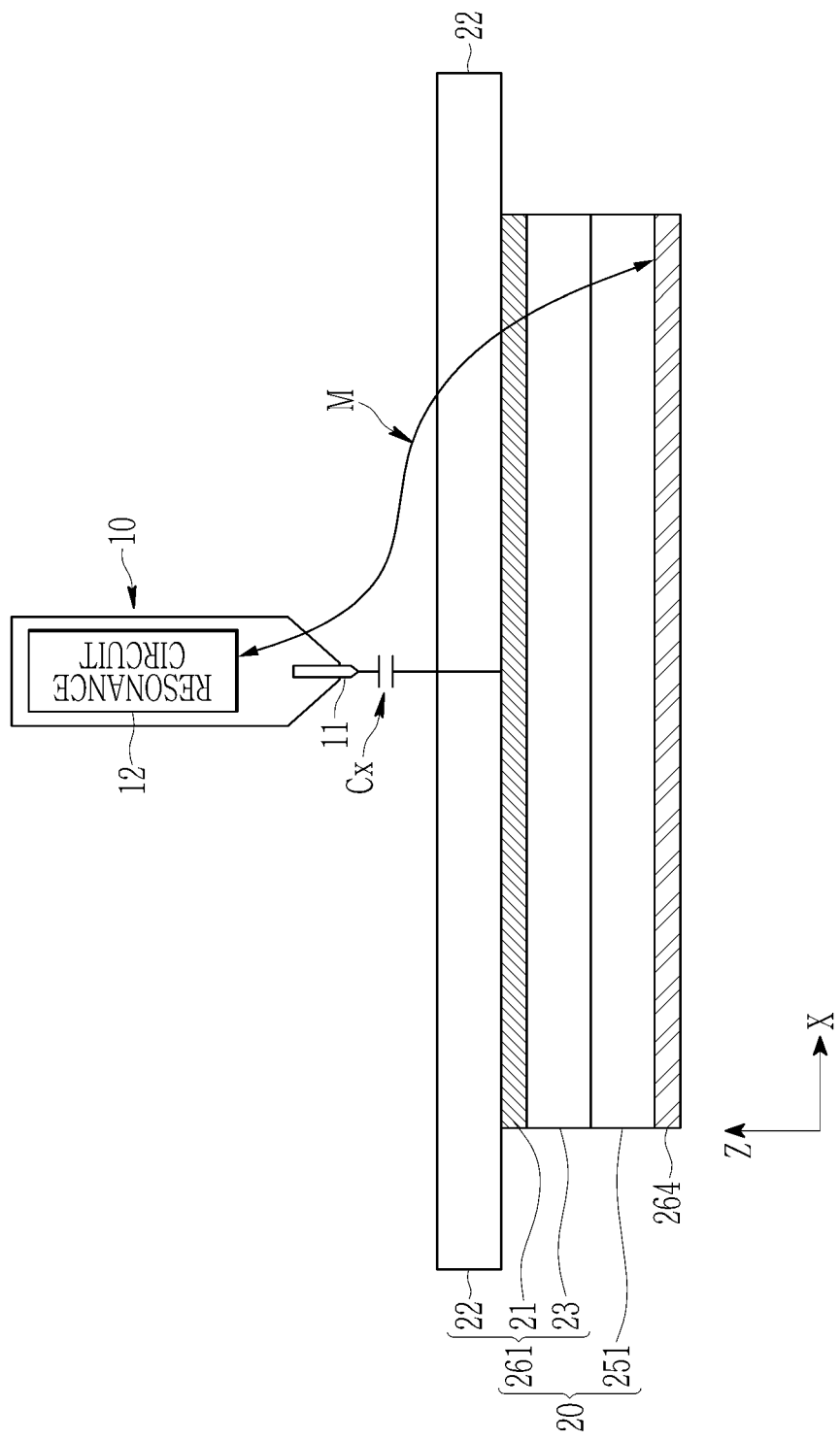
Figure 75:
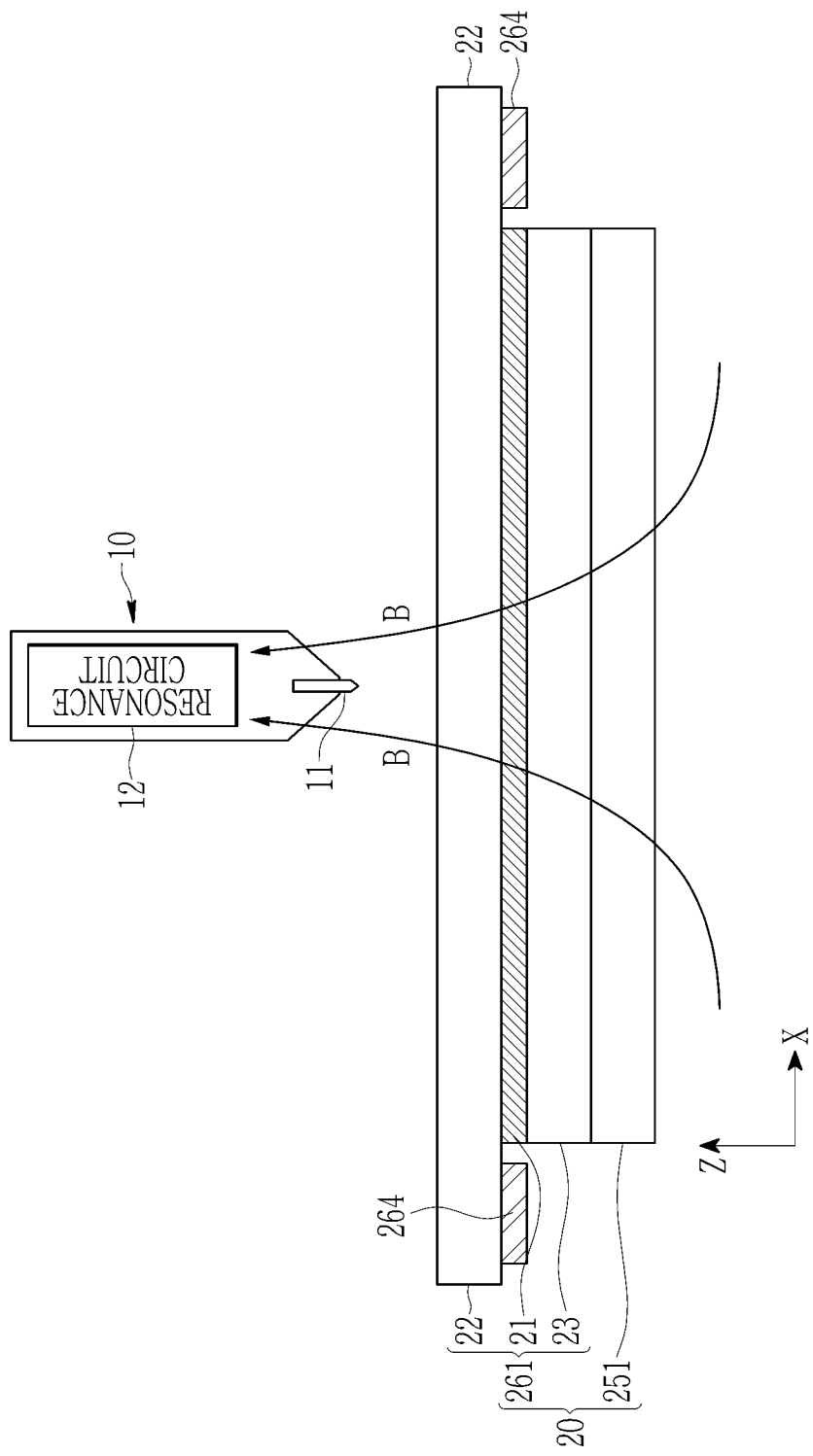
FIG. 75 and FIG. 76 each illustrate a state in which a stylus pen is close to an electronic device to transmit and receive a signal.

As illustrated FIG. 74 and FIG. 75, the loop coil 264 may be positioned in an area that overlaps the touch sensor 261. The loop coil 264 may be directly printed on the substrate of the display panel 251 by a method such as photolithography or thin film sputtering, or may be printed on a sheet by a method such as photolithography or thin film sputtering and attached to the substrate of the display panel 251, and a manner for positioning the loop coil 264 on the substrate of the display panel 251 is not limited to the above description.

As illustrated in FIG. 74, the loop coil 264 may be positioned only at a position close to an outer shell of the touch sensor 261, or as illustrated in FIG. 75, the loop coil 264 may be positioned to correspond to an entire area of the touch sensor 261.

In addition, the loop coil 264 may be positioned in a different layer than that of the touch electrode of the touch electrode layer 21. However, as illustrated in FIG. 71 and FIG. 72, the loop coil 264 may be positioned on the same layer as the touch electrode of the touch electrode layer 21 in an area overlapping the touch sensor 261, and may be made of a same material.

Figure 76:
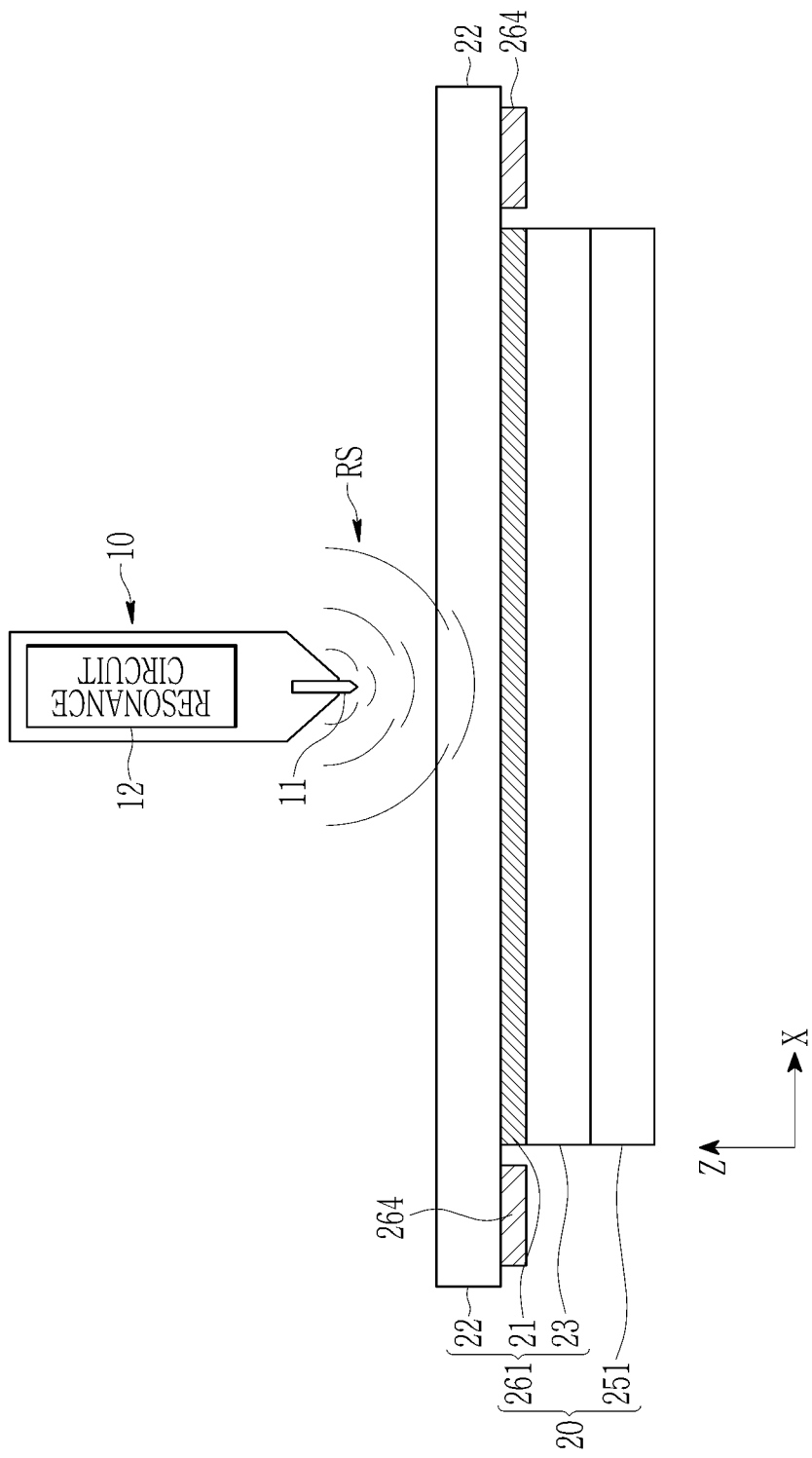

FIG. 75 and FIG. 76 each illustrate a state in which a stylus pen is close to an electronic device to transmit and receive a signal.

As illustrated in FIG. 75, when a driving signal is applied to the loop coil 264, the resonance circuit 12 resonates by a magnetic field B generated therefrom.

Then, as illustrated in FIG. 76, a signal RS from the stylus pen 10 may be directly transferred from the conductive tip 11 to the touch electrode of the touch electrode layer 21, or may be transferred to the touch electrode of the touch electrode layer 21 through the air or a non-conductive housing.

Figure 77:
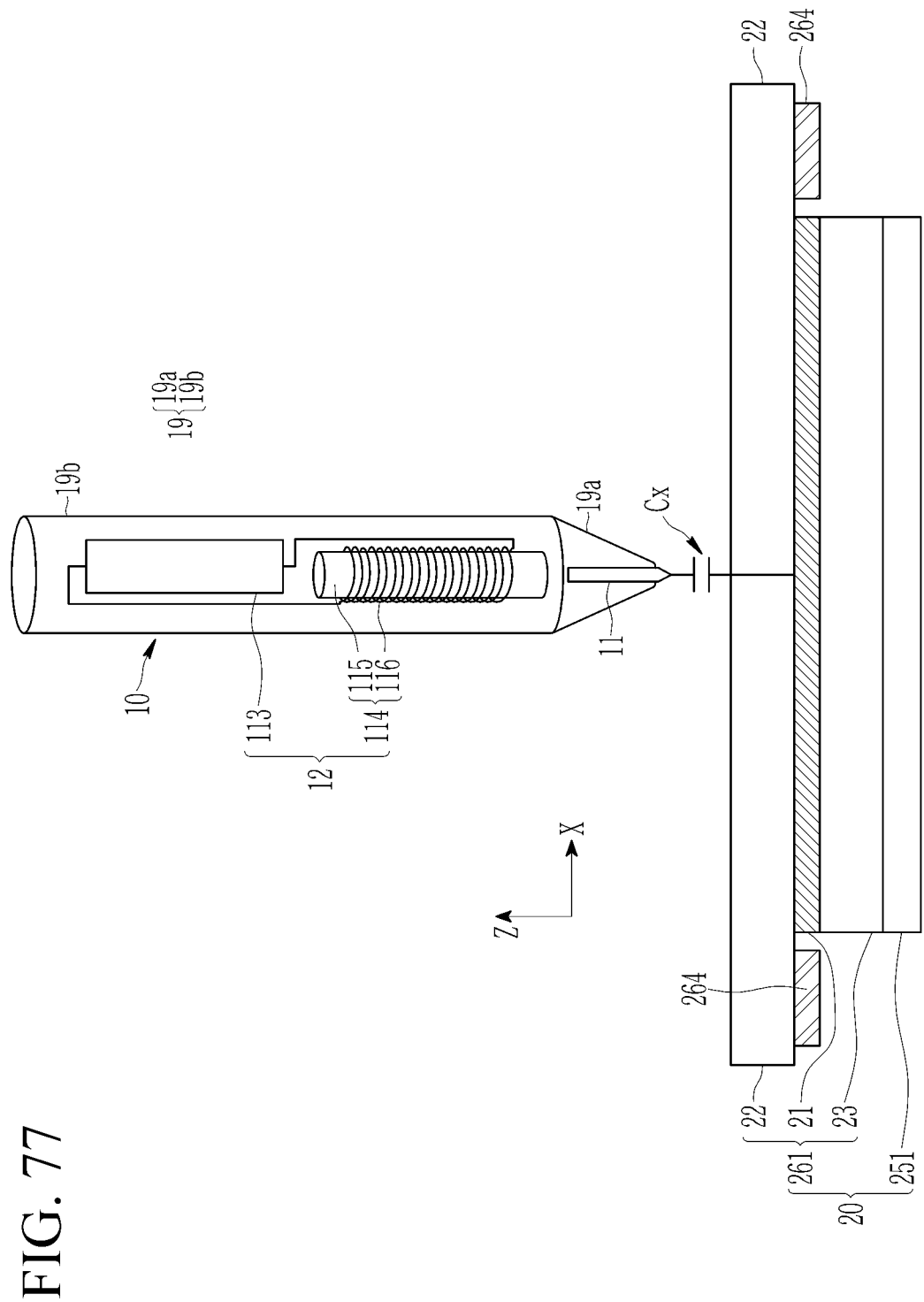
FIG. 77 illustrates a schematic view specifically showing the stylus pen of FIG. 3 and the electronic device of FIG. 2.

FIG. 77 illustrates a schematic view specifically showing the stylus pen of FIG. 3 and the electronic device of FIG. 2.

The stylus pen 10 includes a conductive tip 11, a resonance circuit 12, and a housing 19. The resonance circuit portion 12 includes a capacitor portion 113 and an inductor portion 114. The housing 19 includes a holder portion 19a adjacent to the tip 11 and a body portion 19b spaced apart from the tip 11.

The capacitor portion 113 may include a plurality of capacitors connected in parallel. The capacitors may have different capacitances, and may be adjusted in a manufacturing process.

The inductor portion 114 includes a ferrite core 115 and a coil 116 that is wound around the ferrite core 115.

The capacitor portion 113 and the inductor portion 114 are connected in parallel, and a resonance signal is generated in response to a driving signal through LC resonance of the capacitor portion 113 and the inductor portion 114.

Figure 78:
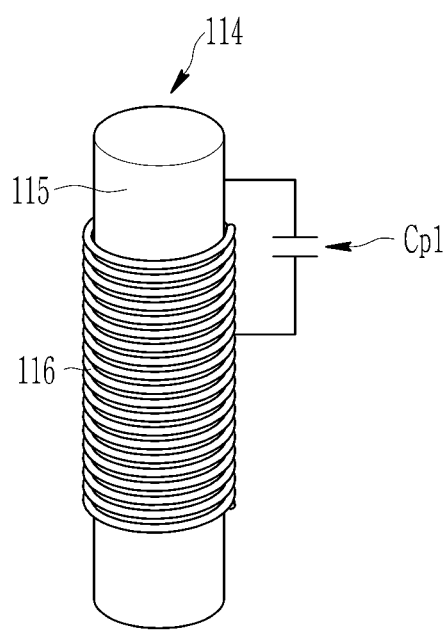
FIG. 78 illustrates a schematic view specifically showing an inductor portion of the stylus pen of FIG. 77.

FIG. 78 illustrates a schematic view specifically showing an inductor portion of the stylus pen of FIG. 77.

Referring to FIG. 78, the inductor portion 114 includes a ferrite core 115 and a coil 116 that is wound around the ferrite core 115.

In this case, the inductance of the inductor portion 114 is determined by the following Equation 4.

$$L = \frac{\mu S N^2}{l} \quad \text{[Equation 4]}$$

As can be seen from Equation 4, the inductance is proportional to the permeability of the ferrite core 115, a cross-sectional area of the coil 116, and a square of a number of turns, and is inversely proportional to a winding length of the coil 116.

A design of the inductor portion 114 is very important in the resonance circuit portion 12 accommodated in the stylus pen.

Figure 79:
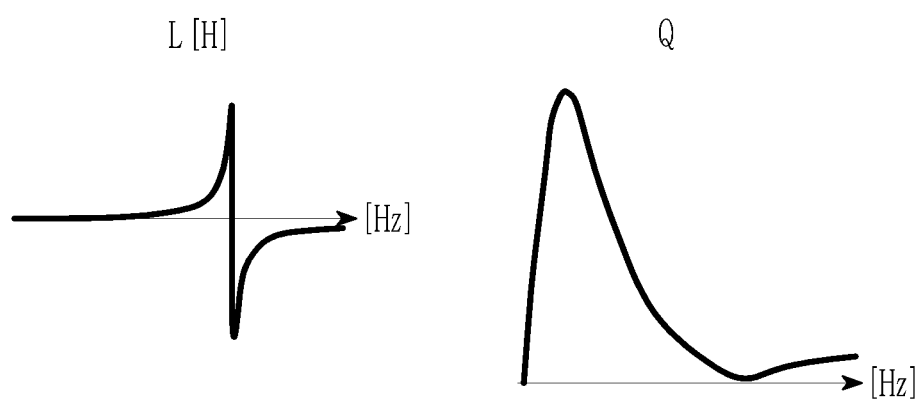
FIG. 79 illustrates inductance and Q values depending on frequency changes.

FIG. 79 illustrates inductance and Q values depending on frequency changes.

As illustrated in FIG. 79, in the design of the inductor portion 114, inductance L and a Q value are very important parameters. Herein, the Q value is an amount representing a coil characteristic as a resonance circuit element, and is given by an equation $Q = 2\pi fL/R$. In addition, L and R indicate the inductance and resistance of the coil, respectively, and f indicates the frequency. The higher the Q value, the sharper the resonance characteristic.

In the design of the stylus pen, L may have a sufficiently large self-resonance frequency relative to a frequency to be used, and the Q value may have a maximum at a frequency to be used. To satisfy this, it is necessary to optimize a material of the ferrite core, a wire type of the coil, and a winding scheme. There is also a need for a method that can obtain a high output signal while maintaining the diameter of a thin pen.

In the following embodiments, a design method of the stylus pen that is most optimized among materials of a plurality of ferrite cores, wire types of coils, and a winding scheme will be described.

1. Ferrite Core Material

In an example, manganese (Mn) and nickel (Ni) were used as a ferrite core material.

2. Wire Type

In the example, an enameled wire and a litz wire were used as the wire type of the coil used.

Figure 80:
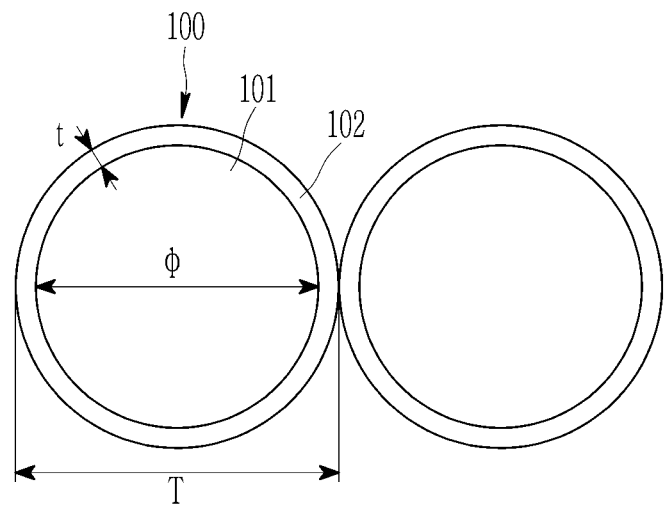
FIG. 80 and FIG. 81 respectively illustrate an enamel wire and a litz wire.
Figure 81:
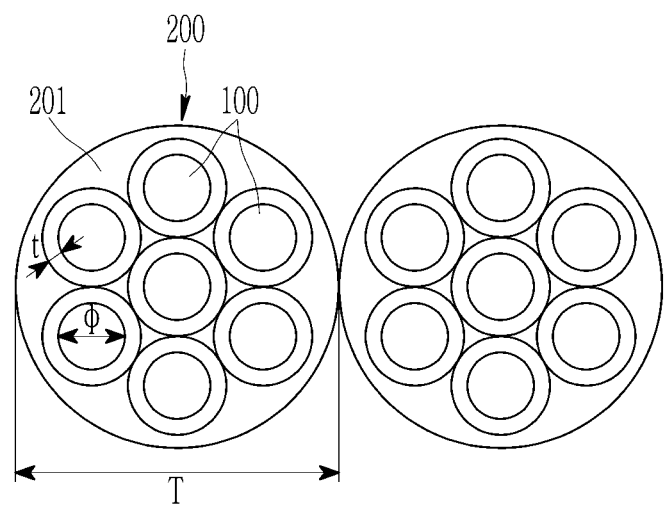

FIG. 80 and FIG. 81 respectively illustrate an enamel wire and a litz wire.

As illustrated in FIG. 80, an enameled wire 100 is an electric wire made by coating an insulating enamel 102 on a surface of a copper wire 101 and heating it to a high temperature, and is used for winding and wiring of electrical devices, communication devices, and electrical instruments. In the example, an enameled wire having a total thickness T of 0.2 mm, an electric wire diameter ϕ of 0.18 mm, and a coating thickness t of 0.01 mm was used.

As illustrated in FIG. 81, a litz wire 200 is a special insulated wire that is made by twisting several strands of a thin insulated wire 100 (e.g., an enameled wire) having a diameter of about 0.1 mm as one wire and applying an insulating coating 201 made of nylon or the like thereon. The litz wire 200 may reduce a skin effect by increasing a surface area, and is used for coils of high frequency circuits and the like.

In the example, a litz wire having a total thickness T of 0.2 mm, an electric wire diameter ϕ of 0.06 mm, and a covering thickness t of 0.007 mm was used.

3. Winding Scheme

In the example of the present invention, a winding scheme of a multilayer winding structure is used in order to obtain a sufficient inductance value (that is, a sufficient number of turns) in a limited space of a stylus pen. Specifically, as shown in FIG. 82A and FIG. 82B, two kinds of multi-layer winding schemes were used.

FIG. 82 illustrates a multi-layer winding scheme.

The winding scheme of FIG. 82A is a simplest winding scheme, and is a sequential layer winding scheme in which an upper layer is wound after winding of a lower layer that is disposed immediately therebelow is finished. In this case, the scheme of FIG. 82A is a scheme in which winding of a layer starts at a point where winding of a previous layer that is disposed immediately therebelow ends, and is hereinafter referred to as a U-type winding scheme.

The winding scheme of FIG. 82B is an alternate layer winding scheme in which adjacent winding layers are alternately wound, such that windings of adjacent layers are wound in a zigzag form. Hereinafter, this is referred to as a zigzag winding scheme. This zigzag winding scheme may minimize a voltage difference between the windings of adjacent layers, thereby reducing winding self-capacitance. In this case, the winding self-capacitance, which is a kind of parasitic capacitance, is a parameter representing electric field energy stored in the winding.

Comparative Experiment 1 (Comparison of Characteristic Values for Each Material)

A material of the ferrite core was changed to manganese, nickel, and magnesium, and the Q value was measured in a state where an enameled wire was used as a wire type of coil and was wound by a U type of winding scheme.

As a result of the measurement, there was little difference between the characteristics of the Q values for each material of cores, and a measured Q value was not enough to be implemented as a product.

Comparative Experiment 2 (Comparison of Characteristic Values for Each Type of Windings)

Q values were respectively measured for the Inductors 1 and 2 produced using the enameled wire and the litz wire in a state in which the ferrite core was wound with manganese (Mn) by the U type of winding scheme.

Figure 83:
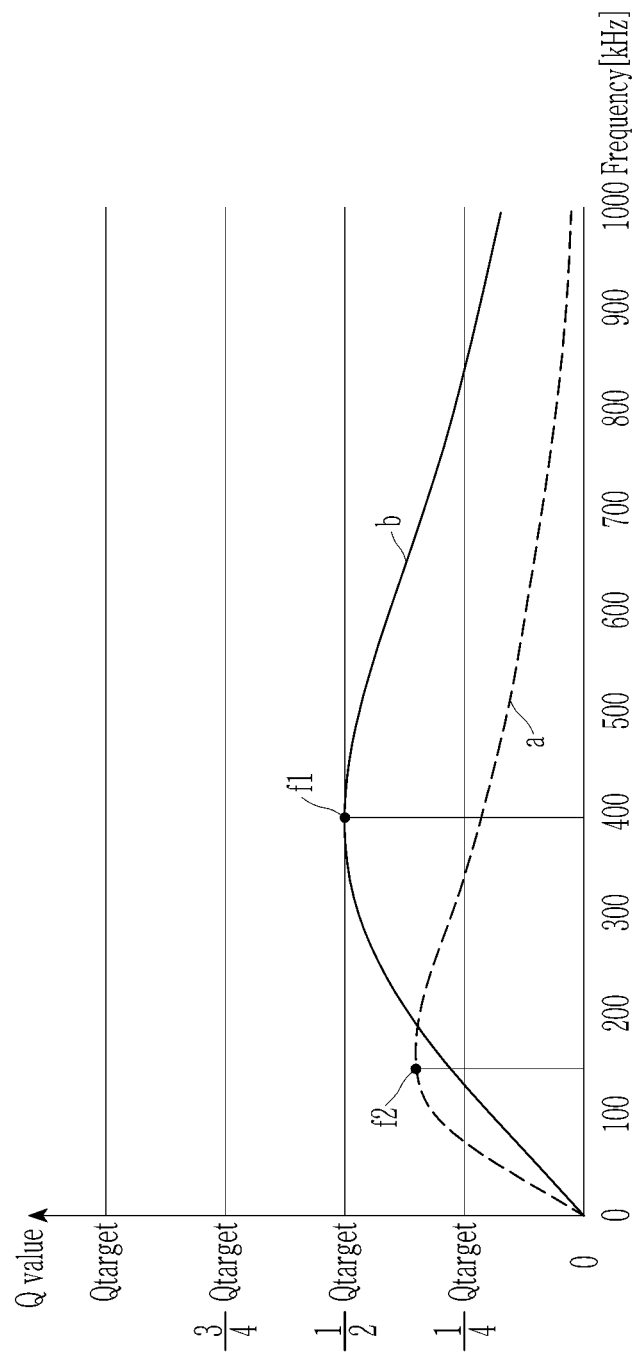
FIG. 83 to FIG. 85 illustrate graphs showing results of comparative experiments.
Figure 84:
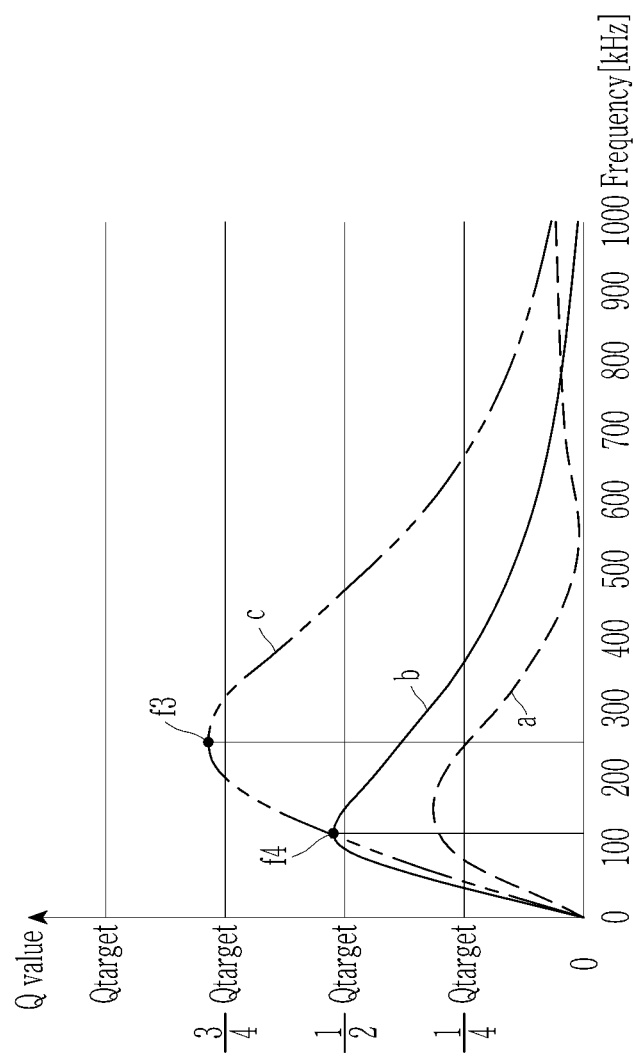
Figure 85:
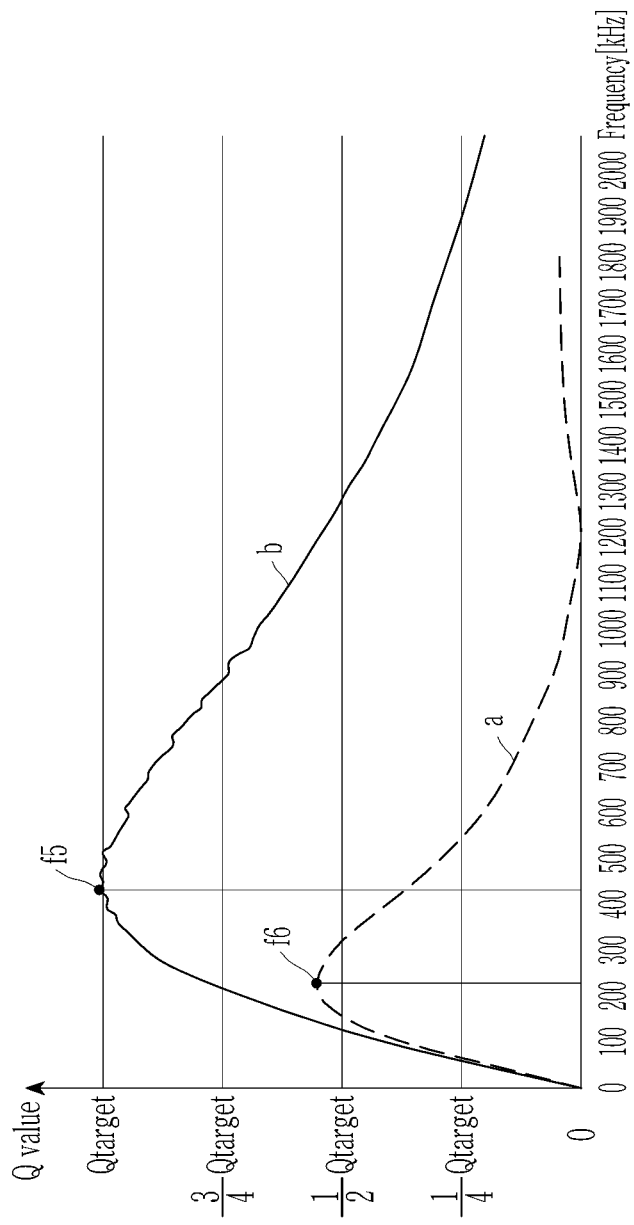

FIG. 83 to FIG. 85 illustrate graphs showing results of comparative experiments.

FIG. 83 illustrates Q values of Inductors 1 and 2 measured while changing frequencies through an E4980A precision LCR meter manufactured by KEYSIGHT TECHNOLOGIES.

In FIG. 83, a indicates a waveform showing a change in the Q value with respect to the frequency of Inductor 1 (manganese core/enameled wire/U-type winding scheme), and b indicates a waveform showing a change of the Q value with respect to the frequency of the Inductor 2 (manganese core/litz wire/U-type winding scheme).

The Q value has almost a maximum at a frequency (frequency f1) around 400 kHz in the Inductor 2 manufactured by the litz wire, and the Q value has almost a maximum at a frequency (frequency f2) around 150 kHz in the Inductor 1 manufactured by the enameled wire.

As a result of comparing a and b of FIG. 83, it can be seen that the maximum Q value of the Inductor 2 is about 1.5 times higher than the maximum Q value of the Inductor 1. Accordingly, it can be seen that the litz wire is superior to the enameled wire as the coil of the inductor forming the resonance circuit of the stylus pen.

However, the maximum Q value of Inductor 2 measured in Comparative Experiment 2 was about ½ of a target value $Q_{target}$ required for commercialization.

Comparative Experiment 3 (Comparison of Characteristic Values for Each Winding Scheme)

Q values were measured for the inductors 3 to 5 manufactured by changing the wire type to the enameled wire and the litz wire and the winding scheme to the U type and the zigzag type in a state where the ferrite core was made of manganese (Mn).

FIG. 84 illustrates Q values of Inductors 3 to 5 measured while changing frequencies through an E4980A precision LCR meter manufactured by KEYSIGHT TECHNOLOGIES.

In FIG. 84, a indicates a waveform showing a change in the Q value with respect to the frequency of Inductor 3 (manganese core/enameled wire/U-type winding scheme), b indicates a waveform showing a change of the Q value with respect to the frequency of Inductor 4 (manganese core/enameled wire/zigzag winding scheme), and c indicates a waveform showing a change of the Q value with respect to the frequency of Inductor 5 (manganese core/litz wire/zigzag winding scheme).

As can be seen from the waveform c of FIG. 84, the Q value has almost a maximum at a frequency (frequency f3) around 300 kHz in Inductor 5 manufactured by the litz wire/zigzag winding scheme. The Q value has almost a maximum at a frequency (frequency f2) around 150 kHz in Inductor 4 manufactured by the enameled wire/zigzag winding scheme and Inductor 3 manufactured by the enameled wire/U-type winding scheme.

In addition, as a result of comparing a, b, and c of FIG. 84, it can be seen that the maximum Q value of Inductor 5 is about 1.5 times higher than the maximum Q value of the Inductor 4 and is twice or more higher than the maximum Q value of Inductor 3. Accordingly, it can be seen that the zigzag type is superior to the U-type as the winding scheme of the inductor forming the resonance circuit of the stylus pen.

However, the maximum Q value of Inductor 5 (manganese core/litz wire/zigzag winding scheme) measured in Comparative Experiment 2 was about ¾ of a target value Qtarget required for commercialization.

Comparative Experiment 4 (Comparison of Characteristic Values for Each Core Material)

In the example, manganese and nickel were used as a ferrite core material, and it is known that permeability of nickel is generally 200 to 300, and the permeability of manganese is generally 3000 to 5000.

Since the manganese used in the example is approximately 15 times higher in permeability than nickel, assuming that the coils have same cross-sectional area and length, the number of turns of manganese is reduced by approximately four times that of nickel to obtain the same inductance value. Accordingly, only from the viewpoint of the number of turns, it can be seen that is more effective to use manganese than nickel.

On the other hand, since the inductor portion 114 has a complicated structure including a coil wound around the core, parasitic capacitance is additionally generated. Since the Q value decreases due to such parasitic capacitance, an amplitude of the resonance signal may be reduced.

The parasitic capacitance generated in the inductor portion 114 may occur between the wound coils and between the core and the coil, and as described above, the parasitic capacitance between the wound coils may be reduced by adopting the zigzag winding scheme.

Meanwhile, in an example, a core material having lower permittivity than that of manganese was tested in order to reduce the parasitic capacitance between the core and the coil, and the test result confirmed that the nickel core was an optimal material for the ferrite core.

An important physical property in manganese and nickel, which are mainly used as a ferrite core element, is permeability, which has an important effect on an inductance value as shown in Equation 4. However, in manganese and nickel as ferrite elements, the permittivity is a physical property of little concern, and in fact, nickel does not have relevant information is in the data sheet provided by the manufacturer.

In the example, the permittivity of manganese and nickel was measured using an E4980A precision LCR meter of KEYSIGHT TECHNOLOGIES in order to confirm the permittivity of manganese and nickel, and the measurement results are shown in Table 1 below.

TABLE 1

| | Manganese permittivity | Nickel permittivity |
|---|---|---|
| Measurement 1 | 2400 | — |
| Measurement 2 | 8300 | 2 |

Measurements 1 and 2 were measured using the same E4980A precision LCR meter of KEYSIGHT TECHNOLOGIES, where Measurement 1 represents the permittivity that is automatically calculated by measurement software. According to Measurement 1, although the permittivity of manganese is 2400, the permittivity of nickel is not measured. Measurement 2 is a method of calculating the dielectric constant by measuring capacitance, area, and distance between ferrite cores, and according to Measurement 2, the permittivity of manganese is 8300 and the permittivity of nickel is 2. There is a big difference in the result of permittivity between Measurement 1 and Measurement 2, and in the case of Measurement 2, it was confirmed that errors were considerable depending on capacitance, area, distance, and the like. However, as results of Measurement 1 and Measurement 2, it can be seen that nickel has permittivity of at least 1/1000 or more relative to manganese.

In Comparative Experiment 4, Q values were measured for Inductors 6 and 7 manufactured by changing the winding type to the U type and the zigzag type with the ferrite core made of nickel and using the litz wire as the wire type.

FIG. 85 illustrates Q values of Inductors 6 and 7 measured while changing frequencies through an E4980A precision LCR meter manufactured by KEYSIGHT TECHNOLOGIES.

In FIG. 85, a indicates a waveform showing a change in the Q value with respect to the frequency of Inductor 6 (nickel core/litz wire/U-type winding scheme), and b indicates a waveform showing a change of the Q value with respect to the frequency of the Inductor 7 (nickel core/litz wire/zigzag winding scheme).

As can be seen from the waveform b of FIG. 85, the Q value has almost a maximum at a frequency (frequency f5) around 400 kHz in Inductor 7 manufactured by the nickel core/litz wire/zigzag winding scheme. The Q value has almost a maximum at a frequency (frequency f6) around 200 kHz in Inductor 6 manufactured by the nickel core/litz wire/U-type winding scheme. As a result of comparing a and b of FIG. 85, it can be seen that the maximum Q value of Inductor 7 is about two times higher than the maximum Q value of Inductor 6.

The maximum Q value of Inductor 7 (nickel core/litz wire/zigzag winding scheme) measured in Comparative Experiment 4 almost reaches a target value Qtarget required for commercialization.

In Comparative Experiments 1 to 4 described above, inductors were manufactured and tested for Q values by changing the material of the ferrite core, the wire type of the coil, and the winding scheme, and test results show that the highest Q value is obtained when the inductor portion of the stylus pen is designed by winding of the nickel core, the litz wire, and the zigzag winding scheme. In addition, it can be seen that the maximum Q value of the inductor manufactured by this combination reaches the target value Qtarget for commercialization.

Meanwhile, in the present the embodiment, the nickel core is used as the ferrite core and the litz wire is used as the wire type of core, but similar results may be obtained when a material with permittivity of 1000 or less is used as the ferrite core instead of the nickel core, and a single wire wrapped with two or more insulated strands is used instead of the litz wire.

In the present embodiment, as described below, a method of increasing the distance between the core and the coil by providing a bobbin between the core and the coil may be used in order to further reduce the parasitic capacitance between the core and the coil, in addition to using nickel having lower permittivity than manganese.

Figure 86:
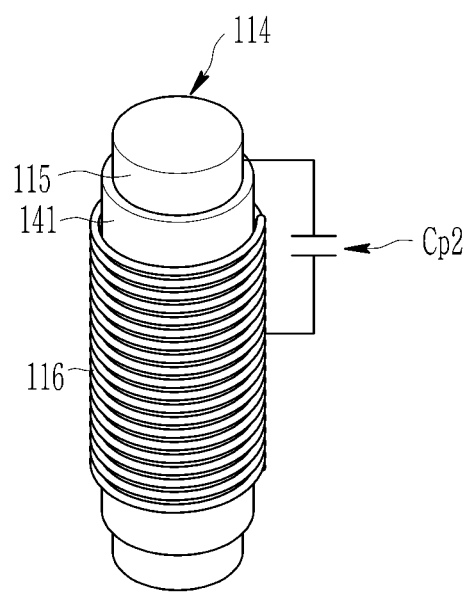
FIG. 86 illustrates another example of the inductor portion of the stylus pen of FIG. 77.

FIG. 86 illustrates another example of the inductor portion.

Referring to FIG. 86, the inductor portion 114 includes a ferrite core 115, a bobbin 141 surrounding at least a portion of the ferrite core 115, and a coil 116 wound on at least a portion of the bobbin 141. The bobbin 141 may be fixed by being closely adhered to the ferrite core 115 by a force caused by the winding of the coil 116. The bobbin 141 may include the same material as that of the housing 19 or a different material, and may include, e.g., a plastic or metal having an insulating surface. Specifically, polyphenylene sulfide (PPS), liquid crystalline polyester (LCP), polybutylene terephthalate (PBT), polyethylene terephthalate (PET), a phenolic resin, or the like may be used for the bobbin 141.

Figure 87:
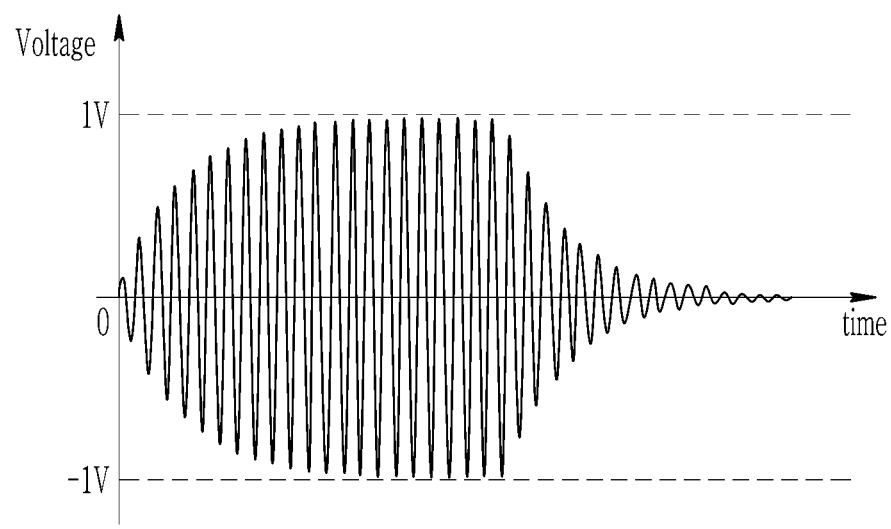
FIG. 87 and FIG. 88 illustrate graphs showing a magnitude of a resonance signal depending on a structure of an inductor portion.
Figure 88:
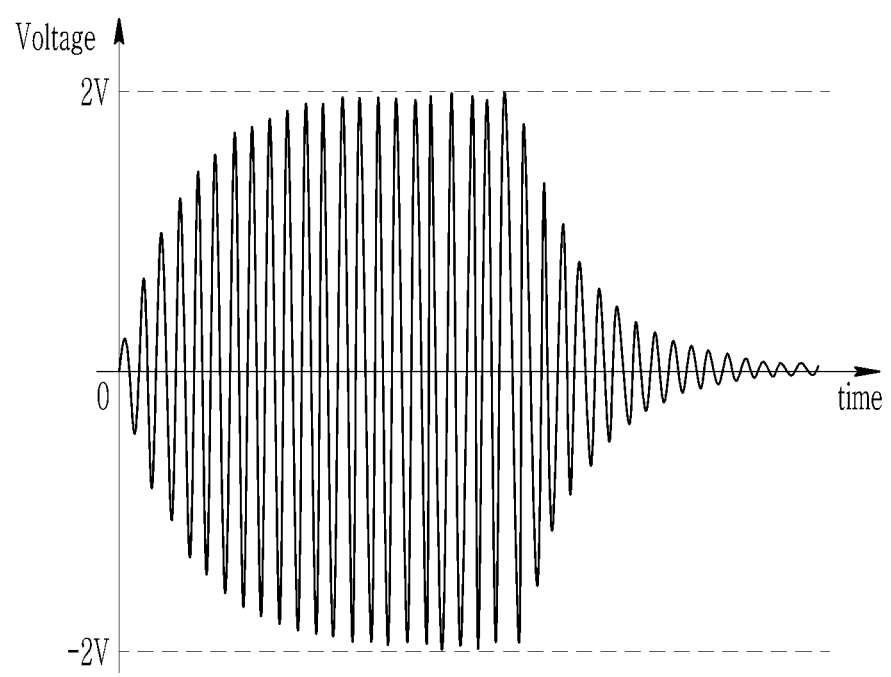

As such, when the bobbin 141 surrounds the ferrite core 115 and the bobbin 141 is wound as the coil 116, a distance between the ferrite core 115 and the coil 116 increases, so that a value of a parasitic capacitance Cp2 in FIG. 86 may be set to be smaller than a value of a parasitic capacitance Cp1 in FIG. 78. FIG. 87 and FIG. 88 illustrate graphs showing a magnitude of a resonance signal depending on a structure of an inductor portion.

Referring to FIG. 87, when the inductor portion 114 includes only the ferrite core 115 and the coil 116, a maximum amplitude of the resonance signal is measured to be about 2 V (+1 V to −1 V). Referring to FIG. 88, when the inductor portion 114 includes the ferrite core 115, the bobbin 141, and the coil 116, the maximum amplitude of the resonance signal is measured to be about 4 V (+2 V to −2 V). That is, when at least a portion of the ferrite core 115 is surrounded in the bobbin 141 and the coil 116 is wound on the bobbin 141, it is confirmed that the amplitude of the resonance signal is larger.

Meanwhile, in the case of using nickel as the ferrite core to design the optimum inductor portion according to the present embodiment, as described above, nickel has a $\frac{1}{15}$ times lower permeability than manganese, and thus the number of turns of nickel must be increased to approximately four times that of manganese to achieve the same inductance. Accordingly, the nickel must be larger in diameter than manganese to achieve the same inductance as manganese.

In the present embodiment, a method of using a plurality of inductors is proposed to achieve a high output signal while reducing a diameter of the stylus pen.

Figure 89:
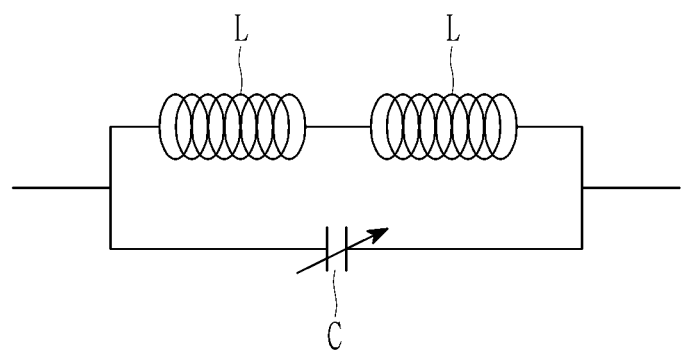
FIG. 89 and FIG. 90 illustrate other examples of the resonance circuit portion.
Figure 90:
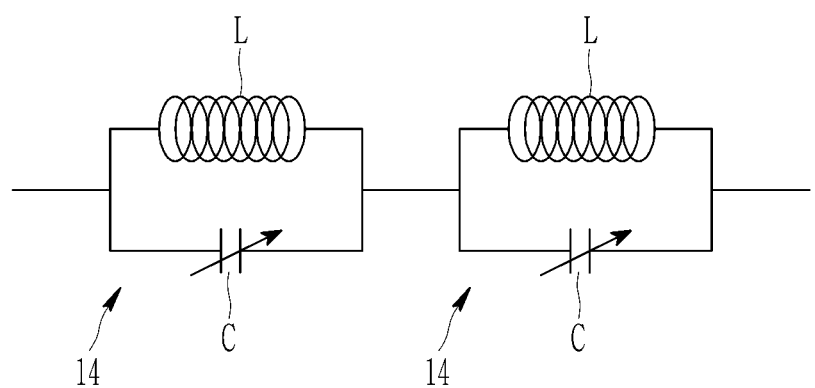

FIG. 89 and FIG. 90 illustrate other examples of the resonance circuit portion.

FIG. 89 illustrates an equivalent circuit in which two inductors of a thin diameter are connected in series and a capacitor is connected in parallel between opposite ends of the two inductors. Hereinafter, this type of resonance circuit is referred to as an 'LLC resonance circuit'. In FIG. 89, it is illustrated that two inductors are connected in series, but the embodiment is not limited thereto, and three or more inductors may be connected in series. According to the LLC resonance circuit, since the inductance L is twice as large as that of the resonance circuit having one inductor and capacitor (hereinafter, referred to as an 'LC resonance circuit'), the capacitance may be reduced to half. That is, the LLC resonance circuit may be made to be thinner than the LC resonance circuit, but is more sensitive to an influence on the capacitance.

Meanwhile, FIG. 90 illustrates an equivalent circuit in which two LC resonance circuits are connected in series (hereinafter referred to as an "LCLC resonance circuit"), where two resonance signals are combined and outputted. In FIG. 90, it is illustrated that two LC resonance circuits are connected in series, but the embodiment is not limited thereto, and three or more LC resonance circuits may be connected in series.

According to the LCLC resonance circuit, since resonance frequencies of the two resonance circuits must be the same, the resonance frequency of each resonance circuit must be tuned to be the same in a manufacturing process.

As described above, in spite of an increase in the number of windings generated by using nickel as a ferrite core, when two or more inductors are used as illustrated in FIG. 89 and FIG. 90, a stylus pen having a thin diameter may be manufactured by suppressing an increase in the diameter of the inductor portion.

Then, as illustrated in FIG. 77, a signal RS from the stylus pen 10 may be directly transferred from the conductive tip 11 to the touch electrode layer 21, or may be transferred to the touch electrode layer 21 through the air or a non-conductive housing.

Even when the stylus pen 10 is hovered, the touch controller 262 may receive the sensing signal by the resonance signal RS transferred to the touch electrode layer 21. When the touch controller 262 generates touch data depending on the sensing signal, touch data not intended by a user may be generated, or touch data that is incorrect or unstable may be generated.

A touch input by the transfer of the signal RS in the hovering state will be described with reference to FIG. 91.

Figure 91:
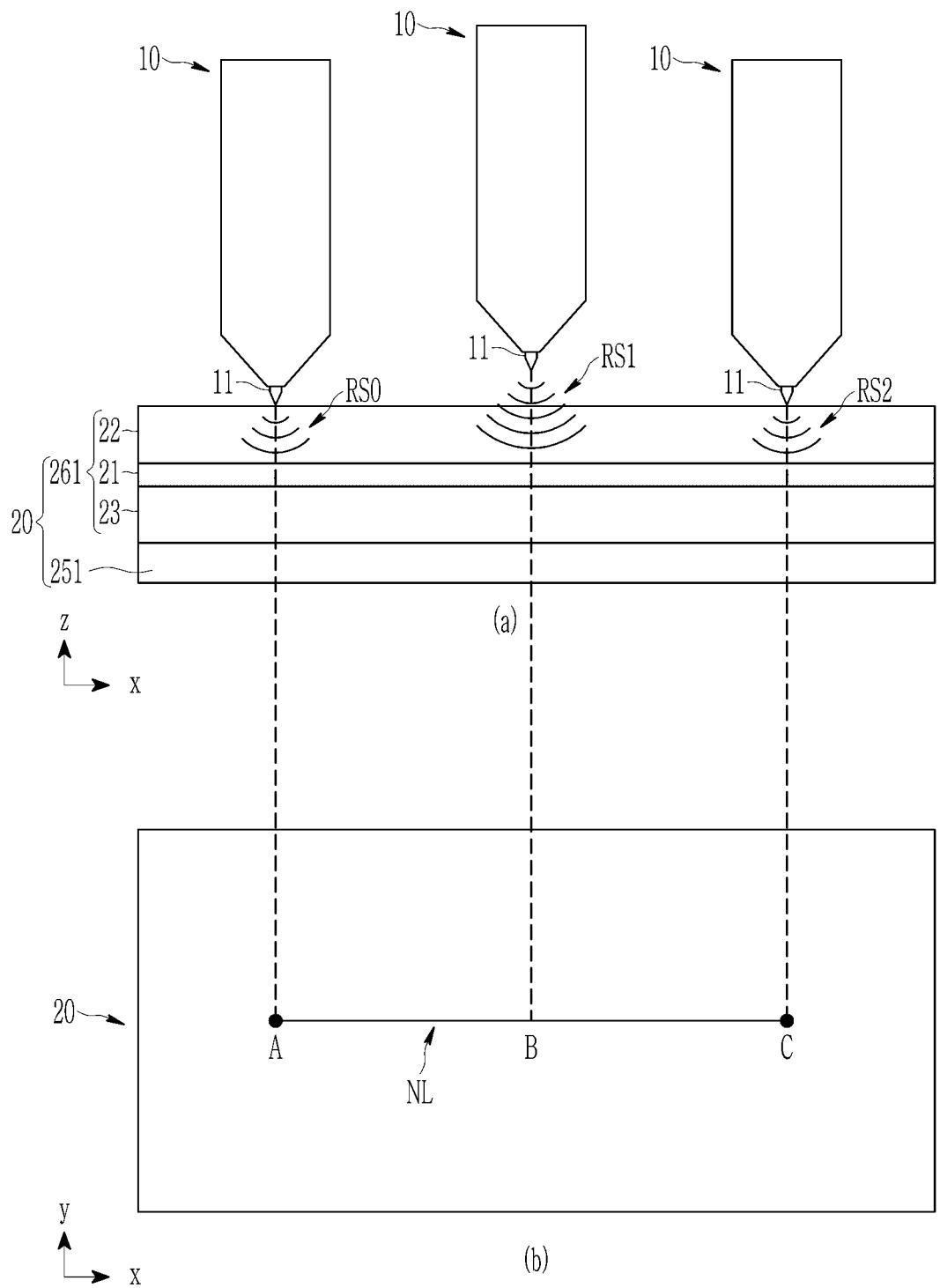
FIG. 91 illustrates a touch input by hovering a stylus pen.

FIG. 91 illustrates a touch input by hovering a stylus pen.

For example, in writing, the stylus pen 10 may move from an end point A of a previous stroke to a start point C of a next stroke in the touch screen 20 to write the previous stroke and then the next stroke.

The conductive tip 11 of the stylus pen 10 contacts the window 22 at one point (first point) A and also contacts the window 22 at another point (second point) C. Resonance signals RS0 and RS2 from the conductive tip 11 which is in contact with the window 22 may be transferred to the touch electrode layer 21. Touch data corresponding to the first point A is generated by the signal RS0, and touch data corresponding to the second point C is generated by the signal RS2.

The stylus pen 10 is spaced apart from the window 22 in a region B between the first point A and the second point B. That is, the stylus pen 10 is hovered in the area B. The signal RS0 from the conductive tip 11 of the stylus pen 10 in the hovering state may be transferred to the touch electrode layer 21. Touch data corresponding to a connection stroke NL of the area B is generated by the signal RS1. That is, when the touch controller 262 generates touch data according to the signal RS1 transferred from the hovered stylus pen 10, the touch data corresponding to the connection stroke which is not intended by a user is generated and displayed on the touch screen 20.

Embodiments provide a stylus pen that prevents signal transmission from a hovered stylus pen.

On the one hand, the user grips the stylus pen 10 and touches the touch screen 20 with the conductive tip 11. This will be described with reference to FIG. 92 to FIG. 94.

Figure 93:
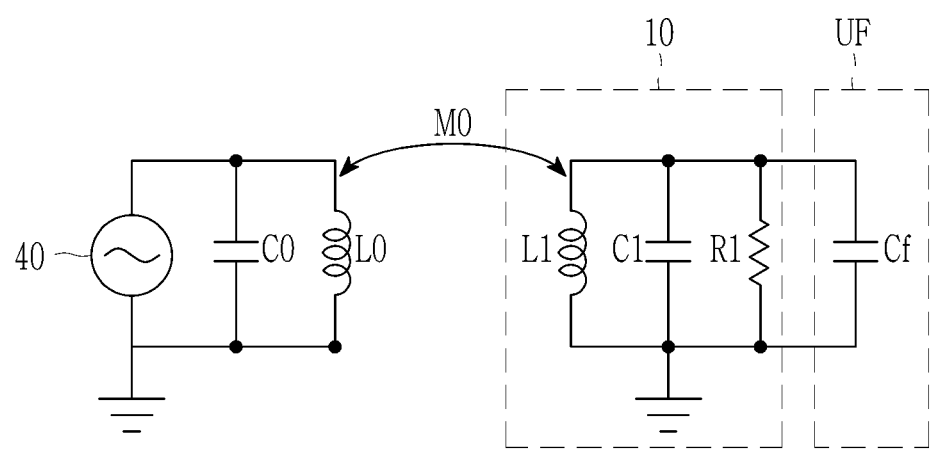
FIG. 93 and FIG. 94 each illustrate a schematic circuit diagram showing a stylus pen and an electronic device when the stylus pen is held.
Figure 94:
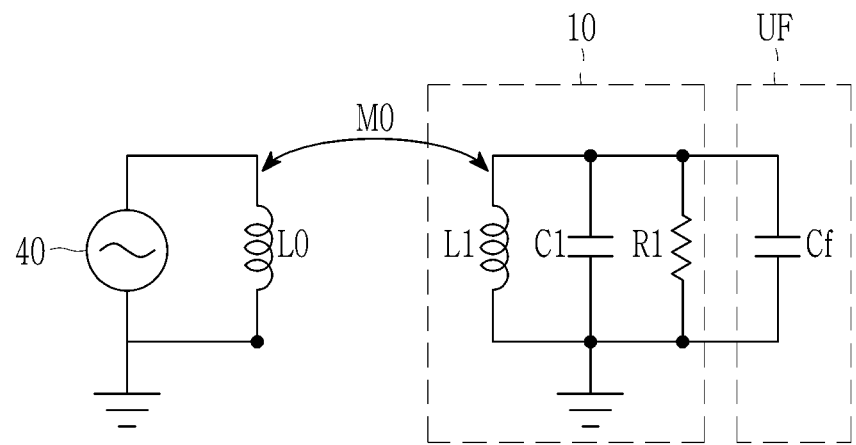

FIG. 92 illustrates a schematic view showing a stylus pen and an electronic device when the stylus pen is held, and FIG. 93 and FIG. 94 each illustrate a schematic circuit diagram showing a stylus pen and an electronic device when the stylus pen is held.

In FIG. 92, a user holds the stylus pen 10 and contacts a tip of the stylus pen 10 with the touch screen 20 to input a touch.

The stylus pen 10 may be gripped by a user's finger UF, and at this time, parasitic capacitances Cf1 and Cf2 may be formed by an internal conductor of the finger UF and the stylus pen 10 (conductors connecting the coil 16 and elements of the stylus pen 10, etc.).

FIG. 93 and FIG. 94 each illustrate an equivalent circuit showing an effect of the parasitic capacitance Cf by a user's hand. Referring to FIG. 93 and FIG. 94, a resonance frequency of the stylus pen 10 is changed by the parasitic capacitance Cf. Then, a frequency of the power source 40 for transferring the driving signal and a resonance frequency of the stylus pen 10 do not coincide, and thus a magnitude of the resonance signal of the stylus pen 10 decreases.

A stylus pen for preventing a change in resonance frequency due to a user's grip will be described with reference to FIG. 95.

Figure 95:
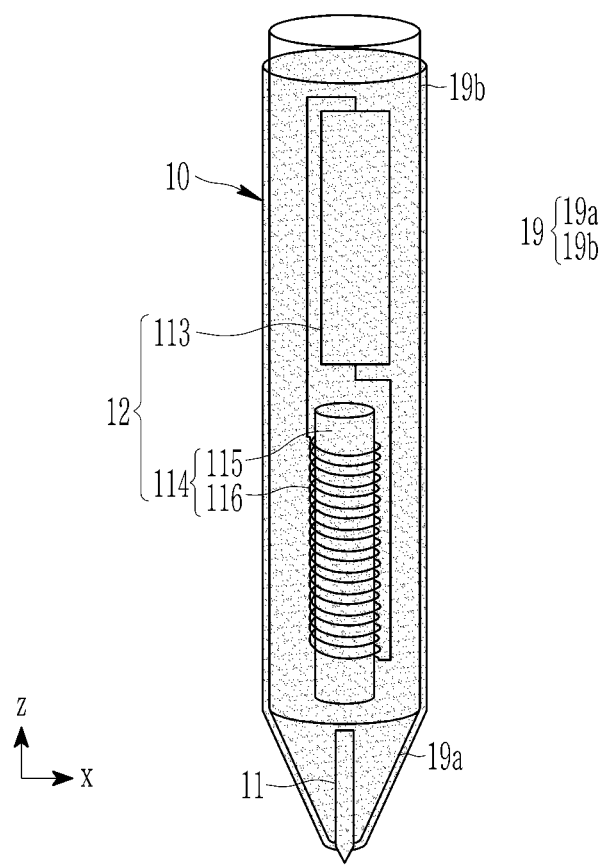
FIG. 95 illustrates a schematic view of a stylus pen.

FIG. 95 illustrates a schematic view of a stylus pen.

A stylus pen 10' illustrated in FIG. 95 further includes a blocking member 17 as compared to the stylus pen 10 of FIG. 92.

The blocking member 17, which is a conductive member that surrounds at least a portion of the housing 19 or a conductive member that is at least a portion of the housing 19, may prevent formation of parasitic capacitance by a user's hand. However, the blocking member 17 may generate an eddy current.

This will be described with reference to FIG. 96.

Figure 96:
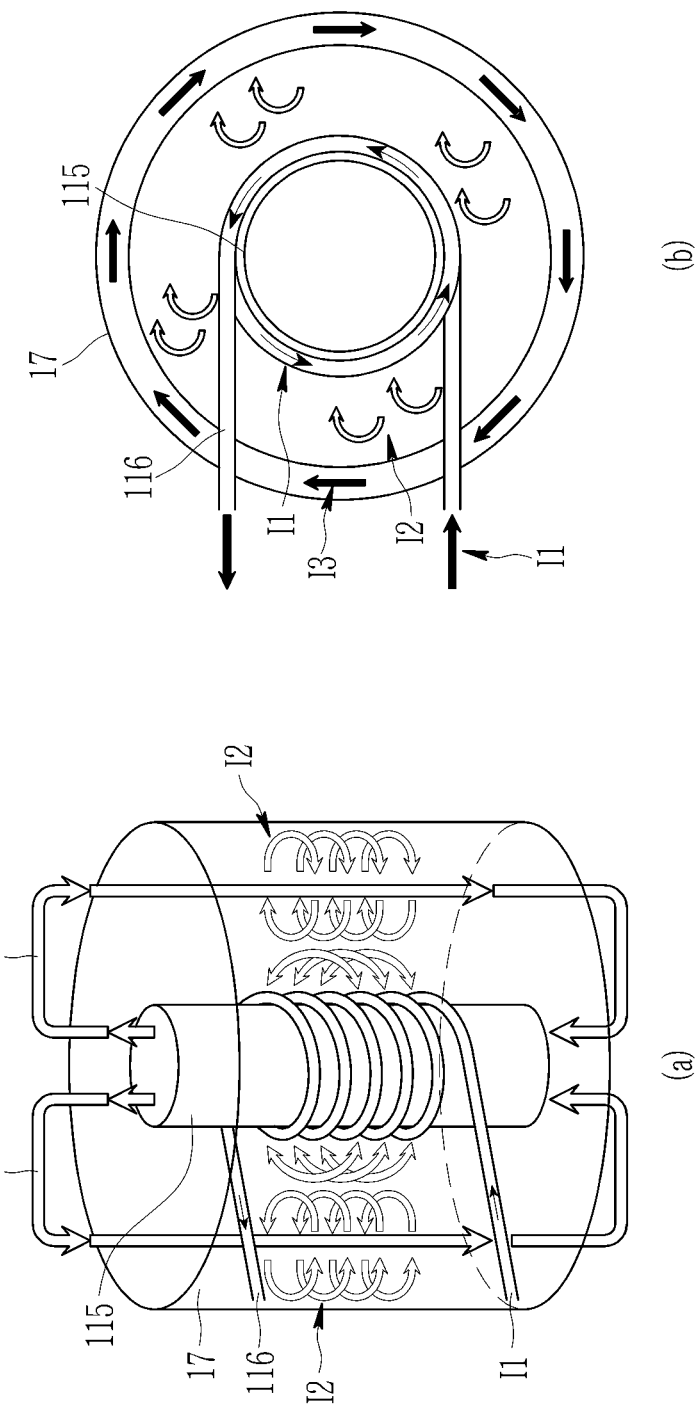
FIG. 96 illustrates an exemplary diagram showing an eddy current generated in the stylus pen illustrated in FIG. 95.

FIG. 96 illustrates an exemplary diagram showing an eddy current generated in the stylus pen illustrated in FIG. 95.

As illustrated in FIG. 96A, a current I1 flows in the coil 116 by resonance. A magnetic field M1 is formed by the current I1 flowing in the coil 116.

The magnetic field M1 generates a current I2 in a predetermined direction in the blocking member 17. The current I2 may be generated on a plane that is perpendicular to a direction of the magnetic field M1 generated by the inductor portion 140. Currents I2 are combined to generate a clockwise eddy current I3 as illustrated in FIG. 96B.

The magnetic field M1 generated in the coil 116 is suppressed by this eddy current I3. Then, the inductance of the inductor portion 114 changes, and a problem that the resonance frequency of the stylus pen 10 changes according to the change in inductance occurs.

Embodiments provide a stylus pen that further prevents a change in a resonance frequency caused by a user's grip and eddy current generation.

FIG. 97 to FIG. 105 illustrate schematic views showing a structure of a stylus pen according to embodiments.

Figure 97:
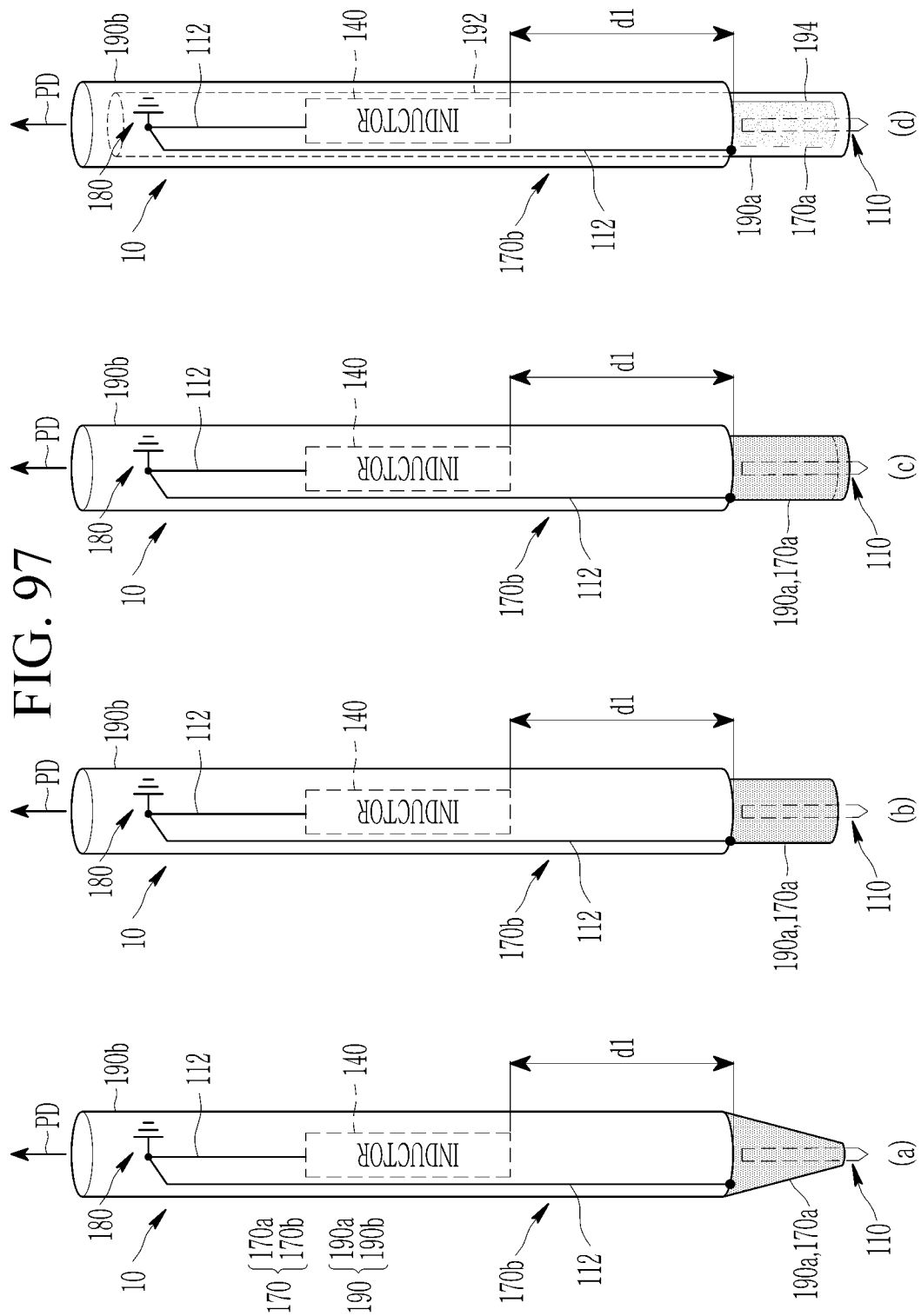
FIG. 97 to FIG. 105 illustrate schematic views showing a structure of a stylus pen according to embodiments.
Figure 98:
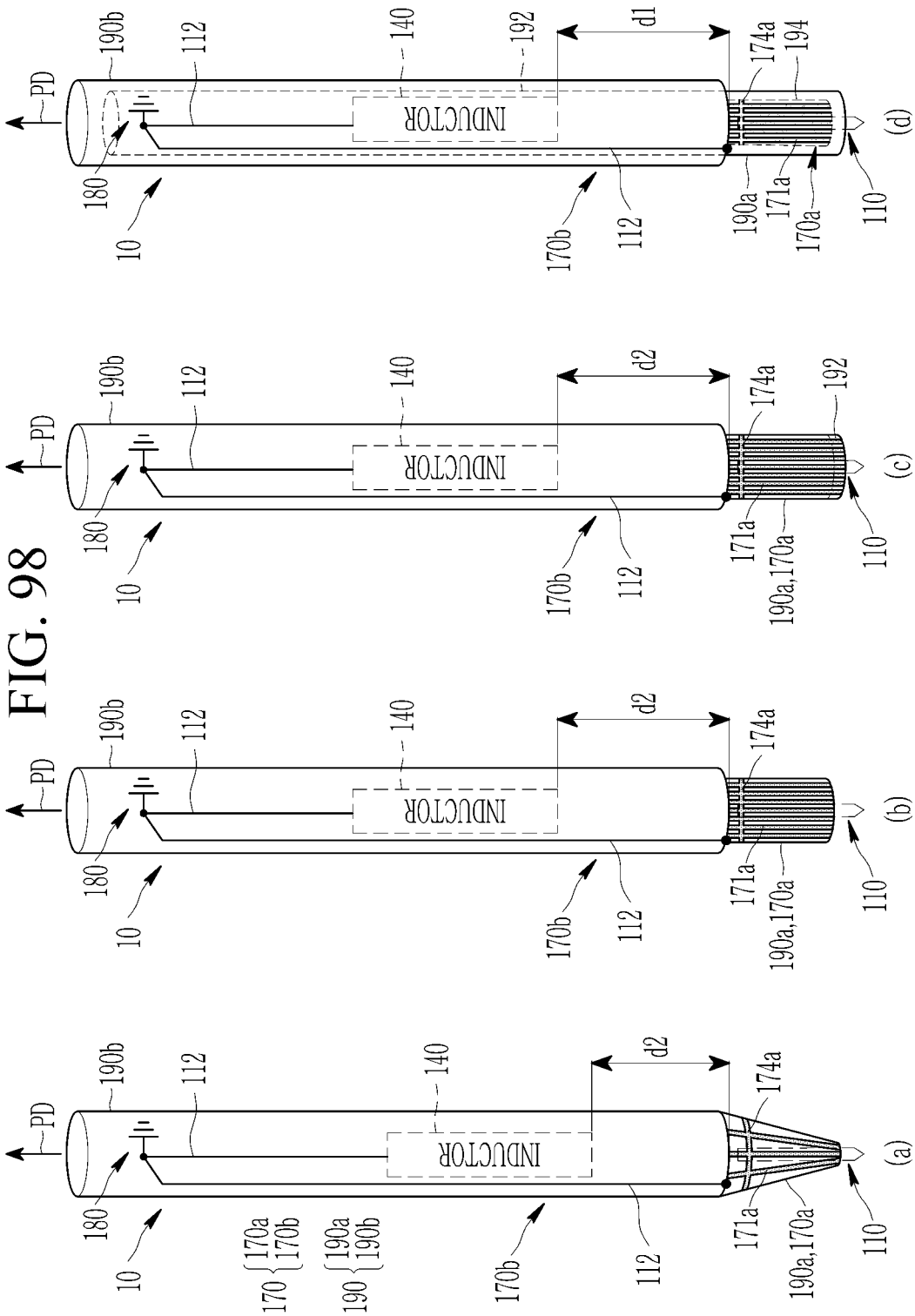
Figure 99:
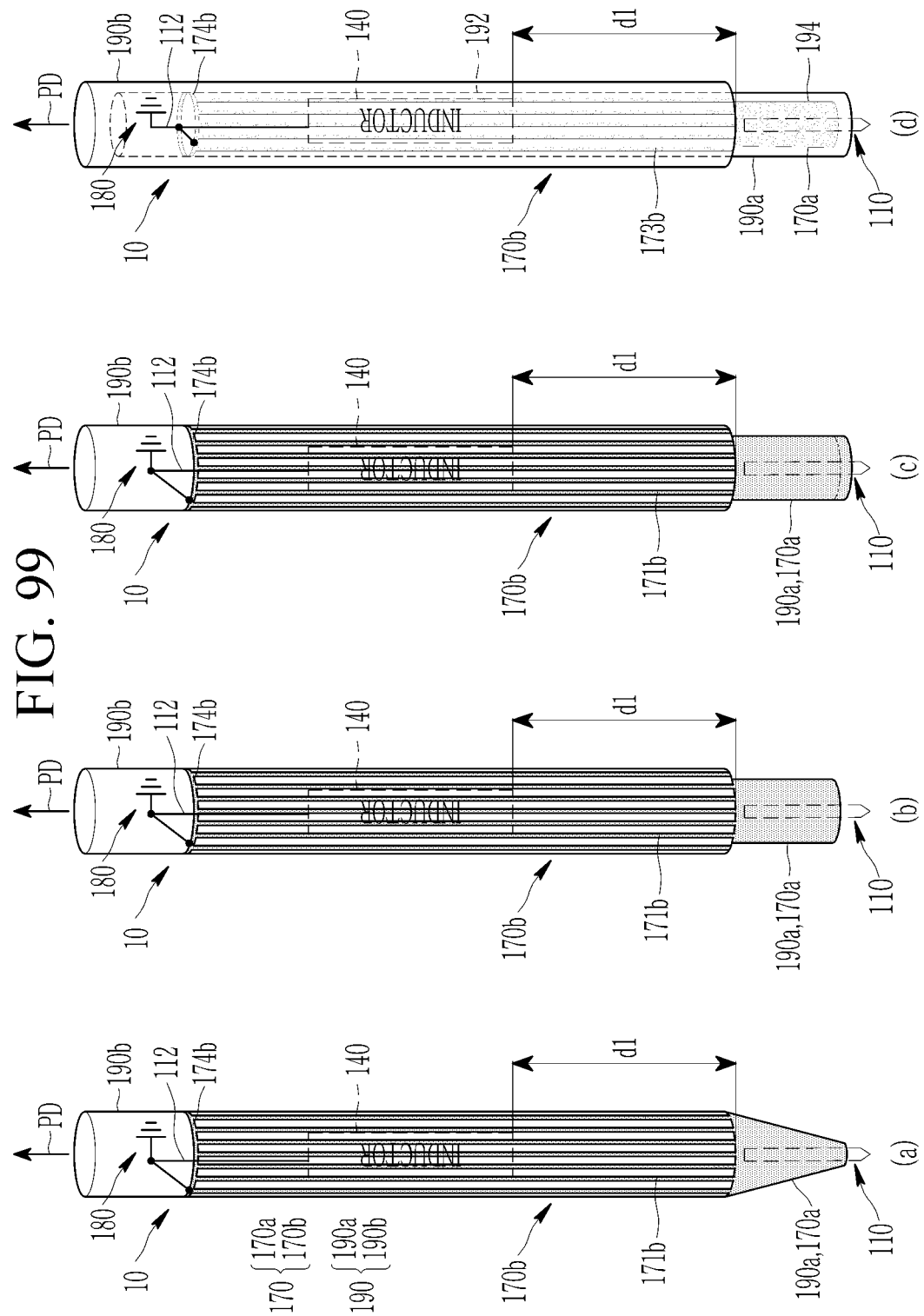
Figure 100:
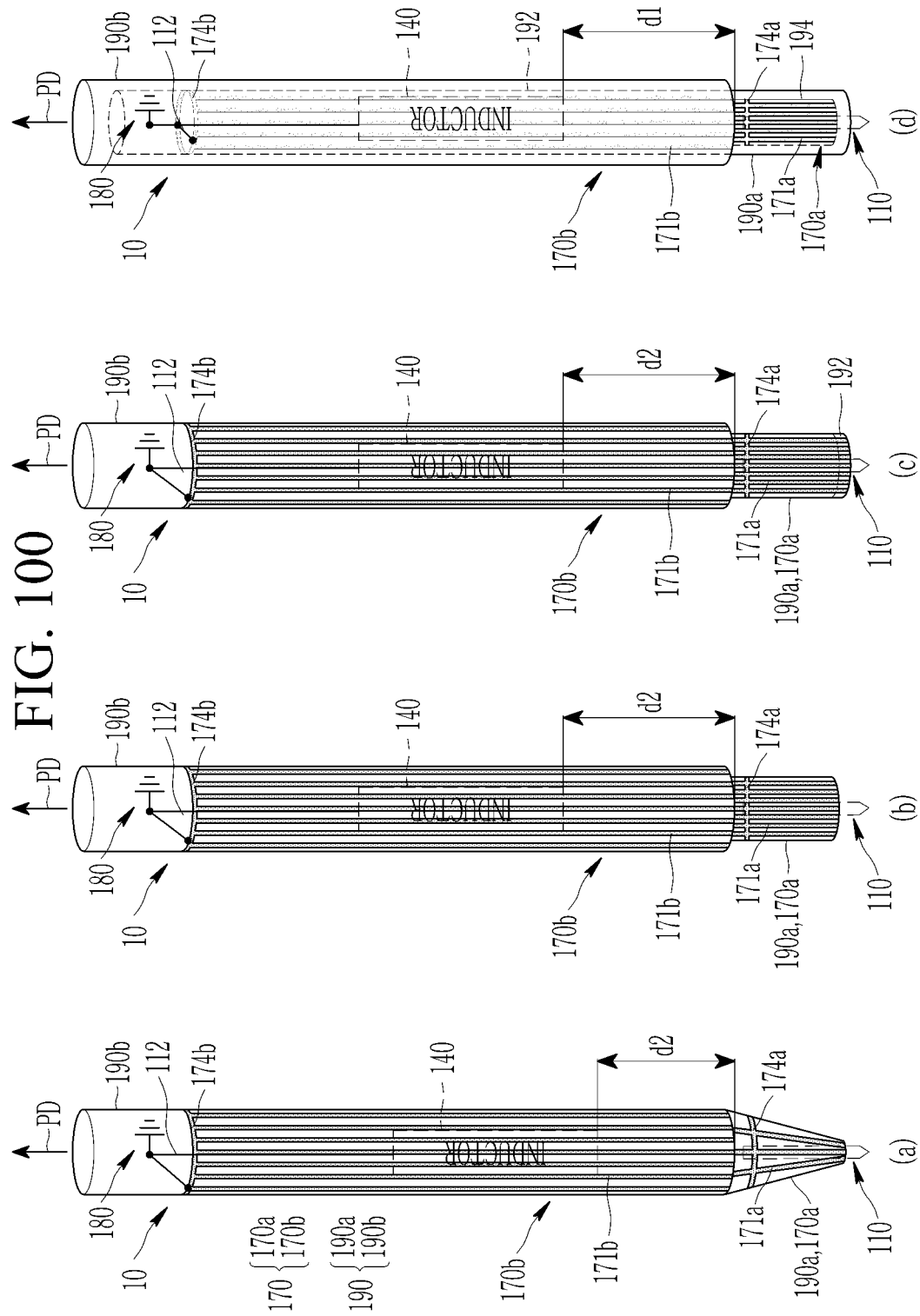
Figure 101:
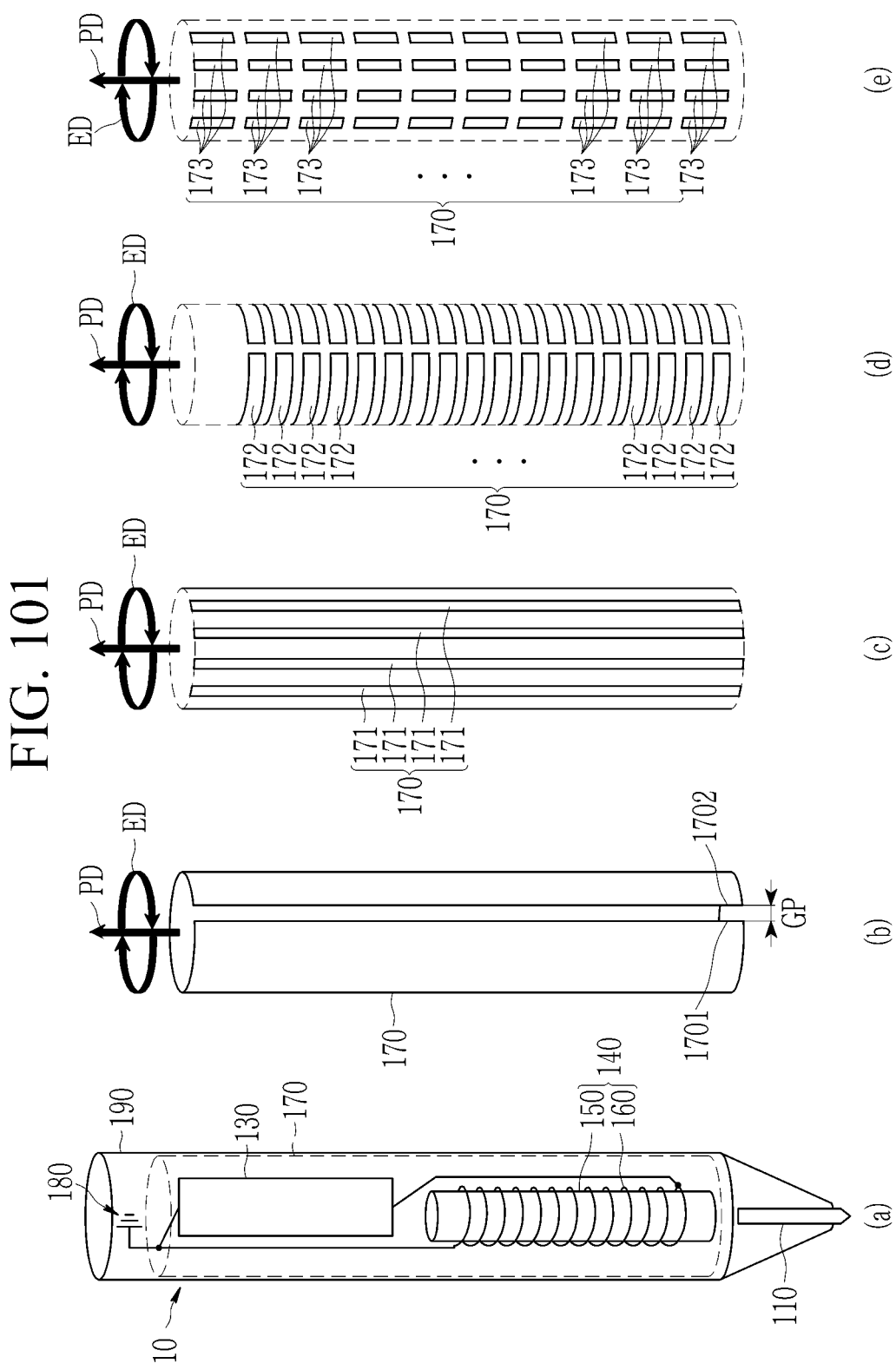
Figure 102:
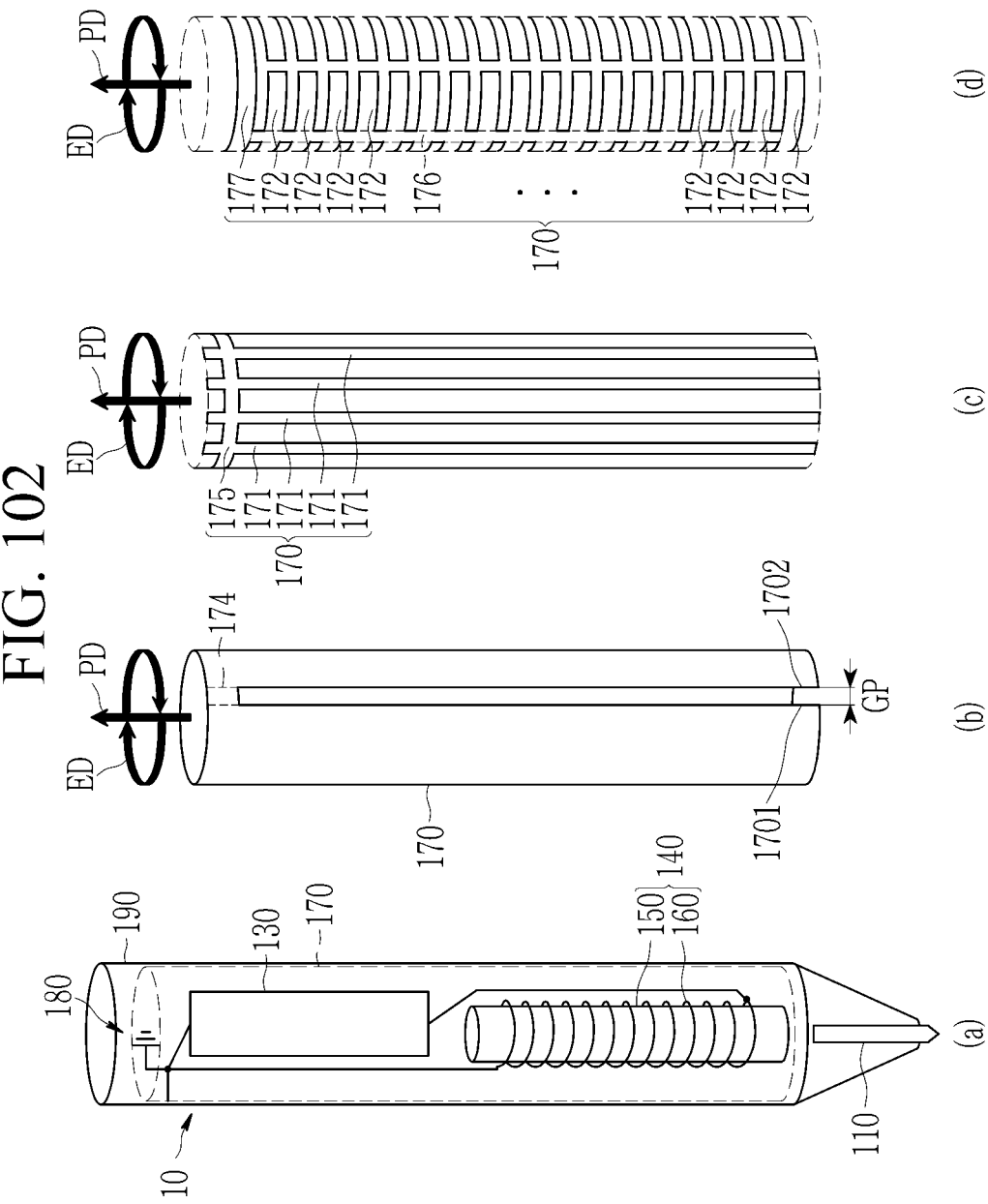
Figure 103:
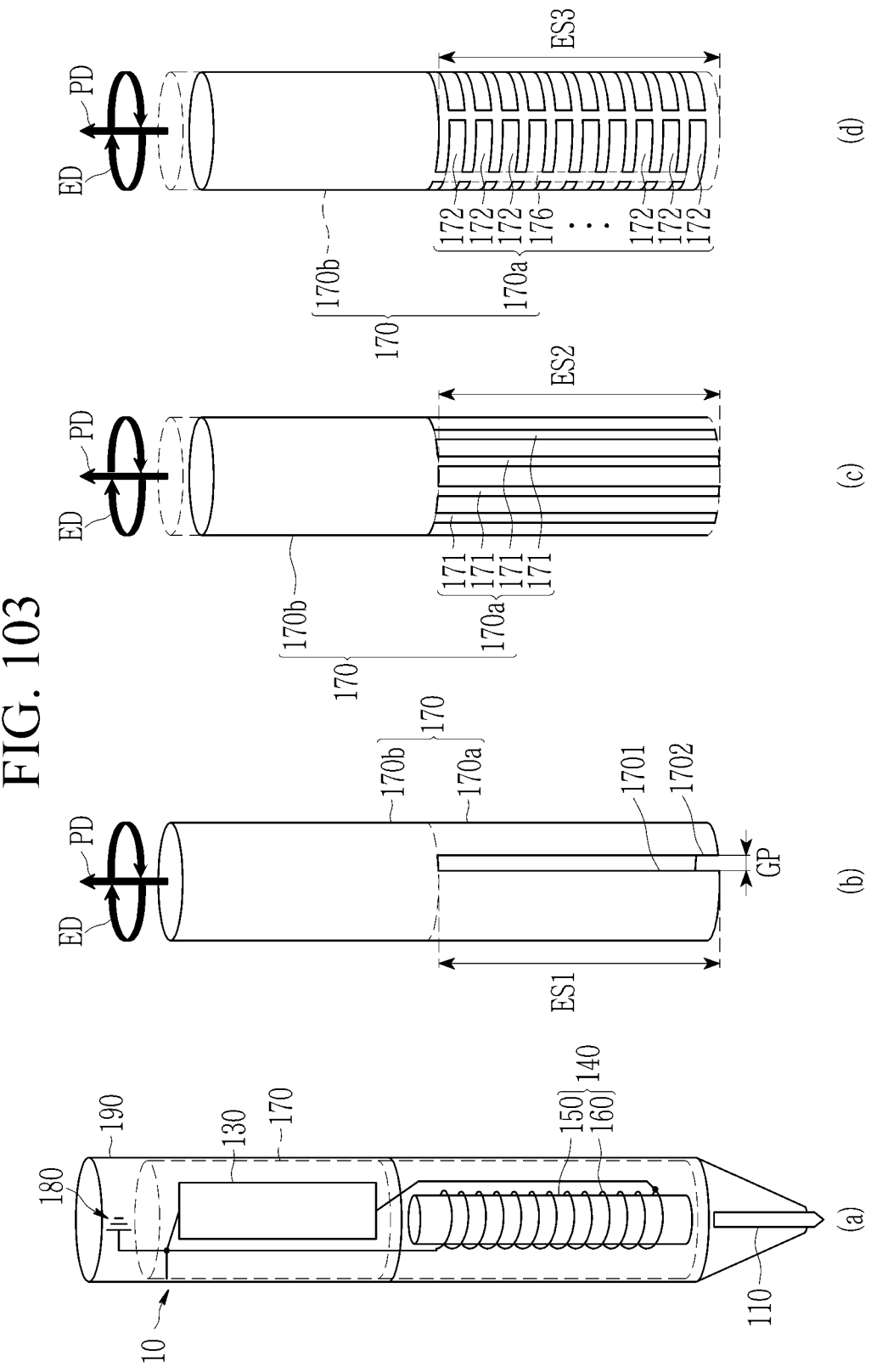
Figure 104:
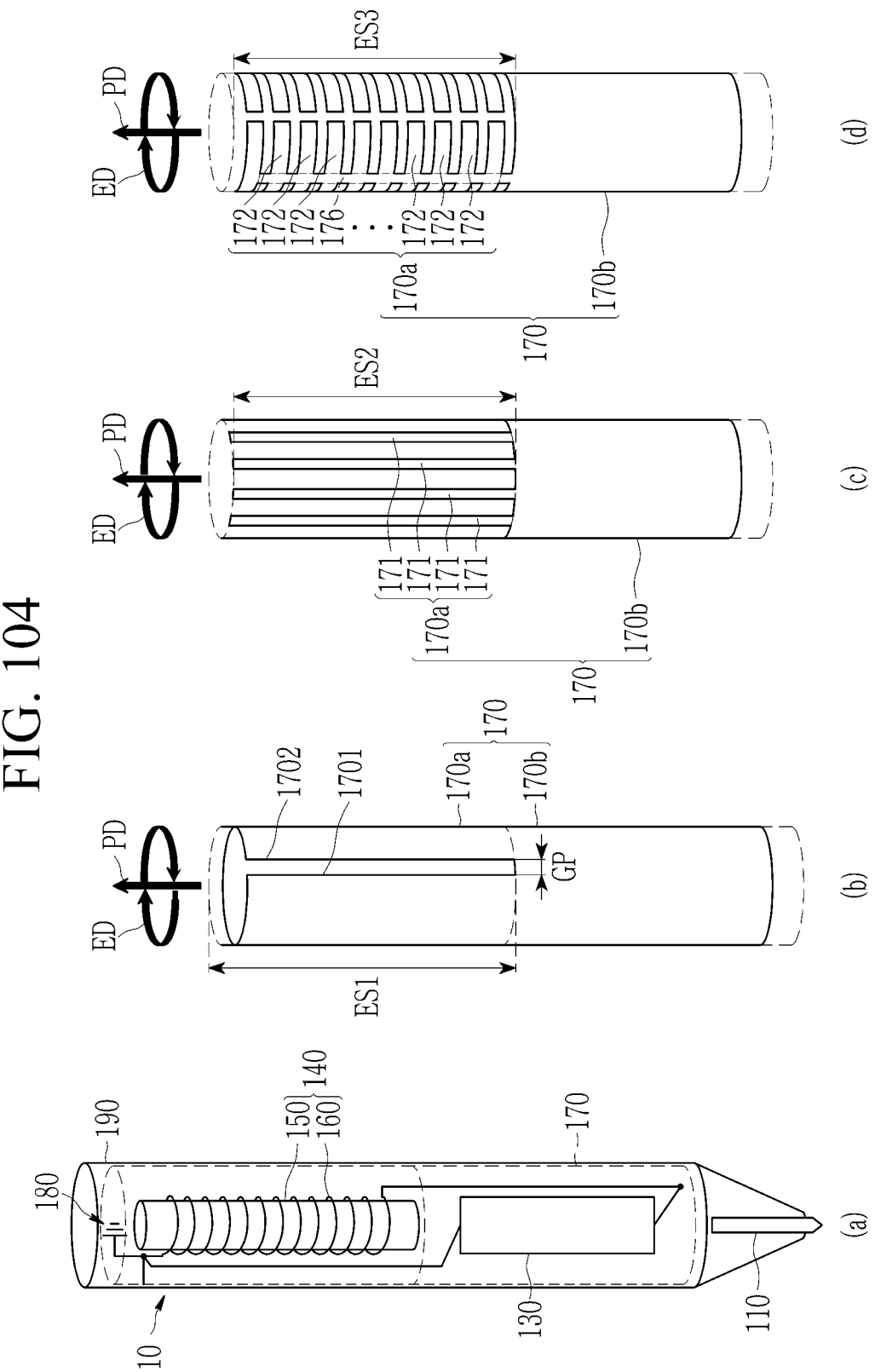
Figure 105:
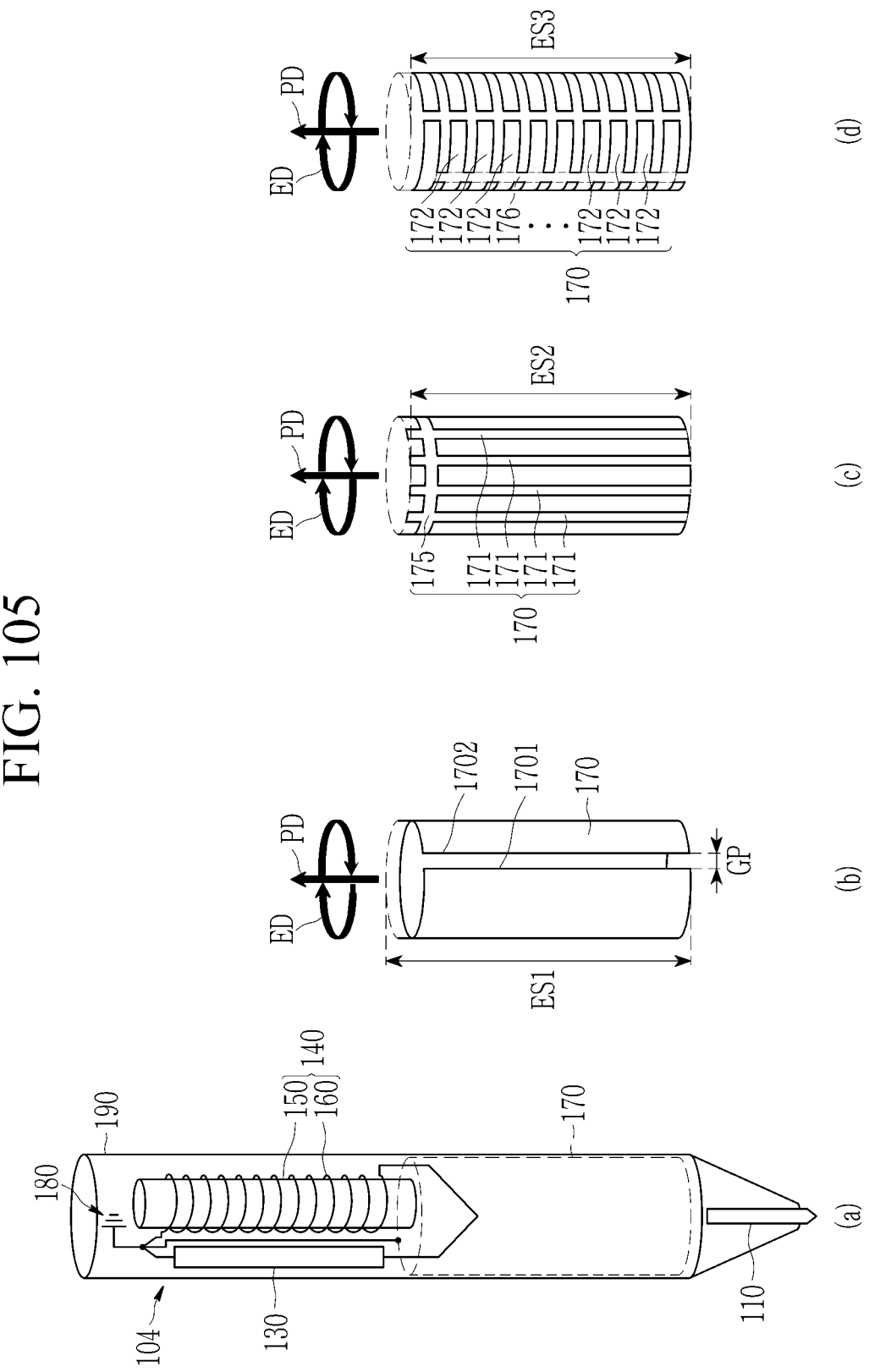

FIG. 97 illustrates a stylus pen that prevents resonance signal transmission in a hovered stylus pen, FIG. 98 illustrates a stylus pen for further preventing resonance signal transmission in a hovered stylus pen and a change in a resonance frequency due to eddy current generation, FIG. 99 and FIG. 100 illustrate a stylus pen which further prevents resonance signal transmission in a hovered stylus pen and a change in a resonance frequency due to user gripping and eddy current generation, and FIG. 101 and FIG. 105 illustrate a stylus pen which further prevents a change in a resonance frequency due to user gripping and eddy current generation.

The stylus pen 10 of FIG. 97 to FIG. 105 may include a conductive tip 110, a resonance circuit portion, a blocking member 170, a ground portion 180, and a housing 190. For convenience of description, although only the inductor portion 140 of the resonance circuit portion is illustrated in FIG. 97 to FIG. 100, the resonance circuit portion may include a capacitor portion, and the capacitor portion may be positioned inside the housing 190.

By referring to FIG. 97 to FIG. 105, all or part of the conductive tip 11 may be formed of a conductive material (e.g., a metal), or the conductive tip 11 may have a form in which a portion of the conductive tip 11 is exposed to an outside of a non-conductive housing while being present inside the non-conductive housing, but it is not limited thereto.

The capacitor portion (not illustrated) and the inductor portion 140 are positioned in the housing 190. The capacitor portion (not illustrated) may include a plurality of capacitors connected in parallel. The capacitors may have different capacitances, and may be adjusted in a manufacturing process. The inductor portion 140 may be positioned to be spaced apart from the conductive tip 110 by a first distance d1.

The housing 190 may accommodate elements of the stylus pen 10. Since the housing 190 is empty inside, the housing 190 may accommodate the conductive tip 110, the resonance circuit portion 12, and the ground portion 180 therein. The housing 190 may be made of a non-conductive material.

The housing 190 includes a holder portion 190a adjacent to the conductive tip 110 and a body portion 190b spaced apart from the conductive tip 110. The holder portion 190a and the body portion 190b may be integrally formed. Although the holder portion 190a and the body portion 190b are illustrated as being integrally coupled, the holder portion 190a and the body portion 190b may be separated.

The holder portion 190a may be in a form of a horn of FIG. 97A or a pillar of FIG. 97B. Alternatively, the holder portion 190a may have a pillar shape to which a dome 192 of FIG. 97C is coupled. Alternatively, the holder portion 190a may be in a form of a pipe of FIG. 97D.

The body portion 190b may have a cylindrical shape, a polygonal shape, a column shape having at least part of a shape of a curved surface, an entasis, a frustum of a pyramid, a circular truncated cone, or the like, but it is not limited thereto.

A blocking member 170a may be positioned to correspond to a portion of the housing in which the conductive tip 110 is exposed to the outside. For example, the blocking member 170a may be positioned within 0 mm to 20 mm from an opening of the holder portion 190a in which the conductive tip 110 is exposed to the outside. Specifically, the blocking member 170a may be positioned between the opening of the holder portion 190a and the portion spaced 20 mm from an opening of the holder portion 190a. In addition, the blocking member 170a may be disposed between a portion spaced 0.1 mm or more from the opening of the holder portion 190a and a portion spaced 10 mm from the opening of the holder portion 190a, or may be disposed between a portion spaced at least 1 mm from the opening of the holder portion 190a and a portion spaced 5 mm from the opening of the holder portion 190a. That is, the blocking member 170a may be positioned in an area that is adjacent to at least 25 mm from a portion of the housing in which the conductive tip 110 is exposed to the outside.

The blocking member 170a may be a conductive member surrounding at least a portion of the holder portion 190a. The blocking member 170a may be a conductive member that is at least part of the holder portion 190a. The blocking member 170a may be connected to the ground portion 180 through the conductive connection member 112. The blocking member 170a is electrically connected to the ground portion 180 to be grounded.

The blocking member 170a may be positioned inside or outside the holder portion 190a. Although the conductive tip 110 is illustrated in FIG. 97 as being disposed inside the holder portion 190a, when the conductive tip 110 extends into the body portion 190b, the blocking member 170a may also be disposed inside or outside the body portion 190b.

In addition, the blocking member 170a may surround at least a portion of the capacitor portion and the inductor portion 140 according to positions of the capacitor portion and the inductor portion 140. For example, when the capacitor portion and the inductor portion 140 are positioned inside the holder portion 190a, the blocking member 170a may surround at least a portion of the capacitor portion and the inductor portion 140.

As illustrated in FIG. 97, the blocking member 170a may have a form of one conductive plate when the inductor portion 140 is spaced apart from the blocking member 170a by a predetermined distance or more. In addition, the blocking member 170a may be a conductive coil inside the holder portion 190a. For example, the blocking member 170a may be a conductive coil wound while being in contact with the inside of the holder portion 190a.

The blocking member 170a is spaced apart from a ferrite core of the inductor portion 140 along a direction PD by a first distance d1. Even when the blocking member 170a is not formed of a plurality of blocking units, an influence of the magnetic field generated by the ferrite core of the inductor portion 140 is small.

In FIG. 97A, the blocking member 170a may have a form surrounding at least a portion of a side surface of the holder portion 190a having a horn shape. For example, the blocking member 170a may have a shape surrounding only a portion of the side surface of the horn-shaped holder portion 190a, which is adjacent to the tip 110.

In FIG. 97B, the blocking member 170a may have a form surrounding at least a portion of a side surface of the holder portion 190a having a pillar shape. For example, the blocking member 170a may have a shape surrounding only a portion of the side surface of the pillar-shaped holder portion 190a, which is adjacent to the tip 110.

In FIG. 97C, the blocking member 170a may have a form surrounding at least a portion of the side surface of the pillar-shaped holder portion 190a and an outer surface of the dome 192. For example, the blocking member 170a may have a shape surrounding only portions of the side surface of the pillar holder portion 190a and an outer surface of the dome 192, which are adjacent to the tip 110.

In FIG. 97D, the blocking member 170a may have a form surrounding at least a portion of an inner surface of the holder portion 190a having a pipe-shaped shape. For example, the blocking member 170a may have a shape surrounding only a portion of the inner surface of the pipe-shaped holder portion 190a, which is adjacent to the tip 110.

As illustrated in FIG. 98, when the inductor portion 140 is spaced apart from the blocking member 170a by less than or equal to a second distance d2, which is shorter than the first distance d1, the blocking member 170a may include a plurality of first blocking units 171a. For example, the blocking member 170a may include a plurality of blocking units 171a spaced apart from each other while forming a closed loop in a circumferential direction of the holder portion 190a.

The first blocking units 171a extend in the direction PD that is perpendicular to the eddy current, that is, in a direction that is parallel to an axial direction PD of the ferrite core in the inductor portion 140, and are spaced apart from each other in a direction ED of the eddy current. The first blocking units 171a may be spaced apart from each other at an interval of 0.03 mm or more along the direction ED of the eddy current. Since the blocking member 170a includes the first blocking units 171a spaced apart from each other along the direction ED of the eddy current, no eddy current can flow along the blocking member 170a, thereby blocking the generation of the eddy current. Although the first blocking units 171a have been described as extending along the direction PD that is perpendicular to the eddy current, the first blocking units 171a may extend along the direction inclined at a predetermined angle (more than 0 degrees and less than 90 degrees) to the direction PD.

The first blocking units 171a are electrically connected to each other through a connector 174a. In addition, the connector 174a may be electrically connected to the ground portion 180. That is, the first blocking units 171a may be connected to the ground portion 180 through the conductive connection member 112. The blocking member 170a is electrically connected to the ground portion 180 to be grounded.

In FIG. 98A, the blocking member 170a may have a form surrounding at least a portion of a side surface of the holder portion 190a having a horn shape. For example, the blocking member 170a may have a shape surrounding only a portion of the side surface of the horn-shaped holder portion 190a, which is adjacent to the tip 110.

In FIG. 98B, the blocking member 170a may have a form surrounding at least a portion of a side surface of the holder portion 190a having a pillar shape. For example, the blocking member 170a may have a shape surrounding only a portion of the side surface of the pillar-shaped holder portion 190a, which is adjacent to the tip 110.

In FIG. 98C, the blocking member 170a may have a form surrounding at least a portion of the side surface of the pillar-shaped holder portions 190a and an outer surface of the dome 192. For example, the blocking member 170a may have a shape surrounding only portions of the side surface of the pillar holder portion 190a and an outer surface of the dome 192, which are adjacent to the tip 110.

In FIG. 98D, the blocking member 170a may have a form surrounding at least a portion of an inner surface of the holder portion 190a having a pipe-shaped shape. For example, the blocking member 170a may have a shape surrounding only a portion of the inner surface of the pipe-shaped holder portion 190a, which is adjacent to the tip 110.

The stylus pen 10 illustrated in FIG. 99 further includes a blocking member 170b as compared to the stylus pen 10 illustrated in FIG. 97. The stylus pen 10 illustrated in FIG. 100 further includes a blocking member 170b as compared to the stylus pen 10 illustrated in FIG. 26. The blocking member 170b includes a conductive member surrounding the inductor portion 140. The blocking member 170b may include a plurality of first blocking units 171b. For example, the blocking member 170b may include a plurality of blocking units 171b spaced apart from each other while forming a closed loop in a circumferential direction of the body portion 190b.

The blocking member 170b may be positioned inside or outside the body portion 190b to surround at least a portion of the inductor 140. Although the inductor portion 140 is illustrated in FIG. 99 as being disposed inside the body portion 190b, when the inductor portion 140 extends into the holder portion 190a, the blocking member 170b may be positioned inside or outside the holder portion 190a.

The first blocking units 171b extend in the direction PD that is perpendicular to the eddy current, that is, in a direction that is parallel to an axial direction PD of the ferrite core in the inductor portion 140, and are spaced apart from each other in a direction ED of the eddy current. Since the blocking member 170*b* includes the first blocking units 171*b* spaced apart from each other along the direction ED of the eddy current, no eddy current can flow along the blocking member 170*b*, thereby blocking the generation of the eddy current. Although the first blocking units 171*b* have been described as extending along the direction PD that is perpendicular to the eddy current, the first blocking units 171*b* may extend along the direction inclined at a predetermined angle (more than 0 degrees and less than 90 degrees) to the direction PD.

The blocking member 170*a* and the blocking member 170*b* may be electrically connected to each other. For example, the blocking member 170*a* and the first blocking units 171*b* are electrically connected at a boundary between the holder portion 190*a* and the body portion 190*b*. The first blocking units 171*b* are electrically connected to each other through a connector 174*b*. The connector 174*b* may be electrically connected to the ground portion 180. That is, the first blocking units 171*b* may be connected to the ground portion 180 through the conductive connection member 112. Both the blocking member 170*a* and the blocking member 170*b* are electrically connected to the ground unit 180 to be grounded.

Referring to FIG. 101A, the stylus pen 10 includes a conductive tip 110, a conductive connection member 120, a capacitor portion 130, an inductor portion 140, a blocking member 170, a ground portion 180, and a housing 190.

The blocking member 170 includes a conductive member surrounding the capacitor portion 130 and the inductor portion 140. The blocking member 170 may be connected to the ground portion 180.

In addition, opposite ends of the blocking member 170 are spaced apart along the direction ED of the eddy current. In this regard, FIG. 101B to FIG. 101E illustrate the blocking member 170 in detail.

Referring to FIG. 101B, the blocking member 170 includes one slit GP for blocking generation of an eddy current. The slit GP extends along the direction PD that is perpendicular to the eddy current. Opposite ends 1701 and 1702 of the blocking member 170 are spaced apart by the slit GP. In embodiments, the slit GP may have a width of 0.03 mm or more along the direction ED of the eddy current.

Although the slit GP has been described as extending along the direction PD that is perpendicular to the eddy current, the slit GP may extend along a direction that is inclined at a predetermined angle (more than 0 degrees and less than 90 degrees) with respect to the direction PD.

The opposite ends 1701 and 1702 of the blocking member 170 are spaced apart along the direction ED of the eddy current. Accordingly, since the eddy current cannot flow along the blocking member 170, generation of the eddy current is interrupted.

Referring to FIG. 101C, the blocking member 170 includes a plurality of first blocking portions 171. The first blocking portions 171 extend along the direction PD that is perpendicular to the eddy current, and are spaced apart from each other along the direction ED of the eddy current. Similarly, since the blocking member 170 includes the plurality of first blocking portions 171 spaced apart from each other along the direction ED of the eddy current, no eddy current can flow along the blocking member 170, thereby blocking the generation of the eddy current. Although the first blocking portions 171 have been described as extending along the direction PD that is perpendicular to the eddy current, the first blocking portions 171 may extend along the direction that is inclined at a predetermined angle (more than 0 degrees and less than 90 degrees) with respect to the direction PD.

Referring to FIG. 101D, the blocking member 170 includes a plurality of second blocking portions 172. The second blocking portions 172 are spaced apart along the direction PD that is perpendicular to the eddy current, and opposite ends of each of the second blocking portions 172 are spaced apart from each other along the direction ED of the eddy current. Similarly, since the opposite ends of each of the second blocking portions 172 included in the blocking member 170 are spaced along the direction ED of the eddy current, no eddy current can flow along the blocking member 170, thereby blocking the generation of the eddy current.

Referring to FIG. 101E, the blocking member 170 includes a plurality of third blocking portions 173. The third blocking portions 173 are spaced apart from each other along the direction PD that is perpendicular to the eddy current and the direction ED of the eddy current. Similarly, since the third blocking portions 173 included in the blocking member 170 are spaced along the direction ED of the eddy current, no eddy current can flow along the blocking member 170, thereby blocking the generation of the eddy current.

The housing 190 may include a form in which a horn portion and a pillar portion are combined. The housing 190 is illustrated in a form in which the horn portion and the pillar portion are integrally combined, but the two portions may be separated. The pillar portion may have a circular cylindrical shape, a polygonal shape, a column shape having at least part of a shape of a curved surface, an entasis shape, a frustum of a pyramid shape, a truncated circular cone shape, or the like, but it is not limited thereto The housing 190 may be made of a non-conductive material.

The blocking member 170 may be disposed on an inner surface, an outer surface, or an inner surface of the housing 190, which will be described later with reference to FIG. 109 to FIG. 111.

Next, referring to FIG. 102A, the stylus pen 10 has a difference in that the blocking member 170 is connected to the ground portion 180 compared with the stylus pen 10 of FIG. 7A. In addition, the blocking member 170 and the ground portion 180 may be connected at a position that is spaced apart from the inductor portion 140.

In this regard, FIG. 102B to FIG. 102D illustrate the blocking member 170 connected to the ground portion 180 in detail.

Referring to FIG. 102A, the blocking member 170 includes one slit GP for blocking generation of an eddy current and a connector 174 for connecting opposite ends 1701 and 1702 of the blocking member 170. The slit GP extends along the direction PD that is perpendicular to the eddy current. Opposite ends 1701 and 1702 of the blocking member 170 are spaced apart by the slit GP. The opposite ends 1701 and 1702 of the blocking member 170 are spaced apart along the direction ED of the eddy current.

The connector 174 may connect the opposite ends 1701 and 1702 of the blocking member 170 at a position that is spaced apart from the inductor portion 140 along a direction PD that is perpendicular to the eddy current. The blocking member 170 may be connected to the ground portion 180 at a position of the connector 174.

Referring to FIG. 102C, the blocking member 170 includes a plurality of first blocking portions 171 and a first connector 175 connecting the first blocking portions 171 to each other.

The first blocking portions 171 extend along the direction PD that is perpendicular to the eddy current, and are spaced apart from each other along the direction ED of the eddy current.

The first connector 175 may connect the first blocking portions 171 at a position that is spaced apart from the inductor portion 140 along the direction PD that is perpendicular to the eddy current. The blocking member 170 may be connected to the ground portion 180 at a position of the connector 175.

Referring to FIG. 102D the blocking member 170 includes a plurality of second blocking portions 172, a second connector 176 connecting the second blocking portions 172 to each other, and an additional ground portion 177.

The second blocking portions 172 are spaced apart along the direction PD that is perpendicular to the eddy current, and opposite ends of each of the second blocking portions 172 are spaced apart from each other along the direction ED of the eddy current.

The second connector 176 may extend from the inductor portion 140 along the direction PD that is perpendicular to the eddy current, and may connect a plurality of second blocking portions 172 and the additional ground portion 177.

The additional ground portion 177 may be connected to the ground portion 180. In addition, the blocking member 177 and the ground portion 180 may be connected at a position that is spaced apart from the inductor portion 140.

Next, referring to FIG. 103A, the stylus pen 10 has a difference in that the blocking member 170 includes a first blocking member 170a disposed to correspond to the inductor portion 140 and a second blocking member 170b connected to the ground portion 180 compared with the stylus pen 10 of FIG. 8A.

The first blocking member 170a may extend beyond a length CL of a ferrite core 150 of the inductor portion 140 along the direction PD that is perpendicular to the eddy current. The second blocking member 170b is connected to the first blocking member 170a.

In this regard, FIG. 103B to FIG. 103D illustrate the blocking member 170 including the first blocking member 170a and the second blocking member 170b in detail.

Referring to FIG. 103B, the first blocking member 170a includes one slit GP for blocking generation of the eddy current. The slit GP extends to a lower end of the second blocking member 170b along the direction PD that is perpendicular to the eddy current. A length ES1 of the first blocking member 170a may be greater than or equal to the length CL of the ferrite core 150 of the inductor portion 140. A length of the slit GP also corresponds to the length ES1 of the first blocking member 170a.

The opposite ends 1701 and 1702 of the first blocking member 170a are spaced apart by the slit GP. The opposite ends 1701 and 1702 of the first blocking member 170a are spaced apart along the direction ED of the eddy current. Accordingly, since the eddy current cannot flow along the first blocking member 170a, generation of the eddy current is interrupted.

The second blocking member 170b is coupled to an upper end of the first blocking member 170a. The second blocking member 170b may be connected to the ground portion 180. The second blocking member 170b is spaced apart from the ferrite core 150 of the inductor portion 140 along the direction PD. Thus, even when a slit is not formed in the second blocking member 170b, an influence of a magnetic field generated by the ferrite core 150 is small.

Referring to FIG. 103C, the blocking member 170a includes a plurality of first blocking portions 171. The first blocking portions 171 extend along the direction PD that is perpendicular to the eddy current, and are spaced apart from each other along the direction ED of the eddy current. A length ES2 of the first blocking member 170a may be greater than or equal to the length CL of the ferrite core 150 of the inductor portion 140. A length of the first blocking portions 171 also corresponds to the length ES2 of the first blocking member 170a. Accordingly, since the eddy current cannot flow along the first blocking member 170a, generation of the eddy current is interrupted.

The second blocking member 170b is coupled to an upper end of the first blocking member 170a. The second blocking member 170b may be connected to the ground portion 180. The second blocking member 170b is spaced apart from the ferrite core 150 of the inductor portion 140 along the direction PD. Thus, even when the second blocking member 170b is not formed to include a plurality of blocking portions, an influence of a magnetic field generated by the ferrite core 150 is small.

Referring to FIG. 103D, the blocking member 170a includes a plurality of second portions 172 and a second connector 176 connecting the first blocking portions 172 to each other. The second blocking portions 172 are spaced apart along the direction PD that is perpendicular to the eddy current, and opposite ends of each of the second blocking portions 172 are spaced apart from each other along the direction ED of the eddy current. Accordingly, since the eddy current cannot flow along the first blocking member 170a, generation of the eddy current is interrupted. A length ES3 of the first blocking member 170a may be greater than or equal to the length CL of the ferrite core 150 of the inductor portion 140.

The second connector 176 extends from the inductor portion 140 along the direction PD that is perpendicular to the eddy current, to connect the first blocking member 170a and the second blocking member 170b.

The second blocking member 170b is coupled to an upper end of the first blocking member 170a. The second blocking member 170b may be connected to the ground portion 180. The second blocking member 170b is spaced apart from the ferrite core 150 of the inductor portion 140 along the direction PD. Thus, even when the second blocking member 170b is not formed to include a plurality of blocking portions, an influence of a magnetic field generated by the ferrite core 150 is small.

Next, referring to FIG. 104A, the stylus pen 10 includes a conductive tip 110, a conductive connection member 120, a capacitor portion 130, an inductor portion 140, a blocking member 170, a ground portion 180, and a housing 190. Description of same or similar components as those shown in FIG. 102A will be omitted.

A position of the inductor part 140 in the housing 190 of the stylus pen 10 is different from that of the inductor portion 140 within the housing 190 of the stylus pen 10 of FIG. 103A. The inductor portion 140 is spaced apart from the conductive tip 110 in the housing 190 of the stylus pen 10.

In this regard, FIG. 104B to FIG. 104D illustrate the blocking member 170 including the first blocking member 170a and the second blocking member 170b in detail.

Referring to FIG. 104B, the first blocking member 170a includes one slit GP for blocking generation of the eddy current. The slit GP extends to an upper end of the second blocking member 170b along a direction opposite to the direction PD that is perpendicular to the eddy current. A length ES1 of the first blocking member 170a may be greater than or equal to the length CL of the ferrite core 150 of the inductor portion 140. A length of the slit GP also corresponds to the length ES1 of the first blocking member 170a.

The opposite ends 1701 and 1702 of the first blocking member 170a are spaced apart by the slit GP. The opposite ends 1701 and 1702 of the first blocking member 170a are spaced apart along the direction ED of the eddy current. Accordingly, since the eddy current cannot flow along the first blocking member 170a, generation of the eddy current is interrupted.

The second blocking member 170b is coupled to a lower end of the first blocking member 170a. The second blocking member 170b is spaced apart from the ferrite core 150 of the inductor portion 140 along a direction opposite to the direction PD. Thus, even when a slit is not formed in the second blocking member 170b, an influence of a magnetic field generated by the ferrite core 150 is small.

Referring to FIG. 104C, the blocking member 170a includes a plurality of first blocking portions 171. The first blocking portions 171 extend along the direction PD that is perpendicular to the eddy current, and are spaced apart from each other along the direction ED of the eddy current. A length ES1 of the first blocking member 170a may be greater than or equal to the length CL of the ferrite core 150 of the inductor portion 140. A length of the first blocking portions 171 also corresponds to the length ES1 of the first blocking member 170a. Accordingly, since the eddy current cannot flow along the first blocking member 170a, generation of the eddy current is interrupted.

The second blocking member 170b is coupled to a lower end of the first blocking member 170a. The second blocking member 170b is spaced apart from the ferrite core 150 of the inductor portion 140 along a direction opposite to the direction PD. Thus, even when the second blocking member 170b is not formed to include a plurality of blocking portions, an influence of a magnetic field generated by the ferrite core 150 is small.

Referring to FIG. 104D, the blocking member 170a includes a plurality of second portions 172 and a second connector 176 connecting the first blocking portions 172 to each other. The second blocking portions 172 are spaced apart along the direction PD that is perpendicular to the eddy current, and opposite ends of each of the second blocking portions 172 are spaced apart from each other along the direction ED of the eddy current. Accordingly, since the eddy current cannot flow along the first blocking member 170a, generation of the eddy current is interrupted.

The second connector 176 extends from the inductor portion 140 along the direction PD that is perpendicular to the eddy current, to connect the first blocking member 170a and the second blocking member 170b.

The second blocking member 170b is coupled to a lower end of the first blocking member 170a. The second blocking member 170b is spaced apart from the ferrite core 150 of the inductor portion 140 along a direction opposite to the direction PD. Thus, even when the second blocking member 170b is not formed to include a plurality of blocking portions, an influence of a magnetic field generated by the ferrite core 150 is small.

Next, referring to FIG. 105A, the stylus pen 10 includes a conductive tip 110, a conductive connection member 120, a capacitor portion 130, an inductor portion 140, a blocking member 170, a ground portion 180, and a housing 190. Description of same or similar components as those shown in FIG. 102A will be omitted.

A position of the capacitor portion 130 in the housing 190 of the stylus pen 10 is different from that of the capacitor portion 130 of the stylus pens 10 of FIG. 101A, FIG. 102A, and FIG. 103A. The capacitor portion 130 is spaced apart from the conductive tip 110 in the housing 190 of the stylus pen 10.

Similarly, the inductor portion 140 is spaced apart from the conductive tip 110 in the housing 190 of the stylus pen 10.

The conductive tip 110 and the conductive connection member 120 are positioned at a front portion of the stylus pen 10, and the capacitor portion 130 and the inductor portion 140 are positioned at a rear portion of the stylus pen 10.

The stylus pen 10 further includes a blocking member 170 to minimize an influence of a user's hand on the conductive connection member 120 and to prevent occurrence of the eddy current by the inductor portion 140.

In this regard, FIG. 105B to FIG. 105D illustrate the blocking member 170 in detail.

Referring to FIG. 105B, the blocking member 170 includes one slit GP for blocking generation of an eddy current. The slit GP extends along a direction opposite to the direction PD that is perpendicular to the eddy current. The length ES1 of the blocking member 170 may correspond to the length of the conductive connection member 120.

Opposite ends 1701 and 1702 of the blocking member 170 are spaced apart by the slit GP. The opposite ends 1701 and 1702 of the blocking member 170 are spaced apart along the direction ED of the eddy current. Accordingly, since the eddy current cannot flow along the blocking member 170, generation of the eddy current is interrupted.

Referring to FIG. 105C, the blocking member 170 includes a plurality of first blocking portions 171 and a first connector 175 connecting the first blocking portions 171 to each other.

The first blocking portions 171 extend along the direction PD that is perpendicular to the eddy current, and are spaced apart from each other along the direction ED of the eddy current. A length ES2 of the blocking member 170 may be greater than or equal to the length CL of the ferrite core 150 of the inductor portion 140. A length of the first blocking portions 171 also corresponds to the length ES2 of the blocking member 170. Accordingly, since the eddy current cannot flow along the blocking member 170, generation of the eddy current is interrupted.

The first connection unit 175 may connect the first blocking portions 171 to each other. The blocking member 170 may be electrically connected to the ground portion 180 at a position of the connector 175.

Referring to FIG. 105D, the blocking member 170 includes a plurality of second blocking portions 172 and a second connector 176 connecting the second blocking portions 172 to each other. The second blocking portions 172 are spaced apart along the direction PD that is perpendicular to the eddy current, and opposite ends of each of the second blocking portions 172 are spaced apart from each other along the direction ED of the eddy current. Accordingly, since the eddy current cannot flow along the blocking member 170, generation of the eddy current is interrupted.

The second connector 176 extends from the inductor portion 140 along the direction PD that is perpendicular to the eddy current.

Figure 106:
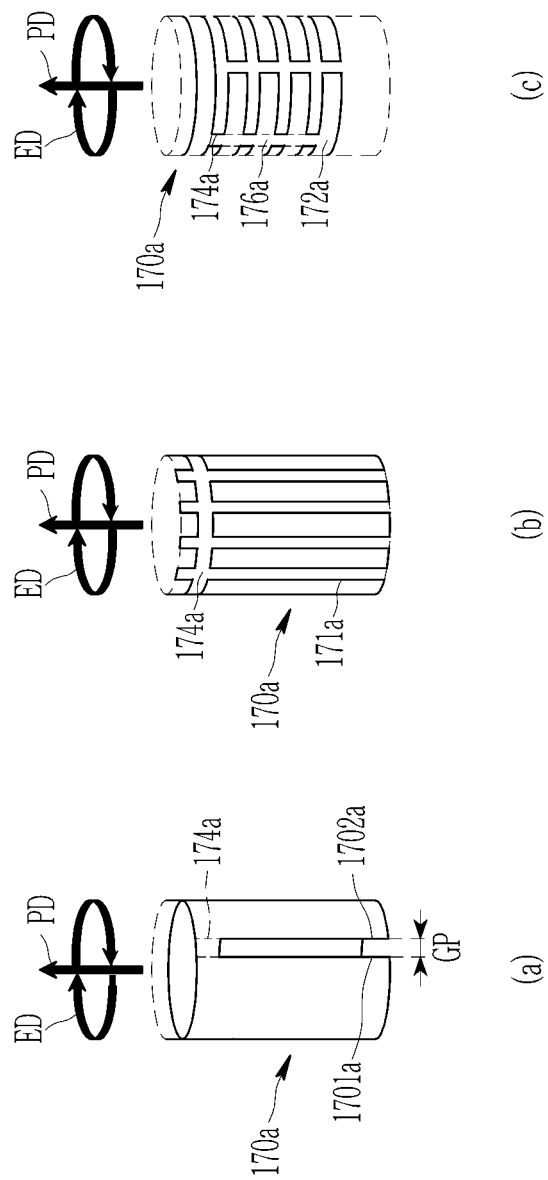
FIG. 106 and FIG. 107 illustrate schematic views showing a structure of a blocking member of a stylus pen according to embodiments.
Figure 107:
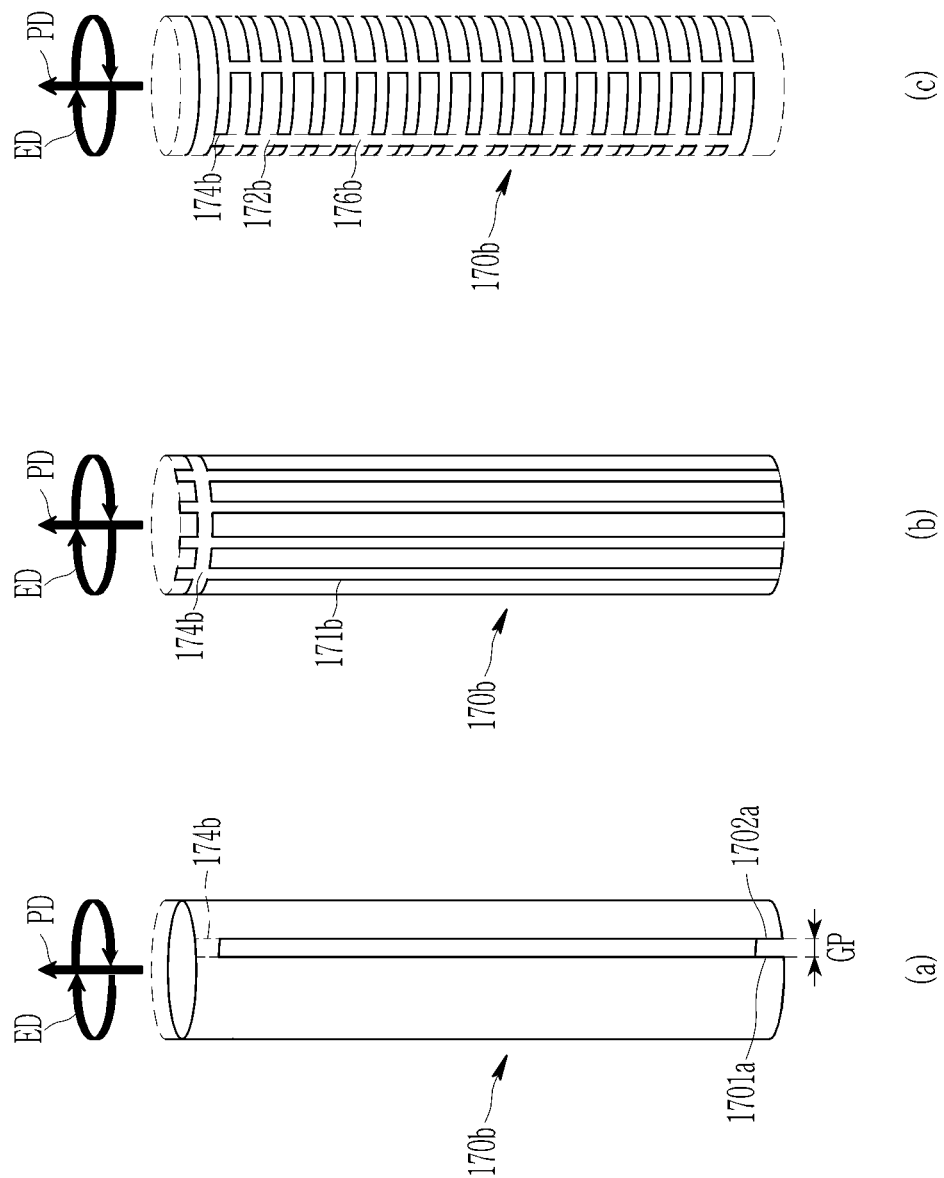

FIG. 106 and FIG. 107 illustrate schematic views showing a structure of a blocking member of a stylus pen according to embodiments.

As illustrated in FIG. 106, opposite ends of the blocking member 170a are spaced apart along the direction ED of the eddy current. The blocking member 170a may be printed on a sheet by plating, photolithography, sputtering, or the like to be attached to the holder portion 190a, or may be printed on the holder portion 190a by a method such as plating, photolithography, thin film deposition, or the like, but the present invention is not limited thereto.

Referring to FIG. 160A, the blocking member 170a includes one slit GP for blocking generation of an eddy current and a connector 174a for connecting opposite ends 1701a and 1702a of the blocking member 170a. The slit GP extends along the direction PD that is perpendicular to the eddy current. The opposite ends 1701a and 1702a of the blocking member 170a are spaced apart from each other by one slit GP. The opposite ends 1701a and 1702a of the blocking member 170a are spaced apart along the direction ED of the eddy current. The connector 174a may connect the opposite ends 1701a and 1702a of the blocking member 170a.

Referring to FIG. 106B, the blocking member 170a includes a plurality of first blocking units 171a and a connector 174a connecting the first blocking units 171a to each other. The first blocking units 171a extend along the direction PD that is perpendicular to the eddy current, and are spaced apart from each other along the direction ED of the eddy current. The connector 174a may connect the first blocking units 171a.

Referring to FIG. 106C, the blocking member 170a includes a plurality of second blocking units 172a and connectors 174a and 176a connecting the second blocking units 172a.

The second blocking units 172a are spaced apart along the direction PD that is perpendicular to the eddy current, and opposite ends of each of the second blocking units 172a are spaced apart from each other along the direction ED of the eddy current. The connector 176a extends along the direction PD that is perpendicular to the eddy current, and may connect the second blocking units 172a.

As illustrated in FIG. 107, opposite ends of the blocking member 170b are spaced apart along the direction ED of the eddy current. The blocking member 170b may be printed on a sheet by plating, photolithography, sputtering, or the like to be attached to the body portion 190b, or may be printed on the body portion 190b by a method such as plating, photolithography, thin film deposition, or the like, but the present invention is not limited thereto.

Referring to FIG. 107A, the blocking member 170b includes one slit GP for blocking generation of an eddy current and a connector 174b for connecting opposite ends 1701b, and 1702b of the blocking member 170b. The slit GP extends along the direction PD that is perpendicular to the eddy current. The opposite ends 1701b and 1702b of the blocking member 170b are spaced apart from each other by one slit GP. The opposite ends 1701b and 1702b of the blocking member 170b are spaced apart along the direction ED of the eddy current. The connector 174b may connect the opposite ends 1701b and 1702b of the blocking member 170b.

Referring to FIG. 107B, the blocking member 170b includes a plurality of first blocking units 171b and a connector 174b connecting the first blocking units 171b to each other. The first blocking units 171b extend along the direction PD that is perpendicular to the eddy current, and are spaced apart from each other along the direction ED of the eddy current. The connector 174b may connect the first blocking units 171b.

Referring to FIG. 107C, the blocking member 170b includes a plurality of second blocking units 172b and connectors 174b and 176b connecting the second blocking units 172b.

The second blocking units 172b are spaced apart along the direction PD that is perpendicular to the eddy current, and opposite ends of each of the second blocking units 172b are spaced apart from each other along the direction ED of the eddy current. The connector 176b extends along the direction PD that is perpendicular to the eddy current, and may connect the second blocking units 172b.

Figure 108:
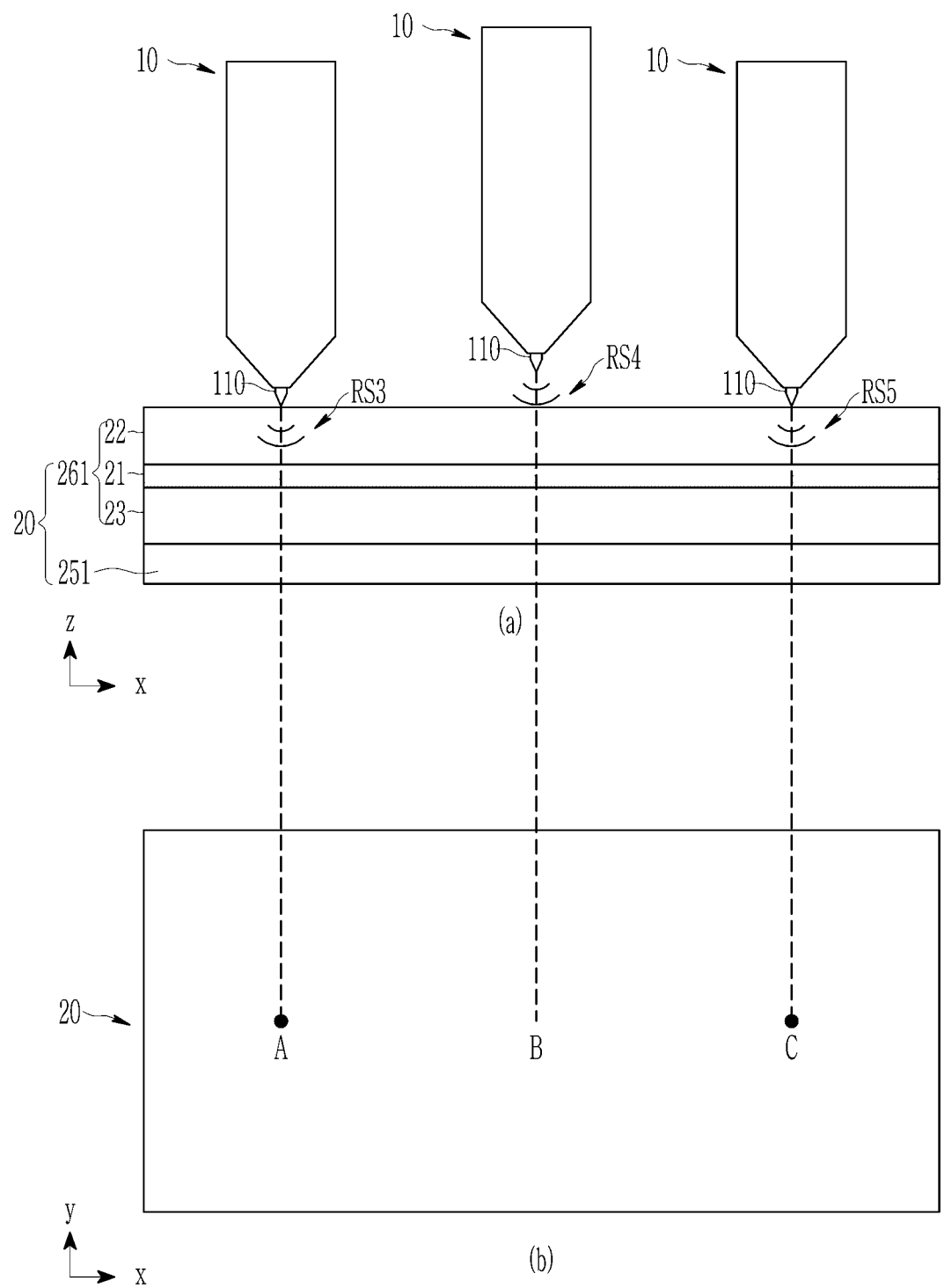
FIG. 108 illustrates a touch input by hovering a stylus pen according to embodiments.

FIG. 108 illustrates a touch input by hovering a stylus pen according to embodiments.

As described in FIG. 91, in writing, the stylus pen 10 may move from the end point A of the previous stroke to the start point C of the next stroke in the touch screen 20 to write the next stroke with the previous stroke.

The conductive tip 110 of the stylus pen 10 contacts the window 22 at one point (first point) A and also contacts the window 22 at another point (second point) C. Resonance signals RS3 and RS5 from the conductive tip 110 which is in contact with the window 22 may be transferred to the touch electrode layer 21. Touch data corresponding to the first point A is generated by the signal RS3, and touch data corresponding to the second point C is generated by the signal RS5.

The stylus pen 10 is spaced apart from the window 22 in a region B between the first point A and the second point B. That is, the stylus pen 10 is hovered in the area B. In a hovering state, the signal RS4 from the conductive tip 110 of the stylus pen 10 according to the embodiment is transferred to the touch electrode layer 21 at a very small value, or not at all. The touch controller 262 does not generate touch data caused by the signal RS4. That is, touch data corresponding to the connection stroke NL of the area B is not generated.

According to at least one of the embodiments, it is possible to provide a stylus pen that prevents unintentional touch input caused by the hovered stylus pen.

According to at least one of the embodiments, it is possible to provide a stylus pen that is robust against external factors such as a user's grip.

According to at least one of the embodiments, an inductance value and a capacitance value of the stylus pen can be kept constant, and thus the resonance frequency may be kept constant, thereby improving touch sensitivity of the touch sensor.

Next, a positional relationship between the blocking member 170 and the housing 190 will be described with reference to FIG. 109 to FIG. 111.

Figure 109:
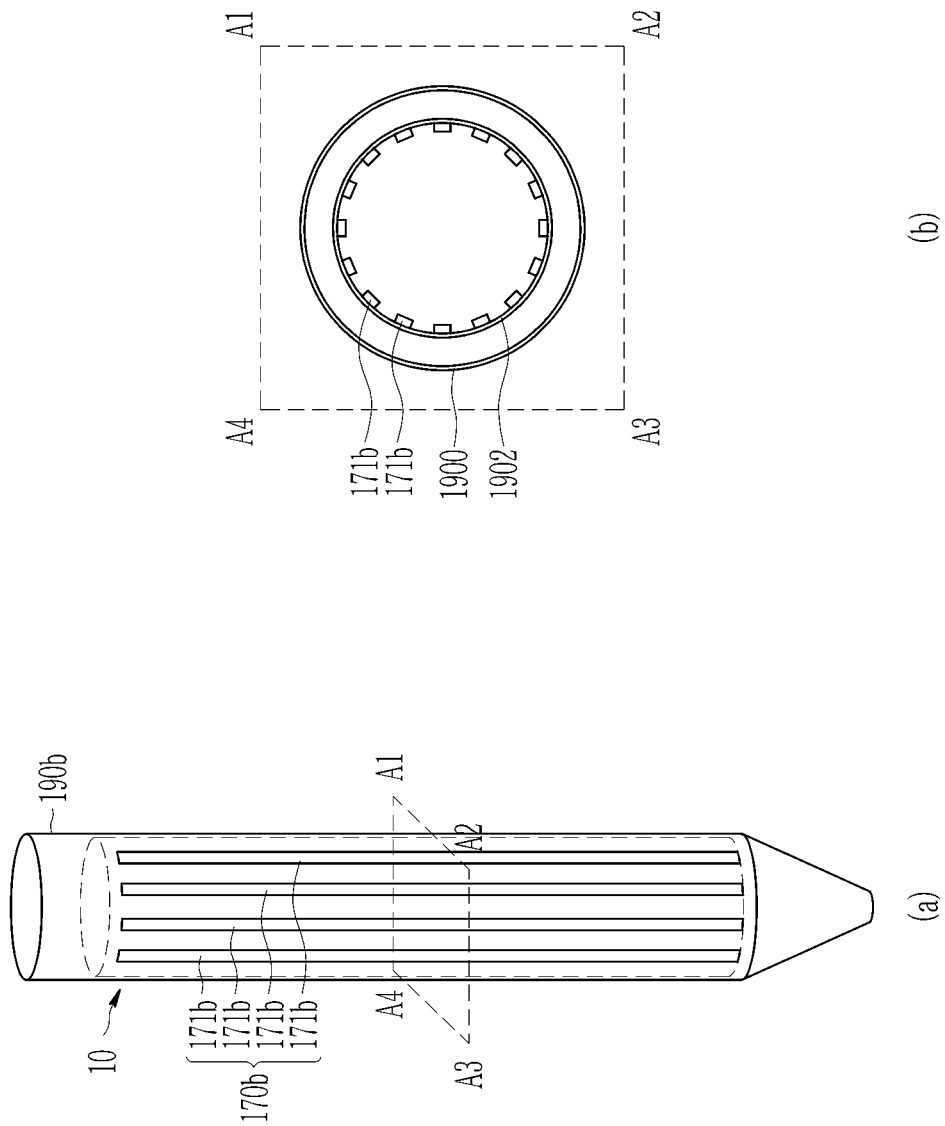
FIG. 109 to FIG. 111 illustrate schematic views showing a structure of a body portion of a stylus pen according to embodiments.
Figure 110:
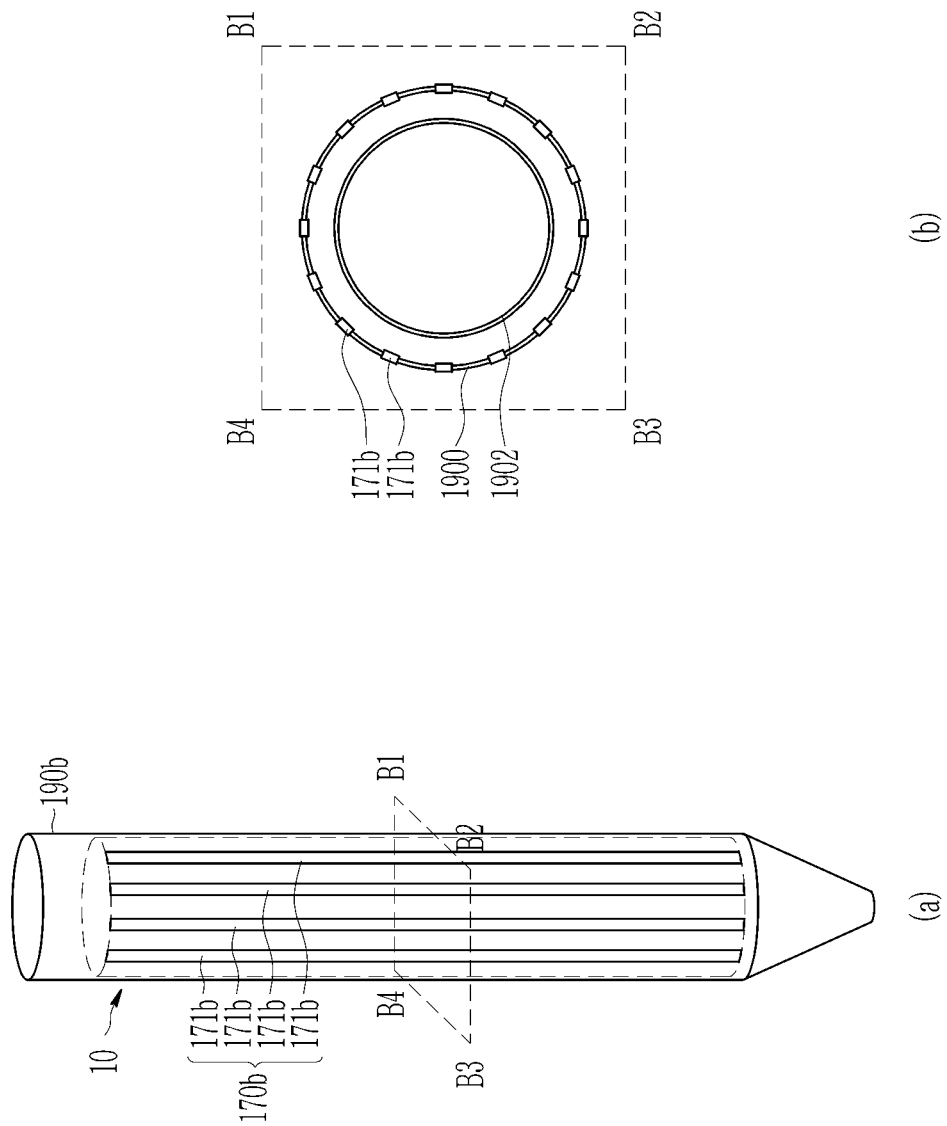
Figure 111:
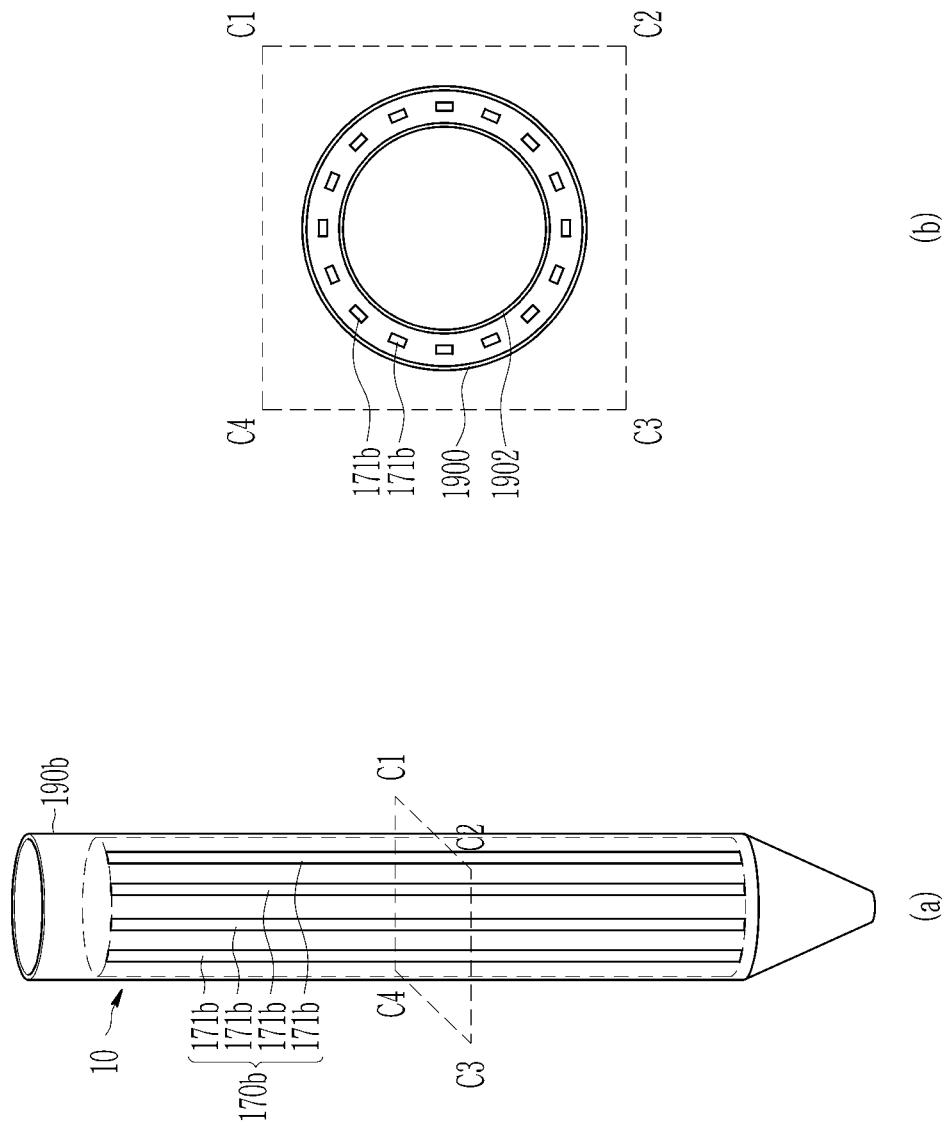

FIG. 109 to FIG. 111 illustrate schematic views showing a structure of a body portion of a stylus pen according to embodiments.

First, referring to FIG. 109A, a stylus pen 10 includes a blocking member 170b including a plurality of first blocking units 171b and a body portion 190b.

FIG. 109B illustrates a cross-section of the stylus pen 10 cut along incision surfaces A1, A2, A3, and A4. According to an embodiment, the first blocking units 171b may be disposed on an inner surface 1902 of the body portion 190b.

Next, referring to FIG. 110A, a stylus pen 10 includes a blocking member 170b including a plurality of first blocking units 171b and a body portion 190b.

FIG. 110B illustrates a cross-section of the stylus pen 10 cut along incision surfaces B1, B2, B3, and B4. According to an embodiment, the first blocking units 171b may be disposed on an outer surface 1900 of the body portion 190b.

Finally, referring to FIG. 111A, a stylus pen 10 includes a blocking member 170b including a plurality of first blocking units 171b and a body portion 190b.

FIG. 111B illustrates a cross-section of the stylus pen 10 cut along incision surfaces C1, C2, C3, and C4. According to an embodiment, the first blocking units 171b may be disposed between the outer surface 1900 and the inner surface 1902 of the body portion 190b.

Although only the blocking member 170b has been described in FIG. 109 to FIG. 111, the blocking member 170a may also be disposed on the inner surface of the holder portion 190a, may be disposed on the outer surface thereof, or may be embedded between the outer surface and the inner surface.

In the meantime, an influence of the parasitic capacitance Cf is greater in the LLC circuit illustrated in FIG. 89 than in the LC resonance circuit or the LCLC resonance circuit. This is because, when designed with the same resonance frequency, capacitance of the LLC resonance circuit is ½ smaller than that of the LC resonance circuit or the LCLC resonance circuit. Accordingly, as illustrated in FIG. 89, when the LLC resonance circuit is used, the structure described above may be applied to minimize the effect on the capacitance reduced to ½.

Figure 112:
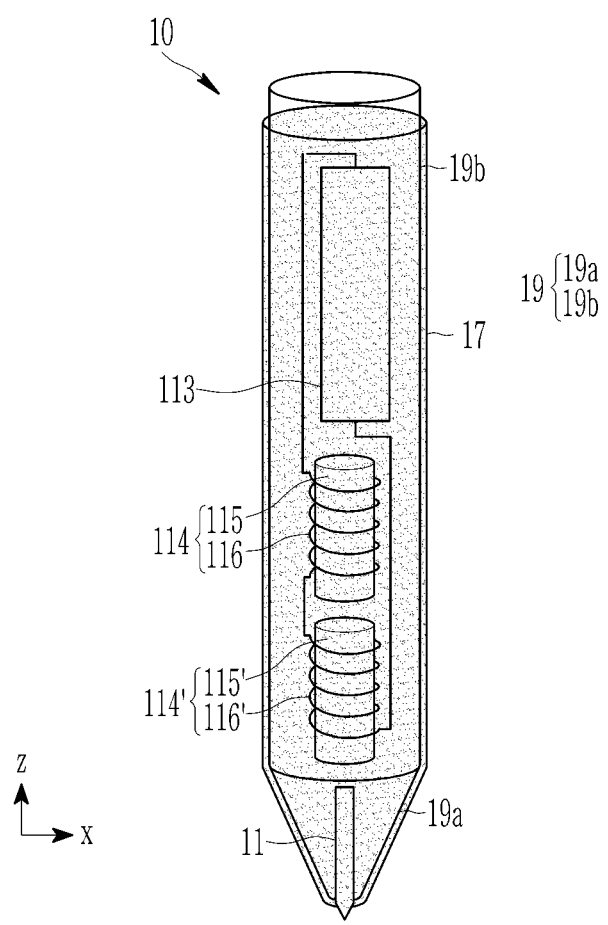
FIG. 112 illustrates a schematic view showing a stylus pen of an LLC structure.

FIG. 112 illustrates a schematic view showing a stylus pen of an LLC structure.

As illustrated in FIG. 112, the stylus pen 10 includes a conductive tip 11, a capacitor portion 113, two inductor portions 114 and 114', a blocking member 17, a ground portion 18, and a housing 19.

The inductor portions 114 and 114' include ferrite cores 115 and 115' and coils 116 and 116' wound around the ferrite cores 115 and 115', respectively. In this case, the two inductor portions 114 and 114' are connected in series.

The blocking member 17, which is a conductive member surrounding the capacitor portion 113 and the inductor portions 114 and 114', may prevent parasitic capacitance from being generated by a user's hand UF.

In this case, the blocking member 117 may be designed such that opposite ends of the blocking member 17 may be spaced apart along a direction ED of an eddy current in order to minimize an influence of the eddy current generated in the stylus pen 10.

In this regard, the blocking member 17 will be described in detail with reference to FIG. 113A to FIG. 18D.

Figure 113:
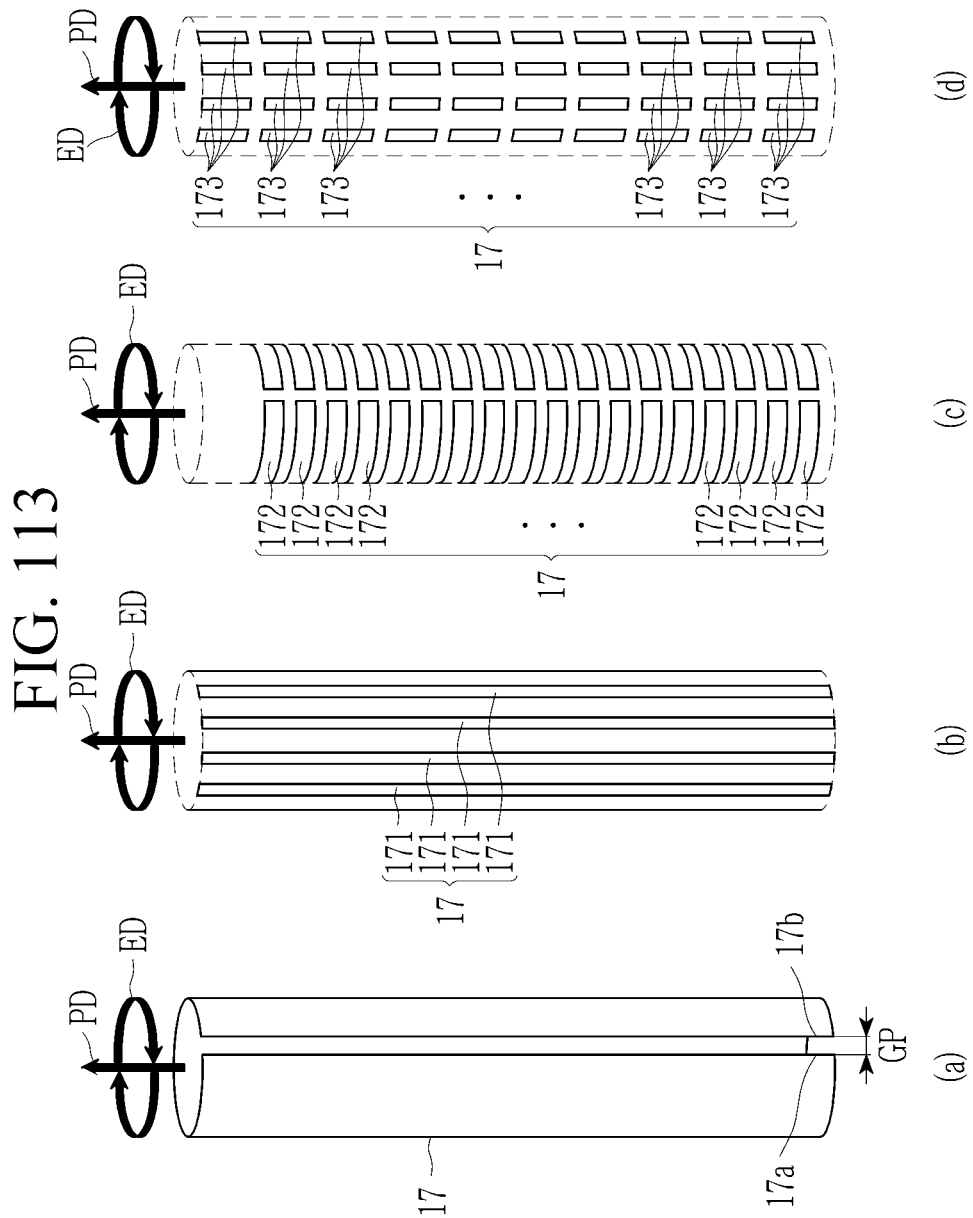
FIG. 113 illustrates various examples of a blocking member.

FIG. 113 illustrates various examples of a blocking member.

As illustrated in FIG. 112, a clockwise current flows through the coils 16 and 16' by a driving signal transferred from the conductive tip 11, and a magnetic field is generated by the currents flowing through the coils 16 and 16'. In this case, an eddy current is generated in a counterclockwise direction that is opposite to the current direction of the coils by a change in the magnetic field generated by the currents of the coils, and thus the eddy current in the counterclockwise direction flows in the blocking member 17.

Referring to FIG. 113A, the blocking member 17 includes one slit GP for blocking generation of eddy currents. The slit GP extends along a direction PD that is perpendicular to the eddy current (counterclockwise in FIG. 113). Opposite ends 17a and 17b of the blocking member 17 are spaced apart by one slit GP. In embodiments, the slit GP may have a width of 0.03 mm or more along the direction ED of the eddy current.

Although the slit GP has been described as extending along the direction PD that is perpendicular to the eddy current, the slit GP may extend along a direction that is inclined at a predetermined angle (more than 0 degrees and less than 90 degrees) with respect to the direction PD. The opposite ends 17a and 17b of the blocking member 17 are spaced apart along the direction ED of the eddy current. Accordingly, since the eddy current cannot flow along the blocking member 17, generation of the eddy current is interrupted.

Referring to FIG. 113B, the blocking member 17 includes a plurality of first blocking units 171. The first blocking portions 171 extend along the direction PD that is perpendicular to the eddy current, and are spaced apart from each other along the direction ED of the eddy current. Similarly, since the blocking member 17 includes the plurality of first blocking portions 171 spaced apart from each other along the direction ED of the eddy current, no eddy current can flow along the blocking member 17, thereby blocking the generation of the eddy current. Although the first blocking portions 171 have been described as extending along the direction PD that is perpendicular to the eddy current, the first blocking portions 171 may extend along the direction that is inclined at a predetermined angle (more than 0 degrees and less than 90 degrees) with respect to the direction PD.

Referring to FIG. 113C, the blocking member 17 includes a plurality of second blocking units 172. The second blocking portions 172 are spaced apart along the direction PD that is perpendicular to the eddy current, and opposite ends of each of the second blocking portions 172 are spaced apart from each other along the direction ED of the eddy current. Similarly, since the opposite ends of each of the second blocking portions 172 included in the blocking member 17 are spaced along the direction ED of the eddy current, no eddy current can flow along the blocking member 17, thereby blocking the generation of the eddy current.

Referring to FIG. 113D, the blocking member 17 includes a plurality of third blocking units 173. The third blocking portions 173 are spaced apart from each other along the direction PD that is perpendicular to the eddy current and the direction ED of the eddy current. Similarly, since the third blocking portions 173 included in the blocking member 17 are spaced along the direction ED of the eddy current, no eddy current can flow along the blocking member 17, thereby blocking the generation of the eddy current.

In addition, the LLC stylus pen may include the blocking members 170, 170a, and 170b of FIG. 97 to FIG. 111 in addition to the blocking member 17.

Figure 114:
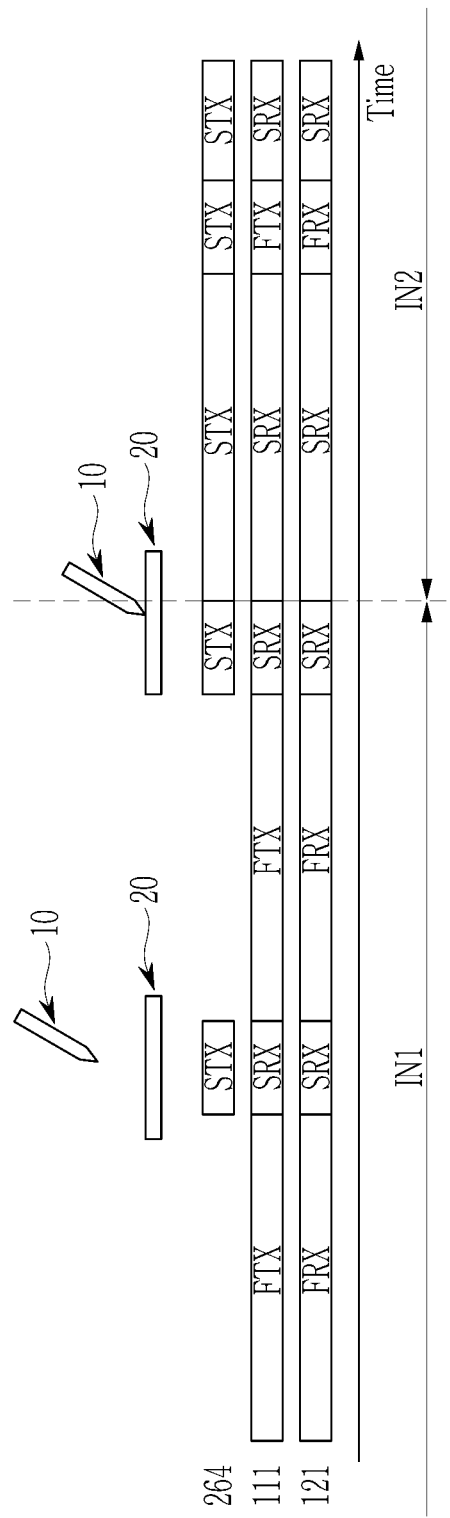
FIG. 114 schematically illustrates a driving timing of a touch sensor according to an embodiment.

FIG. 114 schematically illustrates driving timing of a touch sensor according to an embodiment.

As illustrated in FIG. 114, the electronic device 2 may operate in a first mode IN1 and a second mode IN2.

The first mode IN1 is a mode in which a touch by a user's body portion (finger, palm, etc.) is mainly inputted. During the first mode IN1, a driving signal may be applied to a plurality of first touch electrodes 111 (FTX), and a sensing signal according to the driving signal may be received by a plurality of second touch electrodes 121 (FRX).

During the first mode IN1, a period STX for applying the driving signal for resonating the resonance circuit 12 of the stylus pen 10 to the loop coil 264 may be repeated at a predetermined cycle (e.g., 60 Hz, 120 Hz, etc.). In this case, the first touch electrodes 111 and the second touch electrodes 121 may receive a sensing signal (SRX). In addition, the first mode IN1 may be a mode in which only an input by a user's body portion is received, and in this case, the period STX for applying the driving signal to the loop coil 264 may not be required.

When a signal outputted from the stylus pen 10 is sensed by the touch sensor 261 by the resonance of the resonance circuit 12 of the stylus pen 10, the electronic device 2 operates in a second mode IN2. In addition, the touch sensor 261 may be operated by entering the second mode IN2 by an external controller. For example, when an application program that operates to receive a touch input by the stylus pen 10 is executed, or when a touch input by the stylus pen 10 is expected to be received by another sensor, it may operate in the second mode IN2.

The second mode IN2 is a mode in which a touch by the stylus pen 10 is mainly received. During the second mode IN2, a driving signal is applied to the loop coil 264 (STX), and a signal outputted from the stylus pen 10 may be received through the first touch electrodes 111 and the second touch electrodes 121 (SRX). The touch sensor 261 may identify each of the stylus pens 10a, 10b, and 10c of FIG. 3 depending on a waveform of the sensing signal outputted from the stylus pen 10.

A period (FTX/FRX) for receiving a touch input by a body portion during the second mode IN2 may be repeated at a predetermined cycle (e.g., 60 Hz, 120 Hz, etc.). In this case, a driving signal may be applied to a plurality of first touch electrodes 111 (FTX), and a sensing signal according to the driving signal may be received by a plurality of second touch electrodes 121 (FRX). When it is identified as the stylus pen 10a or the stylus pen 10b of FIG. 3, a driving signal may not be applied to the loop coil 264 during this period in order to reduce power consumption depending on the application of the driving signal. When it is identified as the stylus pen 10c of FIG. 3, a driving signal may be applied to the loop coil 264 during this period. Then, power may be charged to the stylus pen 10c even during a period in which a touch input by a body portion is received. In addition, the second mode IN2 may be a mode in which only an input by the stylus pen 10 is received, and in this case, the period (FTX/FRX) for receiving a touch input by a body portion may not be required.

FIG. 115 to FIG. 118 illustrate driving timings of touch sensors according to embodiments.

Figure 115:
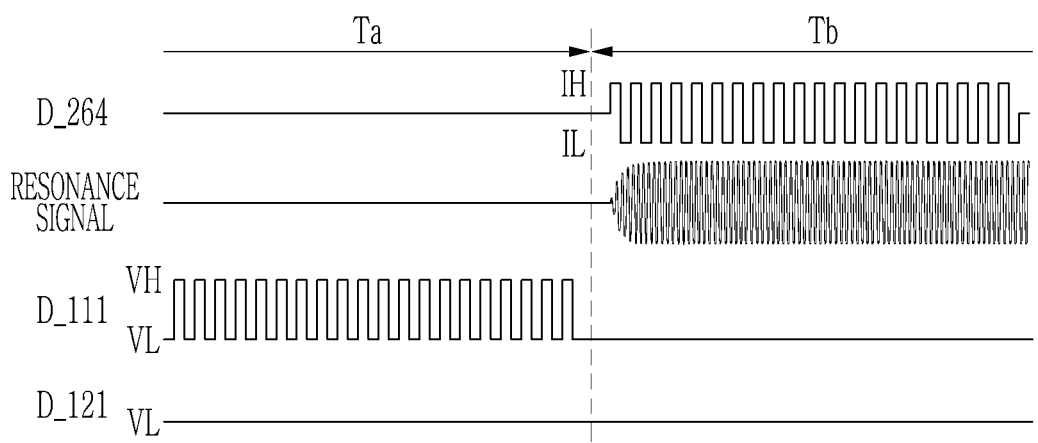
FIG. 115 to FIG. 118 illustrate driving timings of touch sensors according to embodiments.
Figure 116:
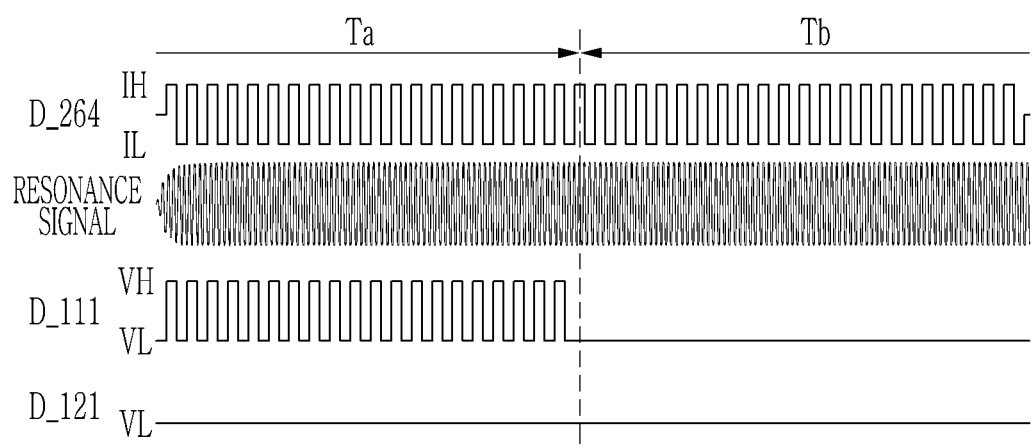

FIG. 115 and FIG. 116 each illustrate timing when the touch sensor 261 operates in a mutual capacitance method, and FIG. 25 and FIG. 26 each illustrate timing when the touch sensor 261 operates in a self-capacitance method.

As illustrated in FIG. 115, a driving signal D_111 may be applied to the first touch electrodes 111 during a period Ta, and a sensing signal depending on the driving signal D_111 may be received from the second touch electrodes 121. In this case, a driving signal D_121 is not applied to the second touch electrodes 121.

Next, a driving signal D_264 may be applied to the loop coil 264 during a period Tb. Then, a signal that resonates in the resonance circuit 12 is increased. A sensing signal by the stylus pen 10 may be received from the first touch electrodes 111 and the second touch electrodes 121.

As illustrated in FIG. 116, a driving signal D_111 may be applied to the first touch electrodes 111 during a period Ta, and a sensing signal depending on the driving signal D_111 may be received from the second touch electrodes 121. In this case, the driving signal D_121 may not be applied to the second touch electrodes 121, but the driving signal D_264 may be applied to the loop coil 264. A signal that resonates in the resonance circuit 12 is increased.

Since a sampling frequency of the second touch electrodes 121 corresponds to the driving signal D_111, the touch sensor 261 may receive a touch by a body portion during the period Ta.

The driving signal D_264 may be applied only to the loop coil 264 during a period Tb. A sensing signal by the stylus pen 10 may be received from the first touch electrodes 111 and the second touch electrodes 121.

Figure 117:
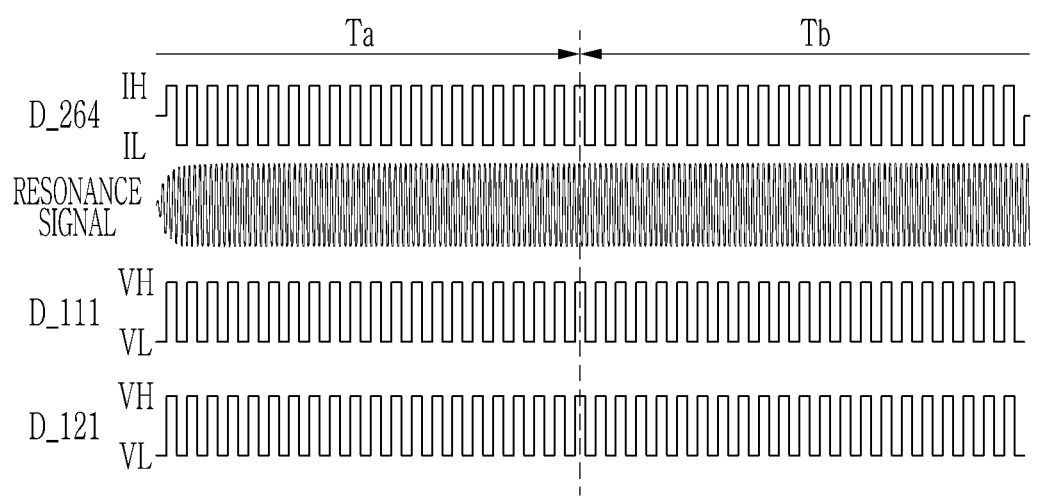

As illustrated in FIG. 117, the driving signal D_111 may be applied to the first touch electrodes 111 during first to second periods T1 to T2, the driving signal D_121 may be applied to the second touch electrodes 121, and the driving signal D_264 may be applied to the loop coil 264.

In this case, a touch by a body portion may be received by setting the sampling frequency of the first touch electrodes 111 and the second touch electrodes 121 to frequencies corresponding to the driving signal D_111, and a touch by the stylus pen 10 may be received by setting it to a frequency corresponding to a signal that is outputted from the stylus pen 10.

Figure 118:
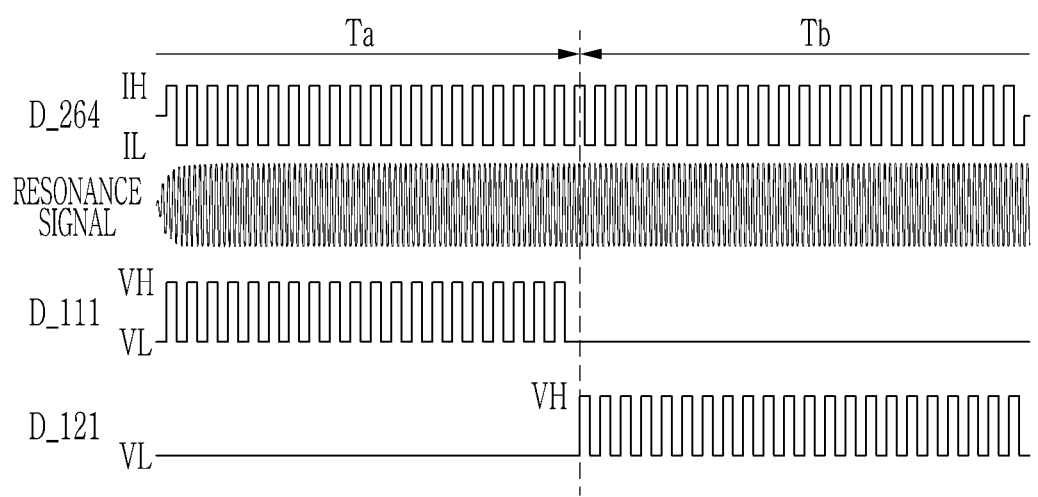

As illustrated in FIG. 118, the driving signal D_111 may be applied to the first touch electrodes 111 during a period Ta to receive a touch by a body portion, and a sensing signal by the stylus pen 10 may be received from the second touch electrodes 121. In this case, the driving signal D_121 may not be applied to the second touch electrodes 121, but the driving signal D_264 may be applied to the loop coil 264. A signal that resonates in the resonance circuit 12 is increased.

The driving signal D_121 may be applied to the first touch electrodes 121 during a period Tb to receive a touch by a body portion, and a sensing signal by the stylus pen 10 may be received from the first touch electrodes 111. In this case, the driving signal D_111 may not be applied to the first touch electrodes 111, but the driving signal D_264 may be applied to the loop coil 264. A signal that resonates in the resonance circuit 12 is maintained.

As described above, in the touch sensor according to the present disclosure, the touch electrodes 111 and 121 may receive a resonance signal from the stylus pens 10a, 10b, and 10c while the loop coil 264 transfers the electromagnetic signal to the stylus pens 10a, 10b, and 10c. In the case of EMR and ECR methods, since the resonance signal is received from the stylus pen after stopping the transfer of the electromagnetic signal, there is a problem in that the resonance signal in the stylus pen is attenuated. Since the touch input is determined based on the attenuated resonance signal, the touch input is incorrectly recognized, and thus the touch sensitivity is deteriorated.

In the touch sensor according to the present disclosure, signal transmission is performed by the loop coil 264, and signal reception is performed by the touch electrodes 111 and 121. That is, since the touch electrodes 111 and 121 receive the resonance signal while the signal is transmitted by the loop coil 264, the resonance signal that resonates in the stylus pen 10a is not attenuated and is received by the touch electrodes 111 and 121. This improves an SNR of the signal and enhances reception sensitivity of the touch input. Next, when the stylus pen 10a or the stylus pen 10b of FIG. 3 is identified, a waveform of the driving signal applied to the loop coil 264 may be changed in order to reduce power consumption depending on the application of the driving signal.

This will be described with reference to FIG. 119 to FIG. 124.

FIG. 119 to FIG. 124 illustrate waveform diagrams showing a driving signal according to various aspects of an embodiment.

Figure 119:
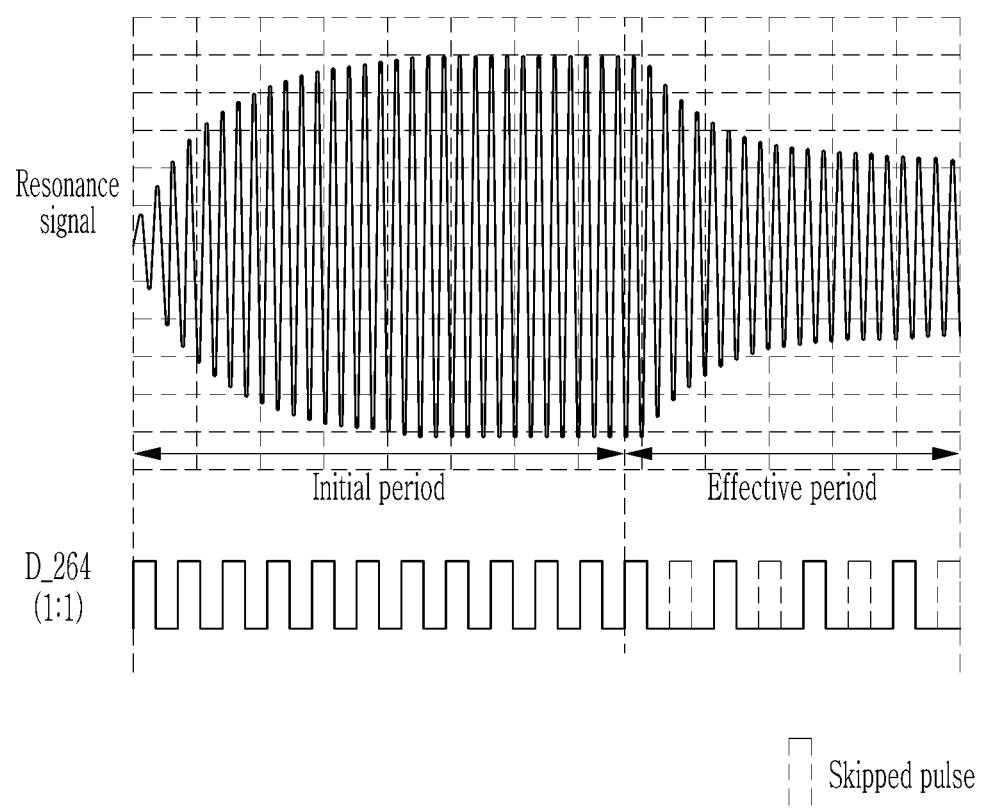
FIG. 119 to FIG. 124 illustrate waveform diagrams showing a driving signal according to various aspects of an embodiment.

Referring to FIG. 119, during an initial period for quickly reaching a resonance signal of the stylus pen 10 to a predetermined level, the coil driver 263 outputs a driving signal of a predetermined frequency to the loop coil 264.

Then, the resonance signal of the stylus pen 10 may quickly reach the predetermined level. Then, during an effective period, the coil driver 263 outputs a driving signal in which the driving signal of the predetermined frequency is modified (e.g., a duty ratio thereof is decreased). Then, the resonance signal of the stylus pen 10 may be maintained at an effective level.

That is, a driving signal having a lower duty ratio (or duty cycle) compared to the driving signal having the predetermined frequency during the effective period may be outputted to the loop coil 264. For example, when the duty ratio of the driving signal outputted during the initial period is 1, the duty ratio of the driving signal outputted during the effective period may be lowered to 1/3 due to an increase in off-duty due to pulse skipping.

Figure 120:
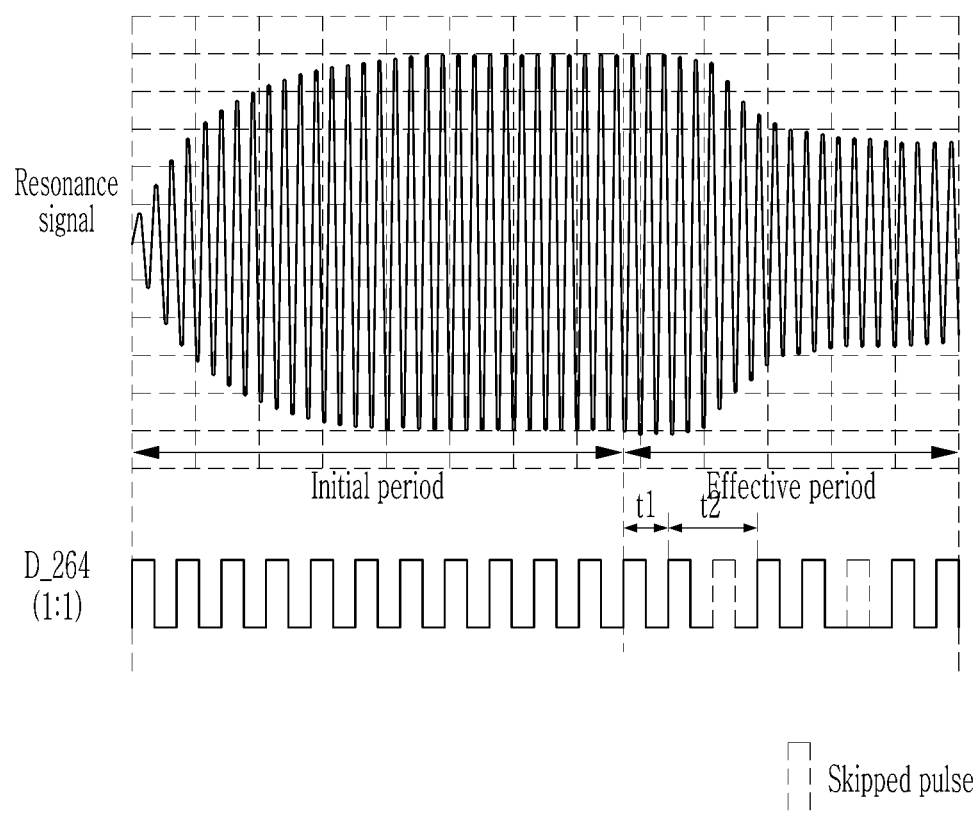

Referring to FIG. 120, the coil driver 263 raises the resonance signal of the stylus pen 10 to a predetermined level by outputting a periodic driving signal as the driving signal of the loop coil 264 during the initial period. Then, during a subsequent effective period, each time two pulses are outputted compared to the driving signal outputted to the loop coil 264 during the initial period, a driving signal in the form of omitting a next one pulse is outputted to the loop coil 264, and the resonance signal of the stylus pen 10 is maintained at an effective level. That is, during the effective period, when two pulses are outputted, the driving signal may be outputted in the form of omitting the next one pulse. Accordingly, the driving signal outputted during the effective period has a first period t1 in which a pulse signal having a same duty ratio as a pulse outputted during the initial period is outputted, and a second period t2 in which a pulse signal having a lower duty ratio than that of the first period t1 is outputted, which may be repeated. For example, when the duty ratio during the first period t1 is 1, the duty ratio during the second period t2 may be lowered to 1/3 due to an increase in off-duty due to pulse skipping.

Energy transferred from the loop coil 264 to the stylus pen 10 may increase as a period during which a pulse output is skipped during the effective period decreases. Accordingly, as the period in which the pulse output is skipped during the effective period decreases, a signal level of a pen resonance signal generated during the effective period increases. By referring to FIG. 119 and FIG. 120 as an example, in the driving signal of FIG. 120, one pulse is omitted whenever two pulses are outputted, and thus a signal level of the corresponding pen resonance signal may be increased compared to the driving signal of FIG. 119 in which one pulse is omitted whenever one pulse is outputted.

In addition, as the number of periods during which the pulse output is skipped during the effective period increases, energy consumed for outputting the driving signal may be reduced. Accordingly, as the number of periods during which the pulse output is skipped during the effective period increases, energy consumed by the touch sensor 261 during the effective period may be reduced. By referring to FIG. 119 and FIG. 120 as an example, in the driving signal of FIG. 119, one pulse is omitted whenever one pulse is outputted, and thus energy consumed by the touch sensor 261 may be reduced compared to the driving signal of FIG. 119 in which one pulse is omitted whenever two pulses are outputted.

On the other hand, FIG. 119 and FIG. 120 illustrate examples of driving signals outputted from the coil driver 263 to the loop coil 264, and a period during which the pulse output is skipped during the effective period may be variously modified.

Figure 121:
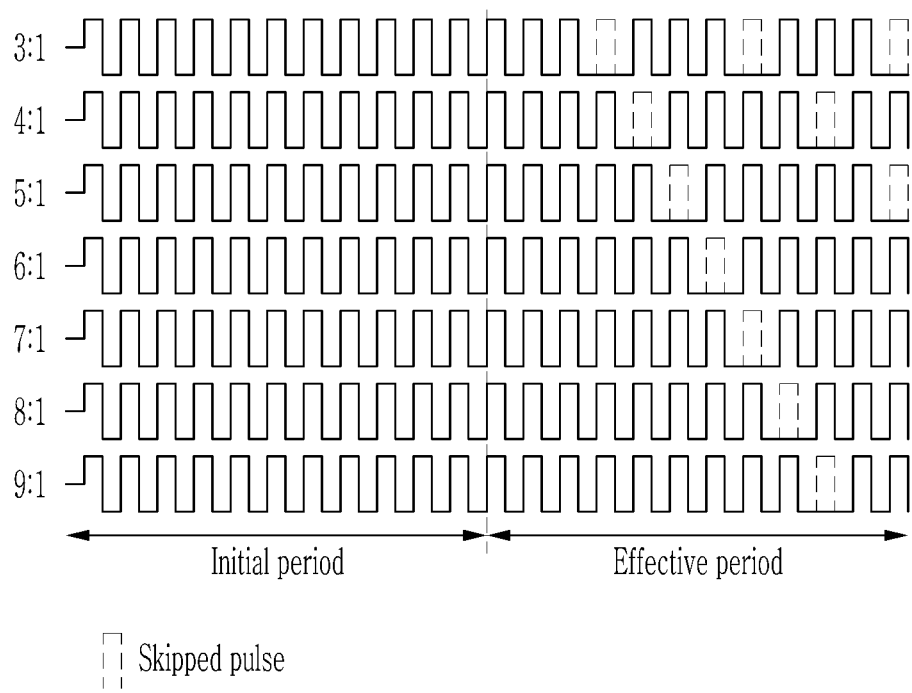
Figure 122:
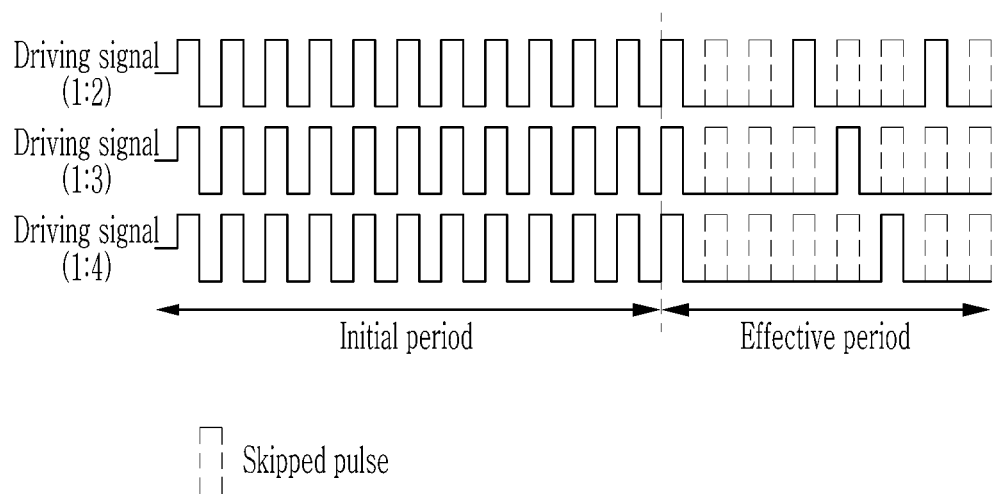
Figure 123:
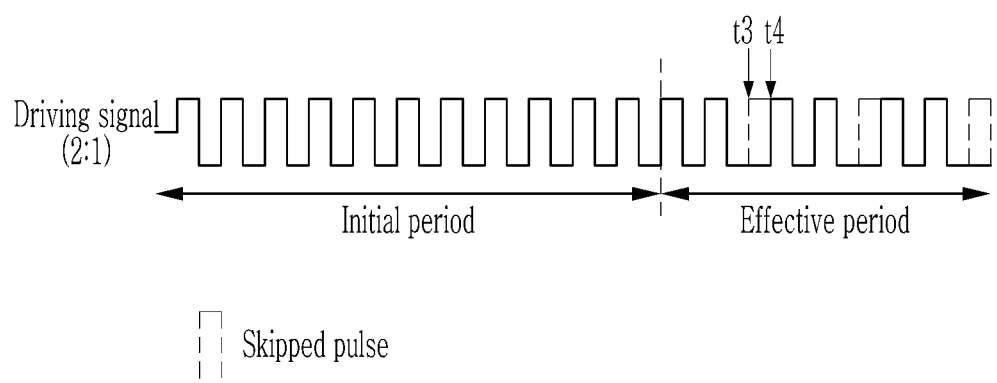

Referring to FIG. 121, in the driving signal outputted to the loop coil 264 during the effective period, a length of the period during which the same pulse is continuously outputted may be variously modified. For example, one pulse may be omitted every time three pulses are outputted, or one pulse may be omitted every time four pulses are outputted. In addition, for example, one pulse may be omitted every time five pulses are outputted, and one pulse may be omitted every time six pulses are outputted. In addition, for example, one pulse may be omitted whenever seven pulses are outputted, or one pulse may be omitted whenever eight pulses are outputted, and one pulse may be omitted whenever nine pulses are outputted. As such, when one pulse is periodically omitted, the duty ratio during the pulse skip period may have a value of $1/(2N+1)=1/3$.

Meanwhile, in the driving signal outputted to the loop coil 264 during the effective period, the number of continuously skipped pulses may also be variously modified. For example, in FIG. 121, a case in which only one pulse is periodically omitted during the valid period is illustrated as an example, but the number of pulses periodically omitted during the effective period may be changed to two or more. By referring to FIG. 122 as an example, a driving signal may be outputted such that a plurality of consecutive pulses (two pulses, three pulses, four pulses, etc.) are periodically skipped during the effective period. For example, when two consecutive pulses are periodically skipped during the effective section, assuming that the duty ratio of the driving signal outputted during the initial period is 1, the duty ratio during the pulse skip period of the effective period is $1/(2N+1)=1/5$. In addition, for example, when three consecutive pulses are periodically skipped during the effective period, assuming that the duty ratio of the driving signal outputted during the initial period is 1, the duty ratio during the pulse skip period of the effective period is $1/(2N+1)=1/7$. In addition, for example, when four consecutive pulses are periodically skipped during the effective section, assuming that the duty ratio of the driving signal outputted during the initial period is 1, the duty ratio during the pulse skip period of the effective period is $1/(2N+1)=1/9$.

In addition, in FIG. 119 to FIG. 121, a case in which a pulse is outputted after an off-duty time has elapsed after pulse skipping during the effective period is illustrated as an example, but timing at which a new pulse is outputted after the pulse skip is also variable. By referring to FIG. 123 as an example, during the effective period, the pulse output may be immediately resumed at a time point t3 when the pulse skip period (interval t3 to t4) ends. Accordingly, the pulse signal outputted after the pulse skipping may have a phase that is opposite to that of the pulse signal outputted before the pulse skipping. In this case, assuming that the duty ratio of the driving signal outputted during the initial period is 1, the duty ratio during the pulse skip period of the effective period is $1/2N=1/2$.

As described above, the energy transferred from the loop coil 264 to the stylus pen 10 increases as the period in which the pulse output is skipped during the effective period decreases, and thus as the number of pulses continuously outputted during the effective period increases, the energy transferred from the loop coil 264 to the stylus pen 10 may increase. Accordingly, compared to a case of using a driving signal in which one pulse is omitted every time three pulses are outputted, in a case of using a driving signal in which one pulse is omitted every time nine pulses are outputted, the energy transferred from the loop coil 264 to the stylus pen 10 may increase, and thus the signal level of the corresponding pen resonance signal may increase. In addition, as the number of periods during which the pulse output is skipped during the effective period increases, the energy consumed for outputting the driving signal decreases, and thus as the number of pulses continuously outputted during the effective period decreases, the energy consumption in the touch sensor 261 may decrease. Accordingly, compared to a case of using a driving signal in which one pulse is omitted every time nine pulses are outputted, in a case of using a driving signal in which one pulse is omitted every time three pulses are outputted, the energy consumption during the effective period of the touch sensor 261 may be reduced.

In the meantime, in FIG. 119 to FIG. 121, a case where signal levels of the pulses outputted during the initial period and the effective period are the same as each other is illustrated as an example, but the signal levels of the pulses outputted during the initial period and the effective period may be different from each other. For example, the touch sensor 261 may set the signal level of the pulse outputted during the initial period to be higher than the signal level of the pulse outputted during the effective period in order to reduce a time until the pen resonance signal of the stylus pen 10 reaches a predetermined level. In addition, for example, the touch sensor 261 may set the signal level of the pulse outputted during the effective period to be higher than the signal level of the pulse outputted during the initial period in order to increase the energy transferred to the stylus pen 10 during the effective period.

Figure 124:
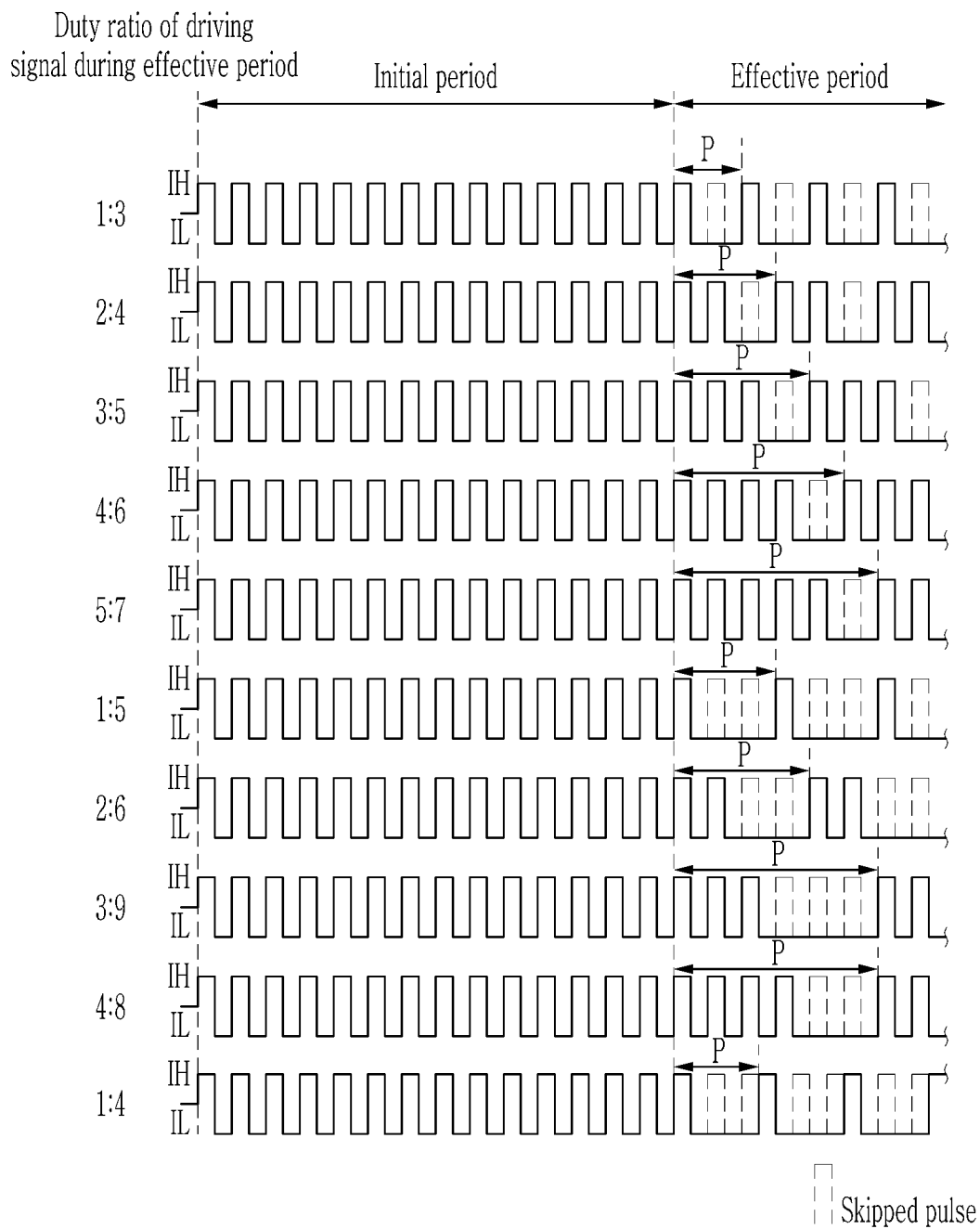

Referring to FIG. 124, during the initial period, a first driving signal in which a pulse of a high level IH is repeated at a predetermined cycle is applied to the loop coil 264. During the initial period, the resonance signal of the stylus pen 10 may be quickly reached (i.e., saturated) by the first driving signal.

During the effective period, a driving signal having a plurality of periods having different disable level periods is applied to the loop coil 264.

For example, when a duty ratio of the first driving signal outputted during the initial period (a ratio of a disable level period to an enable level period during one repeated cycle P) is 1:1, the driving signal outputted during the effective period has a duty ratio of a:2b+1, a:2b+2, a:2b+3, a:2b+4, a:(3b+1), a:2(b+3)+1, a:2(b+3), a:(2b+1), etc. Herein, a and b are integers. A period corresponding to one cycle P of the driving signal outputted during the effective period may include a section in which the enable level section and the disable level section are repeated at least n times, and a section in which the disable level section is maintained at least 2n times. The enable level period corresponds to a period in which the driving signal has an enable level IH, and the disable level period corresponds to a period in which the driving signal has a disable level IL. The duty ratio of the driving signal is merely an example, and may include all ratios for allowing the resonance signal of the stylus pen 10 having reached a predetermined level to be maintained at an effective level.

The resonance signal of the stylus pen 10 reaching the predetermined level by the first driving signal during the initial period may be maintained to an effective level by the driving signal during the effective period. Herein, the effective level indicates a level at which the touch controller 262 can detect the resonance signal of the stylus pen 10 as a touch signal.

The driving signal during the effective period may be a signal in which at least one pulse is periodically omitted from the first driving signal during the initial period. As described above, the driving signal during the effective period is outputted in a form in which at least one pulse is periodically omitted compared to the first driving signal during the initial period, and thus pulse speeds of the first driving signal during the initial period and the driving signal during the effective period may be different from each other. That is, the driving signal during the effective period may have a lower pulse rate than that of the first driving signal during the initial period. Herein, a pulse rate may be a number of pulses outputted per unit time (e.g., 1 s).

As a number of skipped pulses of the driving signal decreases during the effective period, energy transferred from the touch apparatus 261 to the stylus pen 10 may increase. Accordingly, as the number of skipped pulses of the driving signal during the effective period decreases, the signal level of the pen resonance signal generated during the effective period increases. In addition, as the number of skipped pulses of the driving signal increases during the effective period, energy consumed for outputting the driving signal may decrease. Accordingly, as the number of skipped pulses of the driving signal during the effective period increases, energy consumed by the touch sensor 261 during the effective period may be reduced.

According to embodiments, it is possible to improve a signal-noise-ratio (SNR) of a signal outputted from the stylus pen, thereby improving reception sensitivity of a touch input and calculating a more accurate touch position.

According to embodiments, there is an advantage in that palm rejection can be performed, and there is an advantage in that energy consumption of the touch sensor can be reduced by reducing energy consumption during a section during which a driving signal is outputted to the touch sensor for resonance of the stylus pen.

Next, a driving method of an electronic device according to an embodiment will be described with reference to FIG. 125.

Figure 125:
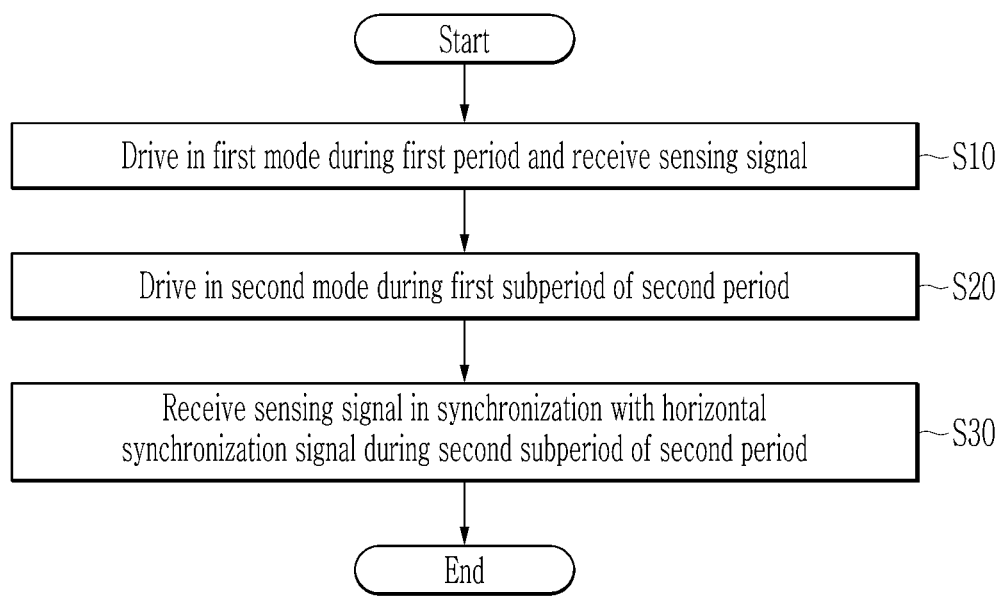
FIG. 125 illustrates a flowchart showing a driving method of an electronic device according to an embodiment.

FIG. 125 illustrates a flowchart showing a driving method of an electronic device according to an embodiment.

During a first period, the electronic device 2 is driven in a first mode (S10). The first mode is a mode in which a driving signal for detecting a touch input by a touch object other than the stylus pen 10 is applied to the touch sensor 261.

For example, in the first mode, the first driver/receiver 2620 outputs a driving signal to the first touch electrodes 111-1 to 111-$m$, and the second driver/receiver 2622 receives a sensing signal depending on a touch from the second touch electrodes 121-1 to 121-$n$.

The controller 2624 may determine whether the sensing signal is a valid touch signal based on whether a signal magnitude of the sensing signal acquired during the first period exceeds a first threshold, and may obtain touch coordinate information by using the valid touch signal.

For example, the controller 2624 calculates touch coordinates by using the sensing signal when the signal magnitude of the sensing signal acquired during the first period exceeds the first threshold. The controller 2624 does not calculate touch coordinates depending on the sensing signal having a signal magnitude that is less than or equal to the first threshold when the signal magnitude of the sensing signal acquired in the first period is less than or equal to the first threshold. In addition, when the signal magnitude of the sensing signal acquired in the first period exceeds the first threshold, the controller 2624 may calculate a touch area by using the sensing signal. The sensing signal acquired in the first period includes at least one of a first sensing signal caused by a user's body portion (a finger, a palm, etc.), and a second sensing signal caused by the stylus pen 10. The first threshold may be set such that the first sensing signal is determined to be a valid touch signal and the second sensing signal is filtered.

During a first subperiod of a second period, the electronic device 2 is driven in a second mode (S20). The second mode is a mode in which a driving signal for detecting a touch input by the stylus pen 10 is applied to the loop coil 264. For example, the coil driver 263 simultaneously applies the driving signal to the loop coil 264.

It is assumed that a frequency of the driving signal applied to the touch sensor 100 during the first period is equal to or less than a frequency of the driving signal applied to the loop coil 264 during the first subperiod. In addition, a frequency of the driving signal applied to the loop coil 264 during a first subperiod may be an integer multiple of 2 or more of a frequency of a horizontal synchronization signal of the signal controller 220.

During a second subperiod of the second period, the electronic device 2 receives a resonated sensing signal based on the driving signal at least once (S30).

For example, the resonance circuit 12 of the stylus pen 10 resonates with the driving signal, thereby generating a resonance signal, which is transferred to the touch sensor 261 through the conductive tip 11.

In an embodiment, the first driver/receiver 2620 receives sensing signals transferred from the first touch electrodes 111-1 to 111-*m* at least once, and the second driver/receiver 2622 also receives sensing signals transferred from the second touch electrodes 121-1 to 121-*n* at least once. In this case, timings at which the first driver/receiver 2620 and the second driver/receiver 2622 receive sensing signals may be the same. Then, the first driver/receiver 2620 and the second driver/receiver 2622 may process the received sensing signals to transfer them to the controller 2624.

In the above, although it has been described that, during the second subperiod, the first driver/receiver 2620 receives the sensing signal transferred from the first touch electrodes 111-1 to 111-*m* and the second driver/receiver 2622 also receives the sensing signal transferred from the second touch electrodes 121-1 to 121-*n*, during the second subperiod of the second period, the first driver/receiver 2620 receives the sensing signal transferred from at least one of the first touch electrodes 111-1 to 111-*m*, and the second driver/receiver 2622 also receives the sensing signal transferred from at least one of the second touch electrodes 121-1 to 121-*n*, or during the second subperiod of the second period, only the first driver/receiver 2620 receives the sensing signal from at least one of the first touch electrodes 111-1 to 111-*m*, or during the second subperiod of the second period, only the second driver/receiver 2622 may receive the sensing signal from at least one of the second touch electrodes 121-1 to 121-*n*, and sensing signal reception operations of the first driver/receiver 2620 and the second driver/receiver 2622 are not limited to the above.

In addition, during the second subperiod, the first driver/receiver 2620 receives the sensing signal from at least one of the first touch electrodes 111-1 to 111-*m*, or the sensing signal may be received from all of the first touch electrodes 111-1 to 111-*m*, and similarly, the second driver/receiver 2622 also receives the sensing signal from at least one of the second touch electrodes 121-1 to 121-*n*, or the sensing signal may be received from all of the second touch electrodes 121-1 to 121-*n*.

The controller 2624 generates touch information by using some sensing signals received during a period that is determined in response to a horizontal synchronization signal among sensing signals received at least once by the first driver/receiver 2620 and the second driver/receiver 2622.

In another embodiment, the first driver/receiver 2620 is synchronized with the horizontal synchronization signal to receive sensing signals transferred from the first touch electrodes 111-1 to 111-*m*, and the second driver/receiver 2622 is also synchronized with the horizontal synchronization signal to receive sensing signals transferred from the second touch electrodes 121-1 to 121-*n*. Then, the first driver/receiver 2620 and the second driver/receiver 2622 may process the received sensing signals to transfer them to the controller 2624.

The controller 2624 generates touch information by using the sensing signals received by the first driver/receiver 2620 and the second driver/receiver 2622 in synchronization with the horizontal synchronization signal.

The controller 2624 may determine whether the sensing signal is an effective touch signal based on whether a signal magnitude of the sensing signal acquired during the second subperiod exceeds a second threshold, and may obtain touch coordinate information related to a point where a touch of the stylus pen 10 occurs by using the effective touch signal.

For example, the controller 2624 calculates touch coordinates by using the sensing signal when the signal magnitude of the sensing signal acquired during the second subperiod exceeds the second threshold. The controller 2624 does not calculate touch coordinates depending on the sensing signal having a signal magnitude that is less than or equal to the second threshold when the signal magnitude of the sensing signal acquired during the second subperiod is less than or equal to the second threshold. In addition, when the signal magnitude of the sensing signal acquired during the second subperiod exceeds the second threshold, the controller 2624 may calculate a touch area by using the sensing signal.

In this case, the driving signal during the second subperiod of the second period may be a signal in which at least one pulse is periodically omitted as described above. For example, the coil driver 263 raises the resonance signal of the stylus pen 10 to a predetermined level by outputting a periodic driving signal as the driving signal of the loop coil 264 during the first subperiod. Then, during a second subperiod, each time two pulses are outputted compared to the driving signal outputted to the loop coil 264 during the initial period, a driving signal in the form of omitting a next one pulse is outputted to the loop coil 264, and the resonance signal of the stylus pen 10 is maintained at an effective level.

Next, a driving signal applied during the first and second periods, a resonance signal of the stylus pen 10, and a sensing signal will be described with reference to FIG. 126.

Figure 126:
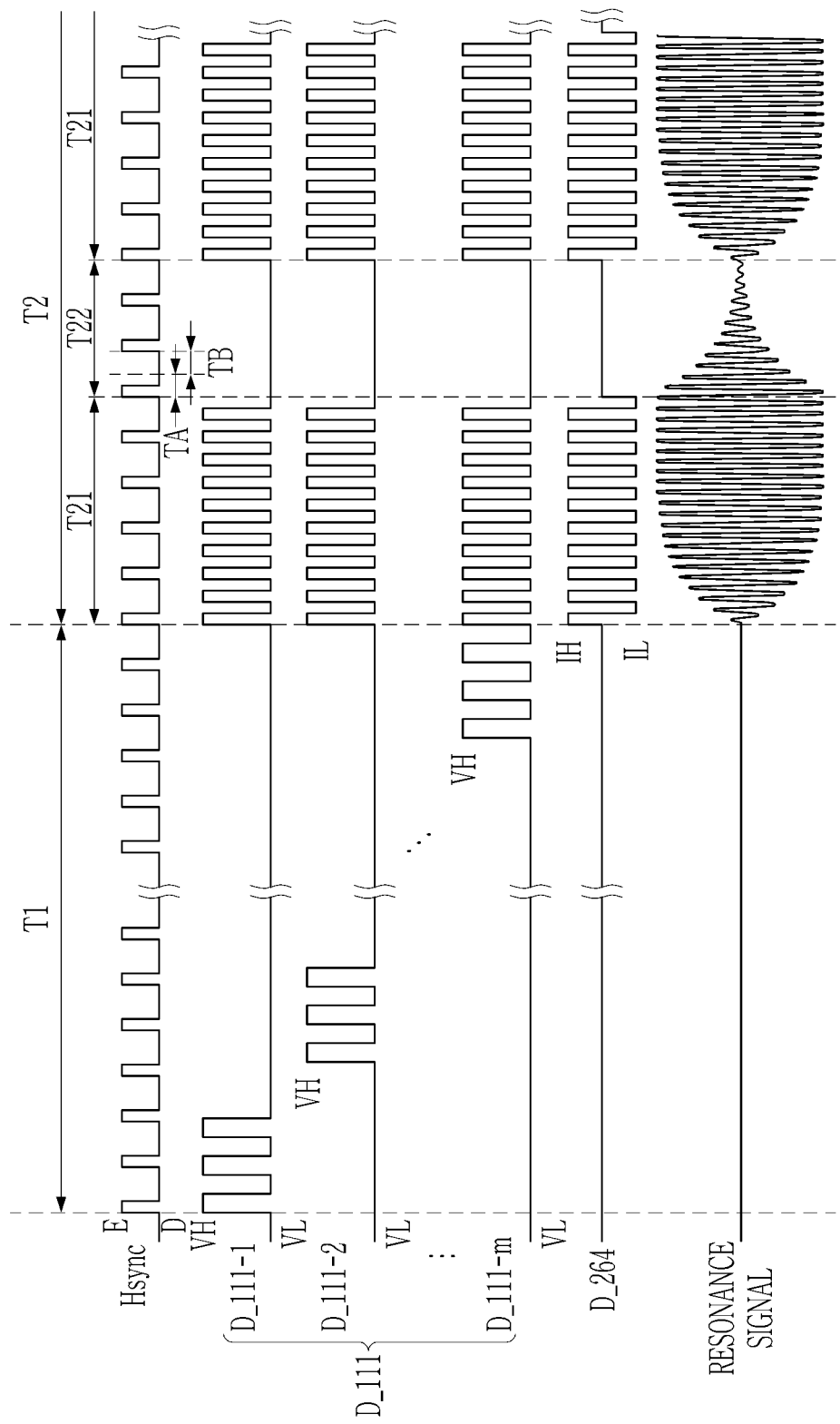
FIG. 126 illustrates a timing diagram showing an example of a horizontal synchronization signal Hsync and a driving signal according to the driving method of FIG. 125.

FIG. 126 illustrates a timing diagram showing an example of a horizontal synchronization signal Hsync and a driving signal according to the driving method of FIG. 125.

One touch report frame period depending on a touch report rate includes a first period T1 and a second period T2. The touch report rate indicates a speed or a frequency (Hz) in which the touch sensor 261 outputs touch data obtained by driving touch electrodes to the controller 270 for reporting.

During the first period T1, the first driver/receiver 2620 outputs a driving signal to at least one kind of touch electrode among the first touch electrodes 111-1 to 111-*m* and the second touch electrodes 121-1 to 121-*n*. When the first driver/receiver 2620 outputs a driving signal to the first touch electrodes 111-1 to 111-*m*, the second driving and receiving 2622 may receive sensing signals from the second touch electrodes 121-1 through 121-*n*. The touch controller 262 may obtain touch coordinate information based on a signal magnitude of the sensing signal.

The coil driver 263 applies a driving signal to the loop coil 264 during a first subperiod T21 within the second period T2.

A frequency of the driving signal applied to the loop coil 264 during the first subperiod T21 corresponds to a resonance frequency of the stylus pen 10. For example, the frequency of the driving signal outputted to the loop coil 264 during the first subperiod T21 may be an integer multiple of 2 or more of the frequency of the horizontal synchronization signal. In contrast, during the first period T1, the frequency of the driving signal outputted to the first touch electrodes 111-1 to 111-m is different from the resonant frequency of the stylus pen 10.

The frequency setting of the driving signal is merely an example, and may be set to a value different from the above. Specifically, the touch controller 262 may receive a horizontal synchronization signal Hsync, a scan driving control signal, a data driving control signal, and the like from a signal controller (e.g., 2524 of FIG. 24). Then, the touch controller 262 may set the frequency of the driving signal provided to the loop coil 264 based on the horizontal synchronization signal Hsync, and may synchronize the driving signal with the horizontal synchronization signal Hsync. For example, the touch controller 262 may set the frequency of the driving signal to an integer multiple of 2 or more of the frequency of the horizontal synchronization signal Hsync. Then, a resonance frequency of the stylus pen 10 may be designed to have an integer multiple of 2 or more of the frequency of the horizontal synchronization signal Hsync. The touch controller 262 may synchronize the driving signal with pulses of the horizontal synchronization signal Hsync.

During the first subperiod T22 in the second period T2, the first driver/receiver 2620 is synchronized with each pulse of the horizontal synchronization signal Hsync to receive sensing signals from the first touch electrodes 111-1 to 111-m, and the second driver/receiver 2622 receives sensing signals from the second touch electrodes 121-1 to 121-n. In addition, during the second subperiod T22, each of the first driver/receiver 2620 and the second driver/receiver 2622 may receive the sensing signal at least once.

During the second subperiod T22 to which the driving signal is no longer applied, the resonance signal outputted by the second resonant circuit portion 12 of the stylus pen 10 may be received by at least one of the first touch electrodes 111-1 to 111-m and the second touch electrodes 121-1 to 121-n.

A cycle of a pulse of the horizontal synchronization signal Hsync is one horizontal period (1H) required to write data into a pixel PX in one row. After each pulse of the horizontal synchronization signal Hsync is generated, a data signal may be written into the pixel PX during a data writing period TA. The data writing period refers to a period in which a data signal is applied to a data line and a scan signal is applied to a scan line in order to write a data signal to the pixel PX. Since the data line and the scan line generate parasitic capacitance with the touch electrode, a voltage applied to the data line and the scan line during the data writing period TA causes noise in the sensing signal transmitted to the touch electrode.

In an embodiment, the touch controller 262 may generate touch information by using a sensing signal received during a noise free period TB excluding the data writing period TA. The data writing period TA and the noise free period TB may be set differently depending on a display device and a driving method of the display device.

Specifically, at each of a plurality of sampling points during the second subperiod T22, the first driver/receiver 2620 receives sensing signals from the first touch electrodes 111-1 to 111-m, and the second driver/receiver 2622 receives sensing signals from the second touch electrodes 121-1 to 121-n.

The touch controller 262 generates a reception signal by using the sensing signal received at a sampling point during the noise-free period TB.

For example, when the touch controller 262 receives only the horizontal synchronization signal Hsync, the touch controller 262 may determine, as the data writing period TA, from a time point when a pulse of the horizontal synchronization signal Hsync is generated to a predetermined first time after a predetermined second time, which exceeds the predetermined first time, they may be variously set depending on a driving method of the display unit 250, and the present invention is not limited thereto. Then, the touch controller 262 generates a reception signal by using remaining sensing signals except for the sensing signal sampled during the data writing period TA.

As another example, when the touch controller 262 receives a scan driving control signal, the touch controller 262 may determine a period during which a scan signal has an enable level from the scan driving control signal as the data writing period TA. Then, the touch controller 262 generates a reception signal by using remaining sensing signals except for the sensing signal sampled during the data writing period TA.

As yet another example, when the touch controller 262 receives a data driving control signal, the touch controller 262 may determine a period during which a data signal has an enable level from the data driving control signal as the data writing period TA. Then, the touch controller 262 generates a reception signal by using remaining signals except for the sensing signal sampled during the data writing period TA.

In another embodiment, it may be preferable that the first driver/receiver 2620 and the second driver/receiver 2622 receive the sensing signal during the noise free period TB excluding the data writing period TA.

Specifically, the first driver/receiver 2620 receives the sensing signal from the first touch electrodes 111-1 to 111-m during the noise-free period TB excluding the data writing period TA. Similarly, the second driver/receiver 2622 may receive a sensing signal from the second touch electrodes 121-1 to 121-n.

That is, the touch controller 262 may receive a sensing signal from the touch sensor 261 based on at least one of the horizontal synchronization signal Hsync and a scan driving control signal during the period excluding the period during which the scan signal has an enable level. When the touch controller 262 receives a scan driving control signal, the touch controller 262 may determine a period during which a scan signal has a disable level from the scan driving control signal. When the touch controller 262 receives only the horizontal synchronization signal Hsync, the touch controller 262 may determine a period from a time point at which the pulse of the horizontal synchronization signal Hsync is generated to a predetermined fourth time from after a third predetermined time from a time point at which the pulse of the horizontal synchronization signal Hsync is generated as the period during which the scan signal has an enable level, the predetermined fourth time exceeds the predetermined third time, they may be variously set depending on a driving method of the display unit 250, and the present invention is not limited thereto.

In addition, the touch controller 262 may receive a sensing signal from the touch sensor 261 based on at least one of the horizontal synchronization signal Hsync and a data driving control signal during a period excluding a period during which the data signal is applied to the data line of the display panel 251. When the touch controller 262 receives the data driving control signal, the touch controller 262 may determine a period during which the data signal is applied to the data line from the data driving control signal. When the touch controller 262 receives only the horizontal synchronization signal Hsync, the touch controller 262 may determine a period from when the pulse of the horizontal synchronization signal Hsync is generated from a predetermined fifth time to after a predetermined sixth time as the period during which the data signal is applied to the data line, the predetermined fifth time exceeds the predetermined sixth time, they may be variously set depending on a driving method of the display unit 250, and the present invention is not limited thereto.

The second period T2 includes a plurality of first subperiods T21 and second subperiods T22. For example, during the second period T2, a combination of the first subperiod T21 and the second subperiod T22 may be repeated eight times.

Although it has been described above that the second period T2 exists after the first period T1, the first period T1 may exist after the second period T2, time lengths of the first period T1 and the second period T2 may each be changed during a plurality of touch report frames, and the driving method of the electronic device 2 of the present embodiment is not limited thereto.

Next, an aspect of the display unit will be described with reference to FIG. 127 to FIG. 126.

Figure 127:
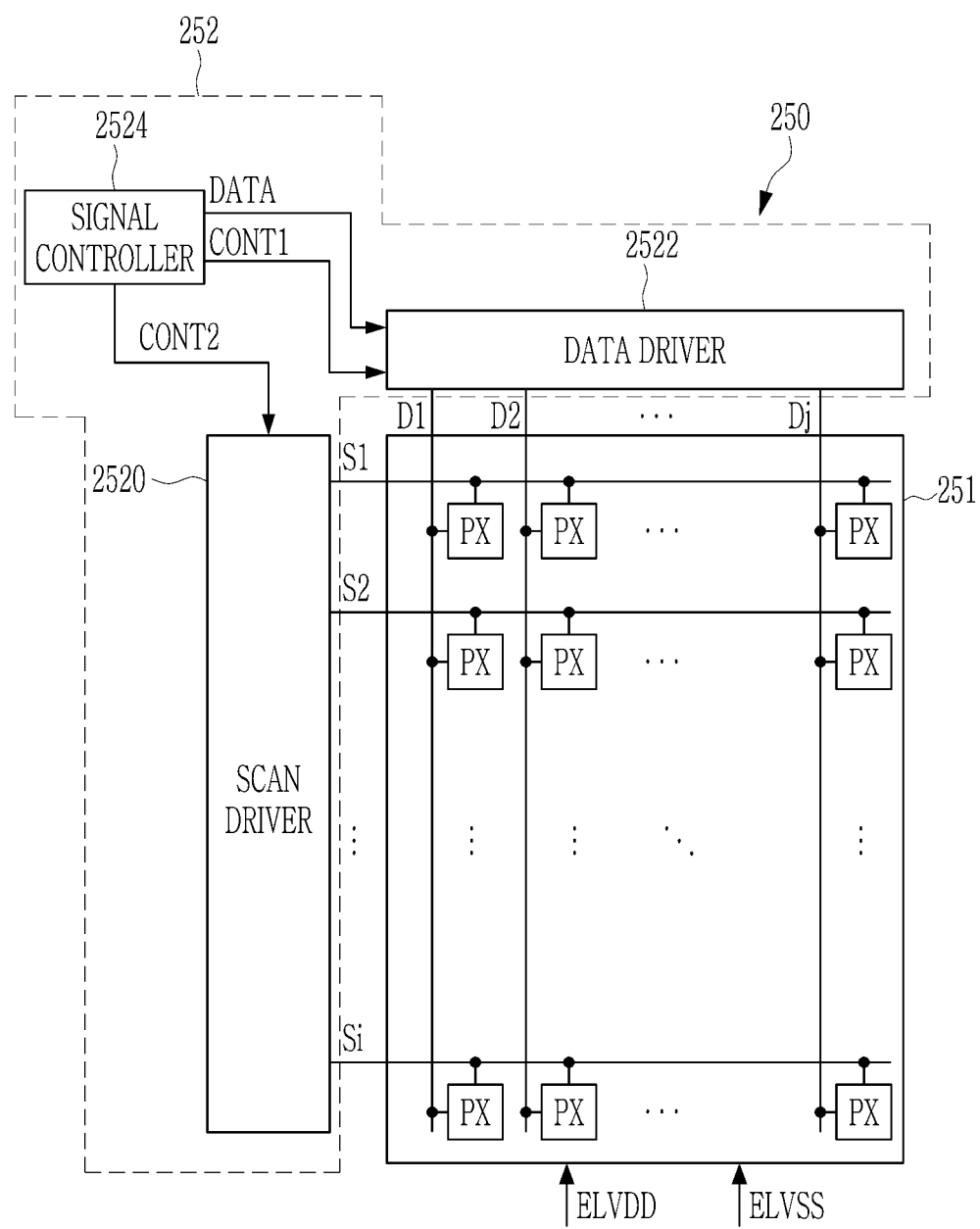
FIG. 127 illustrates a block diagram schematically showing an aspect of a display unit of FIG. 2.
Figure 128:
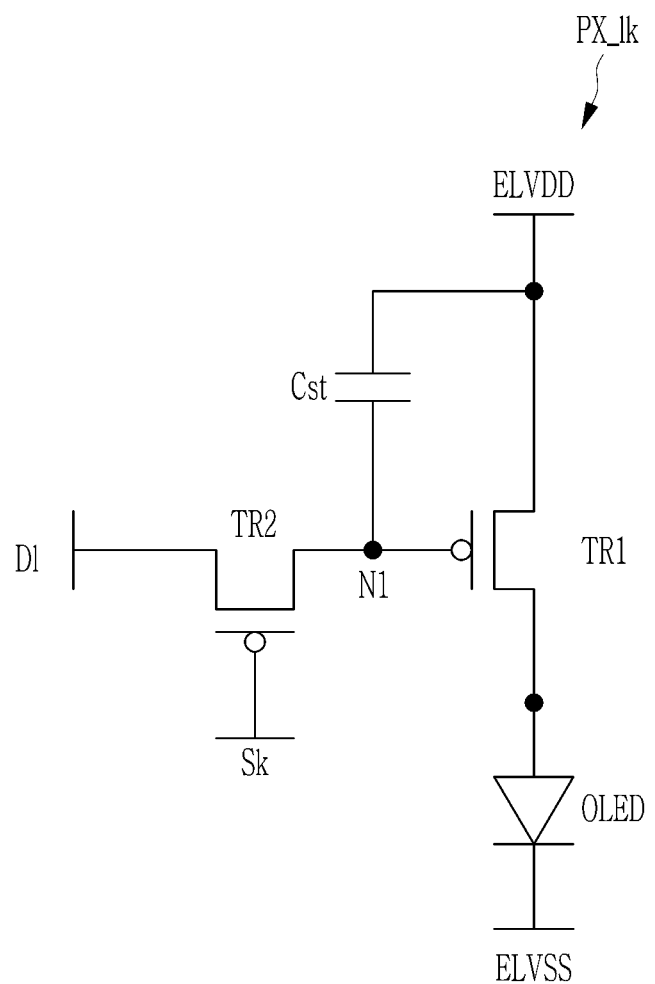
FIG. 128 illustrates a pixel of the display unit of FIG. 127.
Figure 129:
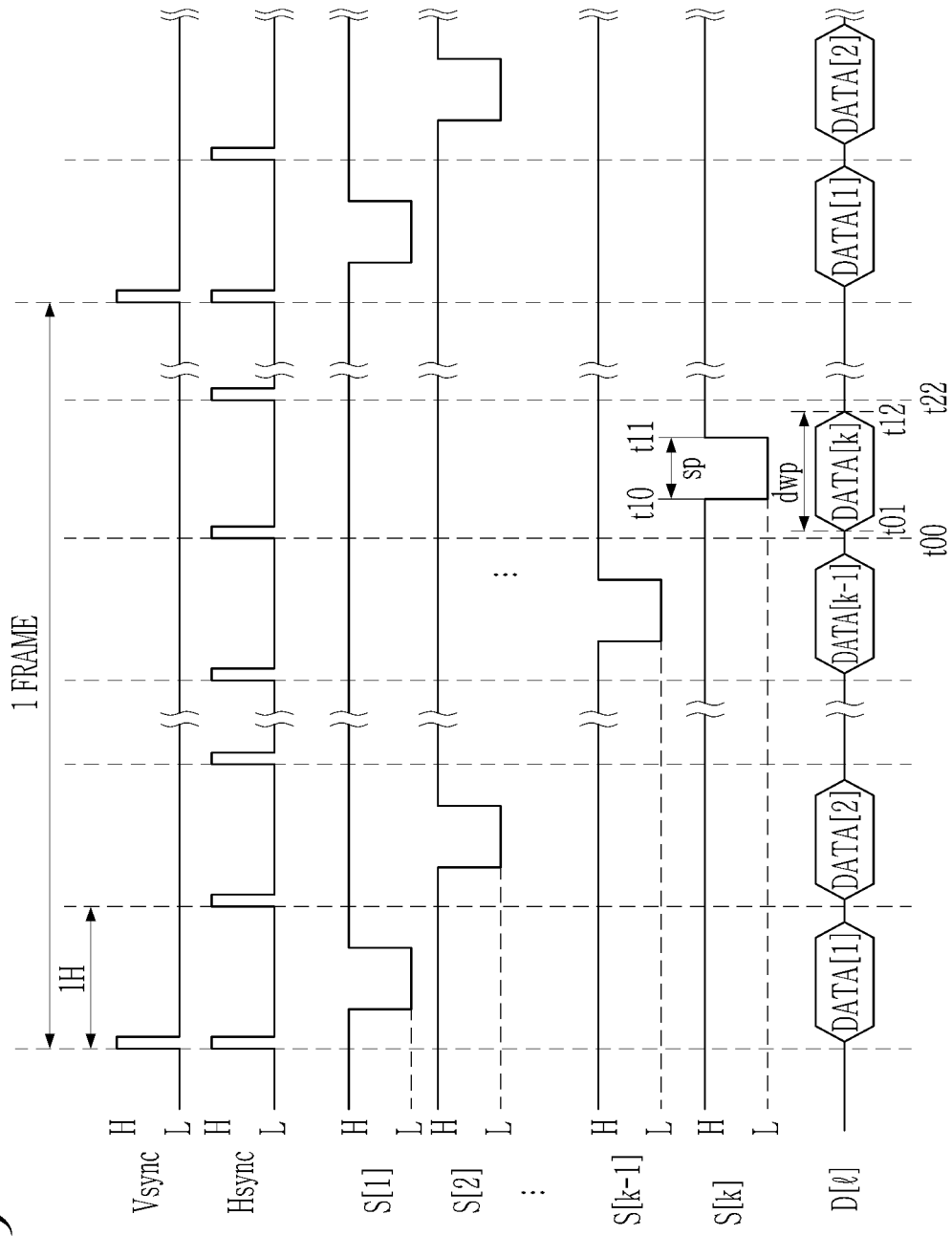
FIG. 129 illustrates a timing diagram showing an example of a driving signal for driving the display unit of FIG. 127.

FIG. 127 illustrates a block diagram schematically showing an aspect of a display unit of FIG. 2, FIG. 128 illustrates a pixel of the display unit of FIG. 127, and FIG. 129 illustrates a timing diagram showing an example of a driving signal for driving the display unit of FIG. 127.

As illustrated in FIG. 127, the display unit includes a display panel 251 including a plurality of pixels PX, a data driver 2522, a scan driver 2520, and a signal controller 2524.

The display panel 251 includes a plurality of pixels PX arranged in a substantially matrix form. Although not particularly limited, a plurality of scan lines S1 to Si extend oppositely in a row direction in an arrangement of the pixels to be substantially parallel to each other, and a plurality of data lines D1 to Dj extend in a substantially column direction to be substantially parallel to each other.

Each of the pixels PX is connected to a corresponding one of the scan lines S1 to Si and a corresponding one of the data lines D1 to Dj, connected to the display panel 251. In addition, although not illustrated directly on the display panel 251 of FIG. 127, each of the pixels PX is connected to a power source connected to the display panel 251 to receive a first power supply voltage ELVDD and a second power supply voltage ELVSS.

Each of the pixels PX emits light with predetermined luminance by a driving current supplied to an organic light emitting diode depending on a corresponding data signal transferred through the data lines D1 to Dj.

The scan driver 2520 generates and transfers a scan signal corresponding to each pixel through the scan lines S1 to Si. That is, the scan driver 2520 transfers a scan signal to each of pixels included in each pixel row through a corresponding scan line.

The scan driver 2520 receives a scan driving control signal CONT2 from the signal controller 2524 to generate a plurality of scan signals, and sequentially supplies the scan signals to scan lines S1 to Si connected to each pixel row. In addition, the scan driver 2520 generates a common control signal, and supplies the common control signal to a common control line connected to all of the pixels PX.

The data driver 2522 transfers a data signal to each pixel through the data lines D1 to Dj.

The data driver 2522 receives a data driving control signal CONT1 from the signal controller 2524, and supplies data signals corresponding to the data lines D1 to Dj connected to each of pixels included in each pixel row.

The signal controller 2524 converts an image signal transferred from the outside into image data DATA, and transfers it to the data driver 2522. The signal controller 2524 receives external control signals such as a vertical synchronization signal Vsync, a horizontal synchronization signal Hsync, and a clock signal, and generates control signals for controlling drivings of the scan driver 2520 and the data driver 2522 to transfer them to each of them. That is, the signal controller 2524 generates and transfers a scan driving control signal CONT2 for controlling the scan driver 2520 and a data driving control signal CONT1 for controlling the data driver 2522.

As illustrated in FIG. 128, the pixel PX_lk may include an organic light emitting diode OLED, a first transistor TR1, a second transistor TR2, and a storage capacitor Cst. The pixel PX_lk may be positioned in an $l^{th}$ pixel row and a $k^{th}$ pixel column. Each transistor is assumed to be a PMOS transistor for convenience of description.

The first transistor TR1 may be a driving transistor. In an embodiment, the first transistor TR1 may include a gate connected to the first node N1, a source connected to the first power voltage ELVDD, and a drain connected to an anode of the organic light emitting diode OLED.

The driving current is a current corresponding to a voltage difference between the gate and the source of the first transistor TR1, and the driving current varies in response to a voltage depending on a data signal applied to a data line Dl.

The second transistor TR2 may be turned on depending on a level of a scan signal applied to a scan line Sk to connect a first node N1 and the data line Dl. In an embodiment, the second transistor TR2 may include a gate connected to the scan line Sk, a source connected to the data line Dl, and a drain connected to the first node N1. The second transistor TR2 transfers a data voltage depending on a data signal D[l] transferred through the $l^{th}$ data line Dl to the first node N1 in response to a corresponding scan signal S[k] transferred through the $k^{th}$ scan line Sk.

The storage capacitor Cst is connected between the first power voltage ELVDD and the first node N1. In an embodiment, the storage capacitor Cst may include a first electrode connected to the first power voltage ELVDD and a second electrode connected to the first node N1.

The organic light emitting diode OLED may emit light by a driving current flowing from the first transistor TR1. In an embodiment, the organic light emitting diode OLED may include an anode connected to a drain of the first transistor TR1 and a cathode connected to the second power voltage ELVSS.

Figure 29:
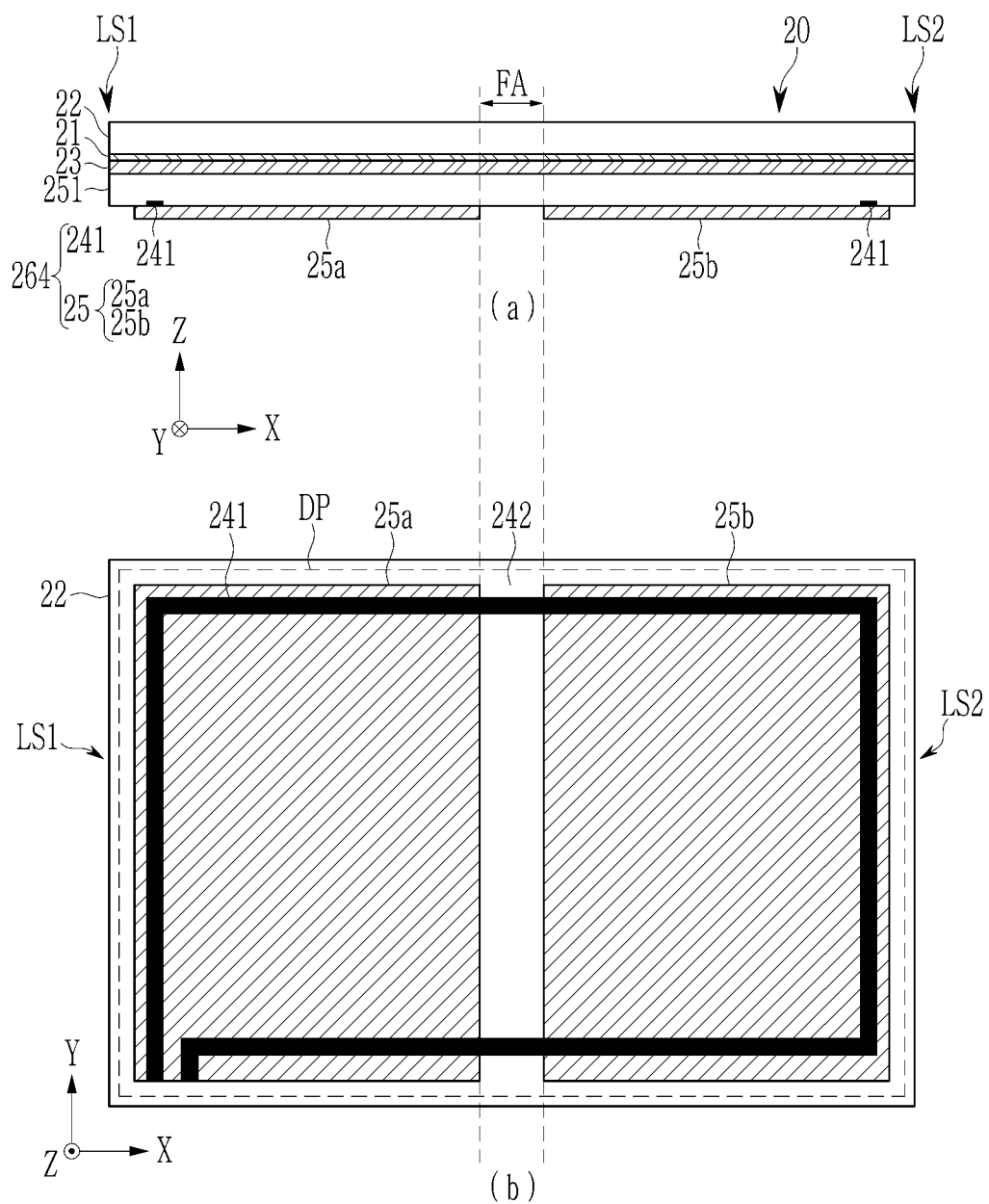

As illustrated in FIG. 29, a cycle of a pulse of the vertical synchronization signal Vsync may be one frame period 1 FRAME of the display panel 251 depending on a display frame rate.

During one frame period 1 FRAME, the data driver 2522 may be synchronized with the horizontal synchronization signal Hsync to apply a data signal of an enable level to the data lines D1 to Dj. For example, the data driver 2522 applies a data signal corresponding to pixels connected to a scan line to which a scan signal having a low level voltage L is applied to all of the data lines D1 to Dj for every pulse of the horizontal synchronization signal Hsync.

During one frame period 1 FRAME, the scan driver 2520 may be synchronized with the horizontal synchronization signal Hsync to substantially apply the scan signals S[1], S[2], . . . , S[k−1], and S[k]. For example, the scan driver 2520 applies the scan signal of the low level voltage L to one corresponding scan line for every pulse of the horizontal synchronization signal Hsync.

Within one horizontal period 1H, that is, one cycle of the pulse of the horizontal synchronization signal Hsync, there is a period dwp during which the data signal is applied to the data line and a period sp in which the scan signal is the low level voltage L.

Regarding the period dwp and the period sp, a pixel connected to the scan line Sk and the data line Dl will be described as an example.

At t00, one horizontal period 1H begins. At t01, a data signal DATA[k] is applied to the data line Dl. At t10, the scan signal S[k] applied to the scan line Sk is changed to the low level voltage L.

The time t10 at which the scan signal S[k] is changed to the low level voltage L and the time t01 at which the data signal DATA[k] starts to be applied to the data line Dl are the same or different. For example, in consideration of an RC delay of the data line Dl, before the scan signal S[k] is changed to the low level voltage L, the data signal DATA[k] is may be applied to the data line Dl.

At t11, the scan signal S[k] is changed to a high level voltage H. At t12, the application of the data signal DATA[k] to the data line Dl is stopped. At t22, one horizontal period 1H ends.

The time t11 at which the scan signal S[k] is changed to the high level voltage H may be the same as or different from the time t12 at which the application of the data signal DATA[k] to the data line Dl is stopped, or may be different. For example, after the scan signal S[k] is changed to the high level voltage H, the application of the data signal DATA[k] to the data line Dl may be stopped.

The data writing period TA described in FIG. 126 includes a period dwp and a period sp. Specifically, the data writing period TA starts from an earlier time of a time at which the period dwp starts and a time at which the period sp starts, to a later time of a time at which the period dwp ends and a time at which the period sp ends, and for example, the data writing period TA may be a period from t01 to t12.

Figure 28:
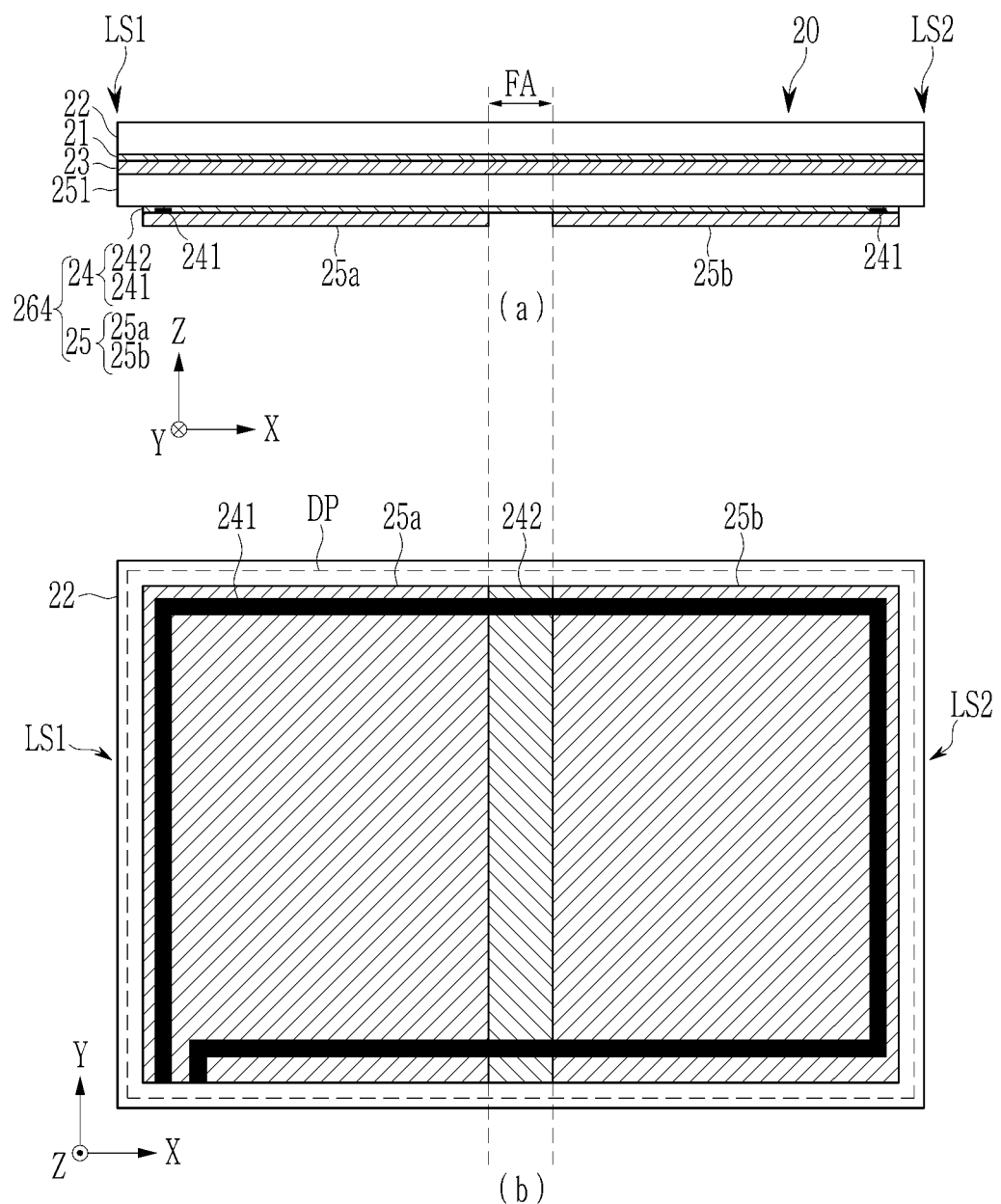
FIG. 28 to FIG. 33 illustrate views showing an arrangement of a touch panel and a loop coil according to various aspects of an embodiment.

An operation of the touch sensor 261 coupled to the display panel 251 will be described with reference to FIG. 27 and FIG. 28.

Figure 130:
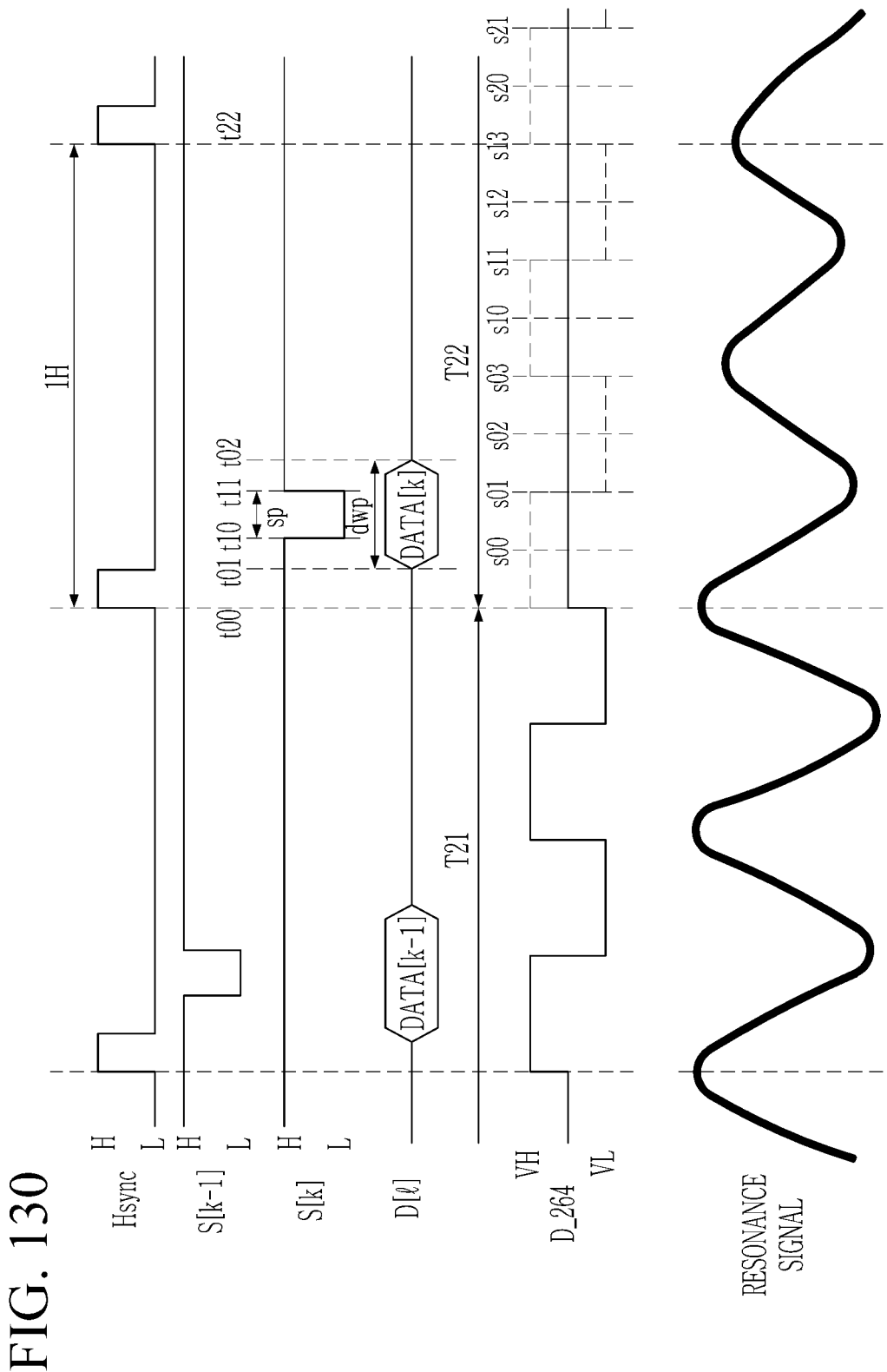
FIG. 130 and FIG. 131 each illustrate a timing diagram showing timing at which an electronic device receives a sensing signal in synchronization with a horizontal synchronization signal of the display unit of FIG. 126 depending on the driving method of FIG. 125 according to an embodiment.
Figure 131:
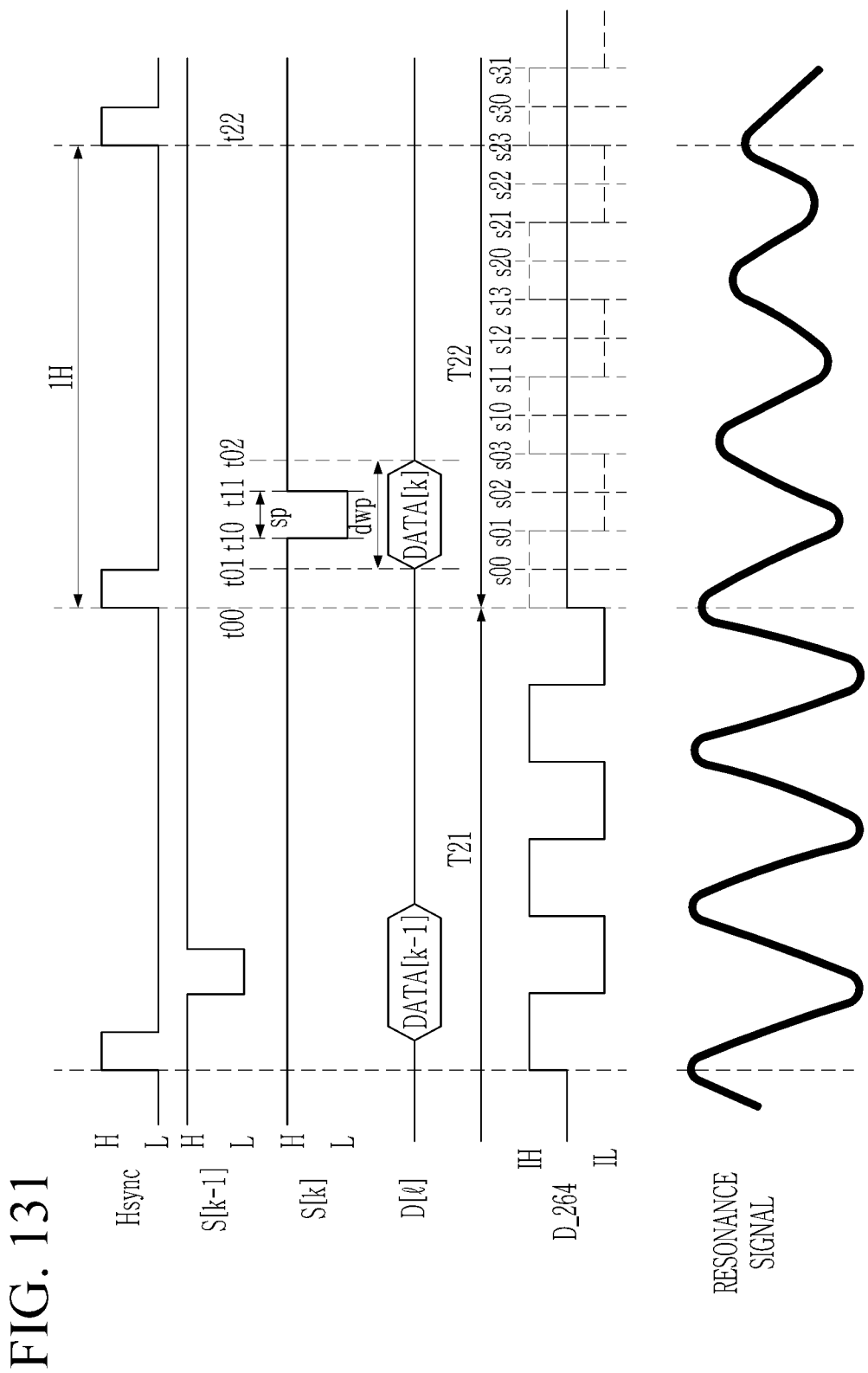

FIG. 130 and FIG. 131 each illustrate a timing diagram showing a timing at which an electronic device receives a sensing signal in synchronization with a horizontal synchronization signal of the display unit of FIG. 126 depending on the driving method of FIG. 125 according to an embodiment.

As illustrated in FIG. 130, a frequency of the driving signal D_264 during the first subperiod T21 may be twice that of the horizontal synchronization signal Hsync.

In response to the frequency of the driving signal D_264 applied during the first subperiod T21, the first driver/receiver 2620 and the second driver/receiver 2622 during the second subperiod T22 may sample a sensing signal. For example, the first driver/receiver 2620 and the second driver/receiver 2622 may sample the sensing signal at at least one sampling time s00, s01, s02, s03, s10, s11, s12, s13, . . . depending on a clock signal having a predetermined frequency. As illustrated in FIG. 27, a clock signal for sampling the sensing signal has a frequency of four times the frequency of the driving signal D_264. At least one sampling time s00, s01, s02, s03, s10, s11, s12, s13, . . . in the present disclosure may be arbitrary timing that may be set periodically in relation to the frequency of the driving signal D_264.

When a cycle of the horizontal synchronization signal Hsync is changed due to an interface delay between the signal controller 220 and the touch controller 262, etc. after the driving signal is synchronized with the pulse of the horizontal synchronization signal Hsync, a discrepancy between a sampling time (e.g., a clock signal for sampling the sensing signal has a frequency of four times the frequency of the driving signal D_264) that is periodically set depending on the frequency of the driving signal D_264 and one horizontal period 1H depending on the horizontal synchronization signal Hsync of which cycle is changed may occur.

For example, when the period of the horizontal synchronization signal Hsync is changed after being synchronized with a first pulse of the horizontal synchronization signal Hsync, the clock signal for sampling the sensing signal is synchronized with the first pulse, and thus timing of the sampling times within one horizontal period 1H is changed. Then, it is difficult to distinguish whether sensing signals sampled within one horizontal period 1H are sensing signals sampled within the periods dwp and sp, or sensing signals sampled within a period other than the periods dwp and sp.

Accordingly, the driving signal D_264 may be synchronized by at least one of the pulse of the horizontal synchronization signal Hsync or the pulse of the vertical synchronization signal Vsync. That is, the timing of the driving signal may be refreshed every horizontal period of a predetermined period or every frame of a predetermined period.

For example, the driving signal D_264 may be synchronized with pulses of the horizontal synchronization signal Hsync of a predetermined period. For example, the pulse of the driving signal D_264 may be started in synchronization with the first pulse of the horizontal synchronization signal Hsync, and then the pulse of the driving signal D_264 may be started in synchronization with an $i^{th}$ pulse of the horizontal synchronization signal. Accordingly, the sampling time periodically set depending on the frequency of the driving signal D_264 may be a desired time within one horizontal period 1H even when the period of the horizontal synchronization signal Hsync is changed.

As another example, the driving signal D_264 may be synchronized with the pulse of the vertical synchronization signal Vsync every frame of a predetermined period. As illustrated in FIG. 129, the pulse of the vertical synchronization signal Vsync may be changed to the enable level H at a same timing as the pulse of the horizontal synchronization signal Hsync of one horizontal period 1H. Accordingly, it is possible to prevent a shift between the horizontal synchronization signal Hsync and a sampling time in a corresponding frame by synchronizing the pulse of the vertical synchronization signal Vsync and the driving signal D_264 in every frame. For example, the pulse of the driving signal D_264 may be started in synchronization with the pulse of the vertical synchronization signal Vsync of the first frame, and then the pulse of the driving signal D_264 may be started in synchronization with the pulse of the vertical synchronization signal Vsync of the second frame. Accordingly, the sampling time that is periodically set depending on the frequency of the driving signal D_264 may be a desired time within one horizontal period 1H within a frame synchronized to the vertical synchronization signal Vsync even when the period of the horizontal synchronization signal Hsync is changed.

In addition, in the present disclosure, at least one sampling time s00, s01, s02, s03, s10, s11, s12, s13, . . . may include at least two viewpoints of which phases are opposite to each other within one period of the frequency of the driving signal D_264. The present invention is not limited to the above description.

In addition, in the present disclosure, at least one sampling time s00, s01, s02, s03, s10, s11, s12, s13, . . . may include at least two viewpoints of which phases are changed within one period of the frequency of the driving signal D_264. The present invention is not limited to the above description.

The touch controller 262 generates touch information by using a sensing signal sampled during a period other than the periods dwp and sp within one horizontal period 1H. That is, the touch controller 262 may generate touch information indicating touch coordinates, touch intensity, and the like by using a sensing signal sampled by the first driver/receiver 2620 and the second driver/receiver 2622 at at least one sampling time s10, s11, s12, s13, . . . .

In this case, the touch controller 262 may acquire a signal magnitude, i.e., an amplitude, of the sensing signal by using a difference value between the signal value sampled at the first sampling time s10 and the signal value sampled at the third sampling time s12. In addition, the touch controller 262 may acquire a signal level of the sensing signal by using a difference value between a signal value received at the second sampling time s11 and a signal value received at the fourth sampling time s13. The touch controller 262 may determine whether a touch occurs, touch coordinates, etc. depending on the signal magnitude of the sensing signal.

Alternatively, the touch controller 262 may control the first driver/receiver 2620 and the second driver/receiver 2622 to sample the sensing signal during a period other than the periods dwp and the period sp within one horizontal period 1H.

As illustrated in FIG. 131, a frequency of the driving signal D_264 during the first subperiod T21 may be three times that of the horizontal synchronization signal Hsync.

According to an embodiment, the touch controller 262 selects some of the sensing signals sampled at least once during the second subperiod T22 based on the horizontal synchronization signal, and generates touch information by using the some selected sensing signals. That is, the touch controller 262 uses the sensing signal sampled during the period other than the period dwp and the period sp as touch information within one horizontal period 1H within the second subperiod T22.

A sensing signal that generates noise depending on a signal applied to a data line and a scan line that may generate parasitic capacitance with touch electrodes is not used as touch information as a sensing signal sampled during one horizontal period 1H except for the period dwp during which the touch controller 262 applies a data signal to the data line and the period sp during which the scan signal is the low level voltage L is used within one horizontal period 1H, and thus, there is an effect of improving the SNR.

According to an embodiment, during the period other than the period dwp and the period sp within one horizontal period 1H within the second subperiod T22, the first driver/receiver 2620 receives sensing signals from the first touch electrodes 111-1 to 111-$m$, and the second driver/receiver 2622 receives sensing signals from the second touch electrodes 121-1 to 121-$n$.

There is an effect of preventing noise of a sensing signal depending on a signal applied to a data line and a scan line that may generate parasitic capacitance with the touch electrodes by sampling the sensing signal by the first driver/receiver 2620 and the second driver/receiver 2622 during a period excluding the period dwp during which the data signal is applied to the data line and the period sp during which the scan signal is the enable level voltage L within one horizontal period 1H.

Next, another aspect of the display unit will be described with reference to FIG. 132 and FIG. 133, and an operation of a touch sensor unit coupled to a display panel of the display unit of FIG. 132 will be described with reference to FIG. 134.

Figure 132:
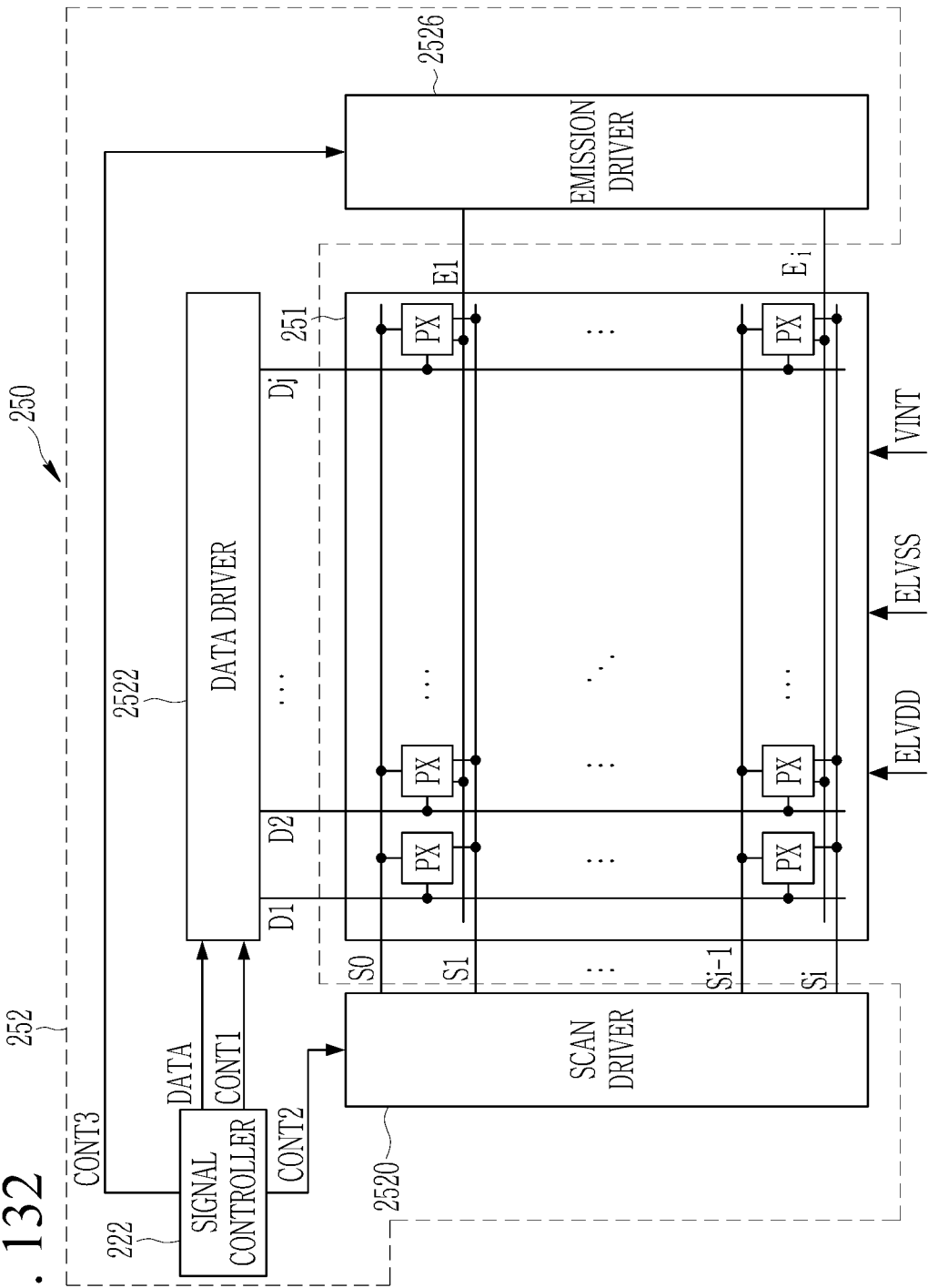
FIG. 132 illustrates a block diagram schematically showing another aspect of a display unit of FIG. 2.
Figure 133:
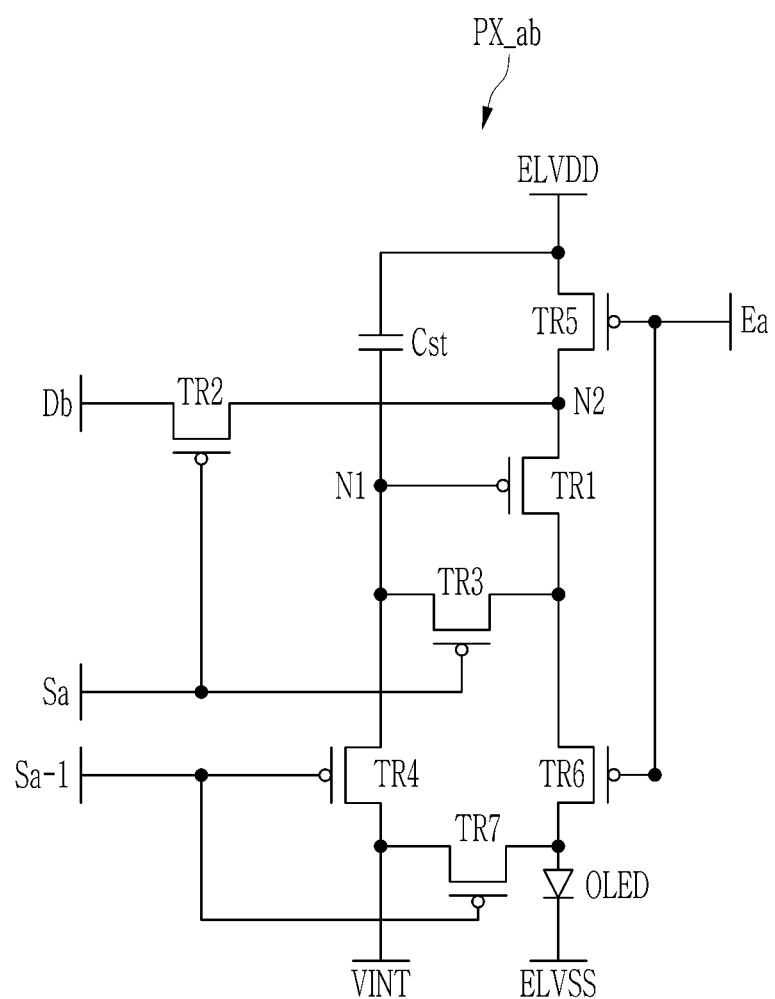
FIG. 133 illustrates a pixel of the display unit of FIG. 132.
Figure 134:
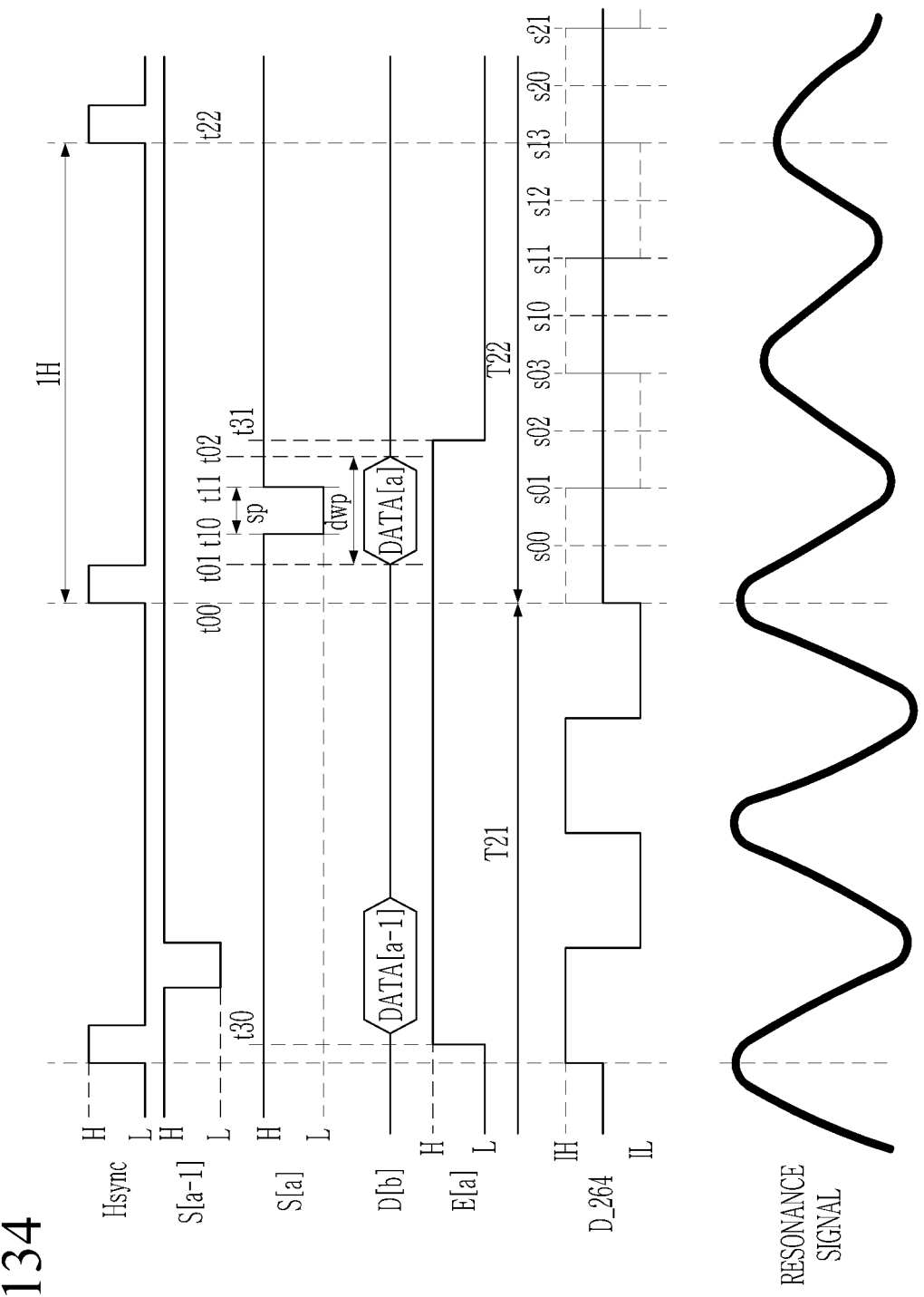
FIG. 134 illustrates a timing diagram showing a timing at which an electronic device receives a sensing signal in synchronization with a horizontal synchronization signal of the display unit of FIG. 132 depending on the driving method of FIG. 125 according to an embodiment.

FIG. 132 illustrates a block diagram schematically showing another aspect of a display unit of FIG. 2, FIG. 133 illustrates a pixel of the display unit of FIG. 132, and FIG. 134 illustrates a timing diagram showing timing at which an electronic device receives a sensing signal in synchronization with a horizontal synchronization signal of the display unit of FIG. 132 depending on the driving method of FIG. 125 according to an embodiment.

As illustrated in FIG. 132, the display unit includes a display panel 251 including a plurality of pixels PX, a data driver 2522, a scan driver 2520, an emission control driver 2526, and a signal controller 2524.

The display panel 251 includes a plurality of pixels PX arranged in a substantially matrix form. Although not particularly limited, a plurality of scan lines S0 to Si and a plurality of emission control lines E1 to Ei extend oppositely in a row direction in an arrangement of the pixels to be substantially parallel to each other, and a plurality of data lines D1 to Dj extend in a substantially column direction to be substantially parallel to each other.

Each of the pixels PX is connected to corresponding two scan lines among the scan lines S0 to Si connected to the display panel 251, a corresponding one of the emission control lines E1 to Ei, and a corresponding one of the data lines D1 to Dj. In addition, although not illustrated directly on the display panel 251 of FIG. 132, each of the pixels PX is connected to a power source connected to the display panel 251 to receive a first power supply voltage ELVDD, a second power supply voltage ELVSS, and a second power supply voltage VINT.

Each of the pixels PX of the display panel 251 is connected to two corresponding scan lines. That is, each is connected to the scan line corresponding to a pixel row including the corresponding pixel and the scan line corresponding to a previous pixel row of the pixel row. Each of pixels included in the first pixel row may be connected to the first scan line S1 and the dummy scan line S0. In addition, each of the pixels included in an $i^{th}$ pixel row is connected to an $i^{th}$ scan line Si corresponding to the $i^{th}$ pixel row, which is a corresponding pixel row, and an $(i-1)^{th}$ scan line (Si-1) corresponding to the $(i-1)^{th}$ pixel row, which is a previous pixel row.

Each of the pixels PX emits light with predetermined luminance by a driving current supplied to an organic light emitting diode depending on a corresponding data signal transferred through the data lines D1 to Dj.

The scan driver 2520 generates and transfers a scan signal corresponding to each pixel PX through the scan lines S0 to Si. That is, the scan driver 2520 transfers a scan signal to each pixel PX included in each pixel row through a corresponding scan line.

The scan driver 2520 receives a scan driving control signal CONT2 from the signal controller 2524 to generate a plurality of scan signals, and sequentially supplies the scan signals to scan lines S0 to Si connected to each pixel row.

The data driver 2522 transfers a data signal to each pixel through the data lines D1 to Dj.

The data driver 2522 receives a data driving control signal CONT1 from the signal controller 2524, and supplies data signals corresponding to the data lines D1 to Dj connected to each of pixels included in each pixel row.

The emission control driver 2526 is connected to the emission control lines E1 to Ei connected to the display panel 251 including the pixels PX arranged in a matrix form. That is, the emission control lines E1 to Ei extending substantially parallel to each other in a substantially row direction opposite to each of the pixels connect each of the pixels PX to the emission control driver 2526.

The emission control driver 2526 generates and transfers an emission control signal corresponding to each pixel through the emission control lines E1 to Ei. Each pixel receiving the emission control signal is controlled to emit an image depending on the image data signal in response to the control of the emission control signal. That is, operations of the emission control transistors (TR5, TR6 in FIG. 133) included in each pixel are controlled in response to the emission control signal transmitted through the corresponding emission control line, and accordingly, the organic light emitting diode connected to the light emission control transistor may or may not emit light with luminance depending on the driving current corresponding to the data signal.

The first power voltage ELVDD, the second power voltage ELVSS, and the initialization voltage VINT are supplied to each pixel PX of the display panel 251. The first power voltage ELVDD may be a predetermined high level voltage, and the second power voltage ELVSS may be a voltage that is lower than the first power voltage ELVDD or a ground voltage. The initialization voltage VINT may be set to be equal to or lower than the second power voltage ELVSS.

Voltage values of the first power voltage ELVDD, the second power voltage ELVSS, and the initialization voltage VINT are not particularly limited.

The signal controller 2524 converts a plurality of image signals transferred from the outside into a plurality of image data signals DATA to transmit the converted image signals to the data driver 2522. The signal controller 2524 receives the vertical synchronization signal Vsync, the horizontal synchronization signal Hsync, and the clock signal to control driving of the scan driver 2520, to generate and transmit control signals for controlling driving of the scan driver 2520, the emission control driver 2526, and the data driver 2522, respectively. That is, the signal control unit 2524 generates and transfers a data driving control signal CONT1 for controlling the data driver 2522, a scan driving control signal CONT2 for controlling the scan driver 2520, and an emission driving control signal CONT3 for controlling an operation of the emission control driver 2526.

As illustrated in FIG. 133, a pixel PX_ab includes an organic light emitting diode OLED, a storage capacitor Cst, and first to seventh transistors TR1 to TR7. The pixel PX_ab may be positioned in an $a^{th}$ pixel row and a $b^{th}$ pixel column. Each transistor is assumed to be a PMOS transistor for convenience of description.

The first transistor TR1 includes a gate connected to the first node N1, a source connected to the second node N2 connected to the drain of the fifth transistor TR5, and a drain connected to the third node N3. A driving current flows through the first transistor TR1 depending on a corresponding data signal D[b].

The driving current is a current corresponding to a voltage difference between a source and a gate of the first transistor TR1, and the driving current varies corresponding to the data voltage depending on the applied data signal D[b].

The second transistor TR2 has a gate connected to the $a^{th}$ scan line Sa, a source connected to the $b^{th}$ data line Db, and a drain connected to the second node N2 to which a source of the first transistor TR1 and a drain of the fifth transistor TR5 are commonly connected. The second transistor TR2 transfers a data voltage depending on a data signal D[b] transferred through the $b^{th}$ data line Db to the second node N2 in response to a corresponding scan signal S[j] transferred through the $a^{th}$ scan line Sa.

The third transistor TR3 includes a gate connected to the $a^{th}$ scan line Sa, and opposite ends respectively connected to the gate and the drain of the first transistor TR1. The third transistor TR3 operates in response to a corresponding scan signal S[j] transferred through the $a^{th}$ scan line Sa. The turned-on third transistor TR3 connects the gate and the drain of the first transistor TR1 to diode-connect the first transistor TR1.

When the first transistor TR1 is diode-connected, a voltage compensated by a threshold voltage of the first transistor TR1 is applied to the gate of the first transistor TR1 from the data voltage applied to the source of the first transistor TR1. Since the gate of the first transistor TR1 is connected to a first electrode of the storage capacitor Cst, a voltage thereof is maintained by the storage capacitor Cst. Since the voltage compensated by the threshold voltage of the first transistor TR1 is applied to the gate and maintained, a driving current flowing through the first transistor TR1 is not affected by the threshold voltage of the first transistor TR1.

The fourth transistor TR4 includes a gate connected to an $(a-1)^{th}$ scan line S(a-1), a source connected to the initialization voltage VINT, and a drain connected to the first node N1. The fourth transistor TR4 transfers the initialization voltage VINT applied through the initialization voltage VINT to the first node N1 in response to an $(a-1)^{th}$ scan signal S[a-1] transferred through the $(a-1)^{th}$ scan line S(a-1). The fourth transistor TR4 may transfer the initialization voltage VINT to the first node N1 before the data signal D[b] is applied in response to the $(a-1)^{th}$ scan signal S[a-1] pre-transferred to the $(a-1)^{th}$ scan line S(a-1) corresponding to a previous pixel row of a $j^{th}$ pixel row including the corresponding pixel PX_ab.

In this case, a voltage value of the initialization voltage VINT is not limited, but may be set to have a low level voltage value to sufficiently lower a gate voltage of the first transistor TR1 for initialization. That is, the gate of the first transistor TR1 is initialized to the initialization voltage VINT during a period during which the $(a-1)^{th}$ scan signal S[a-1] is transferred to the gate of the fourth transistor TR4 at a gate-on voltage level.

The fifth transistor TR5 includes a gate connected to the $j^{th}$ emission control line Ej, a source connected to the first power voltage ELVDD, and a drain connected to the second node N2.

The sixth transistor TR6 includes a gate connected to the $j^{th}$ emission control line Ej, a source connected to the third node N3, and a drain connected to the anode of the organic light emitting diode OLED.

The fifth transistor TR5 and the sixth transistor TR6 operate in response to the $j^{th}$ emission control signal E[j]

transferred through the $j^{th}$ emission control line Ej. When the fifth transistor TR5 and the sixth transistor TR6 are turned on in response to the $j^{th}$ emission control signal E[j], a current path is formed in a direction of the organic light emitting diode OLED from the first power voltage ELVDD such that a driving current can flow therein, and then, the organic light emitting diode OLED emits light depending on the driving current to display an image of a data signal.

The storage capacitor Cst includes a first electrode connected to the first node N1 and a second electrode connected to the first power voltage ELVDD. Since the storage capacitor Cst is connected between the gate of the first transistor TR1 and the first power voltage ELVDD as described above, a voltage applied to the gate of the first transistor TR1 may be maintained.

The seventh transistor TR7 includes a gate connected to the $(a-1)^{th}$ scan line S(a-1), a source connected to the anode of the organic light emitting diode OLED, and a drain connected to a power supply of the initialization voltage VINT.

The seventh transistor TR7 may transfer the initialization voltage VINT to the anode of the organic light emitting diode OLED in response to the $(a-1)^{th}$ scan signal S[a-1] pre-transferred to the $(a-1)^{th}$ scan line S(a-1) corresponding to a previous pixel row of a $j^{th}$ pixel row including the corresponding pixel PX_ab. The anode of the organic light emitting diode OLED is reset to a sufficiently low voltage by the transferred initialization voltage VINT.

A driving operation of the pixel PX_ab and an operation of receiving a sensing signal by an electronic device according to a timing diagram of FIG. 134 will be described based on a circuit diagram of the pixel PX_ab of FIG. 133.

As illustrated in FIG. 134, a frequency of the driving signal D_264 during the first subperiod T21 may be twice that of the horizontal synchronization signal Hsync.

First, a driving operation of the pixel PX_ab will be described.

The seventh transistor TR7 as well as the fourth transistor TR4 are turned on by the low level voltage L of the $(a-1)^{th}$ scan signal S[a-1] transferred through the $(a-1)^{th}$ scan line S(a-1). Then, the initialization voltage VINT for initializing a gate electrode voltage of the first transistor TR1 is transferred to the first node N1 through the fourth transistor TR4.

During the period sp, the third transistor TR3 as well as the second transistor TR2 are turned on by the low level voltage L of the $a^{th}$ scan signal S[a] transferred through the $a^{th}$ scan line Sa. Then, a corresponding data signal DATA[a] is transmitted to the first node N1 through the turned-on second transistor TR2 and the turned-on third transistor TR3.

At t31, the fifth transistor TR5 and the sixth transistor TR6 are turned on by an emission control signal E[j] of the low level voltage L. Then, a driving current by a voltage stored in the storage capacitor Cst is transferred to the organic light emitting diode OLED, and the organic light emitting diode OLED emits light.

Next, an operation in which an electronic device receives a sensing signal will be described.

Within one horizontal period 1H, that is, one cycle of the pulse of the horizontal synchronization signal Hsync, there is a period dwp during which the data signal is applied to the data line and a period sp in which the scan signal is the low level voltage L. Then, an emission control signal is changed to the low level voltage L within one horizontal period 1H.

At least one sampling time s00, s01, s02, s03, s10, s11, s12, s13, . . . within the second subperiod T22, the first driver/receiver 2620 samples sensing signals from the first touch electrodes 111-1 to 111-m, and the second driver/receiver 2622 may sample sensing signals from the second touch electrodes 121-1 to 121-n.

According to an embodiment, the touch controller 262 selects some of the sensing signals sampled at least once during the second subperiod T22 based on the horizontal synchronization signal, and generates touch information by using the some selected sensing signals. That is, the touch controller 262 uses the sensing signal sampled during the period other than the period dwp and the period sp as touch information within one horizontal period 1H within the second subperiod T22.

A sensing signal that generates noise depending on a signal applied to a data line and a scan line that may generate parasitic capacitance with touch electrodes is not used as touch information as a sensing signal sampled during one horizontal period 1H except for the period dwp during which a data signal is applied to the data line and the period sp during which the scan signal is the low level voltage L is used, and thus, there is an effect of improving the SNR.

According to an embodiment, during the period other than the period dwp and the period sp within one horizontal period 1H within the second subperiod T22, the first driver/receiver 2620 receives sensing signals from the first touch electrodes 111-1 to 111-m, and the second driver/receiver 2622 receives sensing signals from the second touch electrodes 121-1 to 121-n.

There is an effect of preventing noise of a sensing signal according to a signal applied to a data line and a scan line that may generate parasitic capacitance with the touch electrodes by sampling a sensing signal during one horizontal period 1H except for the period dwp during which a data signal is applied to the data line and the period sp during which the scan signal is the low level voltage L is used.

Additionally, at least one time s10, s11, s12, and s13 is positioned within a period excluding a time t31 at which the emission control signal E[a] is changed to the low level voltage L within one horizontal period 1H within the second subperiod T22.

That is, there is an effect of preventing noise of a sensing signal depending on a signal applied to an emission control line capable of generating parasitic capacitance with the touch electrodes by using the sampled sensing signal during a period excluding the time t31 when the emission control signal E[a] is changed to the low level voltage L within one horizontal period 1H, or by sampling a sensing signal during a period excluding the time point t31 when the emission control signal E[a] is changed to the low level voltage L within one horizontal period 1H.

Next, a control method of an electronic device according to an embodiment for reducing sensing noise caused by electromagnetic coupling between the loop coil 264 and the touch electrodes 111 and 121 will be described with reference to FIG. 135.

Figure 135:
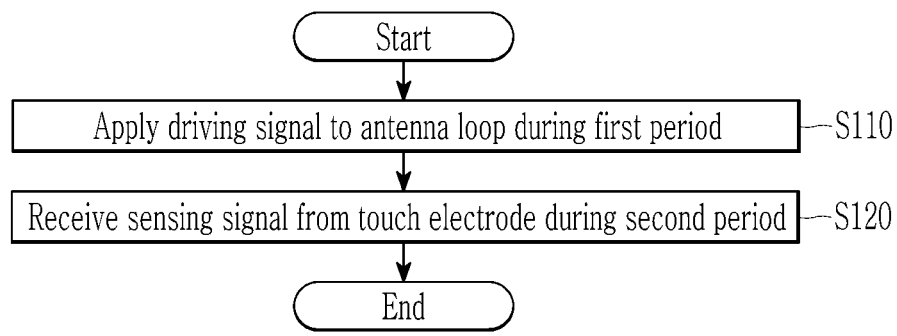
FIG. 135 illustrates a flowchart showing a control method of an electronic device according to another embodiment.

FIG. 135 illustrates a flowchart showing a control method of an electronic device according to another embodiment.

During a first period, the coil driver 263 applies a driving signal to the loop coil 264. The resonance circuit 12 of the stylus pen 10 resonates with the driving signal. An electromagnetic signal generated by a resonance signal is transferred to the touch sensor 261 through the conductive tip 11.

During a second period after the first period, the first driver/receiver 2620 and the second driving/receiver 2622 receive sensing signals transferred from the first touch electrodes 111-1 to 111-n and sensing signals transferred from the second touch electrodes 121-1 to 121-m (S120). The first driver/receiver 2620 and the second driver/receiver 2622 may process the received detection signals to transfer them to the touch controller 2624. The touch controller 2624 may obtain touch coordinate information of a point where a touch of the stylus pen 10 occurs by using the transferred sensing signals.

In accordance with an electronic device and a control method thereof according to the present disclosure, there is an effect of reducing noise due to electromagnetic coupling between the loop coil 264 and the touch electrodes 111 and 121 by distinguishing a period for driving the loop coil 264 and a period for receiving a sensing signal through the touch electrodes 111 and 121. In this regard, noise will be described with reference to FIG. 136.

Figure 136:
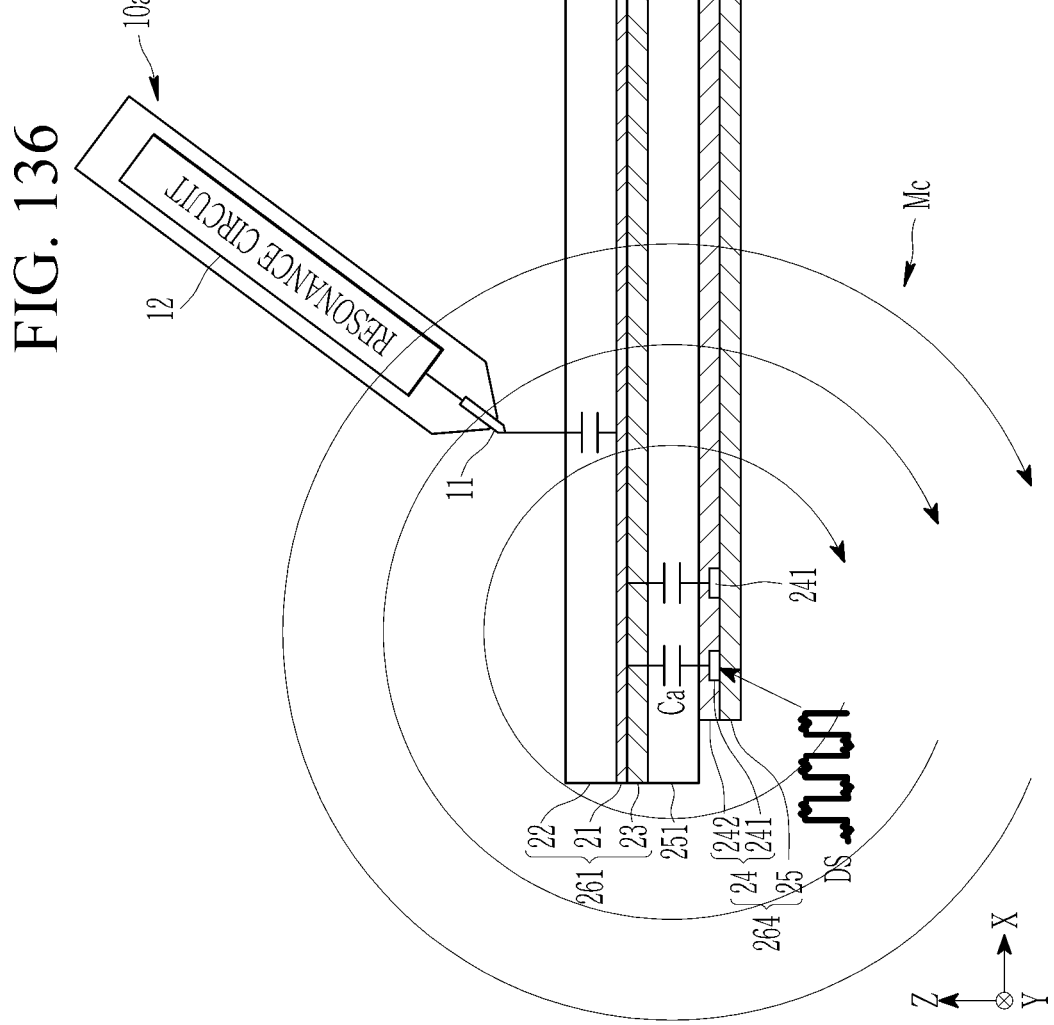
FIG. 136 illustrates a disposal form of a touch panel and a loop coil of an electronic device according to an embodiment.

FIG. 136 illustrates a disposal form of a touch panel and a loop coil of an electronic device according to an embodiment.

The antenna loop 241 and the touch electrode layer 21 are electromagnetically influenced by each other. For example, the touch electrodes 111 and 121 positioned on the touch electrode layer 21 may form capacitive coupling Ca with the antenna loop 241. Accordingly, when the driving signal DS of a predetermined frequency is applied to the antenna loop 241, noise may be generated in the sensing signal sensed by the touch electrodes 111 and 121. In addition, when a current flows through the antenna loop 241 to generate a magnetic field Mc, noise may be generated in a sensing signal sensed by the touch electrodes 111 and 121 by electromagnetic induction.

Such a touch sensing method will be described together with reference to FIG. 137 and FIG. 138.

Figure 137:
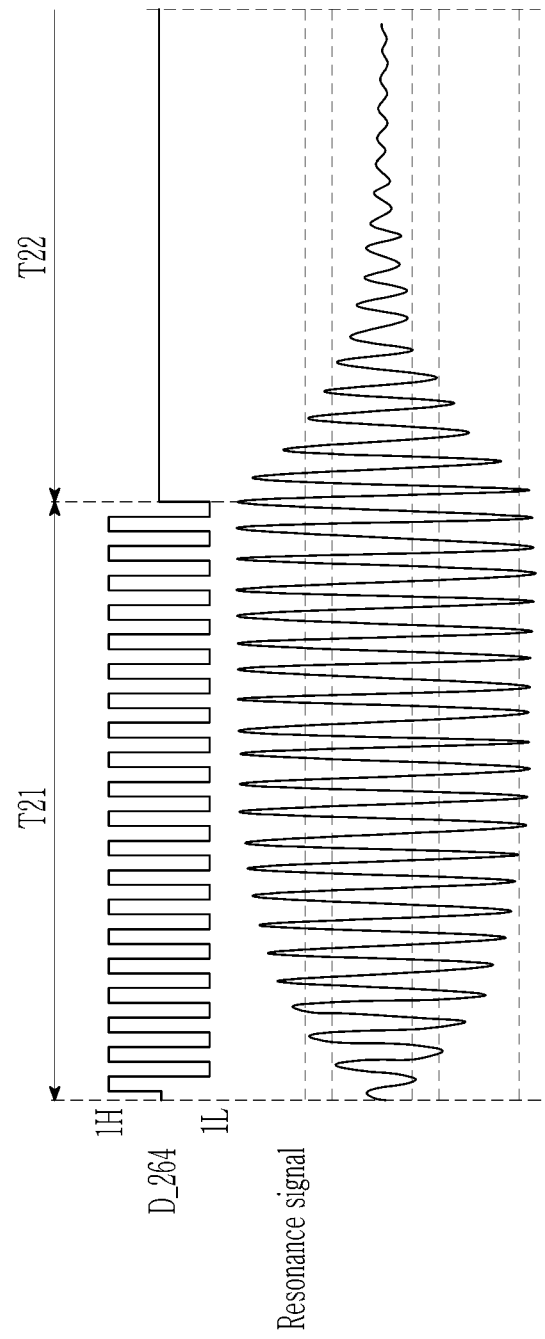
FIG. 137 illustrates a driving signal applied by a coil driver to a loop coil and a resonance signal of a stylus pen according to an aspect.
Figure 138:
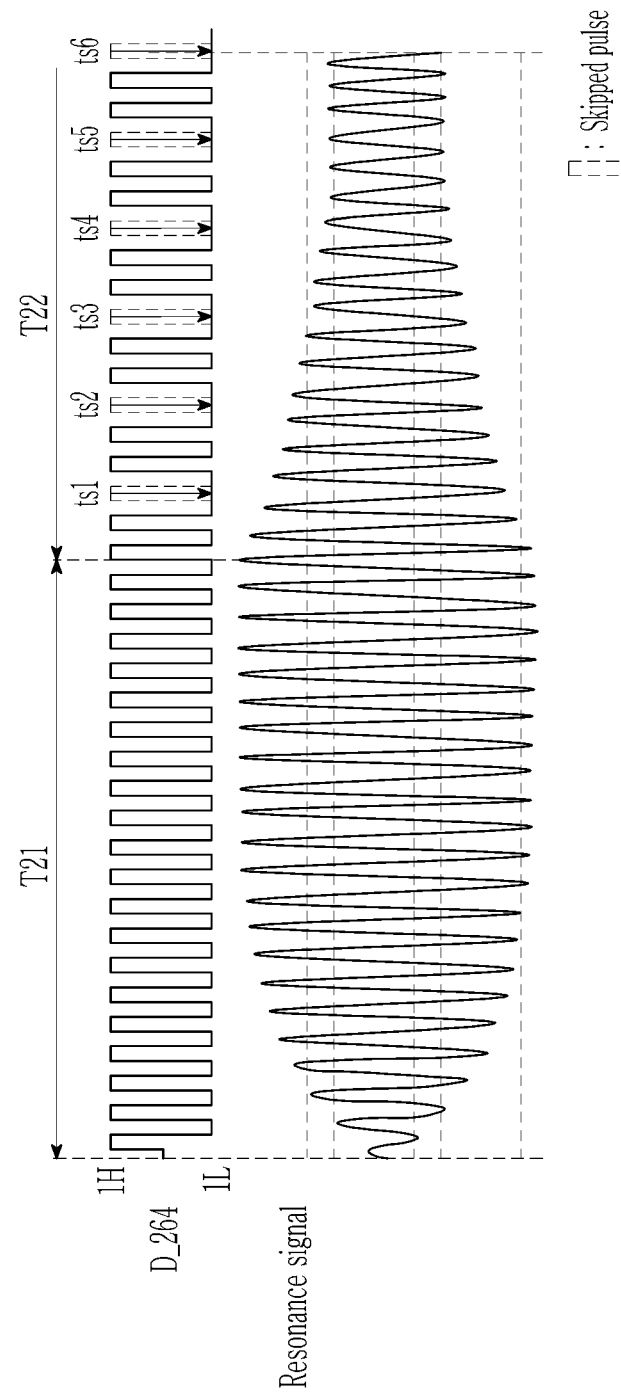
FIG. 138 illustrates a driving signal applied by a coil driver to a loop coil and a resonance signal of a stylus pen according to another aspect.

FIG. 137 illustrates a driving signal applied by a coil driver to a loop coil and a resonance signal of a stylus pen according to an aspect, and FIG. 138 illustrates a driving signal applied by a coil driver to a loop coil and a resonance signal of a stylus pen according to another aspect.

Referring to FIG. 137, during the first subperiod T21, the coil driver 263 applies the driving signal D_264 to the loop coil 264. The driving signal D_264 is a current oscillating at the high level IH and the low level IL, and has a frequency that is similar to a resonance frequency of the resonance circuit 12. During the first subperiod T21, a magnitude of the resonance signal generated by the resonance circuit 12 increases depending on a time when the driving signal D_264 is applied. A magnitude of the resonance signal is saturated after a certain time elapses. During the first subperiod T21, reception of detection signals from the first touch electrodes 111l to 111-$m$ and the second touch electrodes 121-1 to 121-$m$ is not performed.

After the first subperiod T21 ends, the coil driver 263 does not apply the driving signal D_264 to the loop coil 264 during the second subperiod T22. During the second subperiod T22, the first driver/receiver 2620 and the second driver/receiver 2622 receive sensing signals from the touch electrodes 111 and 121.

The first driver/receiver 2620 and the second driver/receiver 2622 may each receive a signal outputted from the stylus pen 10 as a sensing signal during the second subperiod T22 to which the driving signal D_264 is not applied. The touch controller 2624 may determine a touch position and a type of a touch object in the touch sensor 261 through the sensing signal received during the second subperiod T22. In accordance with an electronic device and a control method thereof according to the present disclosure, since the sensing signal is received through both the first touch electrodes 111l to 111-$n$ and the plurality of second touch electrodes 121-1 to 121-$m$ during the second subperiod, there is an advantage in that touch coordinates along two axes intersecting each other may be quickly obtained.

Referring to FIG. 138, during the first subperiod T21, the coil driver 263 applies the driving signal D_264 to the loop coil 264. During the first subperiod T21, a magnitude of the resonance signal generated by the resonance circuit 12 increases depending on a time when the driving signal D_264 is applied. A magnitude of the resonance signal is saturated after a certain time elapses. During the first subperiod T21, reception of detection signals from the first touch electrodes 111l to 111-$m$ and the second touch electrodes 121-1 to 121-$m$ is not performed.

After the first subperiod T21 ends, the coil driver 263 applies the driving signal D_264 that is different from that of the first subperiod T21 to the loop coil 264 during the second subperiod T22. During the second subperiod T22, the first driver/receiver 2620 and the second driver/receiver 2622 receive sensing signals from the touch electrodes 111 and 121.

When a duty ratio of the driving signal D_264 outputted during the first subperiod T21 (a ratio of the disable level period to the enable level period during one repeated cycle P) is 1:1, the driving signal D_264 outputted during the second subsection T22 may have a duty ratio of a:2b+1, a:2b+2, a:2b+3, a:2b+4, a:(3b+1), a:2(b+3)+1, a:2(b+3), a:(2b+1), . . . , and the like. Herein, a and b are integers. A period corresponding to one cycle P of the driving signal D_264 outputted during the second subperiod T22 may include a section in which the enable level section and the disable level section are repeated at least n times, and a section in which the disable level section is maintained at least 2n times. The enable level period corresponds to a period in which the driving signal has an enable level IH, and the disable level period corresponds to a period in which the driving signal has a disable level IL. The duty ratio of the driving signal is merely an example, and may include all ratios for allowing the resonance signal of the stylus pen 10 having reached a predetermined level to be maintained at an effective level.

A resonance signal of the stylus pen 10 that has reached a predetermined level by the driving signal D_264 during the first subperiod T21 may be maintained at an effective level by the driving signal D_264 during the second subperiod T22. Herein, the effective level indicates a level at which the touch controller 262 can detect the resonance signal of the stylus pen 10 as a touch signal or a level at which operable power can be stored in the power storage 14 or the battery 50 of the stylus pen 10.

The driving signal D_264 during the second subperiod T22 may be a signal in which at least one pulse is periodically omitted from the driving signal D_264 during the first subperiod T21. As described above, since the driving signal D_264 during the second subperiod T22 is outputted in a form in which at least one pulse is periodically omitted compared to the driving signal during the first subperiod T21, the driving signal D_264 during the first subperiod T21 and the driving signal D_264 during the second subperiod T22 may have different pulse rates. That is, the driving signal D_264 during the second subperiod T22 may have a lower pulse rate than that of the driving signal D_264 during the first subperiod T21. Herein, a pulse rate may be a number of pulses outputted per unit time (e.g., 1 s).

As a number of skipped pulses of the driving signal D_264 decreases during the second subperiod T22, energy transferred from the loop coil 264 to the stylus pen 10 may increase. Therefore, as the number of skipped pulses of the driving signal D_264 decreases during the second subperiod T22, the signal level of the resonance signal generated during the second subperiod T22 increases. In addition, as the number of skipped pulses of the driving signal D_264 increases during the second subperiod T22, energy consumed for output of the driving signal D_264 may decrease. Therefore, as the number of pulses skipped by the driving signal D_264 increases during the second subperiod T22, energy consumed by the loop coil 264 during the subperiod T22 may be reduced.

During the second period, sensing signals may be received from the touch electrodes 111 and 121 during periods ts1, . . . , and ts6 during which a pulse of the driving signal D_264 is skipped. During the second subperiod T22, the first driver/receiver 2620 and the second driver/receiver 2622 may receive sensing signals from at least one touch electrode of the first touch electrodes 111-1 to 111-$n$ and the second touch electrodes 121-1 to 121-$n$.

In this case, the first driver/receiver 2620 and the second driver/receiver 2622 may simultaneously receive sensing signals through at least one first touch electrode among the first touch electrodes 111-1 to 111-$n$ and at least one touch electrode among the second touch electrodes 121-1 to 121-$m$. Accordingly, the electronic device and the control method thereof according to an embodiment have an effect of quickly acquiring touch coordinates along two axes intersecting each other.

As described above, in accordance with the electronic device and the control method thereof according to an embodiment, during a period in which no driving signal is applied to the loop coil 264, it is possible to reduce noise of a sensing signal that may be generated by the driving signal by receiving the sensing signal from a touch electrode, thereby improving sensitivity of touch input.

Driving signal waveforms during the first subperiod T21 and the second subperiod T22 are similar to the driving signal waveforms of FIG. 119 to FIG. 124, and thus a description thereof will be omitted. The first subperiod T21 corresponds to the initial period of FIG. 119 to FIG. 124, and the second subperiod T22 corresponds to the effective period of FIG. 119 to FIG. 124.

Next, a phenomenon in which noise affects touch sensing will be described with reference to FIG. 139.

Figure 139:
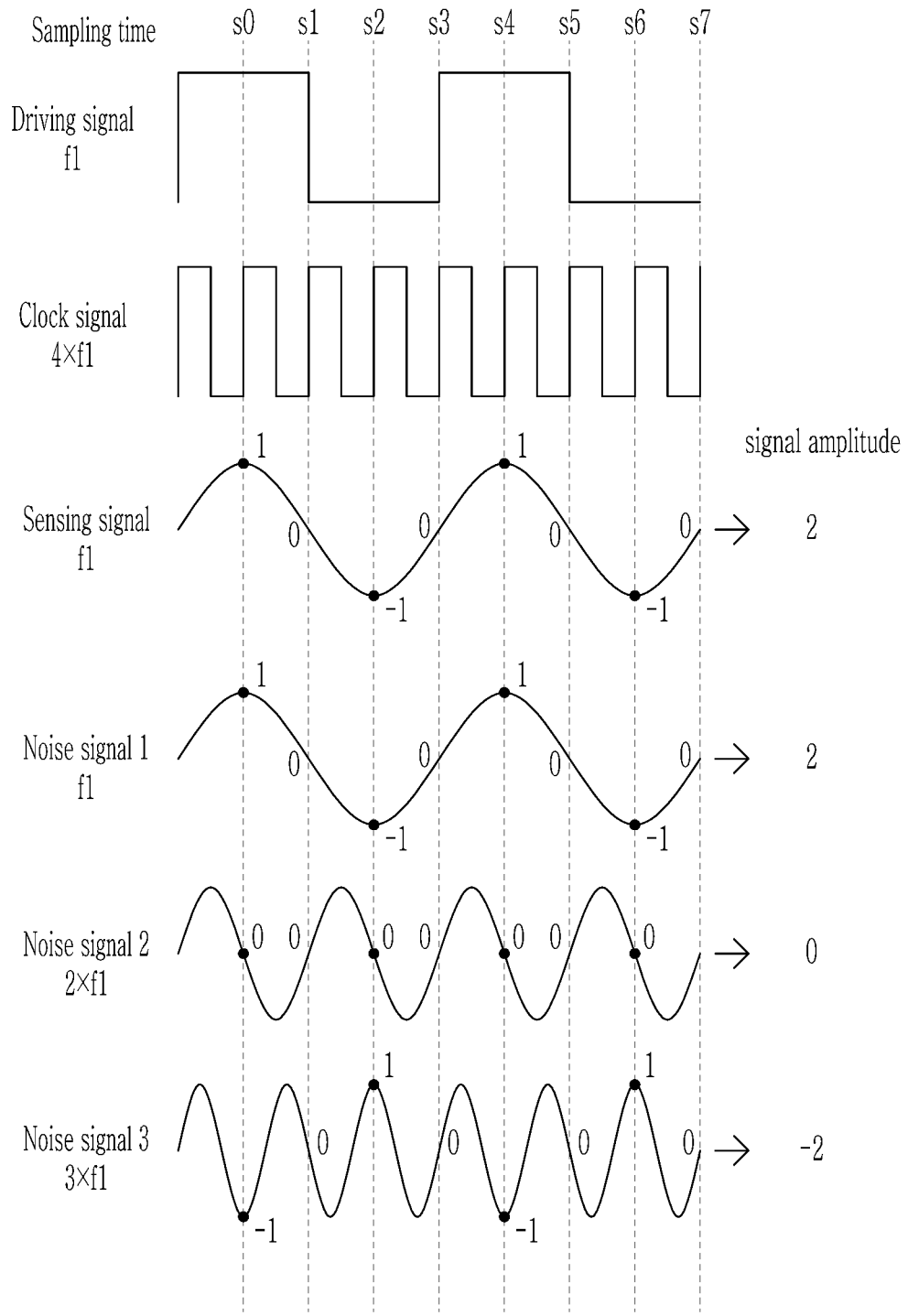
FIG. 139 illustrates a view for describing an effect of noise on a touch sensing performance of a touch sensor.

FIG. 139 illustrates an effect of noise on touch sensing performance of a touch sensor, showing a case in which a noise signal having a same frequency as that of a driving signal applied to the loop coil 264 for resonance of the stylus pen 10 or having a frequency of 2 times or 3 times that is generated.

Referring to FIG. 139, the touch sensor 261 is synchronized with a clock signal having a frequency of n, e.g., 4 times the frequency of the driving signal, to sample the signal value of the sensing signal at a plurality of sampling points s0 to s7 in order to obtain a signal magnitude, i.e., an amplitude of the sensing signal. Then, the signal magnitude (amplitude) of the sensing signal is obtained by using at least some of the sampled signal values. By referring to FIG. 139 as an example, the signal magnitude of the sensing signal is obtained using a difference value $\Delta I$ between the signal value (1) sampled at a point s0 and the signal value (−1) sampled at a point s2.

As illustrated in FIG. 139, when the touch panel 261 is touched by the stylus pen 10, the amplitude $\Delta I$ of the sensing signal outputted from the touched touch electrode becomes 2.

Similarly, a noise signal 1 having a same frequency as a frequency f1 of the driving signal also has a signal value of 1 sampled at the sampling time s0, and a signal value of −1 sampled at the sampling time s2, and the difference value ($\Delta I$) between the two values also becomes 2. In addition, a noise signal 3 having a frequency that is three times the frequency f1 of the driving signal has a signal value of −1 sampled at the sampling time s0, and a signal value of 1 sampled at the sampling time s2, and the difference value ($\Delta I$) between the two values becomes −2.

Accordingly, when the noise signal 1 or the noise signal 3 is temporally synchronized with the driving signal, the signal value of the noise signal 1 or the noise signal 3 affects acquisition of the amplitude of the sensing signal, which may act as a factor that degrades the touch sensing performance.

Accordingly, in the embodiment to be described later, in order to solve this problem, the effect of noise signal is removed from the detection signal by enabling the driving signal outputted to the loop coil 264 in the second section T2 of FIG. 113 to include two types of driving signals having different phases from each other and applying different codes depending on a phase of the corresponding driving signal in a process of acquiring the amplitude of the sensing signal.

Hereinafter, the touch sensing method will be described in more detail with reference to FIG. 140 and FIG. 141.

Figure 140:
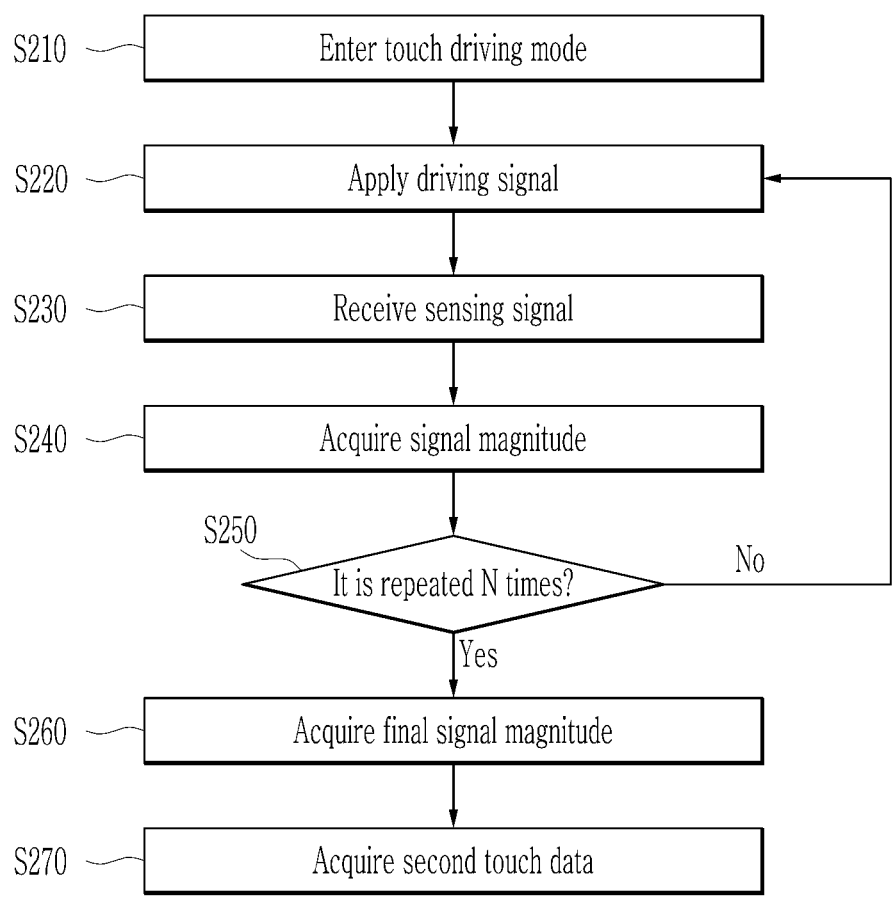
FIG. 140 illustrates a flowchart showing a touch detection method according to an embodiment.
Figure 141:
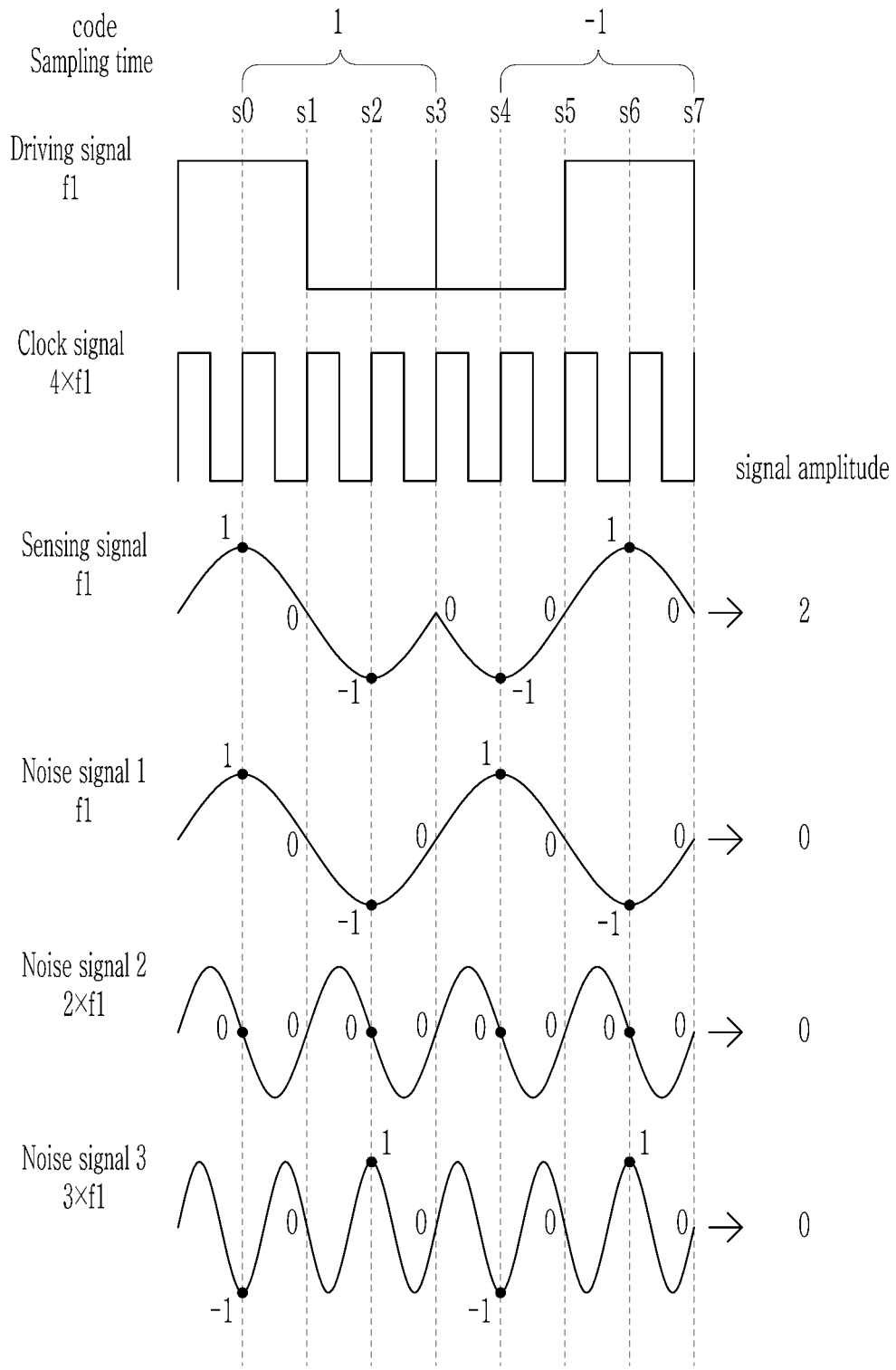
FIG. 141 illustrates a view for describing a method of filtering noise in the touch detection method of FIG. 140.

FIG. 140 illustrates a flowchart showing a touch detection method according to an embodiment, and FIG. 141 illustrates a view for describing a method of filtering noise in the touch detection method of FIG. 140.

By referring to FIG. 140, as the touch sensor 261 enters a touch driving mode for detecting a touch of the stylus pen 10 (S20), the touch controller 262 of the touch sensor 261 controls the coil driver 263 to output a driving signal for generating a resonance signal of the stylus pen 10 to the loop coil 264.

Accordingly, the coil driver 263 applies one of first and second driving signals having a frequency that is similar to a resonance frequency of the stylus pen 10 and has different phases to the loop coil 264 (S21). That is, the coil driver 263 outputs it to the coil driver 263 for a predetermined period (refer to the first subperiod T21 of FIG. 142) by selecting one of the first and second driving signals having different phases, i.e., opposite in phase to each other, depending on a predetermined order or pattern.

In addition, the touch controller 262 receives sensing signals from the touch sensor 261 (S22). For example, the touch controller 262 may receive the sensing signals from the touch sensor 261 during a predetermined period (refer to the second subperiod T22 of FIG. 142) after the application of the driving signal in step S21 is ended. In this case, the touch controller 262 (differentially) amplifies the sensing signals received from the respective touch electrodes and converts them into sensing data that are digital signals.

Herein, the sensed data are data obtained by sampling signal values of the sensed signal through an ADC unit (not illustrated) of the touch controller 262. By referring to FIG. 141 as an example, the ADC unit of the touch controller 262 may be synchronized to a clock signal having a frequency (4·f1) that is n times, e.g., 4 times, the frequency f1 of the driving signal to sample the sensing signals at a plurality of times s0 to s3 and s10 to s13. At least one sampling time s0 to s3 and s10 to s13 in the present disclosure may be arbitrary timing that may be set periodically in relation to the frequency of the driving signal.

When the sensing data corresponding to the sensing signal received from each touch electrode is obtained, the touch controller 262 obtains the signal magnitude, i.e., the amplitude of each sensing signal by using them (S23).

By referring to FIG. 141 as an example, the touch controller 262 calculates a signal magnitude, i.e., an amplitude, of a corresponding sensing signal by using at least some of the sampled signal values. For example, the touch controller 262 calculates the signal magnitude of the sensing signal by using a difference between the signal values sampled at the sampling times s0 and s2 and a difference between the signal values sampled at the sampling times s4 and s6. Accordingly, the amplitude of the sensing signal received in response to a normal-phase driving signal becomes +2, which is a difference value between the signal value 1 sampled at time s0 and the signal value −1 sampled at time s2. On the other hand, the amplitude of the sensing signal received in response to an inverse-phase driving signal becomes −2, which is a difference value between the signal value −1 sampled at time s4 and the signal value 1 sampled at time s6.

The coil driver 263 applies a driving signal to the loop coil 264 (S220), receives sensing signals from the touch sensor 261 in response thereto (S230), and repeatedly performs an operation of acquiring the signal magnitudes of the sensing signals (S240) N times (S250). That is, during the second period T2 during which the touch sensor 261 is driven, a combination of the first subperiod T21 to which the driving signal is applied and the second subperiod T22 to receive the sensing signal is performed N times (e.g., 8 times) may be repeated.

After repeating steps S220 to S240 N times, the touch controller 262 obtains a final signal magnitude, i.e., a final amplitude of each sensing signal, through Equation 5 below (S260).

$$\text{signal amplitude} = \frac{\sum_{i=1}^{N}(\Delta I_i \times \text{code})}{\text{\# of samples}} \quad \text{[Equation 5]}$$

In Equation 5 above, i corresponds to a number of times that steps S21 to S23 are performed, $\Delta$Ii indicates the signal amplitude obtained by steps S21 to S23 which are performed i times, and '# of samples' corresponds to a number of times that the signal amplitude is obtained from the sensing signal (the number of samplings), that is, a number of times that steps S220 to S240 are performed while one touch driving mode is performed.

Referring to Equation 5 above, a final signal amplitude of the sensing signal corresponding to each touch electrode corresponds to a value obtained by multiplying an amplitude $\Delta$ii of a sensing signal obtained by applying a driving signal several times while a touch driving mode is performed by a corresponding code and dividing a sum $\Sigma_{i=1}^{N}(\Delta I_i \times \text{code})$ thereof by a number of samples # of samples.

Herein, the code has one of a first value and a second value having a same absolute value and different signs. For example, the code may have one of 1 and −1, and may be differently applied depending on a phase of the corresponding driving signal. By referring to FIG. 141, a signal magnitude of a sensing signal obtained by applying a normal-phase driving signal (first driving signal) to the loop coil 264 may be multiplied by code 1, and a signal magnitude of a sensing signal obtained by applying an inverse-phase driving signal (second driving signal) to the loop coil 264 may be multiplied by code −1.

When the final signal magnitude of the sensing signal corresponding to each touch electrode is obtained through the above-described method, the touch controller 262 compares it with a predetermined threshold to detect an effective touch signal from among the sensing signals. Then, second touch data including touch coordinates of the stylus pen 10, etc. are acquired in response to the touch electrodes from which the effective touch signal is detected (S26).

A phase of the resonance signal generated by the stylus pen 10 is changed depending on a phase of the driving signal applied to the loop coil 264. Accordingly, the phase of the sensing signal of the loop coil 264 that detects and outputs the resonance signal of the stylus pen 10 may also change in response to the phase of the driving signal applied to the loop coil 264.

By referring to FIG. 141 as an example, a sensing signal generated by applying a driving signal of a positive phase and a sensing signal generated by applying a driving signal of an inverse phase appear different from each other in phase. Accordingly, the amplitude of the sensing signal received by applying the driving signal of the positive phase (e.g., a difference value $\Delta$I between the sensing data sampled at the sampling times s0 and s2) becomes +2, and the amplitude of the sensing signal received by applying the driving signal of the inverse phase (e.g., a difference value $\Delta$I between the sensing data sampled at the sampling times s4 and s6) becomes −2. When the amplitude values obtained in this way are substituted into Equation 5 above, the final signal magnitude value may be reduced through offset between the amplitude values. That is, the amplitude value of the sensing signal generated by the application of the driving signal of the normal phase is +2 and the amplitude value of the sensing signal generated by the application of the driving signal of the inverse phase is −2, and thus when no code is applied, the final signal magnitude is obtained as (2+(−2))/2=0.

Accordingly, the touch controller 262 prevents the offset between amplitude values by multiplying the amplitude of the sensing signal obtained by applying the driving signal of the normal phase by the code 1, and by multiplying the amplitude of the sensing signal obtained by applying the driving signal of the inverse phase by the code −1. That is, when the code depending on the phase of the driving signal is applied, the final signal magnitude of the sensing signal is obtained as ((2×1)+((−2)×(−1))/2=2.

Meanwhile, since noise signals are not affected by the driving signal, as illustrated in FIG. 139, the phase is maintained regardless of a phase change of the driving signal. Accordingly, when the signal magnitudes of the noise signals are obtained by substituting the above Equation 5, the amplitude values multiplied by the code are offset. In the case of noise signal 1 as an example, the final signal magnitude obtained by Equation 5 above may be filtered as ((2×1)+((2×(−1))/2=0). In addition, in the case of noise signal 3 as an example, the final signal magnitude obtained by Equation 5 above may be filtered as (((−2)×1)+((−2)×(−1))/2=0.

Meanwhile, in FIG. 141, it is illustrated that the driving signal of the normal phase and the driving signal of the inverse phase are continuously applied to the loop coil 264, but this is for convenience of description, and during one first subperiod T21, only one of the driving signal of the normal phase and the driving signal of the inverse phase is applied to the touch panel. Accordingly, at least one second subperiod T21 may be positioned between the periods during which the driving signal of the normal phase and the driving signal of the inverse phase are applied.

While the touch sensor 261 is driven in a touch driving mode, arrangement of the periods during which the first driving signal and the second driving signal having different phases are outputted may be variously modified.

Hereinafter, embodiments in which first and second driving signals having different phases are outputted during driving will be described with reference to FIG. 142 to FIG. 145.

FIG. 142 to FIG. 145 respectively illustrate waveform diagrams showing examples in which a touch sensor outputs first and second driving signals having different phases.

Figure 142:
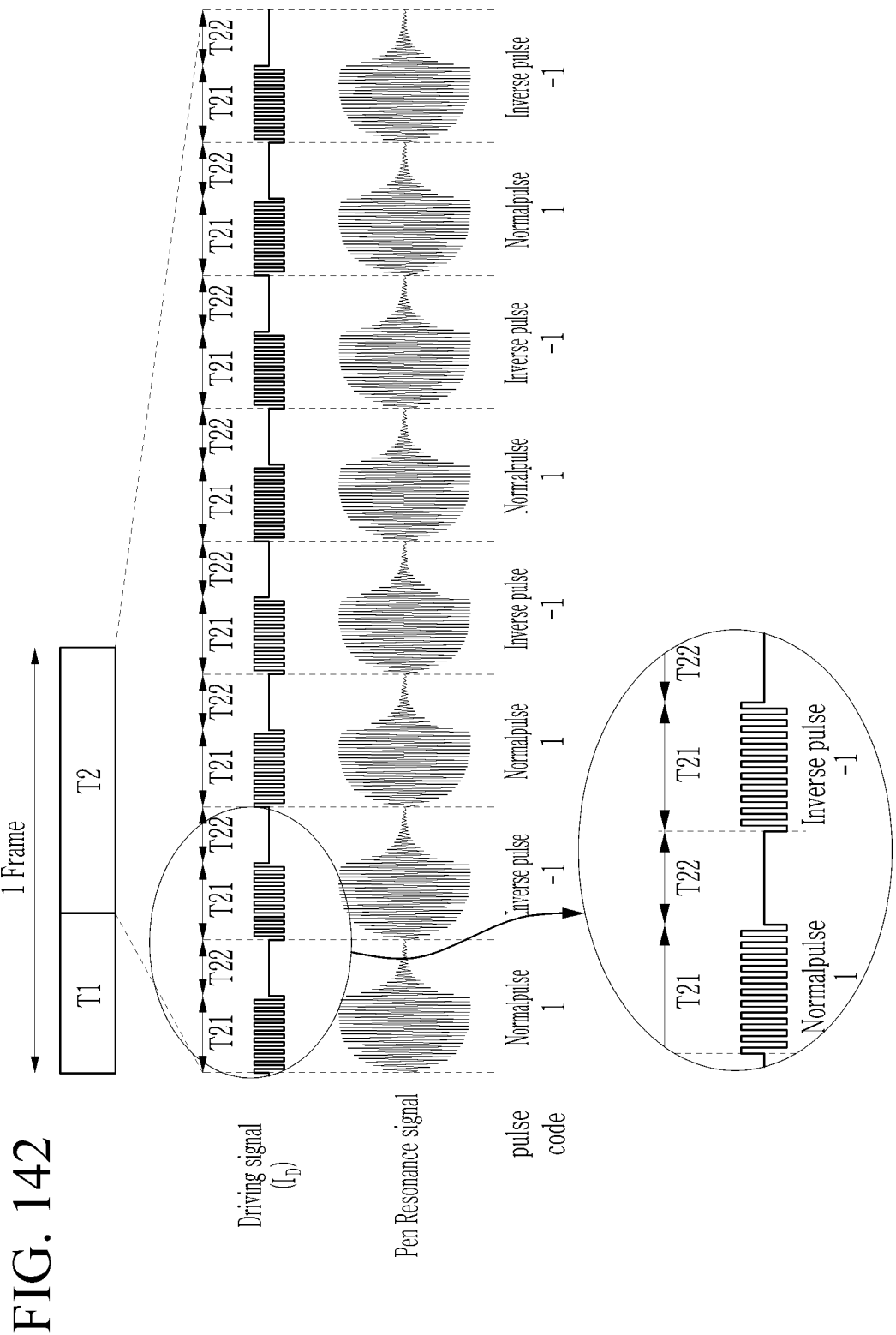
FIG. 142 to FIG. 145 respectively illustrate waveform diagrams showing examples in which a touch sensor outputs first and second driving signals having different phases.
Figure 143:
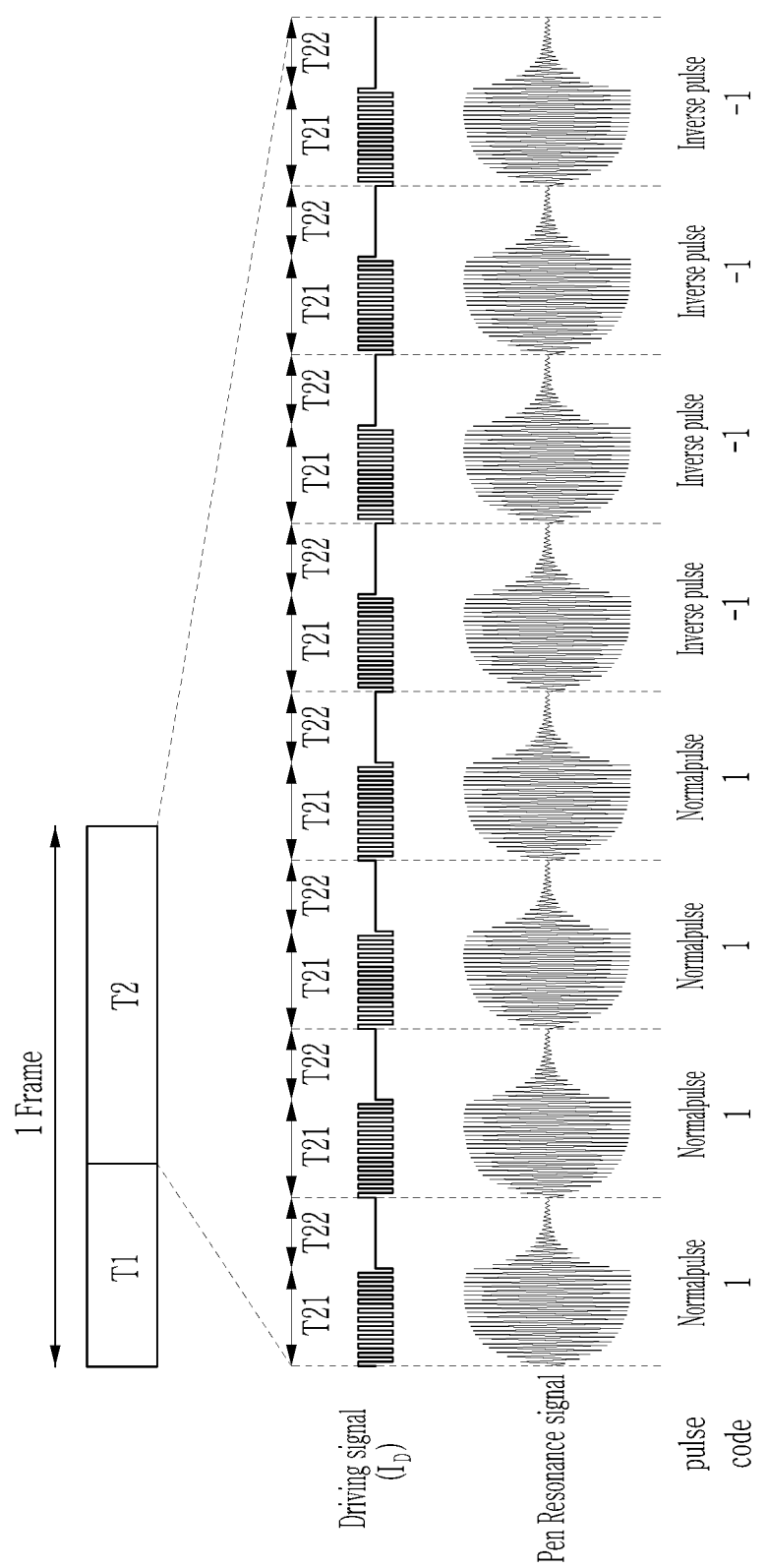
Figure 144:
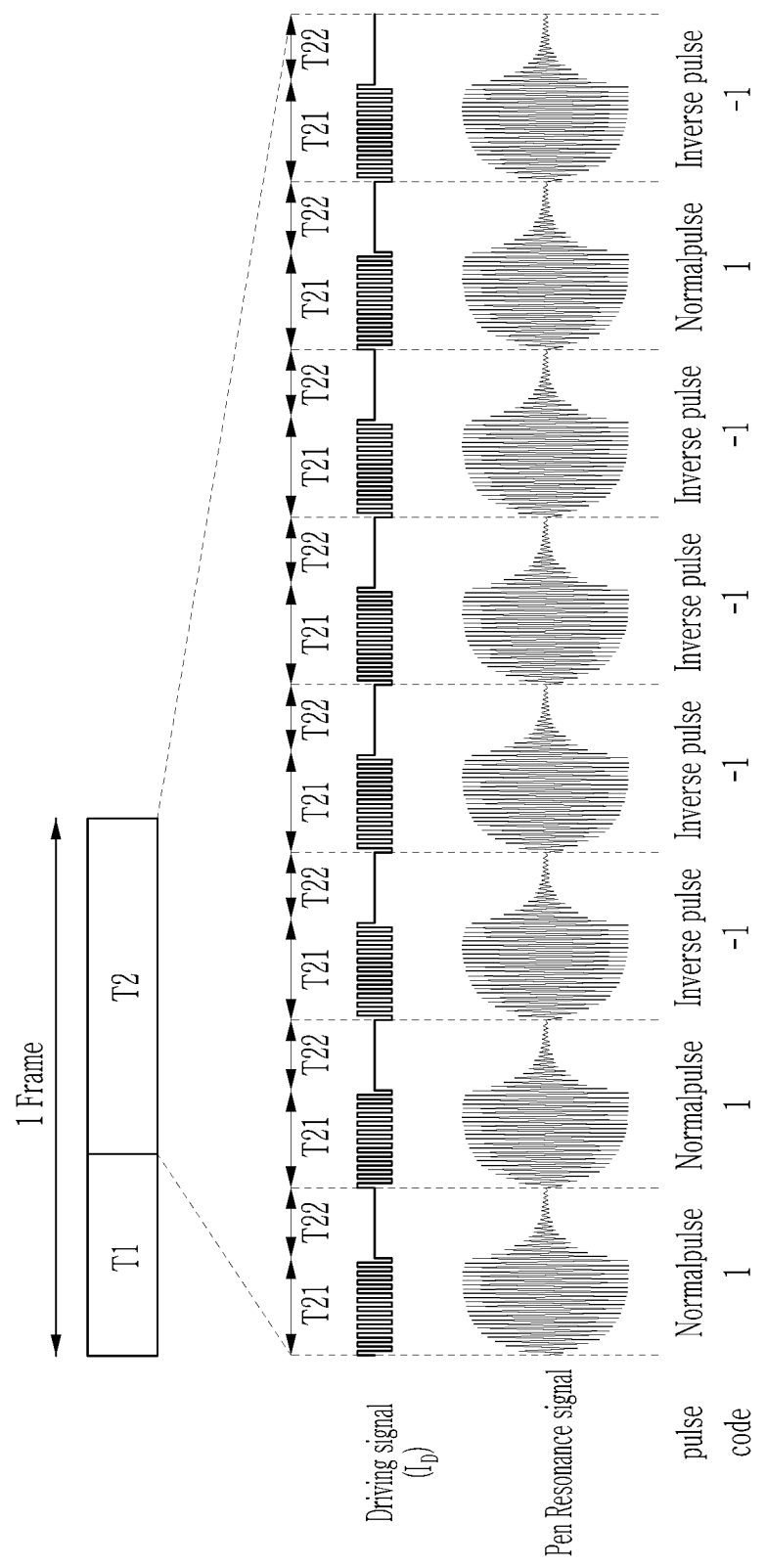

Referring to FIG. 142 to FIG. 144, one frame period is divided into a first period T1 during which the touch sensor 261 is driven in the first touch driving mode and a second period T2 during which the touch sensor 261 is driven in the second touch driving mode, and when the second period T2 of the current frame period ends, the first period T1 of the next frame period starts.

The second period T2 during which the touch sensor 261 drives in the second touch driving mode within one frame period is followed by the first subperiod T21 and the first subperiod T21 to which the driving signal is applied, and includes a plurality (e.g., 8 times) of combinations of the second subperiods T22 during which the driving signal is not applied. In addition, the first subperiod T21 during which the first driving signal is applied and the first subperiod T21 during which the second driving signal is applied may be included at least once in one second period T2.

Referring to FIG. 142, the coil driver 263 may alternately apply the first driving signal having the normal phase and the second driving signal having the inverse phase depending on a predetermined period (e.g., every first subperiod T21). In this case, among the first subperiods T21 included in the second period T2, a number of periods during which the first driving signal is applied and a number of periods during which the second driving signal is applied are equal to each other.

Meanwhile, the first subperiod T21 during which the first driving signal is applied may be consecutive at least twice within one second period T2. Similarly, the first subperiod T21 during which the second driving signal is applied may also be consecutive at least twice within one second period T2. By referring to FIG. 144 as an example, within one second one second period T2, during initial four first subperiods T21, the first driving signal is continuously applied, and during following four first subperiods T21, the second driving signal is continuously applied. In addition, in FIG. 144, the number (4) of consecutive first subperiods T21 during which the first driving signal is applied and the number (4) of consecutive first subperiods T21 during which the second driving signal is applied are equal to each other within one second period T2.

Figure 145:
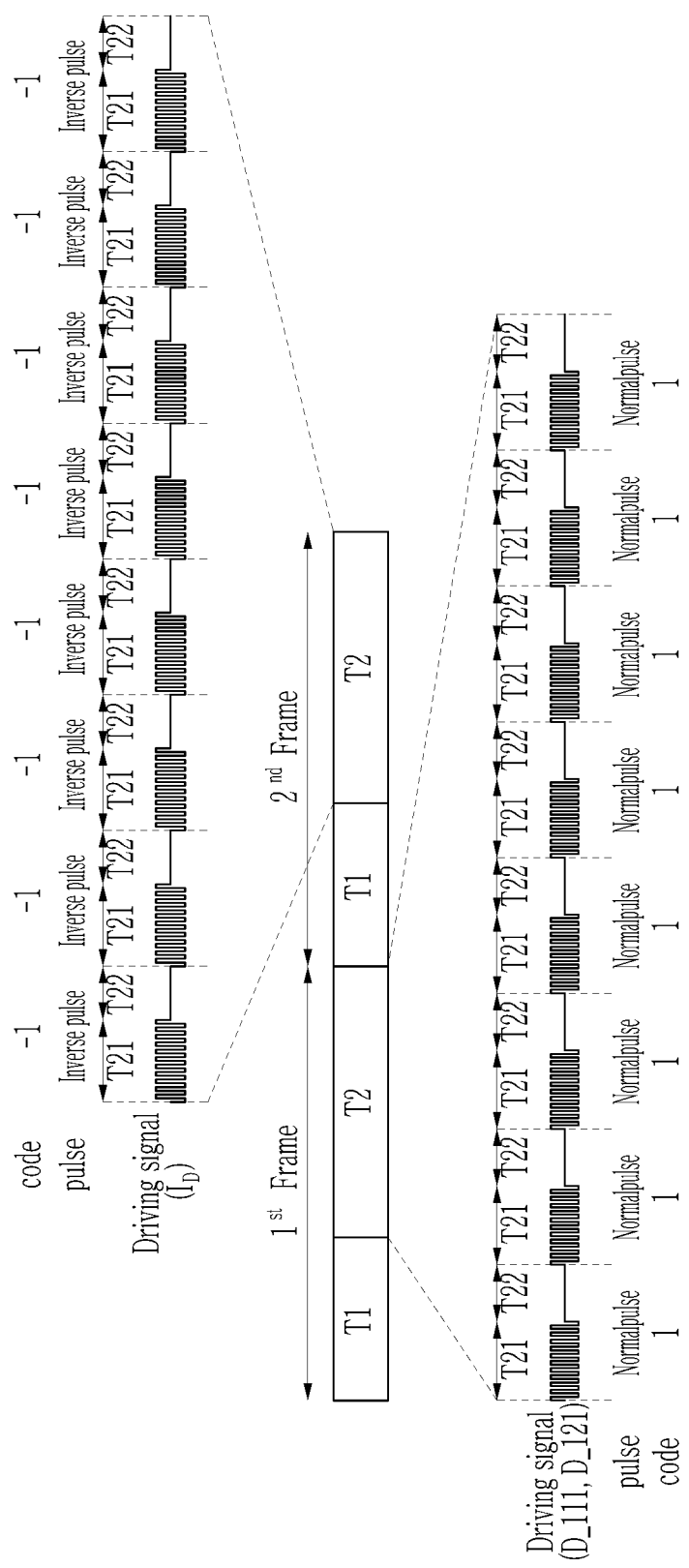

According to FIG. 145, a pattern in which the first driving signal of the normal phase and the second driving signal of the inverse phase are applied by the coil driver 263 may be irregular and non-periodic. Referring to FIG. 144, among the first subperiods T21 included in one second period T2, a number of periods during which the first driving signal is applied and a number of periods during which the second driving signal is applied may be different from each other. In addition, the number of consecutive first subperiods T21 during which the first driving signal is applied and the number of consecutive first subperiods T21 during which the second driving signal is applied may be different from each other within one second period T2.

Meanwhile, in the above description, a case in which a phase change of the driving signal occurs in units of the first subperiod T21 has been described as an example, but the present invention is not limited thereto. According to another embodiment, the phase change of the driving signal may occur in units of the second period T2. By referring to FIG. 145, during the second period T2 of the first frame period, the first driving signal of the normal phase is applied to the loop coil 264, and during the second period T2 of the second frame period, a second driving signal of the inverse phase is applied to the loop coil 264. In this case, the touch sensor 261 may acquire the final signal magnitude of the sensing signal from the sensing signals received from the touch sensor 261 during the second period T2 for every frame period based on Equation 5 above, and may acquire second touch data by using it. In addition, the touch sensor 261 may acquire the final signal magnitude of the sensing signal from sensing signals received from the touch sensor 261 during the second period T2 of the first frame period and sensing signals received from the touch sensor 261 during the second period T2 of the second frame period, and may acquire the second touch data based on it.

According to the above-described embodiments, it is possible to minimize an influence of the noise signal on the sensing signal even in an environment in which noise in a frequency band that is similar to the resonance signal of the stylus pen exists, so that the touch sensing performance by the stylus pen may be improved.

In the meantime, noise exists in the touch sensor 261 due to various reasons, and such noise may act as a factor to degrade sensing performance of the touch sensor 261. In particular, in the case of the stylus pen 10, when noise in a frequency band that is similar to a resonance frequency of the stylus pen 10 exists, precision of touch sensing may be reduced.

Next, the touch sensor 261 that receives a signal from the stylus pen 10 will be described with reference to FIG. 146.

FIG. 146 illustrates an equivalent circuit diagram showing a stylus pen and a touch sensor that receives a sensing signal.

As illustrated in FIG. 146A, the resonance signal RS of the resonance circuit 12 is transferred to at least one of the first driver/receiver 2620 and the second driver/receiver 2622 through the capacitance Cx. At least one of the first driver/receiver 2620 and the second driver/receiver 2622 include an amplifier 2626.

A first voltage Vcc may be applied to a first power input terminal of the amplifier 2626, and a second voltage GND is applied to a second power input terminal. The amplifier 2626 may amplify or differentially amplify and output the resonance signal RS inputted into at least one of the two input terminals by using a voltage difference between the first voltage Vcc and the second voltage GND.

As illustrated in FIG. 164B, a noise NS1 may be introduced from the outside of the touch sensor 261, or a noise NS2 may be introduced from the second power input terminal of the amplifier 113. In this case, the resonance signal RS generated by the driving signal has a same or very similar frequency as or to that of the driving signal. The noises NS1 and NS2 have a same or similar frequency as or to that of the resonance signal RS.

The noise NS1 is transferred to the input terminal of the amplifier 2626 to which the resonance signal RS is transferred or to the input terminal of the amplifier 2626 to which the resonance signal RS is not transferred, or may be transferred to both input terminals of the amplifier 2626 with different magnitudes, respectively. Accordingly, there is a problem that a signal outputted from the amplifier 2626 has noise.

In addition, the noise NS2 is transferred to the second power input terminal to the amplifier 2626. Since the amplifier 2626 amplifies or differentially amplifies the resonance signal RS by using a voltage difference between a first voltage Vcc and the noise NS2, the signal outputted from the amplifier 2626 has noise.

As described above, when the noises NS1 and NS2 similar to the driving signal (or resonance signal RS) are inputted into the touch sensor 261, this makes it difficult for the touch sensor 261 to accurately detect a touch input by the stylus pen 10. In the case of an active stylus pen, when the noises NS1 and NS2 flow into the touch sensor 261, they are avoided by a frequency hopping method, which changes a frequency of the signal transferred by the active stylus pen, but in the case of a passive stylus pen, a response by the driving signal DS from the touch sensor 261 is transferred to the touch sensor 261 as a sensing signal, and thus it was difficult to implement this frequency hopping method.

A stylus pen according to an embodiment of the present disclosure will be described with reference to FIG. 147 and FIG. 148.

Figure 147:
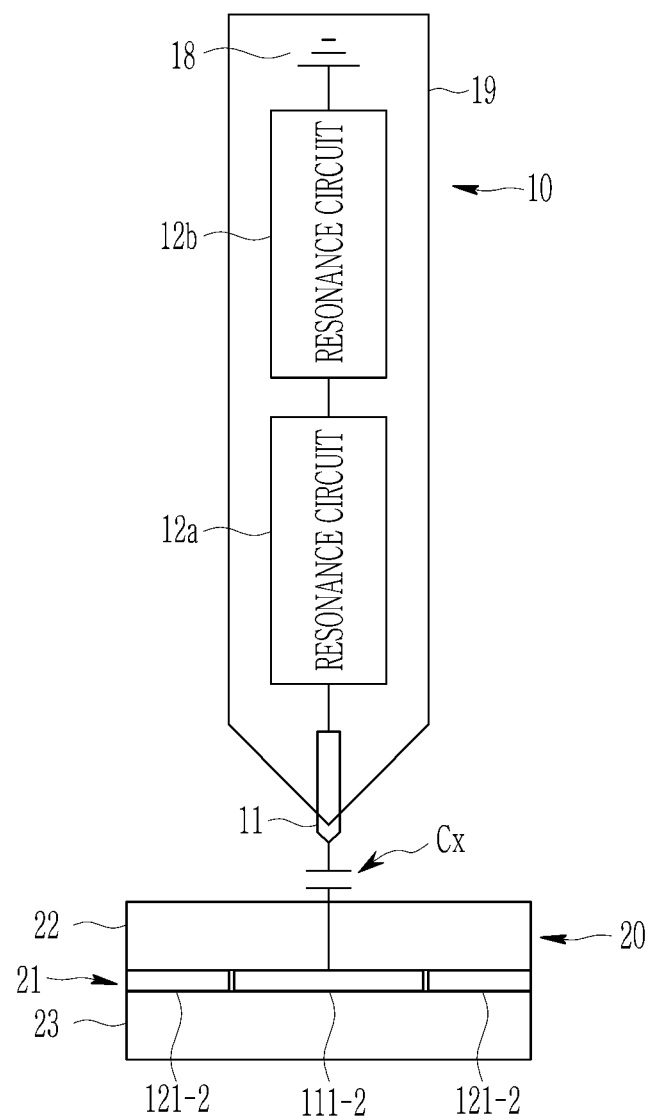
FIG. 147 illustrates a schematic view showing a stylus pen according to an embodiment.
Figure 148:
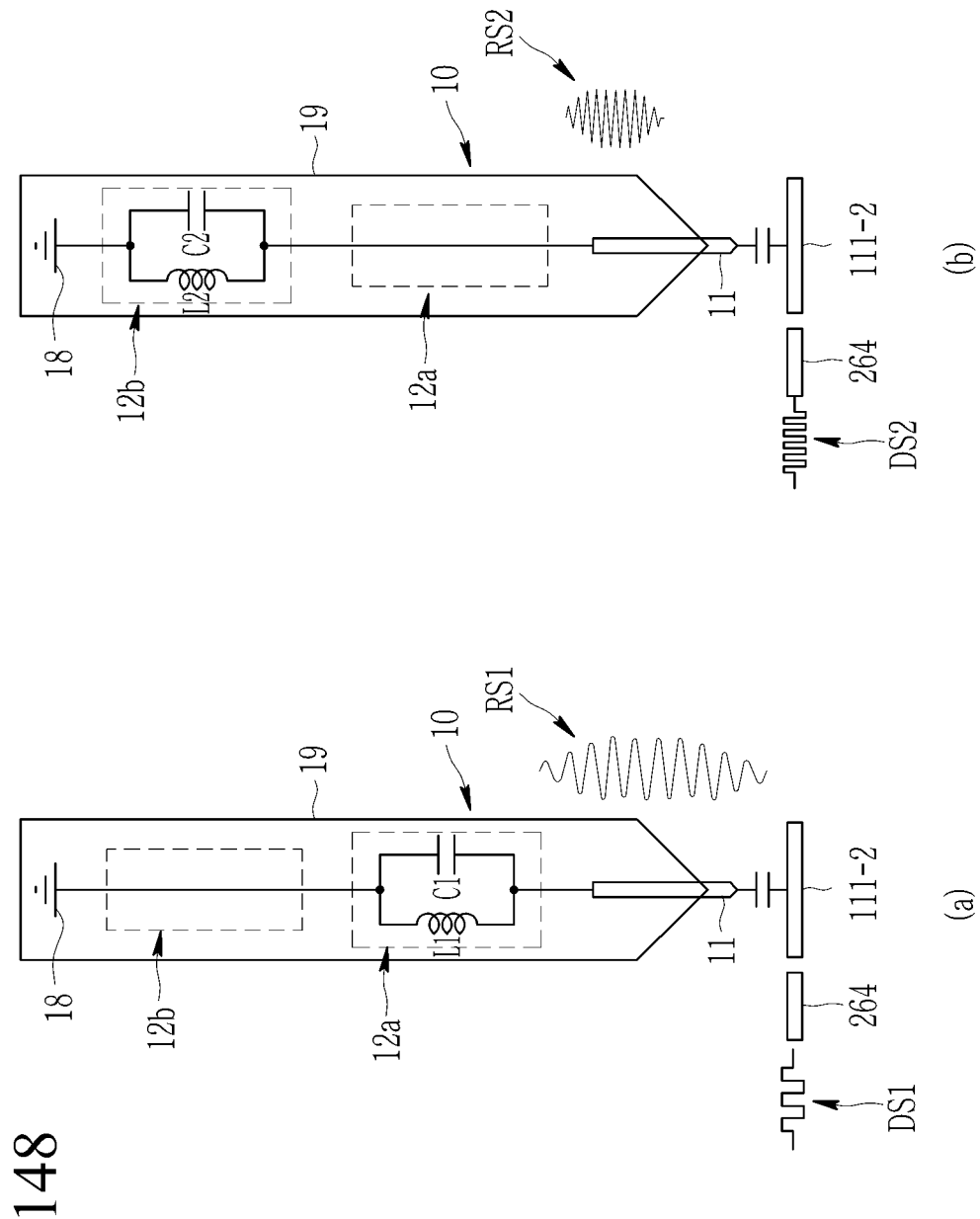
FIG. 148 illustrates a schematic view showing a stylus pen including resonant circuits that respectively resonate with driving signals having different frequencies.

FIG. 147 illustrates a schematic view showing a stylus pen according to an embodiment, and FIG. 148 illustrates a schematic view showing a stylus pen including resonant circuits that respectively resonate with driving signals having different frequencies.

The stylus pen 10 may include a conductive tip 11, a first resonance circuit 12a, a second resonance circuit 12b, a ground portion 18, and a housing 19.

The conductive tip 11 may be at least partially formed of a conductive material (e.g., a metal, a conductive rubber, a conductive fabric, a conductive silicon, etc.), and may be electrically connected to the first resonance circuit 12a.

Each of the first and second resonance circuits 12a and 12b is an LC resonant circuit, and they are connected in series with each other between the conductive tip 11 and the ground portion 18.

Resonance frequencies of the first resonance circuit 12a and the second resonance circuit 12b are different from each other. The first resonance circuit 12a may resonate with a first driving signal transferred through the conductive tip 11, and the second resonance circuit 12b may resonate with a second driving signal transferred through the conductive tip 11.

Each of the first resonance circuit 12a and the second resonance circuit 12b includes an inductor L1 in FIG. 148A (L2 in FIG. 148B) and a capacitor C1 in FIG. 148A (C2 in FIG. 148B). The inductor L1 includes a first ferrite core and a coil wound on the first ferrite core, and the inductor L2 may include a second ferrite core and a coil wound on the second ferrite core. Herein, the first ferrite core and the second ferrite core are ferrite cores which are separate from each other, and are spaced apart by a predetermined distance or more within the housing 19. The ferrite cores are easy to deform or bend in a manufacturing process, making it easier to produce ferrite cores of a shorter length. According to the stylus pen 10 of the present exemplary embodiment, a manufacturing cost of the stylus pen 10 may be reduced, and the manufacturing of the stylus pen 10 may be easily performed, by using separate ferrite cores rather than a single ferrite core.

The stylus pen 10 outputs a resonance signal having a frequency that changes with time in response to an electromagnetic signal having a frequency that changes with time which is transferred by the first resonance circuit 12a and the second resonance circuit 12b. For example, the electromagnetic signal changes with time from a first driving signal having a first driving frequency to a second driving signal having a second driving frequency that is higher than the first driving frequency, and vice versa, and in response thereto, a frequency of the resonance signal outputted from the stylus pen 10 also changes.

Referring to FIG. 148A, when the first driving signal DS1 is applied to the loop coil 264, the inductor L1 and the capacitor C1 included in the first resonance circuit 12a have very large impedance compared to that of the inductor L2 and the capacitor C2 included in the second resonance circuit 12b, a space between the second resonance circuit 12b, and the ground portion 18 is similar to a short circuit state. When resonance substantially occurs, reactance of LC parallel circuits $XL=jwL$ and $XC=1/jwC$ have same magnitude and opposite signs, and thus infinite impedance is shown by $(XL*XC)/(XL+XC)$, but finite impedance is shown by parasitic resistance and capacitance. As a result of simulation by the inventors, a non-resonant LC parallel circuit was measured to have an average impedance of about 10 ohms as compared with a resonant LC parallel circuit having impedances of around 1 to 2 Mohms. Accordingly, a resonance signal RS1 resonated by the first resonance circuit 12a may be outputted.

Referring to FIG. 148B, when the second driving signal DS2 is applied to the loop coil 264, the inductor L2 and the capacitor C2 included in the first resonance circuit 12b have very large impedance compared to that of the inductor L1 and the capacitor C1 included in the first resonance circuit 12a, and a space between the first resonance circuit 12a and the conductive tip 11 is similar to a short circuit state. Accordingly, a resonance signal RS2 resonated by the second resonance circuit 12b may be outputted.

The resonance signals RS1 and RS2 may be outputted to the touch sensor 261 through the conductive tip 11. In a period in which the driving signal is applied to the loop coil 264 and a period thereafter, the resonance signals RS1 and RS2 may be transferred to the conductive tip 11. The first resonant circuit portion 12a and the second resonant circuit portion 12b are positioned in the housing 19, and may be electrically connected to the ground portion 18.

The stylus pen 10 in this manner generates a touch input by generating the resonance signals RS1 and RS2 in response to the driving signals DS1 and DS2 applied to the loop coil 264.

Capacitance Cx is generated by at least one of the touch electrodes 111-1 to 111-$m$ and 121-1 to 121-$n$, and the conductive tip 11 of the stylus pen 10. The resonance signals RS1 and RS2 may be transferred to the touch sensor 261 through the capacitance Cx between at least one of the touch electrodes 111-1 to 111-$m$, 121-1 to 121-$n$ and the conductive tip 11.

Next, an embodiment of the control method of the electronic device 2 using the stylus pen 10 will be described with reference to FIG. 149 and FIG. 150.

Figure 149:
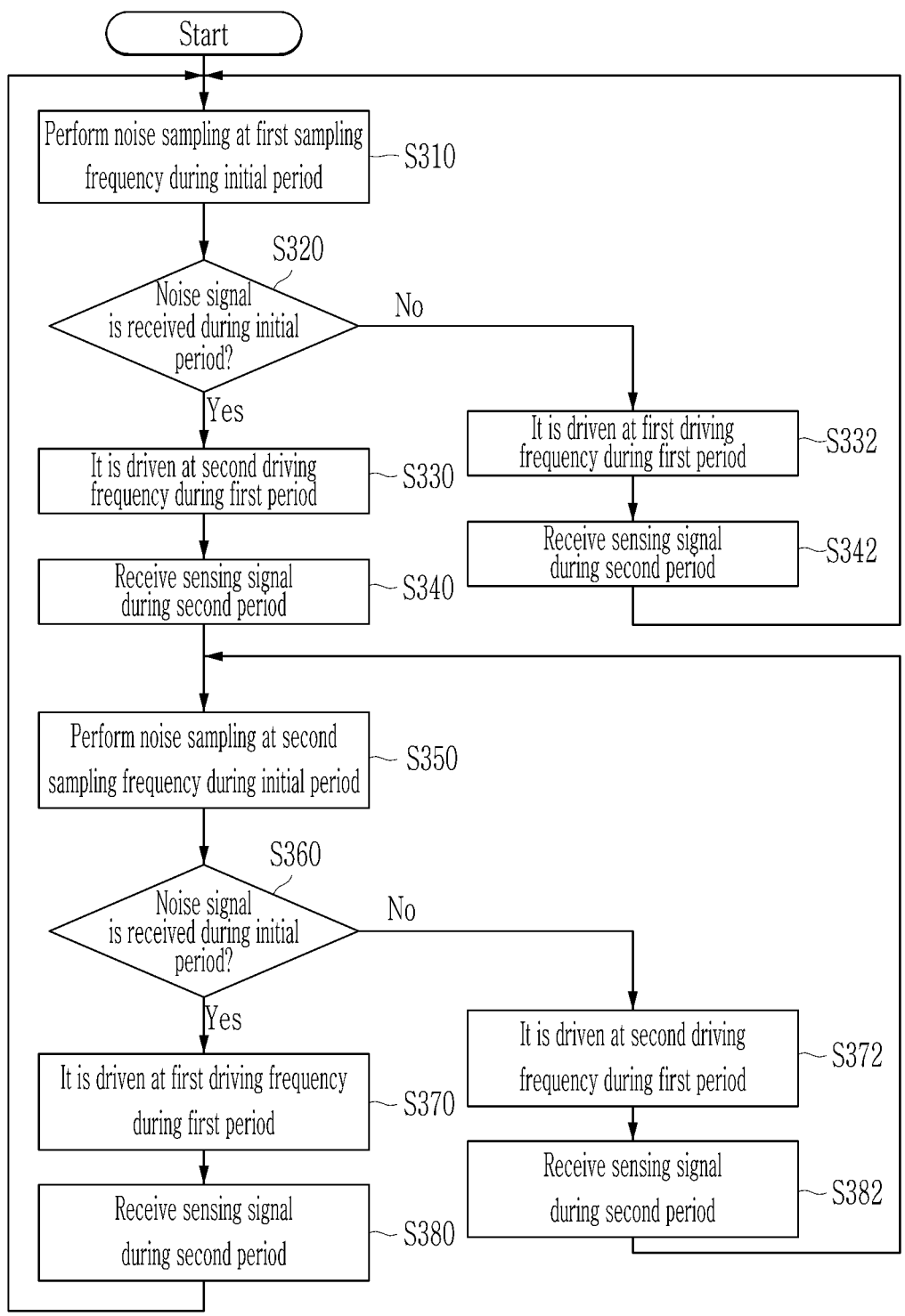
FIG. 149 illustrates a flowchart showing a control method of an electronic device according to another embodiment.
Figure 150:
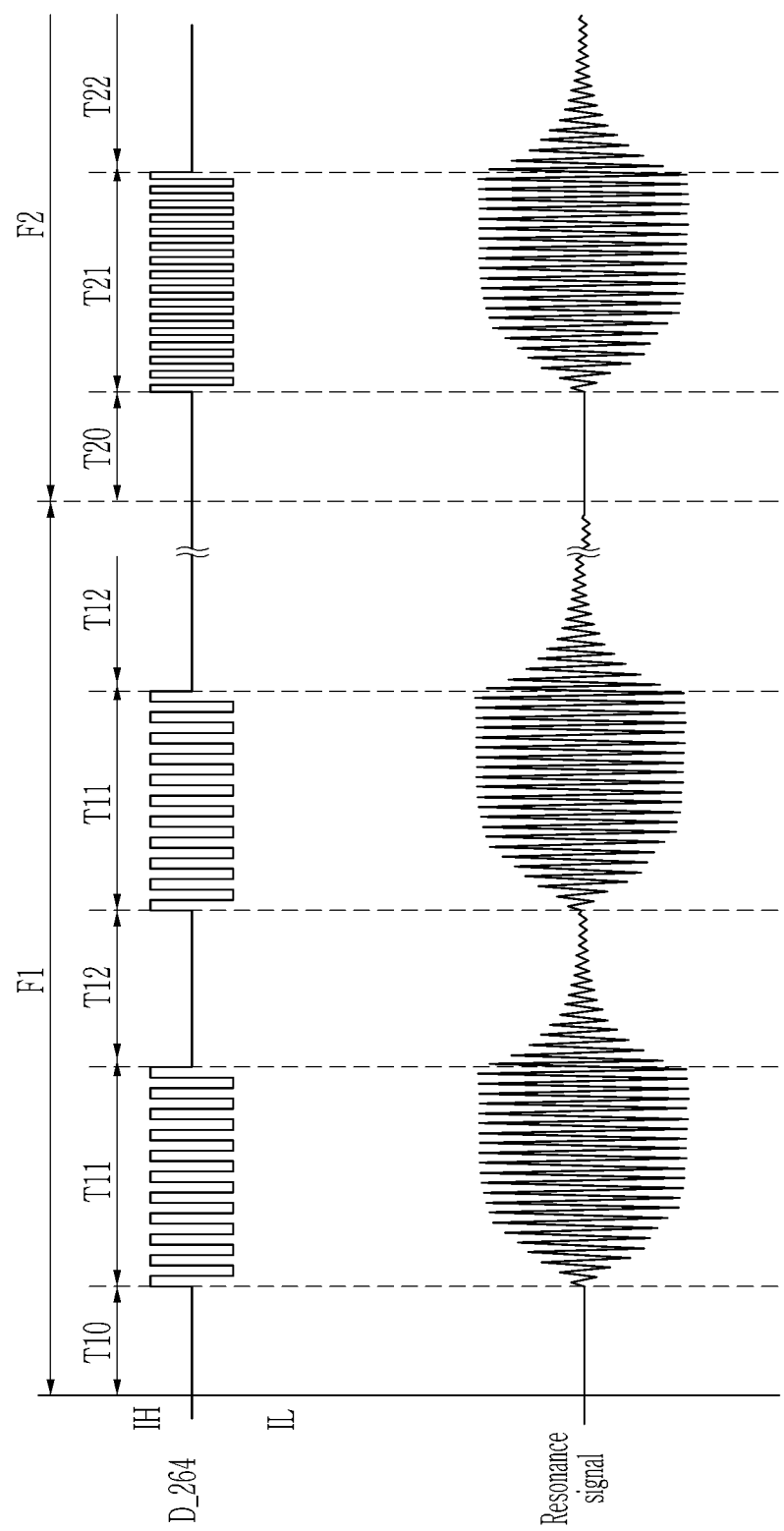
FIG. 150 illustrates a waveform diagram showing an example of a driving signal and a resonance signal depending on a control method of the electronic device of FIG. 149.

FIG. 149 illustrates a flowchart showing a control method of an electronic device according to another embodiment, and FIG. 150 illustrates a waveform diagram showing an example of a driving signal and a resonance signal depending on a control method of the electronic device of FIG. 149.

Referring to FIG. 149, the touch sensor 261 samples a noise with a first sampling frequency during an initial period of one touch report frame period (S310).

In the present embodiment, one touch report frame period according to a touch report rate may include an initial subperiod, n first subperiods, and n second subperiods. The touch report rate indicates a speed or a frequency (Hz) in which the touch sensor 261 outputs touch data obtained by driving touch electrodes to an external host system for reporting. The first periods and the second periods alternate with each other. That is, a second period exists between two consecutive first periods. After the initial subperiod ends, the first subperiods start.

In the above, the initial period has been described as the initial period of the touch report frame period, but the initial period described herein may be a period after at least one second period ends. The initial period may be repeated during a period that is smaller than a period for reporting the touch data, or may be repeated during a period that is greater than or equal to the period for reporting the touch data, but the present invention is not limited thereto. For example, the initial period may exist two or more times within one touch report frame period, or may exist once during a plurality of touch report frame periods.

The first driver/receiver 2620 and the second driver/receiver 2622 may periodically perform sampling depending on a first sampling frequency.

The sampling frequency has a frequency that is a predetermined multiple of a frequency of any driving signal. In the present disclosure, the first sampling frequency may be a frequency that can be set in relation to a frequency of the first driving signal.

The touch sensor 261 determines whether a noise is received by using a sampled signal (S320). The touch sensor 261 may determine whether a noise signal is introduced by using a difference between signals that is periodically sampled depending on the first sampling frequency. For example, the touch sensor 261 determines that a noise signal is introduced into the touch sensor 261 when a magnitude difference between signals sampled during the initial period is greater than or equal to a predetermined magnitude.

When it is determined that the noise signal is received during the initial period, the touch sensor 261 is driven with a second driving frequency during the first period (S330).

For example during the first period, the coil driver 263 applies a second driving signal to the loop coil 264.

In the second period, the touch sensor 261 receives a sensing signal (S340). The touch sensor 261 may sample the sensing signal with the second sampling frequency. For example, the first driver/receiver 2620 and the second driver/receiver 2622 may periodically perform sampling depending on the second sampling frequency. In the present disclosure, the second sampling frequency may be a frequency that can be set in relation to a frequency of the second driving signal.

The controller 2624 may generate touch information indicating touch coordinates, touch strength, and the like by using a sensing signal that is periodically sampled depending on the second sampling frequency.

In this case, the controller 2624 may obtain a signal magnitude, i.e., an amplitude, of the sensing signal by using a difference value between signal values that are sampled at two sampling times. The controller 2624 may determine whether a touch occurs, touch coordinates, etc. depending on the signal magnitude of the sensing signal.

When it is determined that the noise signal is not received during the initial period, the touch sensor 261 is driven with the first driving frequency during the first periods (S332).

For example, during the first period, the coil driver 263 simultaneously applies a first driving signal having a first driving frequency to the loop coil 264.

During the second period, the touch sensor 261 receives the sensing signal (S342). The touch sensor 261 may sample the sensing signal with the first sampling frequency. For example, the first driver/receiver 2620 and the second driver/receiver 2622 may periodically perform sampling depending on the first sampling frequency.

Next, the touch sensor 261 samples noise at the second sampling frequency during the initial period of one touch report frame period (S350). For example, the first driver/receiver 2620 and the second driver/receiver 2622 may periodically perform sampling depending on the second sampling frequency.

The touch sensor 261 determines whether a noise is received by using a sampled signal (S360). The touch sensor 261 may determine whether a noise is introduced by using a difference between signals that are periodically sampled depending on the second sampling frequency. Similarly, the touch sensor 261 determines that a noise signal is introduced into the touch sensor 261 when a magnitude difference between signals sampled during the initial period is greater than or equal to a predetermined magnitude.

When it is determined that the noise is received during the initial period, the touch sensor 261 is driven with the first driving frequency during the first periods (S370).

In the second period, the touch sensor 261 receives a sensing signal (S380). The touch sensor 261 may sample the sensing signal with the first sampling frequency. For example, the first driver/receiver 2620 and the second driver/receiver 2622 may periodically perform sampling depending on the first sampling frequency.

When it is determined that no noise is received during the initial period, the touch sensor 261 is driven with the second driving frequency during the second period (S372), and receives the sensing signal (S382).

Next, a control method of the touch sensor will be described in detail with further reference to FIG. 150.

The first driver/receiver 2620 and the second driver/receiver 2622 may sample a sensing signal in response to a frequency of a first driving signal during an initial period T10 within a touch report frame period F1.

For example, the first driver/receiver 2620 and the second driver/receiver 2622 may sample the sensing signal at at least one sampling time point depending on a clock signal having a predetermined frequency. In this case, the clock signal for sampling the sensing signal may have a frequency that is four times the frequency of the first driving signal.

When it is determined that noise is not received during the initial period, the coil driver 263 applies the first driving signal to the loop coil 264 during the first period T11 after the initial period T10.

During the first period T11, the frequency of the first driving signal applied to the loop coil 264 corresponds to the resonance frequency of the first resonance circuit 12a of the stylus pen 10.

During a second period T12, the first driver/receiver 2620 receives sensing signals from the first touch electrodes 111-1 to 111-m, and the second driver/receiver 2622 receives sensing signals from the second touch electrodes 121-1 to 121-n.

The first driver/receiver 2620 and the second driver/receiver 2622 may sample the sensing signal at at least one sampling time point depending on a clock signal having a predetermined frequency. In this case, the clock signal for sampling the sensing signal may have a frequency that is four times the frequency of the first driving signal applied during the first period T11.

Even after the first driving signal is ended, the resonance signal outputted by the first resonance circuit 12a of the stylus pen 10 during the second period T12 may be received by at least one of the first touch electrodes 111-1 to 111-m and the second touch electrodes 121-1 to 121-n.

The touch report frame period F1 includes a plurality of first periods T11 and a plurality of second periods T12. For example, within the touch report frame period F1, a combination of the first period T11 and the second period T12 may be repeated eight times.

The first driver/receiver 2620 and the second driver/receiver 2622 may sample a sensing signal in response to a frequency of a first driving signal during an initial period T20 within a touch report frame period F2. The sampling frequency at this time corresponds to the frequency of the driving signal applied during the first period T11 within the touch report frame period F1.

When it is determined that noise is received during the initial period, the coil driver 263 applies the second driving signal to the loop coil 264 during the first period T21 after the initial period T20.

During the first period T21, the frequency of the second driving signal applied to the loop coil 264 corresponds to the resonance frequency of the second resonance circuit 12b of the stylus pen 10.

During a second period T22, the first driver/receiver 2620 receives sensing signals from the first touch electrodes 111-1 to 111-m, and the second driver/receiver 2622 receives sensing signals from the second touch electrodes 121-1 to 121-n.

The first driver/receiver 2620 and the second driver/receiver 2622 may sample the sensing signal at at least one sampling time point depending on a clock signal having a predetermined frequency. In this case, the clock signal for sampling the sensing signal may have a frequency that is four times the frequency of the second driving signal applied during the first period T21.

Even after the second driving signal is ended, the resonance signal outputted by the second resonance circuit 12b of the stylus pen 10 during the second period T22 may be received by at least one of the first touch electrodes 111-1 to 111-m and the second touch electrodes 121-1 to 121-n.

The touch report frame period F2 includes a plurality of first periods T21 and a plurality of second periods T22. For example, within the touch report frame period F2, a combination of the first period T21 and the second period T22 may be repeated eight times.

According to the control method of the electronic device, the stylus pen 10 may be resonated to receive a signal with reduced noise by applying a driving signal having a different frequency from that of an external noise that is currently applied to the electronic device to the touch sensor 261.

Next, another embodiment of the control method of the electronic device 2 using the stylus pen 10 will be described with reference to FIG. 151 and FIG. 152.

Figure 151:
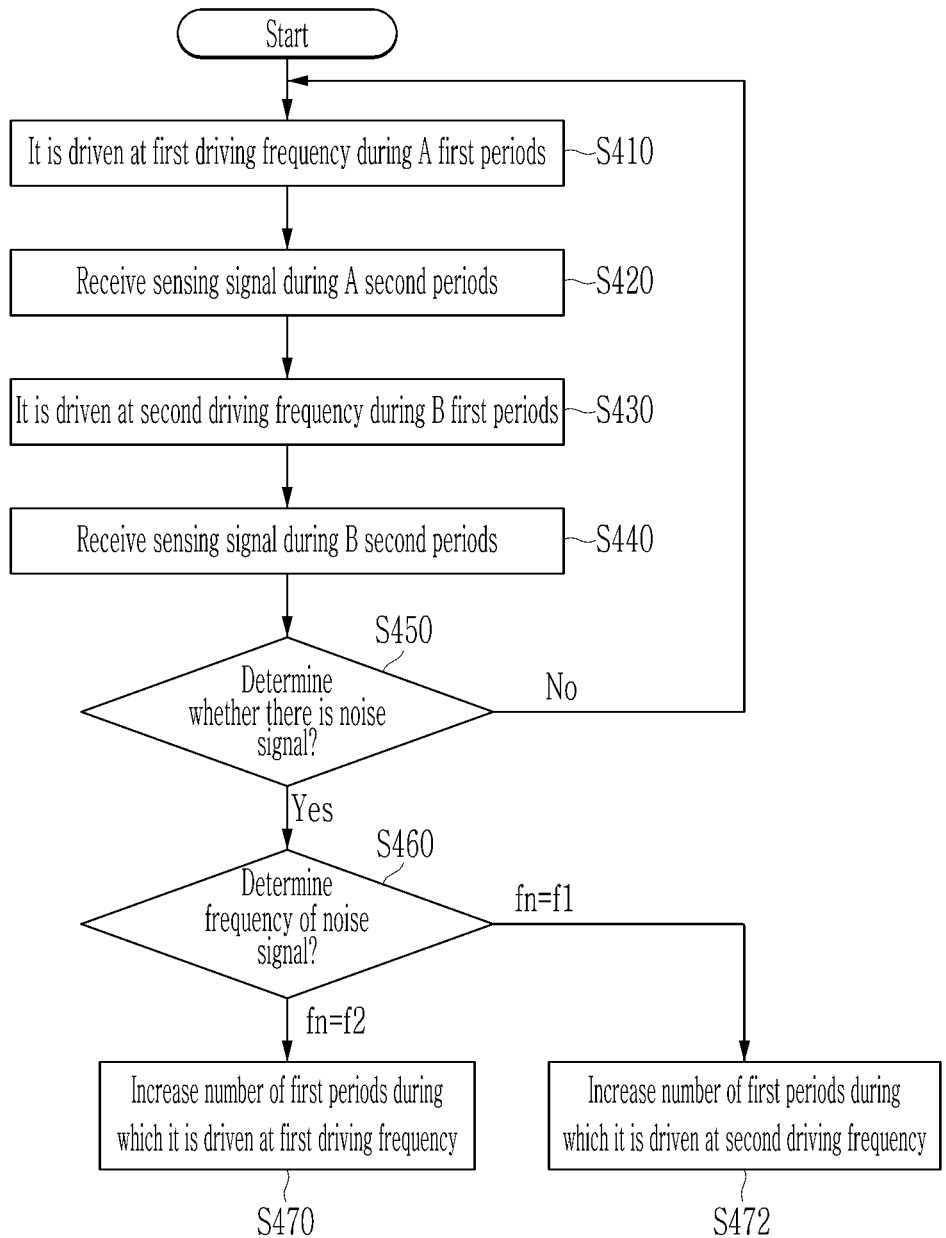
FIG. 151 illustrates a flowchart showing a control method of an electronic device according to another embodiment.
Figure 152:
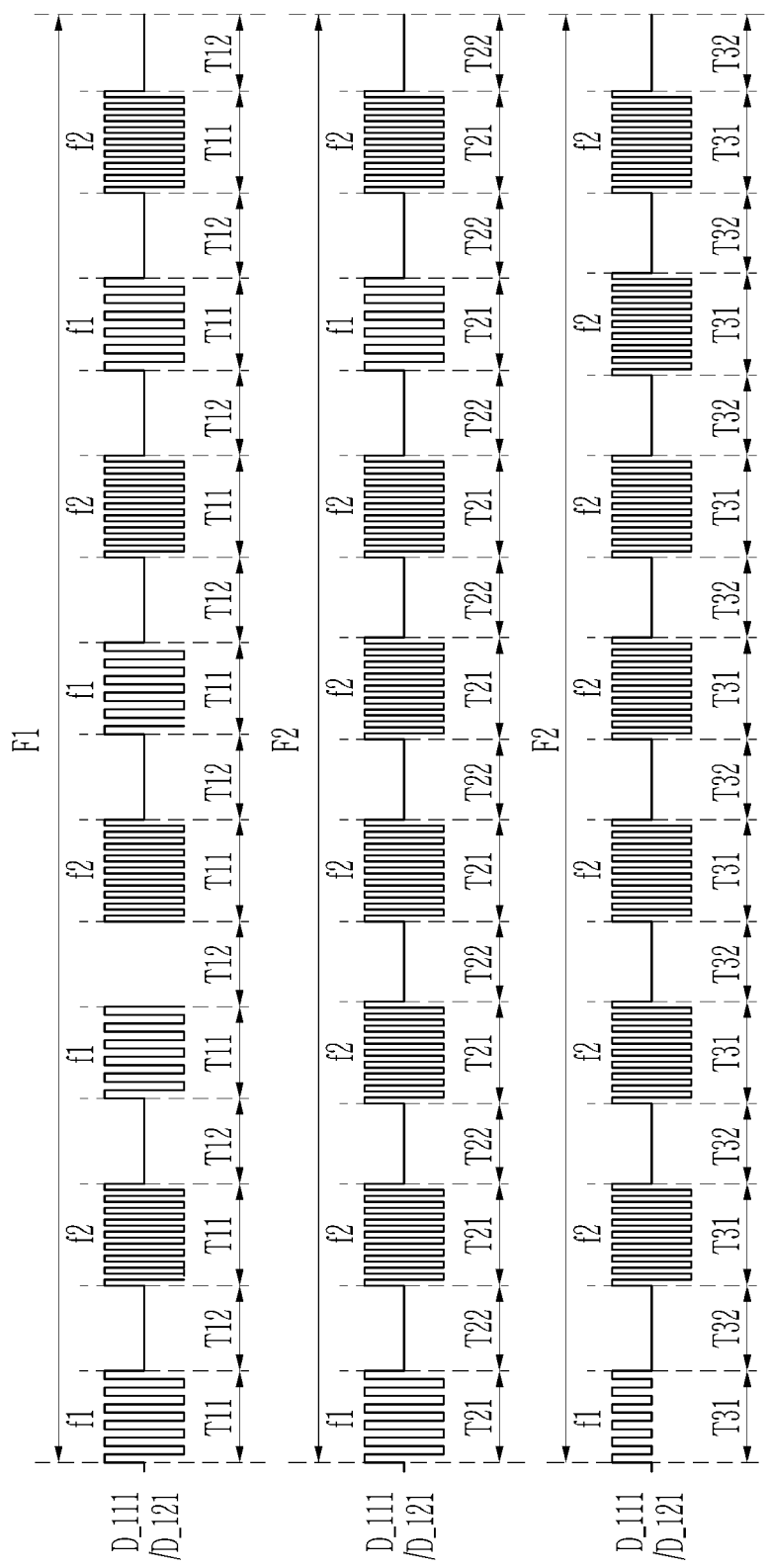
FIG. 152 illustrates a waveform diagram showing an example of a driving signal depending on the control method of the electronic device of FIG. 151.

FIG. 151 illustrates a flowchart showing a control method of an electronic device according to another embodiment, and FIG. 152 illustrates a waveform diagram showing an example of a driving signal depending on the control method of the electronic device of FIG. 151.

Referring to FIG. 151, the touch sensor 261 is driven with a first sampling frequency during A first periods of one touch report frame period (S410). Noise sampling is not performed during the initial period according to a control method of the touch sensor of FIG. 151 compared with the control method of the touch sensor of FIG. 149.

For example, during A first periods within one touch report frame period, the coil driver 263 applies the first driving signal to the loop coil 264.

In the present embodiment, one touch report frame period according to a touch report rate may include n first periods and n second periods. The first periods and the second periods alternate with each other. That is, a second period exists between two consecutive first periods. The A first periods may include a first period other than one or more first periods (B first periods) among a plurality of first periods included in one touch report frame period. That is, n=A+B (where A>0 and B>0).

In the control method of FIG. 151, a first first-period of one touch report frame period is included in the A first periods. An order and disposal of the A first periods within one touch report frame period may be changed.

During A second periods of one touch report frame period, the touch sensor 261 receives a sensing signal (S420). The A second periods include a second period immediately following the A first periods.

For example, the touch sensor 261 may sample the sensing signal with the first sampling frequency. That is, the first driver/receiver 2620 and the second driver/receiver 2622 may periodically perform sampling depending on a first sampling frequency.

The controller 2624 may generate touch information indicating touch coordinates, touch strength, and the like by using a sensing signal that is periodically sampled depending on the first sampling frequency.

In this case, the controller 2624 may obtain a signal magnitude, i.e., an amplitude, of the sensing signal by using a difference value between signal values that are sampled at two sampling times. The controller 2624 may determine whether a touch occurs, touch coordinates, etc. depending on the signal magnitude of the sensing signal.

The touch sensor 261 samples a noise with a second sampling frequency during B first periods of one touch report frame period (S430).

For example, during B first periods within one touch report frame period, the coil driver 263 simultaneously applies the second driving signal to the loop coil 264.

During B second periods of one touch report frame period, the touch sensor 261 receives a sensing signal (S440). The B second periods include a second period immediately following the B first periods.

For example, the touch sensor 261 may sample the sensing signal with the second sampling frequency. That is, the first driver/receiver 2620 and the second driver/receiver 2622 may periodically perform sampling depending on a second sampling frequency.

The controller 2624 may generate touch information indicating touch coordinates, touch strength, and the like by using a sensing signal that is periodically sampled depending on the second sampling frequency.

In this case, the controller 2624 may obtain a signal magnitude, i.e., an amplitude, of the sensing signal by using a difference value between signal values that are sampled at two sampling times. The controller 2624 may determine whether a touch occurs, touch coordinates, etc. depending on the signal magnitude of the sensing signal.

Next, the touch sensor 261 determines whether there is a noise signal by using the sensing signal received during the A second periods and the sensing signal received during the B second periods (S450), and when it is determined that there is a noise signal, the controller 2624 determines a frequency of the noise signal (S460).

For example, the controller 2624 may obtain a signal magnitude (referred to as a first magnitude) of the sensing signal by using a difference value between the signal values that are sampled at any two sampling times during one second period of the A second periods, and may acquire a signal magnitude (referred to as a second magnitude) of the sensing signal by using a difference value between the signal values that are sampled at any two sampling times during one second period of the B second periods. The controller 2624 may determine that there is a noise signal when a difference between the first magnitude and the second magnitude is greater than or equal to a threshold value. When the first magnitude is greater than the second magnitude by a threshold value, the controller 2624 may determine that a noise signal having a frequency that is similar to a frequency of the second driving signal is being introduced. Similarly, when the second magnitude is greater than the first magnitude by a threshold value, the controller 2624 may determine that a noise signal having a frequency that is similar to a frequency of the first driving signal is being introduced.

In addition, the controller 2624 may pre-store a magnitude of a signal that can be detected and outputted from the stylus pen 10 in a memory, etc. by each driving signal, and may determine that a noise signal is flowing thereinto when a signal that is greater than the stored value is received (i.e., the first magnitude is greater than the value stored in memory, or the second magnitude is greater than the value stored in memory).

That is, the controller 2624 may determine whether a noise signal having a frequency that is similar to the frequency of the first driving signal or a noise signal having a frequency that is similar to the frequency of the second driving signal is introduced from the outside by comparing a signal received by the touch sensor 261 by resonating the first resonant circuit unit 12a by the first driving signal with a signal received by the touch sensor 261 by resonating the second resonant circuit unit 12b by the second driving signal.

When the frequency of the noise signal is similar to the frequency of the second driving signal, the touch sensor 261 increases a number of the first periods during which it is driven by the first driving signal within the touch report frame period (S470).

Then, when the frequency of the noise signal is similar to the frequency of the first driving signal, the touch sensor 261 increases a number of the first periods during which it is driven by the first driving signal within the second touch report frame period (S472).

For example, as illustrated in FIG. 152, when the frequency of the noise signal that is introduced by applying a first driving signal f1 during four first periods T11, and applying a second driving signal f2 during the four first periods T11 within the first touch report frame period F1 is determined to be similar to the frequency of the second driving signal, the controller 2624 may apply the first driving signal f1 during six first periods T21 and the second driving signal f2 during two first periods T21 within a second touch report frame period F2. In this case, the controller 2624 may generate touch information indicating touch coordinates, touch strength, and the like by using only the sensing signal received during six second periods T22.

That is, the controller 2624 increases a number of the first periods during which it is driven by the first driving signal when a signal-to-noise ratio (SNR) of a signal that is sampled within A second periods is greater than an SNR of a signal that is sampled within B second periods, and increases a number of the first periods during which it is driven by the second driving signal when an SNR of a signal that is sampled within the B second periods is greater than an SNR of a signal that is sampled within the A second periods.

FIG. 152 illustrates that the first period T11 during which the first driving signal f1 is applied and the second period T12 during which the second driving signal f2 is applied alternate with each other within the first touch report frame period F1, but after the first period T11 during which the first driving signal f1 is applied lasts four times, the second period T12 during which the second driving signal f2 is applied may be started, and an order of the first period T11 during which the first driving signal f1 is applied and the second period T12 during which the second driving signal f2 is applied is not limited in the present embodiment.

Within the second touch report frame period F2, the controller 2624 may perform steps S410 to S460 to determine the presence or absence of a noise signal and to determine the frequency of the noise signal again.

Within the second touch report frame period F2, when a frequency of an introduced noise signal is re-determined to be similar to the frequency of the second driving signal, the controller 2624 may apply the first driving signal f1 during seven first periods T31 and the second driving signal f2 during one first period T31 within a third touch report frame period F3.

In this case, the controller 2624 may generate touch information indicating touch coordinates, touch strength, and the like by using only the sensing signal received during seven second periods T32.

According to the control method of the touch sensor, the stylus pen 10 may be resonated to receive a signal with reduced noise by determining an external noise that is currently applied to the touch sensor and applying that of a driving signal having a different frequency from that of the external noise to the touch sensor 261.

According to the embodiments, the touch sensor 261 may determine the presence or absence of a noise signal, and may transfer touch data including information related to the determined noise signal to the host apparatus.

Next, examples in which a stylus pen and an electronic device transmit and receive signals will be described with reference to FIG. 153 to FIG. 158.

FIG. 153 to FIG. 158 each illustrate a schematic circuit diagram showing a stylus pen and an electronic device.

The resonance circuit 12 of FIG. 3 may be expressed as an equivalent circuit including a resistor Rp, an inductor Lp, and a capacitor Cp or an equivalent circuit including a resistor Rs, an inductor Ls, and a capacitor Cs.

Figure 153:
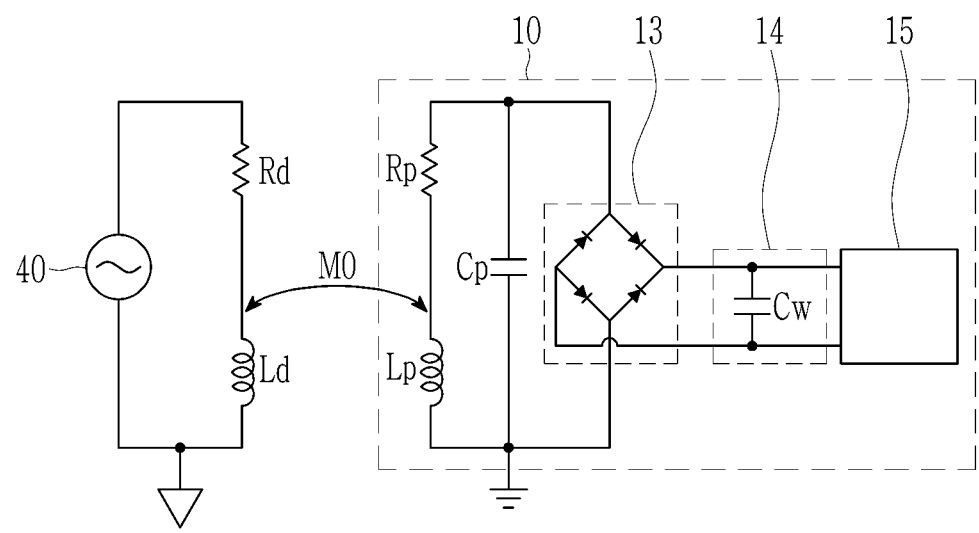
FIG. 153 to FIG. 158 each illustrate a schematic circuit diagram showing a stylus pen and an electronic device.
Figure 154:
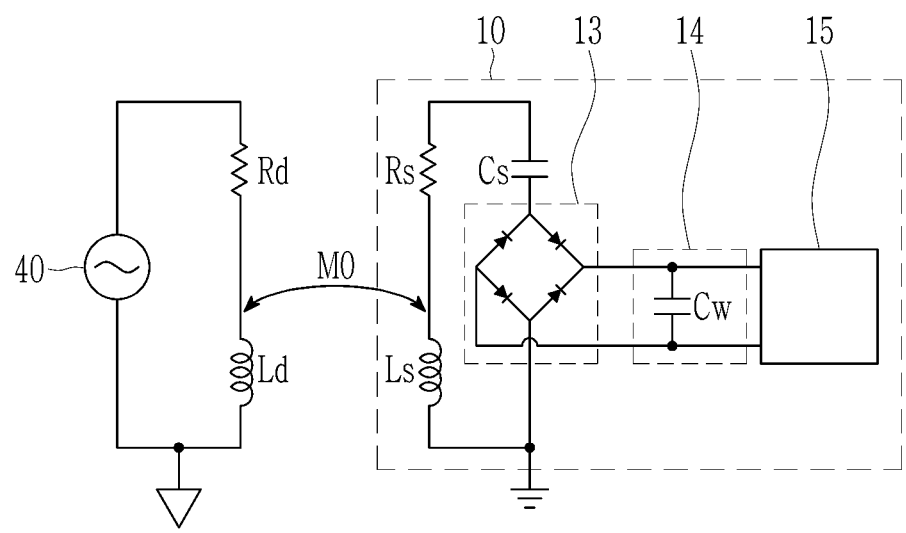

As illustrated in FIG. 153 and FIG. 154, when a loop coil L0 forms a magnetic field by a power source 40 that transfers a driving signal, a current may be induced in the inductor LP of the stylus pen 10 to resonate the resonance circuit 12. A resonant voltage in the resonance circuit 12 may be rectified by the rectifier 13 and stored in the power storage 14. Then, an active circuit 15 may be driven by using the power stored in the power storage 14.

As illustrated in FIG. 155 to FIG. 158, when the loop coil and the internal capacitor resonate by the power source 40 that transfers the driving signal, the resonance circuit 12 of the stylus pen 10 may also mutually resonate with the loop coil and the internal capacitor.

Figure 155:
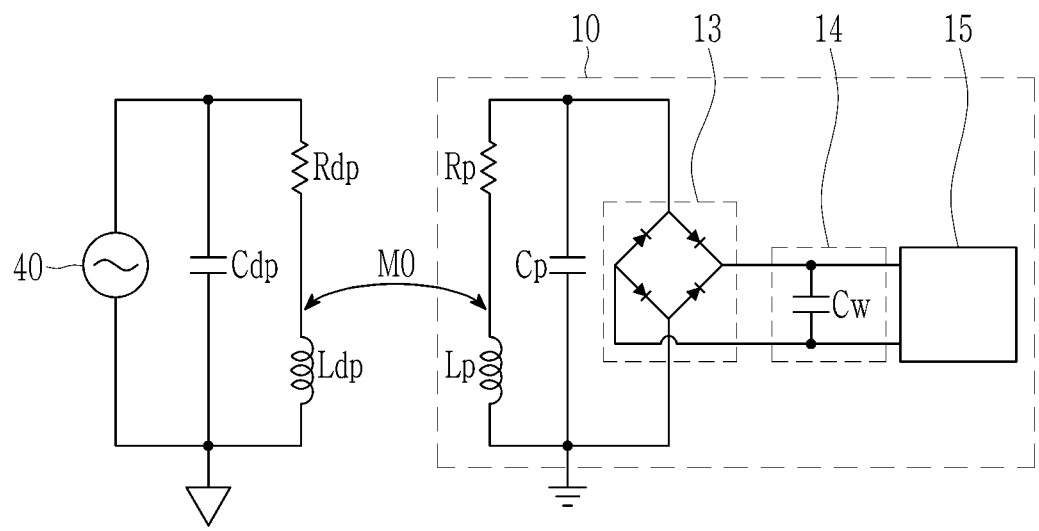

FIG. 155 illustrates a case in which a loop coil Ldp and an internal capacitor Cdp are connected in parallel, and the resistor Rp, the inductor Lp, and the capacitor Cp of the resonance circuit 12 are connected in parallel.

Figure 156:
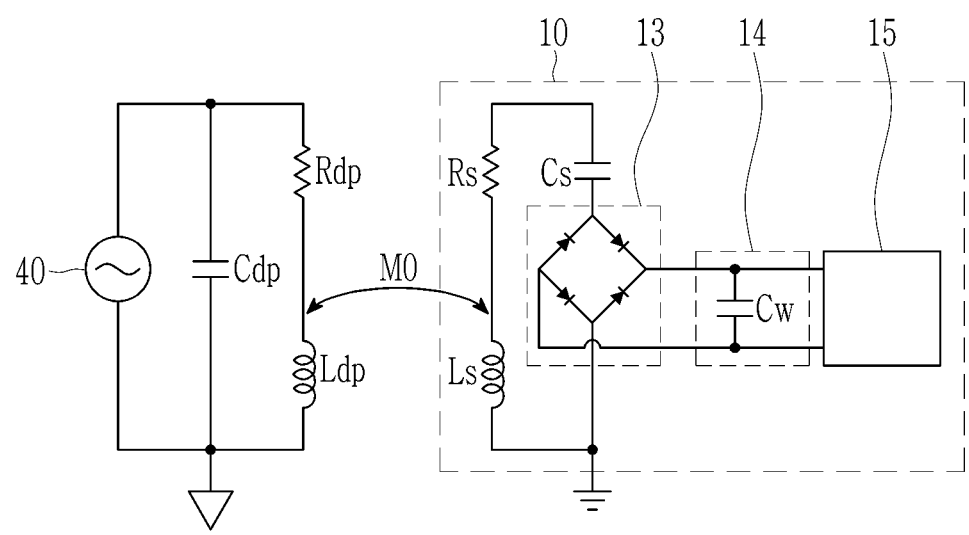

FIG. 156 illustrates a case in which the loop coil Ldp and the internal capacitor Cdp are connected in parallel, and the resistor Rs, the inductor Ls, and the capacitor Cs of the resonance circuit 12 are connected in series.

Figure 157:
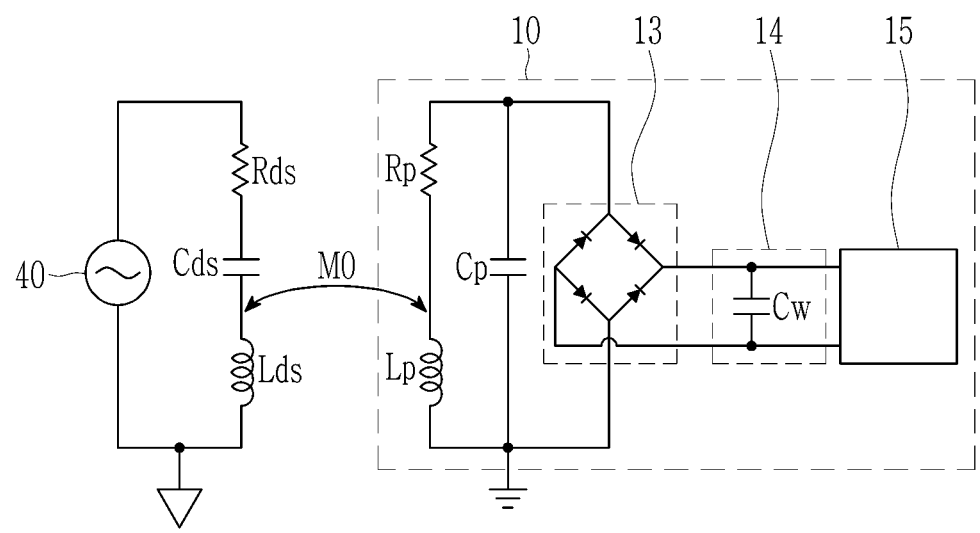

FIG. 157 illustrates a case in which a loop coil Lds and an internal capacitor Cds are connected in series, and the resistor Rp, the inductor Lp, and the capacitor Cp of the resonance circuit 12 are connected in parallel.

Figure 158:
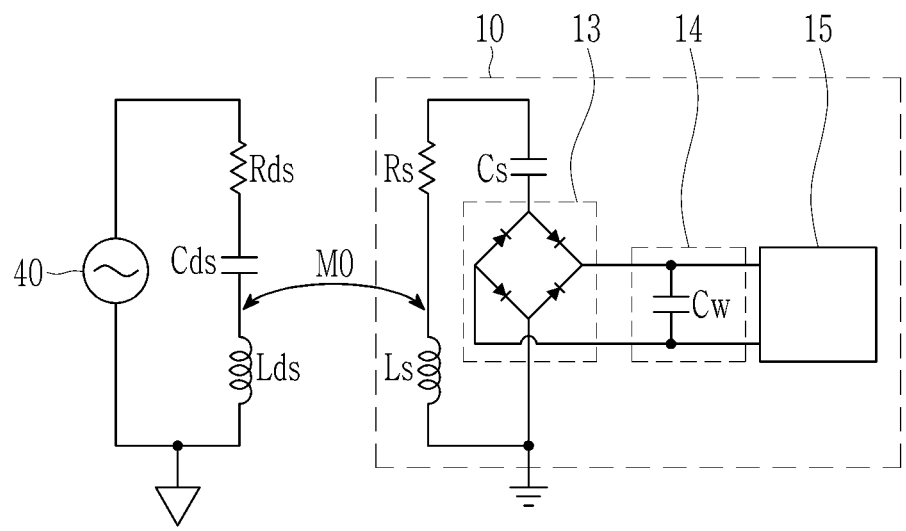

FIG. 158 illustrates a case in which the loop coil Lds and the internal capacitor Cds are connected in series, and the resistor Rs, the inductor Ls, and the capacitor Cs of the resonance circuit 12 are connected in series.

Next, a stylus pen, an electronic device, and an input system including the same according to an embodiment will be described with reference to FIG. 159 to FIG. 163.

Figure 159:
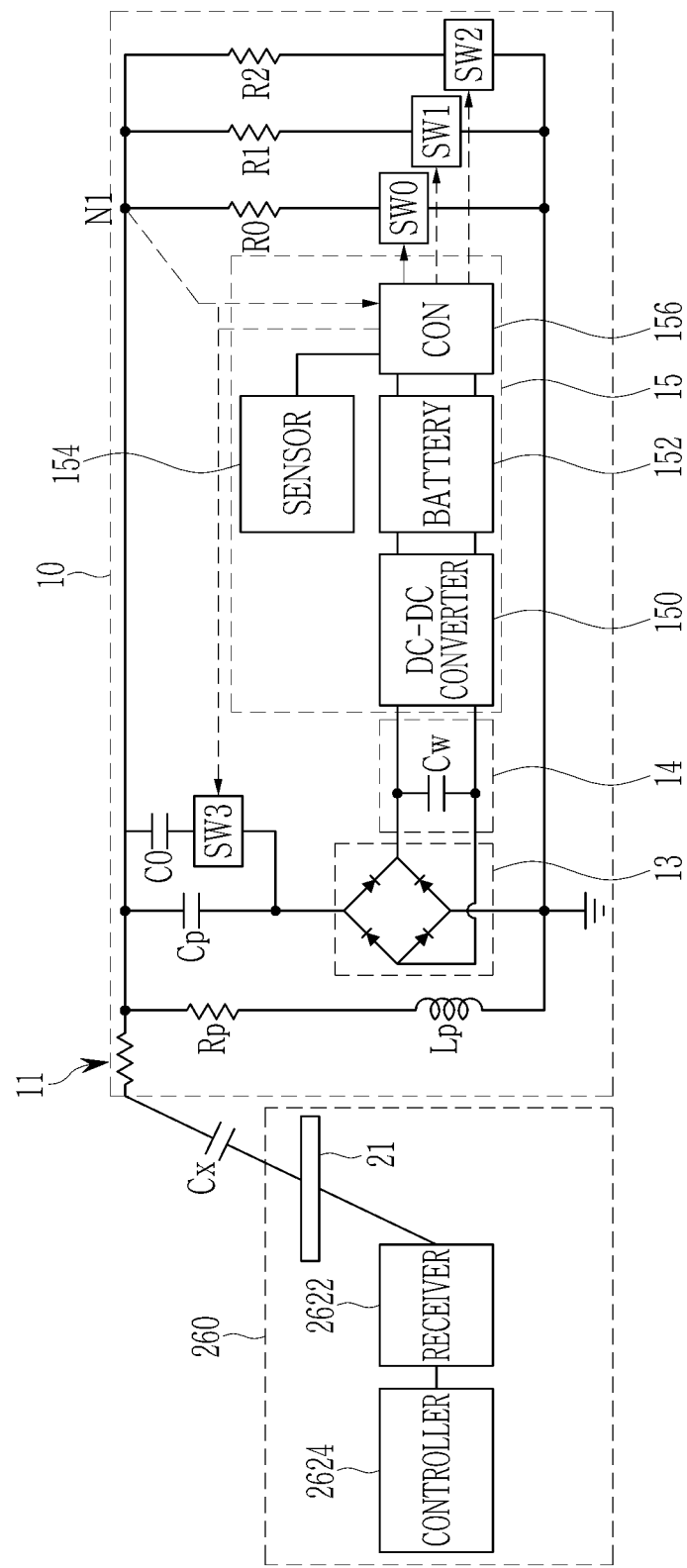
FIG. 159 partially illustrates a stylus pen and an electronic device according to an embodiment

FIG. 159 partially illustrates a stylus pen and an electronic device according to an embodiment Hereinafter, descriptions of the same components as those described with reference to FIG. 153 to FIG. 158 will be omitted.

The active circuit 15 may include a DC/DC converter 150, a battery 152, a sensor 154, and a controller 156. Herein, the DC/DC converter 150 and the battery 152 may not be included depending on a design.

The DC/DC converter 150 may boost or down-convert power stored in the power storage 14 to supply an appropriate charging voltage to the battery 152. When the battery 152 is not included in the active circuit 15, the DC/DC converter 150 may supply the converted voltage as an operating voltage of the controller 156.

The battery 152 may be charged with a voltage supplied from the DC/DC converter 150, and the charged voltage may be supplied as the operating voltage of the controller 156. When the DC/DC converter 150 is not included in the active circuit 15, the battery 152 functions as the power storage 14.

The sensor 154 may include at least one of a pen pressure sensor for acquiring a change in pressure depending on pressure of a pen tip 11, an acceleration sensor for obtaining a change in inclination of the stylus pen 10, a mechanical input means (or a mechanical key, e.g., a button positioned on a back or side surface of the stylus pen 10, a dome switch, a jog wheel, a jog switch, etc.), a proximity sensor, an illumination sensor, a touch sensor, a magnetic sensor, a gyroscope sensor, a motion sensor, an RGB sensor, an infrared (IR) sensor, a finger scan sensor, an optical sensor (e.g., camera), a microphone, a battery gauge, an environmental sensor (e.g., a barometer, a hygrometer, a thermometer, a radiation sensor, a thermal sensor, a gas detection sensor, etc.), or a chemical sensor (e.g., an electronic nose, a healthcare sensor, a biometric sensors, etc.).

The controller 156 controls an overall operation of the stylus pen 10.

The controller 156 may transfer a sensor input to the electronic device 2 by controlling a magnitude of the resonance signal depending on an input from the sensor 154. The controller 154 may modulate a sensor input value by an OOK method or an ASK method by controlling on and off of switches SW0, SW1, and SW2 depending on an input value from the sensor. In FIG. 159, it is illustrated that a total of three resistors are connected in parallel to represent 4 bits, but more or fewer resistors may be included. This will be described with reference to FIG. 160 and FIG. 161.

Figure 160:
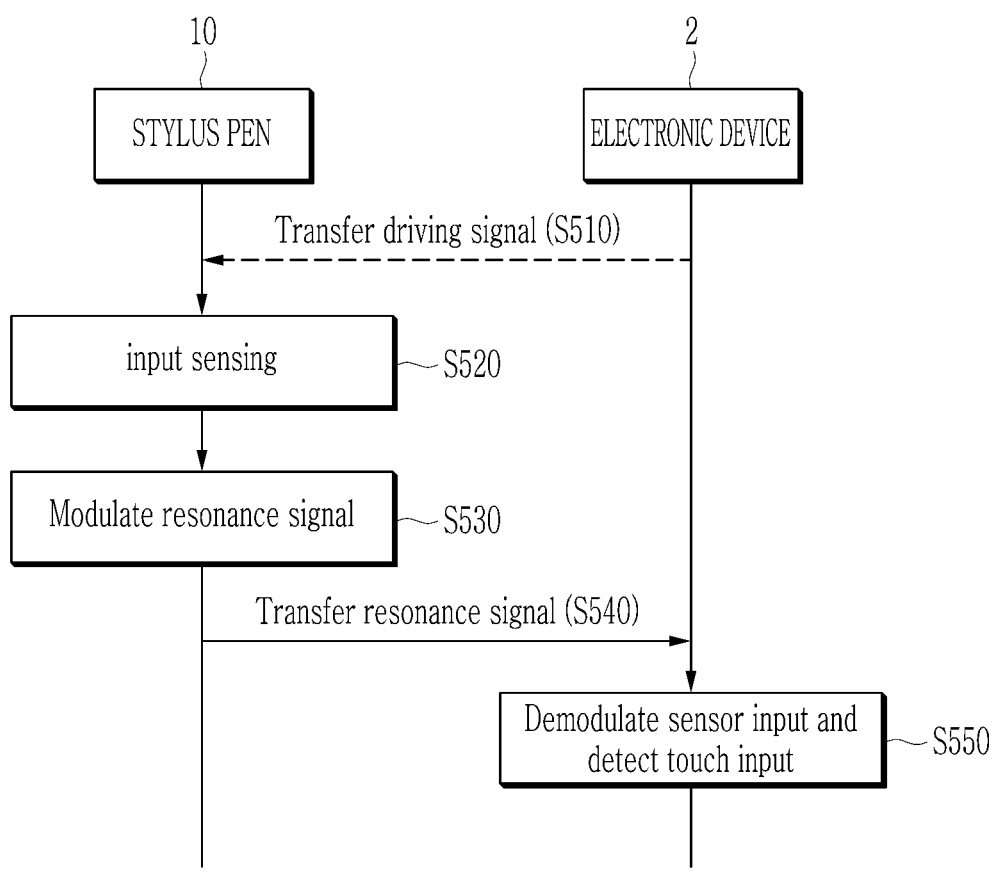
FIG. 160 illustrates a flowchart showing a sensor input operation of a stylus pen and an electronic device according to an embodiment.
Figure 161:
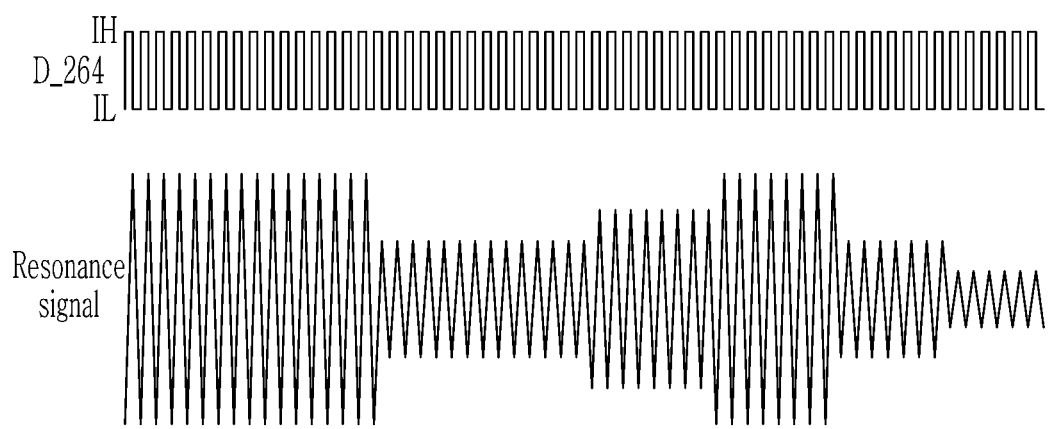
FIG. 161 illustrates a waveform diagram showing an example of a driving signal and a resonance signal depending on FIG. 160.

FIG. 160 illustrates a flowchart showing a sensor input operation of a stylus pen and an electronic device according to an embodiment, and FIG. 161 illustrates a waveform diagram showing an example of a driving signal and a resonance signal depending on FIG. 160.

As illustrated in FIG. 160, the electronic device 2 transfers a driving signal to the stylus pen 10 (S510). The driving signal may charge the power storage 14 or 152 of the stylus pen 10. When the power storage 14 or 152 is sufficiently charged, this step may be omitted.

The sensor 154 senses an input (S520). The input may be various inputs according to a type of the sensor 154.

The controller 156 modulates a resonance signal depending on the sensed input (S530). Then, the modulated resonance signal is transferred to the electronic device 2 (S540). As illustrated in FIG. 1611, the resonance signal modulated by the ASK method may be transferred to the electronic device 2.

The electronic device 2 acquires data sensed by the sensor 154 by demodulating the transferred resonance signal, and detects a touch input as the resonance signal (S550). Hereinafter, data transferred to the electronic device 2 depending on a type of the sensor 154 will be described.

When the sensor 154 is a pen pressure sensor and detects a hovering state, the controller 156 may control at least one of the switches SW0, SW1, or SW2 to change a magnitude of the resonance signal. For example, the controller 156 may connect a voltage of the first node N1 to a ground of the battery 152 to stop an output of the resonance signal in the hovering state. In this case, the controller 2624 may detect that a magnitude of the resonance signal received through the touch electrode 21 is very small or that the resonance signal itself is not received, and determine that there is no touch input by the stylus pen 10. As another example, the controller 156 may output data indicating the hovering state as a resonance signal through a signal modulation method using the magnitude of the resonance signal. Then, the controller 2624 may demodulate the resonance signal received by the drivers/receivers 2620 and 2622 to obtain data indicating that a device is in the hovering state, and may not process the received resonance signal as a touch input.

When the sensor 154 is an acceleration sensor and detects an inclination angle, the controller 156 may control at least one of the switches SW0, SW1, or SW2 to change a magnitude of the resonance signal. The controller 156 may output data indicating the inclination angle as a resonance signal through a signal modulation method using the magnitude of the resonance signal. Then, the controller 2624 may demodulate the resonance signal received by the drivers/receivers 2620 and 2622 to obtain data indicating the inclination angle, and may adjust a touch area to correspond to the inclination angle. When the inclination angle of the stylus pen 10 from the Z-axis (refer to FIG. 4) is large, the controller 2624 adjusts it to have a larger value than the touch area depending on the touch input inputted by the resonance signal to generate touch data.

When the sensor 154 is a button or touch sensor, and detects that a user's button is pressed or a touch sensor is touched, the controller 156 may control at least one of the switches SW0, SW1, or SW2 to change a magnitude of the resonance signal. The controller 156 may output data indicating the button being pressed or a touch input as a resonance signal through the signal modulation method using the magnitude of the resonance signal. Then, the controller 2624 may demodulate the resonance signal received by the drivers/receivers 2620 and 2622 to obtain the data indicating the button being pressed or the touch input, and may generate touch data indicating the button being pressed or the touch input. The electronic device 2 may process the user input received by the electronic device 2 by using touch data indicating the button being pressed or the touch input. For example, in the case where the electronic device 2 further includes a camera, when touch data indicating the button being pressed or the touch input of the stylus pen 10 is received, the controller 270 may perform an operation of capturing an image with the camera. For example, in the case where the electronic device 2 further includes a speaker, when touch data indicating the button being pressed or the touch input of the stylus pen 10 is received, the controller 270 may control a volume of a sound outputted to the speaker, or perform an operation to start or stop the reproduction of the sound.

When the sensor 154 is an illuminance sensor and detects ambient illuminance, the controller 156 may control at least one of the switches SW0, SW1, or SW2 to change a magnitude of the resonance signal. The controller 156 may output data indicating the ambient illuminance as a resonance signal through a signal modulation method using the magnitude of the resonance signal. Then, the controller 2624 may demodulate the resonance signal received by the drivers/receivers 2620 and 2622 to obtain data indicating the ambient illuminance, and may transfer it to the controller 270 or the display controller 252. Then, luminance of the image displayed on the display panel 251 may be adjusted depending on the ambient illuminance.

When the sensor 154 is a magnetic sensor and detects a direction in which the stylus pen 10 faces, the controller 156 may control at least one of the switches SW0, SW1, or SW2 to change a magnitude of the resonance signal. The controller 156 may output data indicating the direction in which the stylus pen 10 faces as a resonance signal through the signal modulation method using the magnitude of the resonance signal. Then, the controller 2624 may demodulate the resonance signal received by the drivers/receivers 2620 and 2622 to acquire data indicating the direction in which the stylus pen 10 faces, and may transfer it to the controller 270. Then, the controller 270 may display the direction in which the stylus pen 10 faces on the display panel 251 as a compass image or the like. The controller 270 may generate a signal for controlling another external device positioned in the direction the stylus pen 10 faces. In this case, it is assumed that the direction in which the external device is positioned with respect to the electronic device 2 is stored in the memory 220.

When the sensor 154 is a gyroscope sensor or a motion sensor and detects a users motion input, the controller 156 may control at least one of the switches SW0, SW1, or SW2 to change a magnitude of the resonance signal. The controller 156 may output data indicating the motion input as a resonance signal through a signal modulation method using the magnitude of the resonance signal. Then, the controller 2624 may demodulate the resonance signal received by the drivers/receivers 2620 and 2622 to acquire data indicating the motion input, and may transfer it to the controller 270. Then, the controller 270 may perform an operation depending on the motion input.

When the sensor 154 is an RGB sensor, a light sensor, or an infrared sensor, and detects external light, the controller 156 may control at least one of the switches SW0, SW1, or SW2 to change a magnitude of the resonance signal. The controller 156 may output data indicating a color, image, or infrared level of external light as a resonance signal through the signal modulation method using the magnitude of the resonance signal. Then, the controller 2624 may demodulate the resonance signal received by the drivers/receivers 2620 and 2622 to acquire data indicating the color, image, or infrared level of the external light, and may transfer it to the controller 270. Then, the controller 270 may perform an operation depending on the color, image, or infrared level of the external light.

When the sensor 154 is a fingerprint sensor and detects a user's fingerprint input, the controller 156 may authenticate a user by comparing an input fingerprint image with a fingerprint image stored in a memory (not illustrated) of the active circuit 15. Then, when the user is an authenticated user, the controller 156 may control at least one of the switches SW0, SW1, or SW2 to change a magnitude of the resonance signal.

For example, the controller 156 may connect a voltage of the first node N1 to a ground of the battery 152 to stop an output of the resonance signal during use by an unauthenticated user. In this case, the controller 2624 may detect that a magnitude of the resonance signal received through the touch electrode 21 is very small or that the resonance signal itself is not received, and determine that there is no touch input by the stylus pen 10. As another example, the controller 156 may output data indicating the use by the unauthenticated user as a resonance signal through a signal modulation method using the magnitude of the resonance signal. Then, the controller 2624 may demodulate the resonance signal received by the drivers/receivers 2620 and 2622 to obtain data indicating that a device is in use by the unauthenticated user, and may not process the received resonance signal as a touch input.

When the sensor 154 is a microphone and detects an external sound, the controller 156 may control at least one of the switches SW0, SW1, or SW2 to change a magnitude of the resonance signal. The controller 156 may output data indicating the external sound as a resonance signal through a signal modulation method using the magnitude of the resonance signal. Then, the controller 2624 may demodulate the resonance signal received by the drivers/receivers 2620 and 2622 to acquire data indicating the external sound, and may transfer it to the controller 270. Then, the controller 270 may perform an operation depending on the external sound.

When the sensor 154 is a battery gauge and detects the state of charge (SOC, OCV, etc.) of the batteries 14 and 152, the controller 156 may control at least one of the switches SW0, SW1, or SW2 to change a magnitude of the resonance signal. The controller 156 may output data indicating a battery charging state as a resonance signal through a signal modulation method using the magnitude of the resonance signal. Then, the controller 2624 may demodulate the resonance signal received by the drivers/receivers 2620 and 2622 to acquire data indicating the state of charge of the batteries 14 and 152, and may adjust a magnitude of the driving signal applied to the loop coil 264. When the state of charge of the batteries 14 and 152 is full, the controller 2624 may reduce the magnitude of the driving signal. When the state of charge of the batteries 14 and 152 is equal to or less than a threshold value, the controller 2624 may increase the magnitude of the driving signal.

When the sensor 154 is a thermometer and detects an ambient temperature, the controller 156 may control at least one of the switches SW0, SW1, or SW2 to change a magnitude of the resonance signal. The controller 156 may output data indicating the ambient temperature as a resonance signal through a signal modulation method using the magnitude of the resonance signal. In this case, the controller 156 may control the switch SW3 to change a resonance frequency. For example, when the ambient temperature increases, the controller 156 may control the switch SW3 to increase the resonance frequency. The controller 156 may reduce the resonance frequency by controlling the switch SW3 when the ambient temperature decreases. Then, the controller 2624 may demodulate the resonance signal received by the drivers/receivers 2620 and 2622 to acquire data indicating the ambient temperature, and may adjust a frequency of the driving signal applied to the loop coil 264. When it is determined that the temperature increases, the controller 2624 may decrease the frequency of the driving signal. When it is determined that the temperature increases, the controller 2624 may decrease the magnitude of the driving signal.

In addition, sensed data depending on a function of the sensor 154 may be modulated according to various data modulation methods and transferred to the electronic device 2. Then, the controllers 2624 and 270 may acquire sensor data by demodulating the received resonance signal, and may perform appropriate control in response thereto.

Next, the controller 156 may change the resonance frequency of the resonance circuit 12 by demodulating the driving signal transferred through the touch electrode 21. This will be described with reference to FIG. 162 and FIG. 163.

Figure 162:
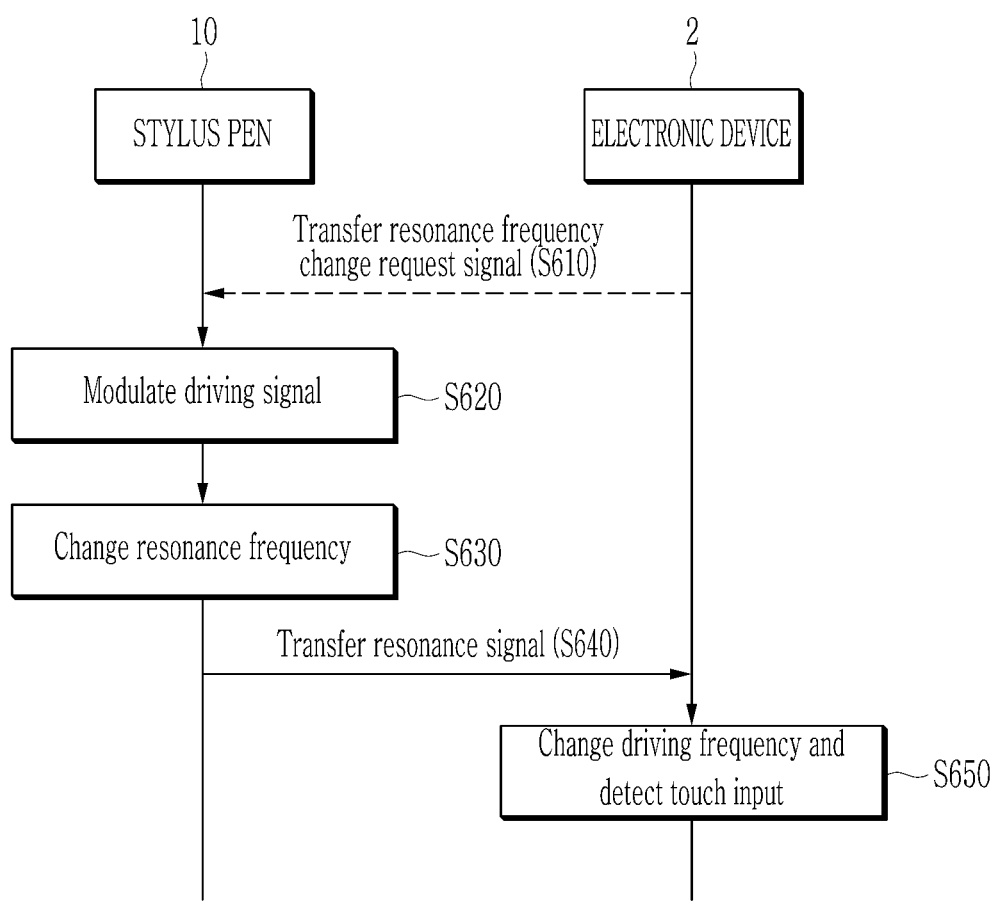
FIG. 162 illustrates a flowchart showing an operation of changing a resonance frequency of a stylus pen and an electronic device according to an embodiment.
Figure 163:
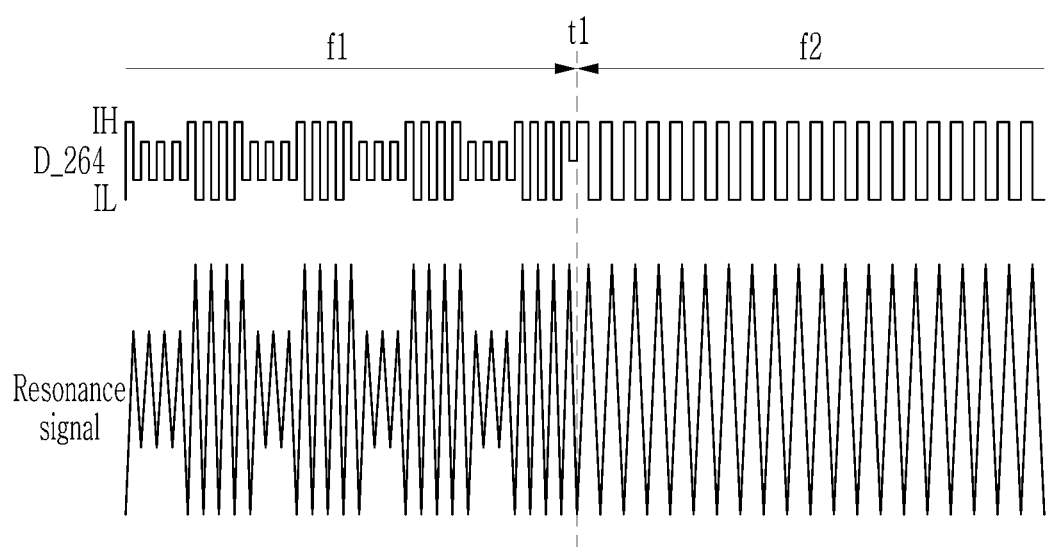
FIG. 163 illustrates a waveform diagram showing an example of a driving signal and a resonance signal depending on FIG. 162.

FIG. 162 illustrates a flowchart showing an operation of changing a resonance frequency of a stylus pen and an electronic device according to an embodiment, and FIG. 163 illustrates a waveform diagram showing an example of a driving signal and a resonance signal depending on FIG. 162.

The electronic device 2 may be vulnerable to noise having a frequency that is similar to the resonance frequency depending on the design of the resonance circuit built in the stylus pen 10. Accordingly, the controller 2624 may change a driving frequency of the driving signal when a noise component having a same or similar frequency as the driving frequency of the current driving signal is included, or only a noise signal that is equal to or similar to the driving frequency of the current driving signal exists in a signal received from the driver/receiver 2622.

As illustrated in FIG. 162, the control unit 2624 transmits a resonance frequency change request signal to the stylus pen 10 (S610). Before changing the driving frequency of the driving signal, the controller 2624 may modulate the resonance frequency change request signal to the driving signal to apply it to the touch electrode 21. As illustrated in FIG. 163, the controller 2624 may modulate the resonant frequency change request signal to the driving signal in an ASK method to transfer it to the stylus pen 10 before changing a frequency f1 of the driving signal to a frequency f2.

The controller 156 determines whether a frequency change request signal is received by demodulating the driving signal transferred through the touch electrode 21 (S620).

When there is a frequency change request, the controller 156 controls the switch SW3 to change the resonance frequency of the resonance circuit 12 (S630). Then, the stylus pen 10 transfers the resonance signal to the electronic device 2 (S640). In this case, although the resonance frequency is changed, when the driving frequency of the driving signal is not changed, a magnitude of the resonance signal may be reduced.

When the resonance frequency of the resonant circuit 12 is changed, the controller 2624 changes a frequency of the driving signal to the changed resonance frequency, and detects a touch input (S650). Referring back to FIG. 163, at a time t1, the controller 2624 changes the driving frequency of the driving signal to the frequency f2. In this case, the changed resonance frequency of the resonance circuit 12 may be a predetermined frequency. Meanwhile, the controller 156 may output data indicating that the resonance frequency is changed through a signal modulation method using the magnitude of the resonance signal as a resonance signal, to check whether the resonance frequency is changed. Alternatively, after the controller 2624 transmits the frequency change request signal, when the magnitude of the received resonance signal decreases, or when a predetermined time elapses after the frequency change request signal is transferred, the controller 2624 may determine that the resonance frequency has changed.

Next, a stylus pen, an electronic device, and an input system including the same according to another embodiment will be described with reference to FIG. 164 to FIG. 166.

Figure 164:
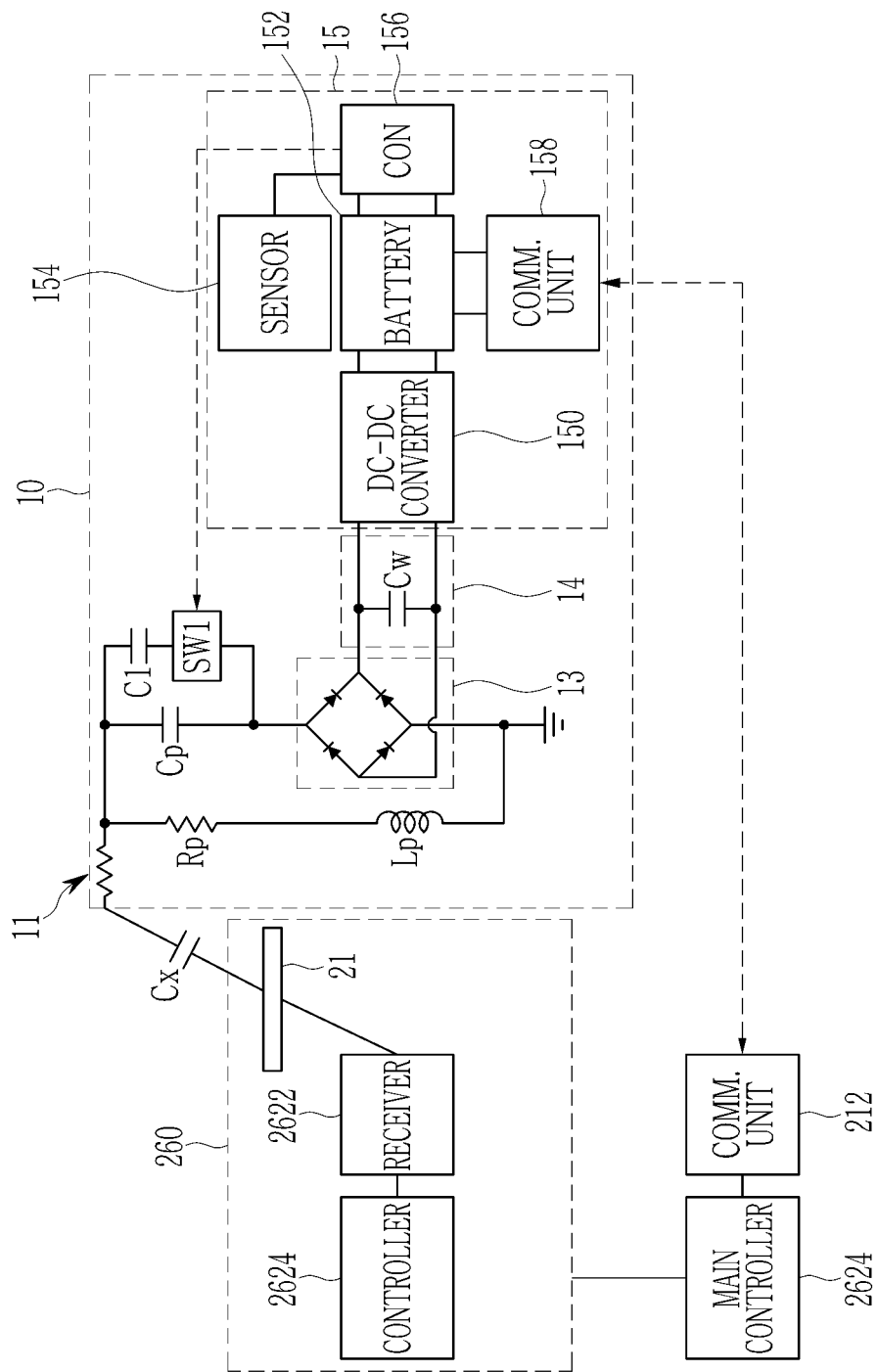
FIG. 164 partially illustrates a stylus pen and an electronic device according to an embodiment.

FIG. 164 partially illustrates a stylus pen and an electronic device according to an embodiment Hereinafter, descriptions of the same components as those described with reference to FIG. 159 will be omitted.

As illustrated in FIG. 164, the stylus pen 10 further includes a communication unit 158 capable of communicating with an external communication module 212 and the like.

The communication unit 158 may perform short-range wireless communication by using at least one of Bluetooth™, radio frequency identification (RFID), infrared data association (IrDA), ultra wideband (UWB), ZigBee, near field communication (NFC), wireless-fidelity (Wi-Fi), Wi-Fi Direct, or a Wireless universal serial bus (USB) technique. A short-range communication method of the communication unit 158 may be a short-range communication protocol other than the above-described communication protocol, and the present invention is not limited to the above description.

The controller 156 may transfer an input from the sensor 154 to the electronic device 2 through the communication unit 158. It will be described together with reference to FIG. 165.

Figure 165:
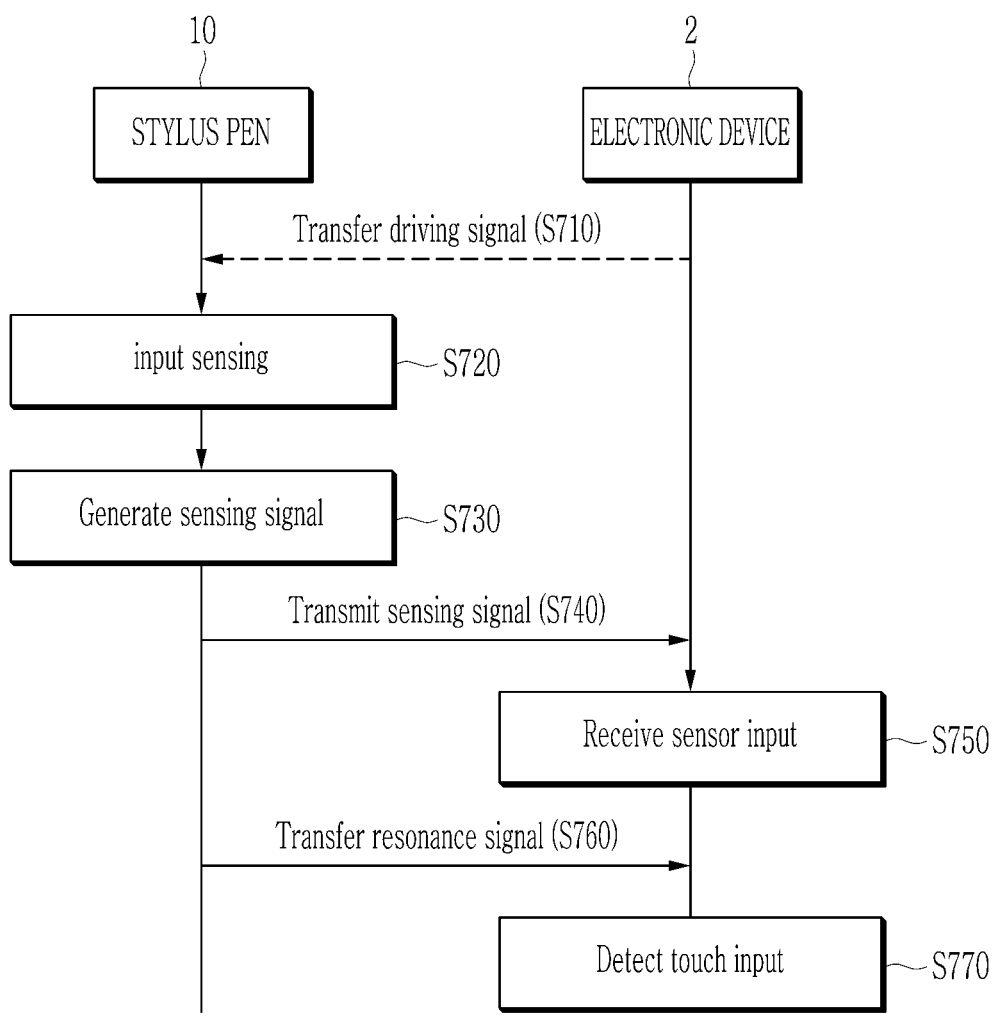
FIG. 165 illustrates a flowchart showing a sensor input operation of a stylus pen and an electronic device according to another embodiment.

FIG. 165 illustrates a flowchart showing a sensor input operation of a stylus pen and an electronic device according to another embodiment.

As illustrated, the electronic device 2 transfers a driving signal to the stylus pen 10 (S710). The driving signal may charge the power storage 14 or 152 of the stylus pen 10. When the power storage 14 or 152 is sufficiently charged, this step may be omitted.

The sensor 154 senses an input (S720). The input may be various inputs according to a type of the sensor 154.

The controller 156 generates a sensing signal depending on the sensed input (S730). Then, the generated resonance signal is transferred to the electronic device 2 (S740).

The electronic device 2 receives the transferred communication signal and acquires data sensed by the sensor 154 (S750).

Separately, the stylus pen 10 transfers a resonance signal depending on the driving signal to the electronic device 2 (S760), and the electronic device 2 detects a touch input as the resonance signal (S770).

Next, the controller 156 may change the resonance frequency of the resonance circuit 12 by demodulating the driving signal transferred through the touch electrode 21. This will be described together with reference to FIG. 166.

Figure 166:
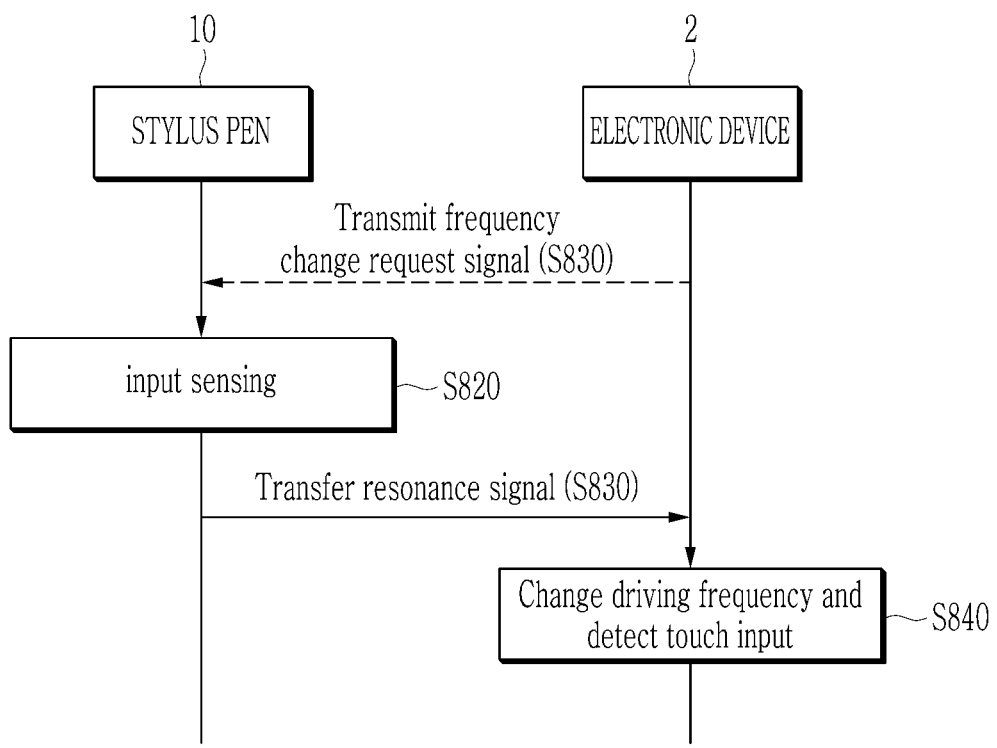
FIG. 166 illustrates a flowchart showing an operation of changing a resonance frequency of a stylus pen and an electronic device according to another embodiment.

FIG. 166 illustrates a flowchart showing an operation of changing a resonance frequency of a stylus pen and an electronic device according to another embodiment.

As illustrated therein, the controller 2624 transfers the resonance frequency change request signal to the stylus pen 10 through the short-range communication module 212 (S810). The controller 2624 may transmit the resonance frequency change request signal to the stylus pen 10 before changing the driving frequency of the driving signal.

When the resonance frequency change request signal is received through the communication unit 158, the controller 156 controls the switch SW3 to change a resonance frequency of the resonant circuit 12 (S820). When the resonance frequency is changed, the communication unit 158 transfers data indicating that the resonance frequency is changed to the short-range communication module 212, or transfers data indicating a timing at which the resonance frequency is to be changed to the short-range communication module 212. Then, the stylus pen 10 transfers the changed resonance signal to the electronic device 2 (S830).

When the resonance frequency of the resonant circuit 12 is changed, the controller 2624 changes a frequency of the driving signal to the changed resonance frequency, and detects a touch input (S840). After the controller 2624 transmits the frequency change request signal, when the magnitude of the received resonance signal decreases, or when a predetermined time elapses after the frequency change request signal is transferred, the controller 2624 may determine that the resonance frequency has changed.

Next, examples in which a stylus pen and an electronic device transmit and receive signals will be described with reference to FIG. 167 to FIG. 170.

Figure 167:
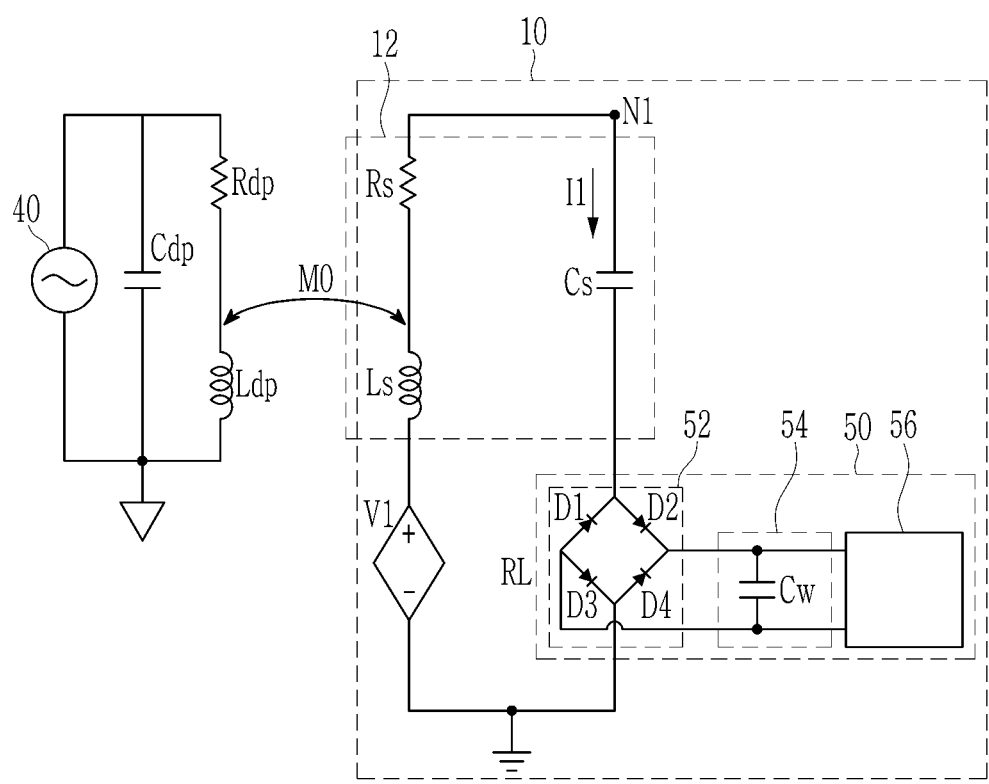
FIG. 167 and FIG. 168 illustrate a schematic circuit diagram showing a stylus pen and an electronic device.
Figure 168:
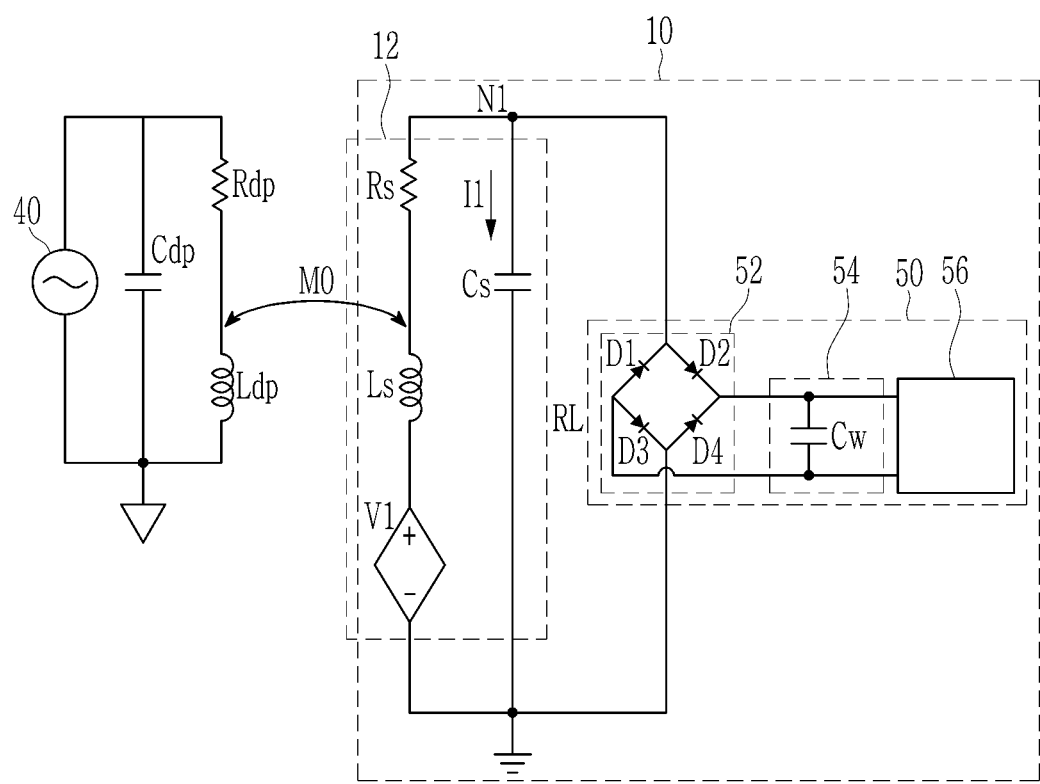

FIG. 167 and FIG. 168 illustrate a schematic circuit diagram showing a stylus pen and an electronic device.

As illustrated in FIG. 167, the active module 50 is connected in series to a resistor Rs, an inductor Ls, and a capacitor Cs.

At a side of the electronic device side, when a loop coil Ldp generates a magnetic field by a driving signal from the power source 40, a current I1 is induced in the inductor Ls of the stylus pen 10 so as to enable the resonance circuit 12 to resonate. A degree to which a current is induced in the inductor Ls by the loop coil Ldp is affected by mutual inductance M0.

Alternatively, when the loop coil Ldp and the internal capacitor Cdp resonate by the driving signal from the power source 40, the resonance circuit 12 of the stylus pen 10 may also mutually resonate with the loop coil and the internal capacitor. In this case, a degree of mutual resonance between the loop coil Ldp, the internal capacitor Cdp, and the resonance circuit 12 is affected by the mutual inductance M0.

At the side of the electronic device, the transferred energy is represented as a voltage source V1. V1 may be determined as in Equation 6 below.

$$V1 = 2\pi f0 \cdot k \cdot \sqrt{L1 \cdot L2} \cdot I1 \qquad \text{[Equation 6]}$$

Herein, f0 indicates the resonance frequency of the resonant circuit 12, L1 indicates inductance of the inductor Ldp, L2 indicates inductance of the inductor Ls, and k indicates a coupling coefficient of the inductor Ldp and the inductor Ls. L1 is several tens to several hundreds of pH, L2 is several mH, and k is 0 or more and less than 1 (e.g., k may be 0 or more and less than 0.9).

A resonant energy in the resonance circuit 12 may be rectified by the rectifier 52 and stored in the power storage 54. Then, an active IC 56 may be driven by using the power stored in the power storage 54.

In the case where the active module 50 is represented by equivalent resistance RL, when the resonance circuit 12 resonates, the resistance Rs and the resistance RL must be the same to receive maximum energy from the electronic device. When the resistance Rs and the resistance RL are the same, a voltage applied to the node N1 becomes V1/2.

A voltage transferred to opposite ends of the power storage 54 is calculated as in Equation 7 below in consideration of threshold voltages Vth of the diodes D1 to D4 included in the rectifier 52.

$$V_{Cw} = \frac{V1}{4} - 2Vth \qquad \text{[Equation 7]}$$

Herein, it is assumed that the threshold voltages Vth are greater than 0 V and less than or equal to 0.5 V.

The inventors found that a voltage $V_{Cw}$ stored in the power storage 54 is not sufficient to drive the active IC 56. That is, the driving voltage for operating the active IC 56 is greater than the voltage $V_{Cw}$ stored in the power storage 54. In addition, there is a problem in that an additional device is required to convert the voltage to a voltage sufficient to drive the active IC 56. In addition, although the equivalent resistance RL and the resistance Rs should have a same value, a resistance value of the active module 50 is greater than the resistance Rs, so there is a problem that impedance conversion is required.

Accordingly, the inventors have considered a structure in which the active module 50 is connected in parallel to the resonance circuit 12.

As illustrated in FIG. 168, the active module 50 is connected in parallel to a resistor Rs, an inductor Ls, and a capacitor Cs.

Figure 169:
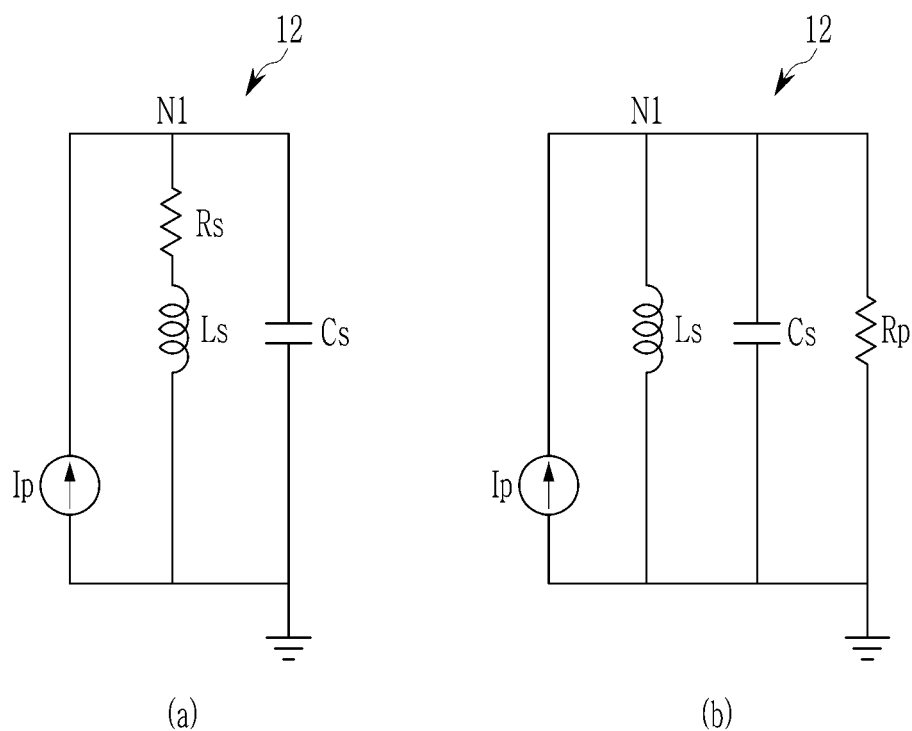
FIG. 169 and FIG. 170 schematically illustrate the stylus pen of FIG. 168.
Figure 170:
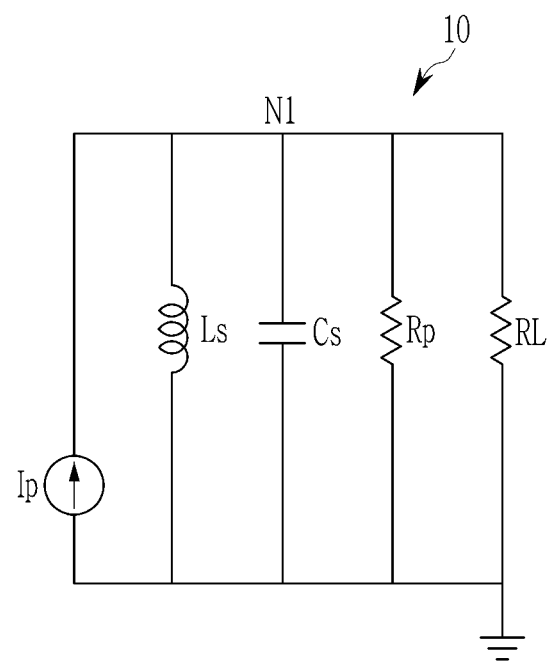

In this case, as in FIG. 169 and FIG. 170, the internal circuit of the stylus pen 20 was converted by using Norton's theorem in order to calculate a resistance (RL) value capable of receiving the maximum energy from the electronic device.

FIG. 169 and FIG. 170 schematically illustrate the stylus pen of FIG. 168.

As illustrated in FIG. 169A, the dependent voltage source V1 is converted to a current source Ip, and the resistor Rs, the inductor Ls, and the capacitor Cs are connected in parallel at the node N1.

In this case, a current of the current source Ip is calculated as in Equation 8 below.

$$Ip = \frac{V1}{(Rs + j \cdot 2\pi f0 \cdot L2)} \qquad \text{[Equation 8]}$$

As illustrated in FIG. 169b, the resistor Rs is converted into a resistor Rp connected in parallel with the inductor Ls and the capacitor Cs at the node N1. In this case, the resistance Rp is calculated as in Equation 9 below.

$$Rp = Rs \cdot \left(\frac{2\pi f0 \cdot L2}{Rs}\right)2 \qquad \text{[Equation 9]}$$

As illustrated in FIG. 170, in the case where the active modules 50 are connected in parallel, when the equivalent resistance RL has a same resistance value as the resistance Rp, the stylus pen 10 may receive maximum energy from the electronic device.

However, since the resonance frequency f0 is several tens to several hundreds of kHz, the resistance Rp is greater than the equivalent resistance RL. The equivalent resistance RL may be several hundred Ω. Accordingly, combined resistance in which the equivalent resistance RL and the resistance Rp are connected in parallel has a value that is similar to the equivalent resistance RL than the resistance Rp.

In this case, a voltage applied to the node N1 may be calculated as Ip*RL, and may be expressed as Equation 10 below.

$$V_{N1} = \frac{V1 \cdot RL}{(Rs + j \cdot 2\pi f0 \cdot L2)} \quad \text{[Equation 10]}$$

In Equation 10, $V_{N1}$ indicates a voltage across the node N1. In Equation 10, since the inductance L2 is several mH, the voltage $V_{N1}$ across the node N1 is very small. The inventors found that a voltage $V_{C_w}$ stored in the power storage 54 depending on Equation 7 is not sufficient to drive the active IC 56. In addition, there is a problem in that an additional device is required to convert the voltage to a voltage sufficient to drive the active IC 56.

Next, the stylus pen 10 according to the present disclosure will be described with reference to FIG. 171 to FIG. 173.

Figure 171:
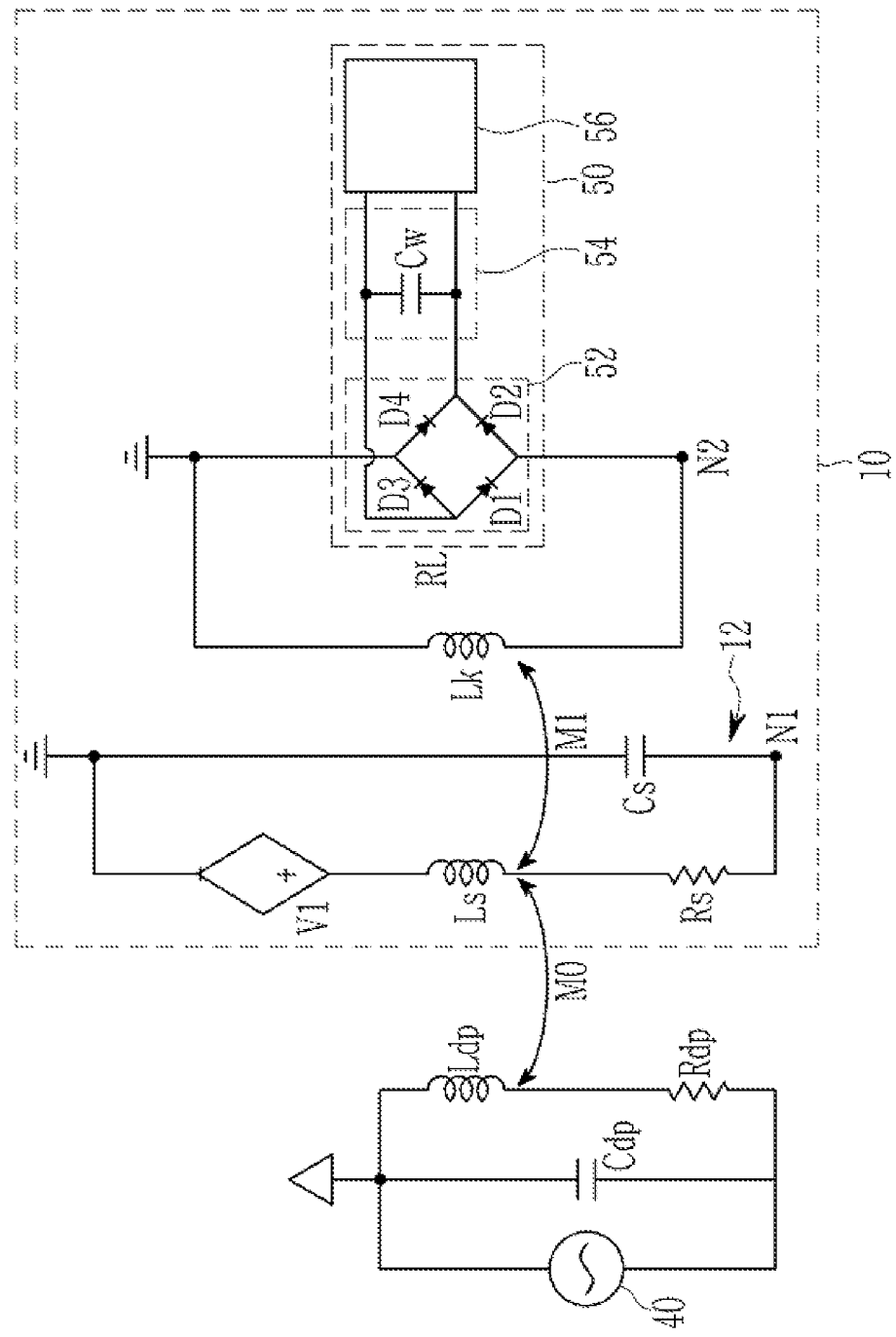
FIG. 171 illustrates a schematic circuit diagram showing a stylus pen and an electronic device according to an embodiment.
Figure 172:
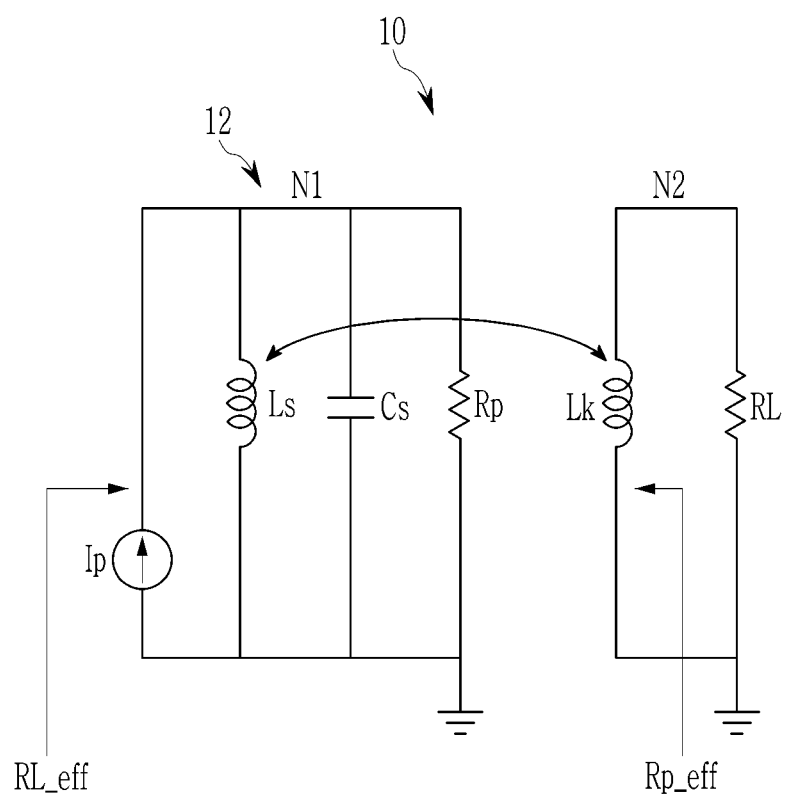
FIG. 172 and FIG. 173 schematically illustrate the stylus pen of FIG. 171.
Figure 173:
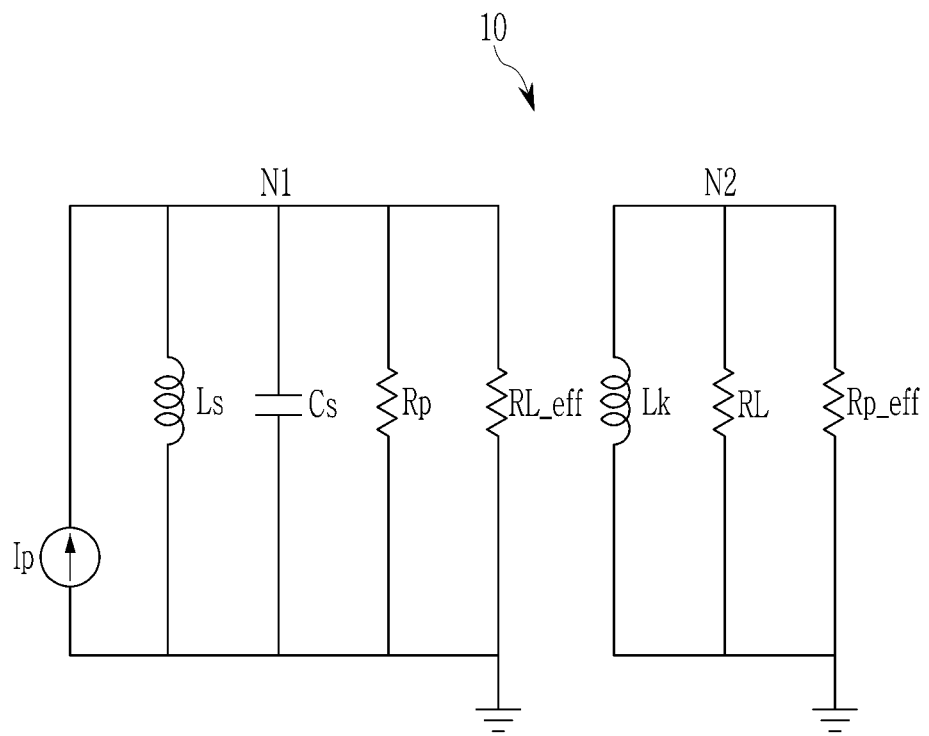

FIG. 171 illustrates a schematic circuit diagram showing a stylus pen and an electronic device according to an embodiment, and FIG. 172 and FIG. 173 schematically illustrate the stylus pen of FIG. 171.

Referring to FIG. 171, in addition to the resonant circuit 12, the stylus pen 10 further includes an inductor Lk connected to the inductor Ls of the resonance circuit 12 through mutual inductance M1, and an active module 50 connected to the inductor Lk.

The active module 50 may include a rectifier 52, a power storage 54, and an active IC 56.

In FIG. 172, the resonance circuit 12, the inductor Lk, and the equivalent resistance RL of the active module 50 are illustrated as an equivalent circuit. A resistance RL_eff when the resonance circuit 12 faces the equivalent resistance RL and a resistance Rp_eff when the resonant circuit 12 is viewed from the equivalent resistance RL may be calculated by using Equations 11 and 12 below in order to calculate a voltage across the equivalent resistor RL, i.e. a voltage across node N2.

$$RL\_eff = \left(\frac{n2}{n3}\right)^2 \cdot RL \quad \text{[Equation 11]}$$

$$Rp\_eff = \left(\frac{n3}{n2}\right)^2 \cdot Rp \quad \text{[Equation 12]}$$

In Equations 11 and 12, n2 indicates a number of turns of the inductor Ls, and n3 indicates a number of turns of the inductor Lk.

As illustrated in FIG. 173, the resistance Rp_eff when the resonance circuit unit 12 viewed from the equivalent resistance RL is connected in parallel to the active module 50, and the resistance RL_eff when the equivalent resistance RL viewed from the resonance circuit 12 is connected in parallel to the resistance Rp of the resonance circuit 12.

A voltage of the node N2 is determined by Equation 13 below with the voltage of the node N1 and numbers of turns of the inductor Ls and the inductor Lk.

$$V_{N2} = \left(\frac{n3}{n2}\right) \cdot V_{N1} \quad \text{[Equation 13]}$$

Since the combined resistance of the resistor Rp and the resistor RL_eff calculated in Equation 9 is several hundred kΩ, when the current Ip calculated in Equation 8 is multiplied, a voltage at the node N1 is calculated as several hundred V.

It is assumed that a ratio of n2 and n3 is a:1 (10<a<300). Then, the voltage at the node N2 is calculated to be at least several V. Even considering threshold voltages of the diodes D1 to D4, the voltage at the node N2 has a sufficient value to drive the active IC 56.

Next, the stylus pen 10 and the loop coil 264 of the present disclosure will be described with reference to FIG. 174 to FIG. 176.

Figure 174:
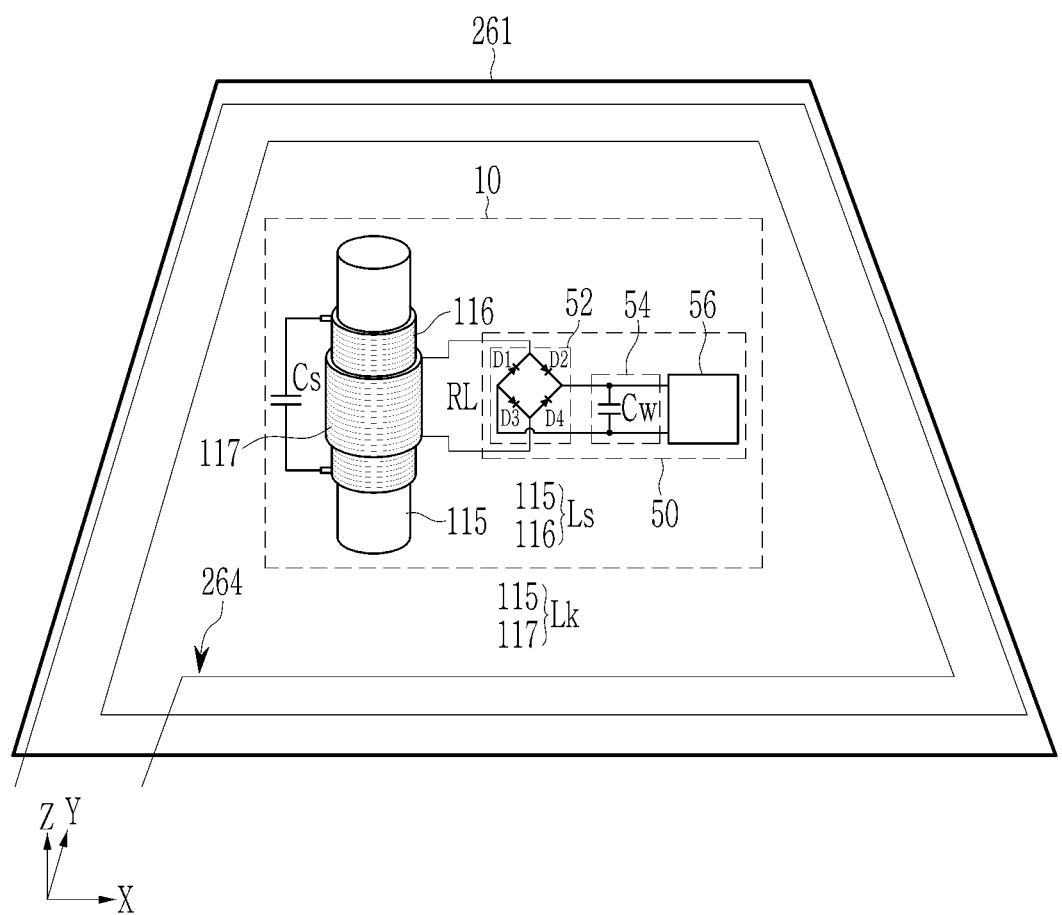
FIG. 174 to FIG. 176 partially illustrate a stylus pen and an electronic device according to various aspects of an embodiment.
Figure 175:
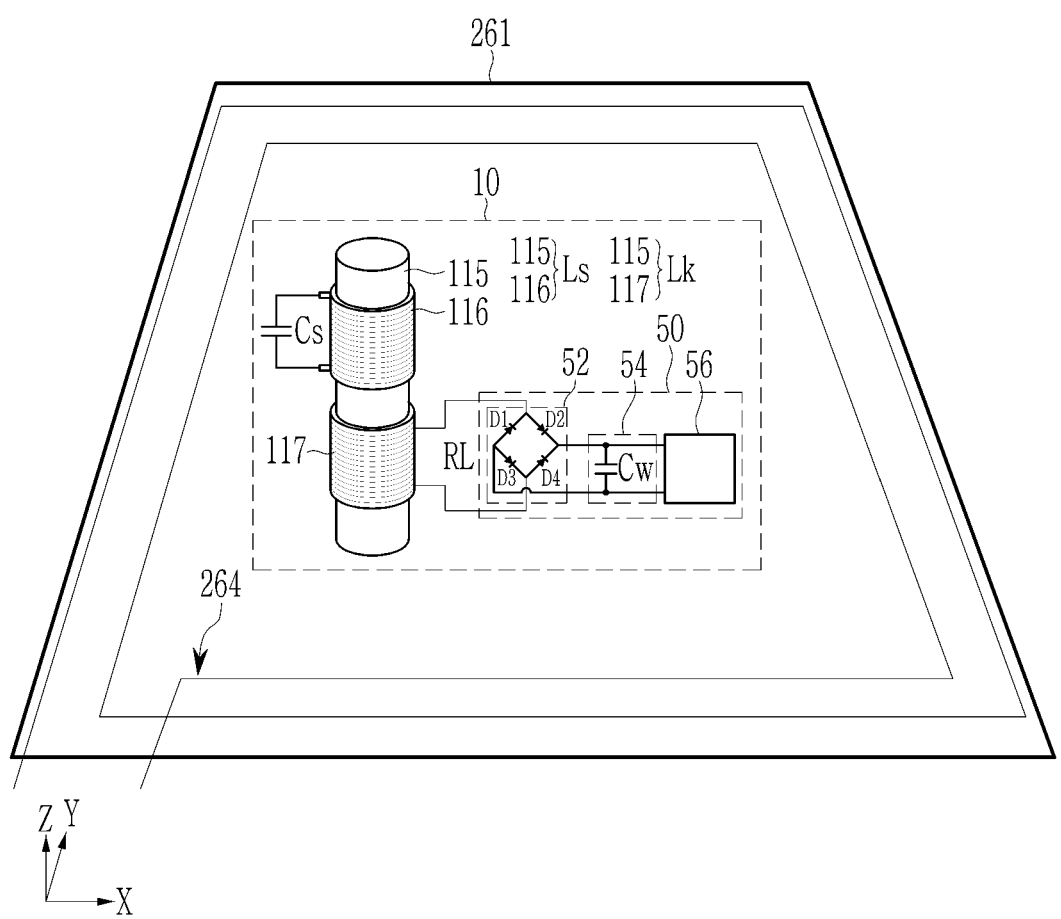
Figure 176:
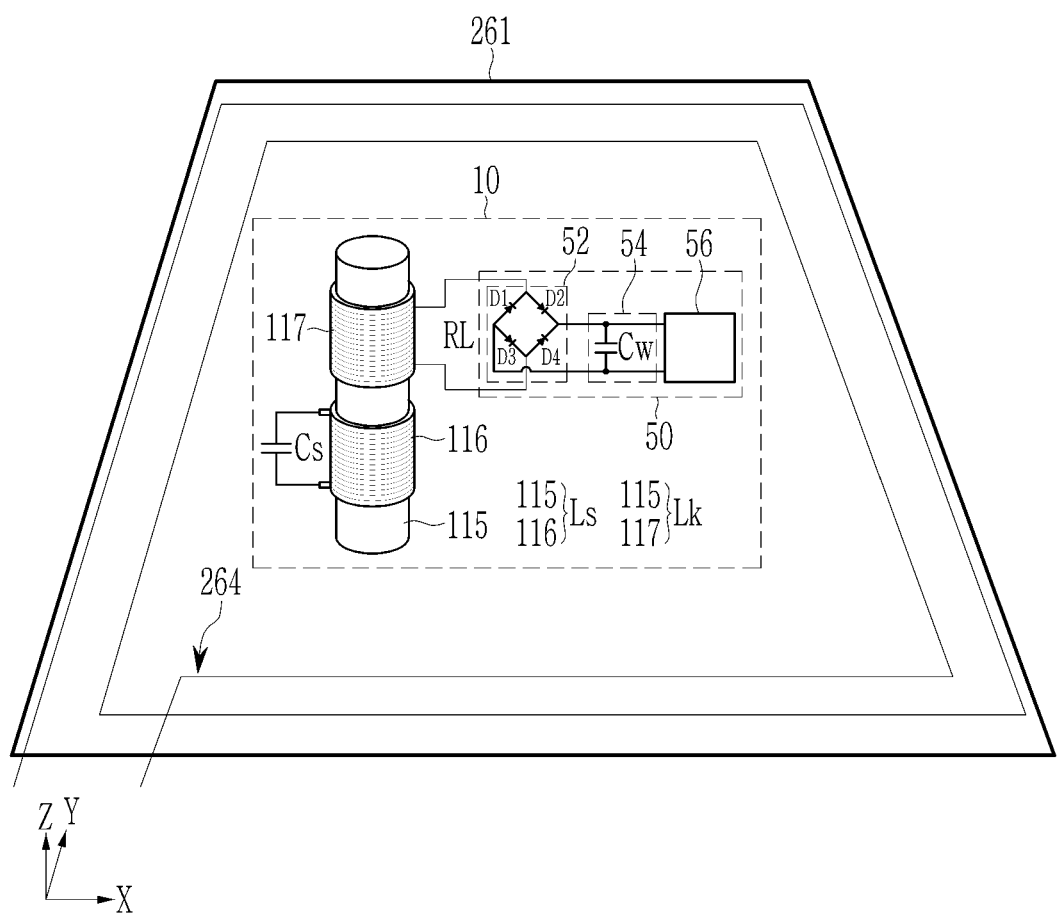

FIG. 174 to FIG. 176 partially illustrate a stylus pen and an electronic device according to various aspects of an embodiment.

Referring to FIG. 174 to FIG. 176, the resonance circuit 12 includes an inductor Ls and a capacitor Cs, and the inductor Ls includes a ferrite core 115 and a coil 116 wound around the ferrite core 115.

As illustrated in FIG. 174, the inductor Lk includes the ferrite core 115 and the coil 117 wound on the outside of the coil 116 (directly wound around the ferrite core 115).

As illustrated in FIG. 175, the inductor Lk includes the ferrite core 115 and a coil 117 directly wound around the ferrite core 115 while positioned below the coil 116 (that is, in a −Z-axis direction).

As illustrated in FIG. 176, the inductor Lk includes the ferrite core 115 and the coil 117 directly wound around the ferrite core 115 while positioned on the coil 116 (i.e., in a +Z-axis direction).

In FIG. 174 to FIG. 176, the active module 50 is connected to the coil 117. The coil 116 and the coil 117 are close to a perfect coupling state, and a coupling coefficient between the coil 116 and the coil 117 has a value close to 1 (e.g., 0.9 or more and less than 1).

According to the stylus pen 10 of the present disclosure, there is an advantage that a voltage required to drive the active module 50 may be supplied through energy transferred from the electronic device 2 by combining the resonance circuit 12 and the active module 50 with a transformer.

In addition, there is an advantage that the stylus pen 10 may be more quickly charged.

In addition, there is an advantage in that power consumption in the electronic device 2 for charging the stylus pen 10 may be reduced.

Figure 177:
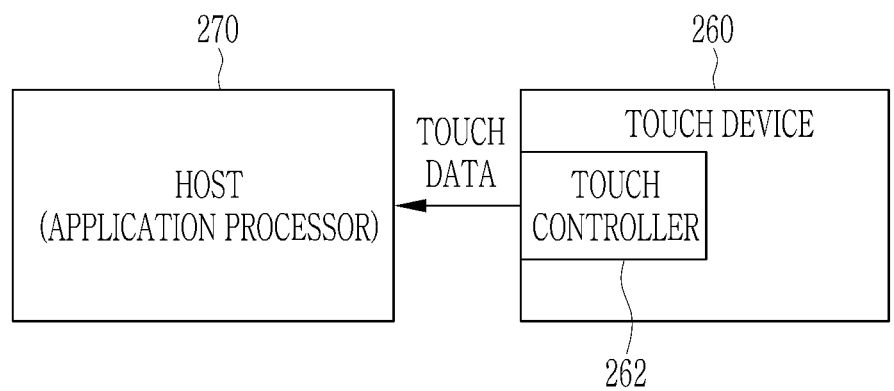
FIG. 177 illustrates a block diagram showing a touch module and a host.
Figure 178:
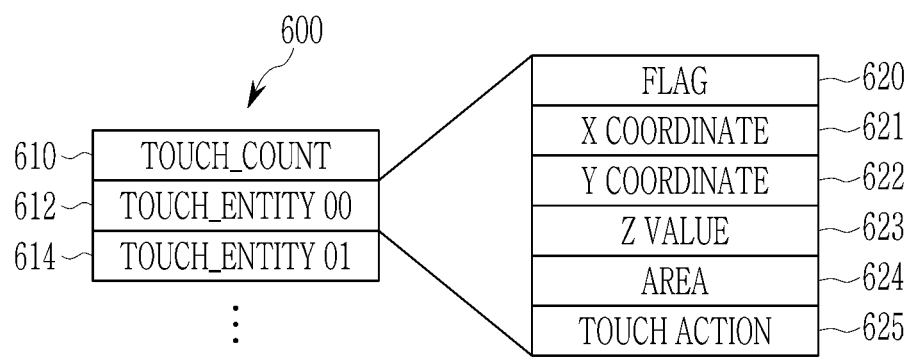
FIG. 178 illustrates an example of touch data provided to a host from a touch module.

FIG. 177 illustrates a block diagram showing a touch module and a host, and FIG. 178 illustrates an example of touch data provided to a host from a touch module.

Referring to FIG. 177, a host 270 may receive touch data from the touch controller 262 included in the touch module 260. For example, the host 270 may be a mobile system-on-chip (SoC), an application processor (AP), a media processor, a microprocessor, a central processing unit (CPU), or a device similar thereto.

After one frame ends, the touch module 260 may generate information related to the touch input during one frame as touch data to transfer it to the host 270.

Referring to FIG. 177 and FIG. 178, touch data 600 may be transferred from the touch module 260 to the host 270, and may include a touch count field 610 and one or more touch entity fields 612 and 614. In addition, the touch data 600 may further include sensor input data from the stylus pen 10, data indicating a change of a resonance signal, and the like.

In the touch count field 610, a value indicating a number of touches that are inputted during one frame period may be written. The touch entity fields 612 and 614 include fields indicating information related to each touch input. For example, the touch entity fields 612 and 614 may include a flag field 620, an X-axis coordinate field 621, a Y-axis coordinate field 622, a Z-value field 623, an area field 624, and a touch action field 625.

A number of the touch entity fields 612 and 614 may be equal to a value written in the touch count field 610.

A value representing a touch object may be written in the flag field 620. For example, a finger, a palm, and a stylus pen may be filled in the flag field 620 with different values. Values representing the calculated touch coordinates may be written in the X-axis coordinate field 621 and the Y-axis coordinate field 622. A value corresponding to the signal strength of the sensing signal may be written in the Z-value field 623. A value corresponding to an area of the touched area may be written in the area field 624.

According to embodiments, the host 270 receiving touch data 600 determines that a touch object is the finger when the touch area is larger than the threshold by using the value of the area field 624, and determines that the touch object is the stylus pen 10 when the touch area is less than or equal to the threshold.

According to the embodiments, the host 270 receiving the touch data 600 may identify whether the touch object is the finger or the stylus pen 10 by using the value of the flag field 620.

The electronic device according to various embodiments disclosed in this document may be various types of apparatus. The electronic device may include, e.g., a portable communication device (e.g., a smart phone), a computer device, a portable multimedia device, a portable medical device, a camera, a wearable device, or a home appliance device. The electronic device according to the embodiments of the present document is not limited to the above-described devices.

The various embodiments of this document and the terms used therein are not intended to limit the technical features described in this document to specific embodiments, and should be understood to include various modifications, equivalents, or substitutions of the embodiments. In connection with the description of the drawings, like reference numerals may be used for similar or related components. The singular form of the noun corresponding to the item may include one or more of the item, unless the relevant context clearly dictates otherwise. As used herein, each of the phrases "A or B", "at least one of A and B", "at least one of A or B," "A, B or C," "at least one of A, B, and C," and "at least one of A, B, or C" may include all possible combinations of the items listed together in the corresponding one of the phrases. Terms such as "1st", "2nd", "first", or "second" may simply be used to distinguish a component from another component, and the component is not limited in another aspect (e.g., importance or order). When one (e.g., first) component is "coupled" or "connected" to another (e.g., second) component, with or without the terms "functionally" or "communicatively", this indicates that one component may be connected to the other component directly (e.g., by wire), wirelessly, or through a third component.

As used herein, the term "module" may include a unit implemented in hardware, software, or firmware, and may be used interchangeably with terms such as, e.g., logic, logic block, component, or circuit. A module may be an integrally formed part or a minimum unit or a portion of the part that performs one or more functions. For example, according to an embodiment, the module may be implemented in the form of an application-specific integrated circuit (ASIC).

Various embodiments of the present document may be implemented as software (e.g., a program) including one or more commands stored in a storage medium (e.g., internal memory or external memory) readable by a machine (e.g., an electronic device). For example, a processing unit (e.g., processor) of a device (e.g., an electronic device) may call one or more commands stored from a storage medium and execute it. This makes it possible for the device to be operated to perform one or more functions depending on the called one or more commands. The one or more commands may include codes generated by a compiler or executable by an interpreter. The device-readable storage medium may be provided in the form of a non-transitory storage medium. Herein, 'non-transitory' only indicates that the storage medium is a tangible device and does not include a signal (e.g., electromagnetic wave), and this term does not distinguish between a case in which data is stored semi-permanently in a storage medium and a case in which data is temporarily stored therein.

According to an embodiment, the method according to various embodiments disclosed in this document may be provided as being included in a computer program product. A computer program product may be traded between a seller and a buyer as a commodity. The computer program product may be distributed in the form of a machine-readable storage medium (e.g., compact disc read only memory (CD-ROM)), or may be distributed (e.g., downloaded or uploaded) via an application store (e.g., Play Store™), directly between two user devices (e.g., smart phones), or in an online manner. In the case of online distribution, at least a part of the computer program product may be at least temporarily stored or temporarily created in a machine-readable storage medium such as a memory of a server of a manufacturer, a server of an application store, or a memory of a relay server.

According to various embodiments, each component (e.g., a module or a program) of the above-described components may include a singular entry or a plurality of entities. According to various embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to being performed by the corresponding component among the plurality of components prior to the integration. According to various embodiments, operations performed by a module, program, or other component may be executed sequentially, in parallel, repeatedly, or heuristically, one or more of the operations may be executed in a different order or may be omitted, or one or more other operations may be added.

The invention claimed is:
1. An electronic device comprising:
a loop coil;
a display unit configured to include a plurality of pixels;
a display driver configured to apply a data signal and a scan signal to the pixels based on a vertical synchronization signal and a horizontal synchronization signal;
a plurality of touch electrodes positioned on the display unit;
a driving receiver configured to apply a driving signal to the loop coil during a first period and to receive a sensing signal from at least one of the touch electrodes during a second period after the first period; and a controller configured to generate touch information by using the sensing signal received during a sensing period and determine a period excluding a period during which a scan signal applied to one pixel among the pixels is at an enable level as the sensing period, wherein the driving signal is synchronized to at least one pulse of the vertical synchronization signal and the horizontal synchronization signal.

2. The electronic device of claim 1, wherein
the driving receiver is synchronized with a pulse of the horizontal synchronization signal to receive the sensing signal.

3. An electronic device comprising:
a loop coil;
a display unit configured to include a plurality of pixels;
a display driver configured to apply a data signal and a scan signal to the pixels based on a vertical synchronization signal and a horizontal synchronization signal;
a plurality of touch electrodes positioned on the display unit;
a driving receiver configured to apply a driving signal to the loop coil during a first period and to receive a sensing signal from at least one of the touch electrodes during a second period after the first period; and
a controller configured to generate touch information by using some sensing signals received during a sensing period determined in response to the horizontal synchronization signal among the sensing signals and determine a period excluding a period from a time when the pulse of the horizontal synchronization signal is generated to a predetermined second time from a time when the pulse of the horizontal synchronization signal is generated to a predetermined first time as the sensing period, and the predetermined second time exceeds the predetermined first time,
wherein the driving signal is synchronized to at least one pulse of the vertical synchronization signal and the horizontal synchronization signal.

4. An electronic device comprising:
a loop coil;
a display unit configured to include a plurality of pixels;
a display driver configured to apply a data signal and a scan signal to the pixels based on a vertical synchronization signal and a horizontal synchronization signal;
a plurality of touch electrodes positioned on the display unit;
a driving receiver configured to apply a driving signal to the loop coil during a first period and to receive a sensing signal from at least one of the touch electrodes during a second period after the first period; and
a controller configured to generate touch information by using the sensing signal received during a sensing period and determine a period excluding a period during which a data signal is applied to one pixel among the pixels as the sensing period,
wherein the driving signal is synchronized to at least one pulse of the vertical synchronization signal and the horizontal synchronization signal.

5. An electronic device comprising:
a loop coil;
a display unit configured to include a plurality of pixels;
a display driver configured to apply a data signal and a scan signal to the pixels based on a vertical synchronization signal and a horizontal synchronization signal;

a plurality of touch electrodes positioned on the display unit;
a driving receiver configured to apply a driving signal to the loop coil during a first period and to receive sensing signals at two times having opposite phases within one cycle of a frequency of the driving signal from at least one of the touch electrodes during a second period after the first period and apply an emission control signal for controlling the pixels to emit light; and
a controller configured to generate touch information based on the sensing signals,
wherein the driving signal is synchronized to at least one pulse of the vertical synchronization signal and the horizontal synchronization signal, and
wherein the two times are within a period excluding a time at which the emission control signal applied to one of the pixels is transitioned to an enable level.

6. The electronic device of claim 5, wherein
the controller is further configured to generates the touch information by using a difference value between the sensing signals received at the two times.

7. The electronic device of claim 1, wherein
a frequency of the driving signal is an integer multiple of 2 or more of a frequency of the horizontal synchronization signal.

8. A touch device on a display that displays an image of one frame by applying a scan signal and a data signal to a plurality of pixels based on a vertical synchronization signal and a horizontal synchronization signal, the touch device comprising:
a touch sensor unit configured to include a plurality of electrodes;
a driver/receiver configured to apply a driving signal to at least one of the electrodes during a first period and to receive a sensing signal having a predetermined phase difference from the driving signal from at least one of the electrodes during a second period after the first period; and
a controller configured to generate touch information by using the sensing signal and determine a period excluding a period during which a scan signal applied to one pixel among the pixels is at an enable level as a sensing period,
wherein the driving signal is synchronized to at least one pulse of the vertical synchronization signal and the horizontal synchronization signal.

9. The touch device of claim 8, wherein
the driving receiver is synchronized with a pulse of the horizontal synchronization signal to receive the sensing signal.

10. The touch device of claim 9, wherein
the controller generates the touch information by using some sensing signals received during a sensing period determined in response to the horizontal synchronization signal among the sensing signals.

11. A touch device on a display that displays an image of one frame by applying a scan signal and a data signal to a plurality of pixels based on a vertical synchronization signal and a horizontal synchronization signal, the touch device comprising:
a touch sensor unit configured to include a plurality of electrodes;
a driver/receiver configured to apply a driving signal to at least one of the electrodes during a first period and to receive a sensing signal having a predetermined phase difference from the driving signal from at least one of the electrodes during a second period after the first period; and a controller configured to generate touch information by using the sensing signal and determine a period excluding a period from a time when the pulse of the horizontal synchronization signal is generated to a predetermined second time from a time when the pulse of the horizontal synchronization signal is generated to a predetermined first time as the sensing period, and the predetermined second time exceeds the predetermined first time.

12. A touch device on a display that displays an image of one frame by applying a scan signal and a data signal to a plurality of pixels based on a vertical synchronization signal and a horizontal synchronization signal, the touch device comprising:

a touch sensor unit configured to include a plurality of electrodes;

a driver/receiver configured to apply a driving signal to at least one of the electrodes during a first period and to receive a sensing signal having a predetermined phase difference from the driving signal from at least one of the electrodes during a second period after the first period; and a controller configured to generate touch information by using the sensing signal and determine a period excluding a period during which a data signal is applied to one pixel among the pixels as the sensing period, wherein the driving signal is synchronized to at least one pulse of the vertical synchronization signal and the horizontal synchronization signal.

13. The touch device of claim 8, wherein the driving receiver receives the sensing signal at two times having opposite phases within one cycle of a frequency of the driving signal.

14. The touch device of claim 13, wherein the controller generates the touch information by using a difference value between sensing signals received at the two times.

15. The touch device of claim 8, wherein a frequency of the driving signal is an integer multiple of 2 or more of a frequency of the horizontal synchronization signal.

16. A touch system comprising:

a stylus configured to include a resonance circuit;

a display configured to include a display unit configured to include a plurality of pixels, and a display driver configured to apply a data signal and a scan signal to the pixels and an emission control signal for controlling the pixels to emit light based on a vertical synchronization signal and a horizontal synchronization signal;

a plurality of touch electrodes positioned on the display unit;

a driving receiver configured to apply a driving signal to the loop coil during a first period and to receive sensing signals from at least one of the touch electrodes during a second period after the first period; and a controller configured to generate touch information based on the sensing signals at two times having opposite phases within one cycle of a frequency of the driving signal, wherein the driving signal is synchronized to at least one pulse of the vertical synchronization signal and the horizontal synchronization signal, and wherein the two times are within a period excluding a time at which the emission control signal applied to one of the pixels is transitioned to an enable level.

* * * * *